United States Patent
Alshawabkeh et al.

(10) Patent No.: US 9,703,664 B1
(45) Date of Patent: Jul. 11, 2017

(54) SELF ADAPTIVE WORKLOAD CLASSIFICATION AND FORECASTING IN MULTI-TIERED STORAGE SYSTEM USING ARIMA TIME SERIES MODELING

(71) Applicant: EMC IP Holding Company LLC, Hopkinton, MA (US)

(72) Inventors: Malak Alshawabkeh, Franklin, MA (US); Owen Martin, Hopedale, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 102 days.

(21) Appl. No.: 14/748,709

(22) Filed: Jun. 24, 2015

(51) Int. Cl.
G06F 11/00 (2006.01)
G06F 11/34 (2006.01)

(52) U.S. Cl.
CPC ...... G06F 11/3414 (2013.01); G06F 11/3452 (2013.01)

(58) Field of Classification Search
CPC ............. G06F 11/3452; G06F 11/3414; G06F 11/3442
See application file for complete search history.

(56) References Cited

U.S. PATENT DOCUMENTS

| | | | |
|---|---|---|---|
| 7,882,075 B2 * | 2/2011 | Suzuki | G06F 11/3409 707/672 |
| 7,949,637 B1 | 5/2011 | Burke | |
| 8,688,878 B1 * | 4/2014 | Dolan | G06F 3/061 710/33 |
| 8,856,397 B1 | 10/2014 | Marshak et al. | |
| 8,949,483 B1 | 2/2015 | Martin | |
| 9,047,017 B1 | 6/2015 | Dolan et al. | |
| 9,152,349 B2 | 10/2015 | Yochai | |
| 9,274,898 B2 * | 3/2016 | Boldyrev | G06F 11/1458 |
| 9,323,655 B1 | 4/2016 | Sahin et al. | |
| 9,378,136 B1 | 6/2016 | Martin | |
| 2009/0157378 A1 * | 6/2009 | Boldyrev | G06F 11/008 703/22 |
| 2011/0126206 A1 * | 5/2011 | Kato | G06F 1/206 718/103 |

(Continued)

OTHER PUBLICATIONS

Lon-Mu Liu, et al., Forecasting and Time Series Analysis Using the SCA Statistical System, vol. 1, pp. 422, 1992-1994.

*Primary Examiner* — Elmira Mehrmanesh
(74) *Attorney, Agent, or Firm* — Muirhead and Saturnelli, LLC

(57) ABSTRACT

Techniques are described data storage optimization that determine predicted values for I/O statistics using an ARIMA (auto-regressive integrated moving average) model. The ARIMA model may be used to capture periodic patterns and trends of workload I/O access to predict the future load demand. A current set of I/O statistics is collected for a current time period T. Using the current set and one or more ARIMA models, a predicted set of I/O statistics is determined for a next time period T+1. Each of the ARIMA models is characterized by model parameters including P denoting a number of auto-regressive terms, D denoting a number of nonseasonal difference needed for stationarity, and Q denoting a number of lagged forecast errors of prediction. A data storage optimizer may determine one or more data portions for movement from a current storage tier to a target storage tier using the predicted set of I/O statistics.

16 Claims, 54 Drawing Sheets

(56) References Cited

U.S. PATENT DOCUMENTS

| | | | | |
|---|---|---|---|---|
| 2012/0089726 A1* | 4/2012 | Doddavula | ............. | H04L 67/34 709/224 |
| 2012/0310939 A1* | 12/2012 | Lee | ........................ | G06Q 10/04 707/739 |
| 2014/0164328 A1* | 6/2014 | Calo | ................. | G06F 17/30575 707/626 |
| 2014/0325072 A1* | 10/2014 | Zhang | ................... | H04L 47/823 709/226 |
| 2015/0278284 A1* | 10/2015 | Bordignon | ........ | G06F 17/30371 707/693 |

* cited by examiner

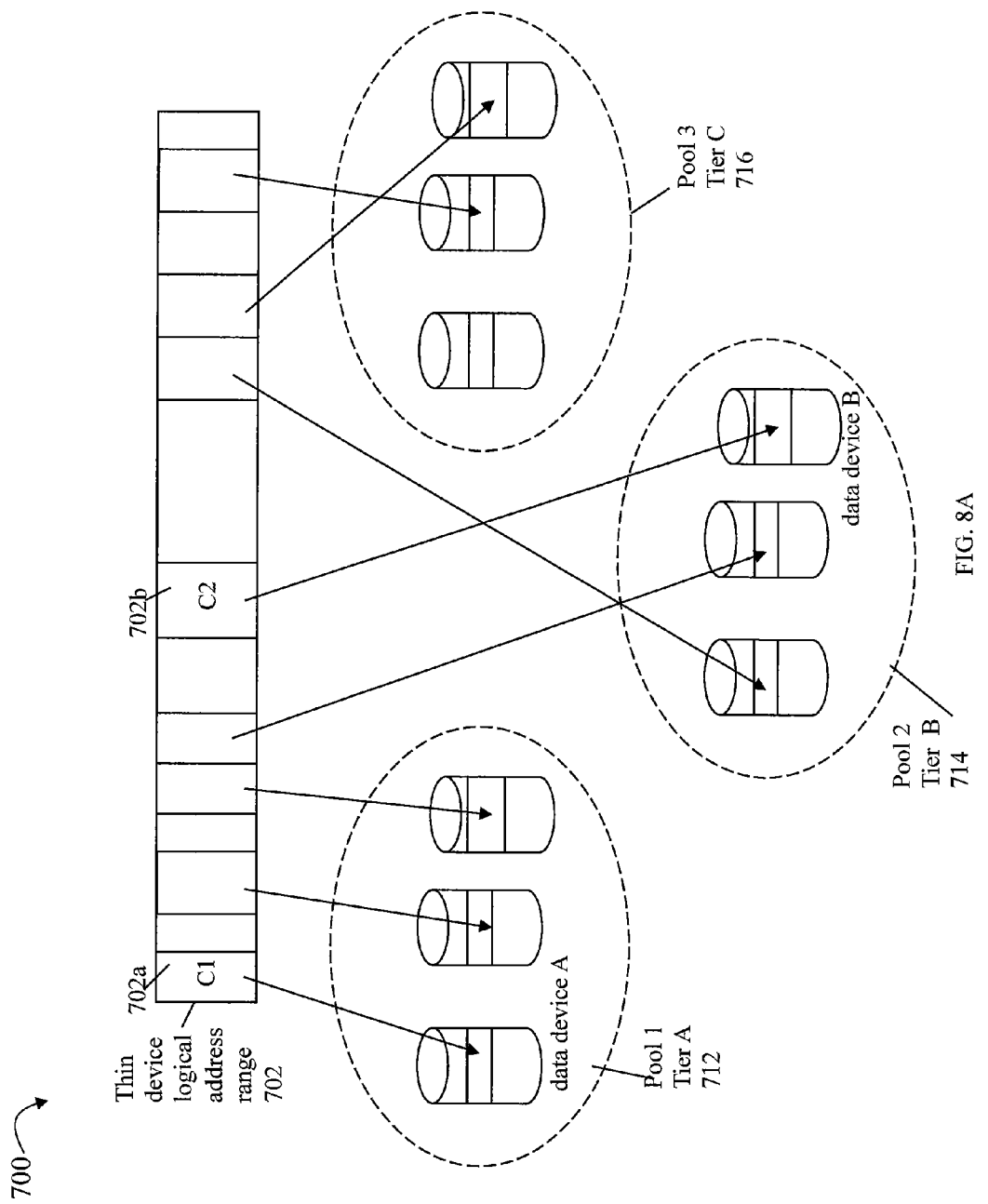

| 1602 | 1604 | 1606 | 1608 | 1610 |
|---|---|---|---|---|
| App/SG | App1/SG1 | App2/SG2 | App3/SG3 | App4/SG4 |
| 1612 RT objectives | 10 | 2 | 5 | 50 |
| 1614 Observed RT (average) | 10.5 | 1.5 | 1.5 | 60 |
| 1616 At, above or below QOS performance target ? | 1616a AT/MEET | 1616b Above | 1616c Above | 1616d Below |
| 1618 App/SG state | 1618a Stable | 1618b -- (Acquire LOWER performance media/decrease performance) | 1618c -- (Acquire LOWER performance media/decrease performance) | 1618d ++ (Acquire HIGHER performance media/increase performance) |

| Media type 2210 | Read heavy Random Small | Read heavy Random Large | Read heavy Sequential Small or Large | Write heavy Random Small | Write heavy Random Large | Read heavy Sequential Small or Large | Idle |
|---|---|---|---|---|---|---|---|
| SLC | G | G | D | G | G | D | D |
| MLC | G | G | D | X | X | X | D |
| 7.2K SATA | X | X | G | X | X | D | D |
| 15K FC | D | G | D | D | G | D | D |

2212: X=bad/not preferred; G=good/preferred; D=don't care

I/O type 2220

| Media type | RAID-1 | RAID-5 | RAID-6 |
|---|---|---|---|
| EFD/Flash | 3 | 6 | 7 |
| FC 15K RPM | 1 | 4 | 8 |
| FC 10K RPM | 2 | 5 | 9 |
| SATA 7.2K RPM | 10 | 11 | 12 |

DSS (Medium DSS Workload)

| I/O Profile | Block Size | % of Total |
|---|---|---|
| Random Read Hit | 32 K | 18% |
| Random Read Miss | 32 K | 18% |
| Random Write | 32 K | 4% |
| Sequential Read | 32 K | 48% |
| Sequential Write | 32 K | 12% |

2720

OLTP (Small-block OLTP)

| I/O Profile | Block Size | % of Total |
|---|---|---|
| Random Read Hit | 4 K | 40% |
| Random Read Miss | 4 K | 24% |
| Random Write | 4 K | 16% |
| Sequential Read | 4 K | 10% |
| Sequential Write | 4 K | 10% |

2730

| I/O Workload | (p,d,q) | AR & MA Coefficients |
|---|---|---|
| OLTP — 2732 | (3,2,3) | AR: -0.317, 0.318, -0.153    MA: 0.764, 0.899, -0.7475 |
| DSSS — 2734 | (2,2,1) | AR: -0.4334, -0.2827    MA: 0.9676 |

2740

| I/O workload | (p, d, q) | ST coefficients | LT coefficients |
|---|---|---|---|
| OLTP — 2742 | (3,2,3) | $\theta_{A1} - \theta_{An}$ ; $\Phi_{A1} - \Phi_{Ap}$ | $\theta_{B1} - \theta_{Bn}$ ; $\Phi_{B1} - \Phi_{Bp}$ |
| DSS — 2744 | (2,2,1) | $\theta_{C1} - \theta_{Cn}$ ; $\Phi_{C1} - \Phi_{Cp}$ | $\theta_{D1} - \theta_{Dn}$ ; $\Phi_{D1} - \Phi_{Dp}$ |

2742a — ST coefficients column (OLTP row: 2742a)
2742b — LT coefficients column (OLTP row: 2742b)
2744a — ST coefficients column (DSS row: 2744a)
2744b — LT coefficients column (DSS row: 2744b)

FIG. 44

SELF ADAPTIVE WORKLOAD CLASSIFICATION AND FORECASTING IN MULTI-TIERED STORAGE SYSTEM USING ARIMA TIME SERIES MODELING

BACKGROUND

Technical Field

This application generally relates to data storage systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes. The logical disk units may or may not correspond to the actual disk drives. Allowing multiple host systems to access the single storage device unit allows the host systems to share data stored therein.

In connection with data storage, a variety of different technologies may be used. Data may be stored, for example, on different types of disk devices and/or flash memory devices. The data storage environment may define multiple storage tiers in which each tier includes physical devices or drives of varying technologies. The physical devices of a data storage system, such as a data storage array, may be used to store data for multiple applications.

SUMMARY OF THE INVENTION

In accordance with one aspect of the invention is a method of performing data storage optimization comprising: collecting a current set of one or more I/O statistics for a current time period T; determining, using the current set of one or more I/O statistics and one or more models, a predicted set of one or more I/O statistics for a next time period T+1, wherein each of the one or more models is used to model at least a first of the one or more I/O statistics of the predicted set, wherein each of the one or more models is an auto-regressive integrate moving average model characterized by model parameters including P denoting a number of auto-regressive terms, D denoting a number of nonseasonal difference needed for stationarity, and Q denoting a number of lagged forecast errors of prediction; and determining, by a data storage optimizer using the predicted set of one or more I/O statistics, one or more data portions for movement from a current storage tier to a target storage tier. At least a first of the one or more data portions selected for movement may be included in a logical device having an average observed response time that is not in accordance with a specified response time objective denoting a performance goal for the logical device. The logical device may have an average observed response time that is greater than the specified response time objective and the method may include moving the first data portion from the current storage tier to the target storage tier, wherein the current storage tier has an associated expected response time that is more than the specified response time objective for the logical device and wherein said target storage tier is a higher performance storage tier than the current storage tier. At least a first of the one or more data portions selected for movement may be included in a first storage pool of storage devices of a first storage tier and the first storage pool may have an average observed response time that is more than a specified response time objective denoting an expected service level objective for physical storage devices of the first storage tier. The method may include moving the first data portion from the current storage tier to a target storage tier that is a higher performance storage tier than the current storage tier. At least a first of the one or more data portions selected for movement may be included in a first storage pool of storage devices of a first storage tier and the first storage pool may have a maximum capacity limit denoting an upper allocation bound wherein a current allocation amount of the first storage pool exceeds the maximum capacity limit. The first data portion may be included in a first extent determined to be idle or has a predicted I/O workload that is lower than any other extent including any others of the one or more data portions. The current set of one or more I/O statistics for the current time period T may include any of a random read miss I/O statistic, a write I/O statistic, and a read miss sequential I/O statistic. The predicted set of one or more I/O statistics for a next time period T+1 may include one or more predicted short term I/O statistics and one or more predicted long term I/O statistics. The one or more predicted short term I/O statistics may include a predicted short term read I/O statistic and a predicted short term write I/O statistic. The one or more predicted long term I/O statistics may include a predicted long term read I/O statistic and a predicted long term write I/O statistic. Each of the one or more models may use an equation or function including a constant, a first set of one or more terms that are the auto-regressive terms and a second set of one or more terms that are lagged forecast errors of prediction. At least a first of the one or more models may use a first set of one or more coefficients and a second set of one or more coefficients, where said first set of coefficients may be used with the first set of one or more terms and said second set of coefficient may be with the second set of one or more terms. Any of the first set of one or more coefficients, second set of one or more coefficients and a value for parameter D may be determined in accordance with I/O workload characteristics of an application issuing I/O operations directed to a set of one or more logical devices including the one or more data portions selected for data movement, wherein said collecting collects information regarding I/O operations of the application observed during the current time period T. The I/O workload characteristics may denote any of: whether I/O workload for the application includes more reads than writes, w I/O workload for the application includes more sequential I/Os than random I/Os, whether I/O workload for the application includes I/Os larger than a specified size, and whether I/O workload for the application includes I/Os of a specified size. Each of the one or more I/O statistics of the predicted set may be a predicted I/O statistic for the next time period T+1 determined using a constant and any of: a weighted sum of one or more observed values for said each I/O statistic in one or more time periods prior to time period T+1 and a weighted sum of one or more error values each denoting an amount of error between a predicted value and an observed value for said each I/O statistic in a particular time period. The logical device may be a virtually provisioned logical device.

In accordance with another aspect of the invention is a system comprising a processor; and a memory comprising code stored thereon, that, when executed, performs a method of data storage optimization comprising: collecting a current set of one or more I/O statistics for a current time period T; determining, using the current set of one or more I/O statistics and one or more models, a predicted set of one or more I/O statistics for a next time period T+1, wherein each of the one or more models is used to model at least a first of the one or more I/O statistics of the predicted set, wherein each of the one or more models is an auto-regressive integrate moving average model characterized by model parameters including P denoting a number of auto-regressive terms, D denoting a number of nonseasonal difference needed for stationarity, and Q denoting a number of lagged forecast errors of prediction; and determining, by a data storage optimizer using the predicted set of one or more I/O statistics, one or more data portions for movement from a current storage tier to a target storage tier.

In accordance with another aspect of the invention is a computer readable medium comprising code stored thereon, that, when executed, performs a method of data storage optimization comprising: collecting a current set of one or more I/O statistics for a current time period T; determining, using the current set of one or more I/O statistics and one or more models, a predicted set of one or more I/O statistics for a next time period T+1, wherein each of the one or more models is used to model at least a first of the one or more I/O statistics of the predicted set, wherein each of the one or more models is an auto-regressive integrate moving average model characterized by model parameters including P denoting a number of auto-regressive terms, D denoting a number of nonseasonal difference needed for stationarity, and Q denoting a number of lagged forecast errors of prediction; and determining, by a data storage optimizer using the predicted set of one or more I/O statistics, one or more data portions for movement from a current storage tier to a target storage tier. At least a first of the one or more data portions selected for movement may be included in a logical device having an average observed response time that is not in accordance with a specified response time objective denoting a performance goal for the logical device. The logical device may have an average observed response time that is greater than the specified response time objective and the method may include moving the first data portion from the current storage tier to the target storage tier, wherein the current storage tier has an associated expected response time that is more than the specified response time objective for the logical device and wherein said target storage tier is a higher performance storage tier than the current storage tier. Any of a promotion score and a demotion score may be determined for each of the one or more data portions using the predicted set of one or more I/O statistics.

BRIEF DESCRIPTION OF THE DRAWINGS

Features and advantages of the present invention will become more apparent from the following detailed description of exemplary embodiments thereof taken in conjunction with the accompanying drawings in which:

FIGS. 8A and 8B are examples illustrating thin devices and associated structures that may be used in an embodiment in accordance with techniques herein;

FIG. 16 is an example of information that may be specified for different applications for use in an embodiment in accordance with techniques herein;

FIG. 28 is an example illustrating ranking of I/O type preferences for different media types or PD technologies in an embodiment in accordance with techniques herein;

FIG. 33 is an example of a ranking of media types that may be used in an embodiment in accordance with techniques herein;

FIGS. 43 and 44 are examples illustrating I/O workload characteristics used to select parameters and/or coefficients in an embodiment in accordance with techniques herein;

DETAILED DESCRIPTION OF EMBODIMENT(S)

Figure 1:
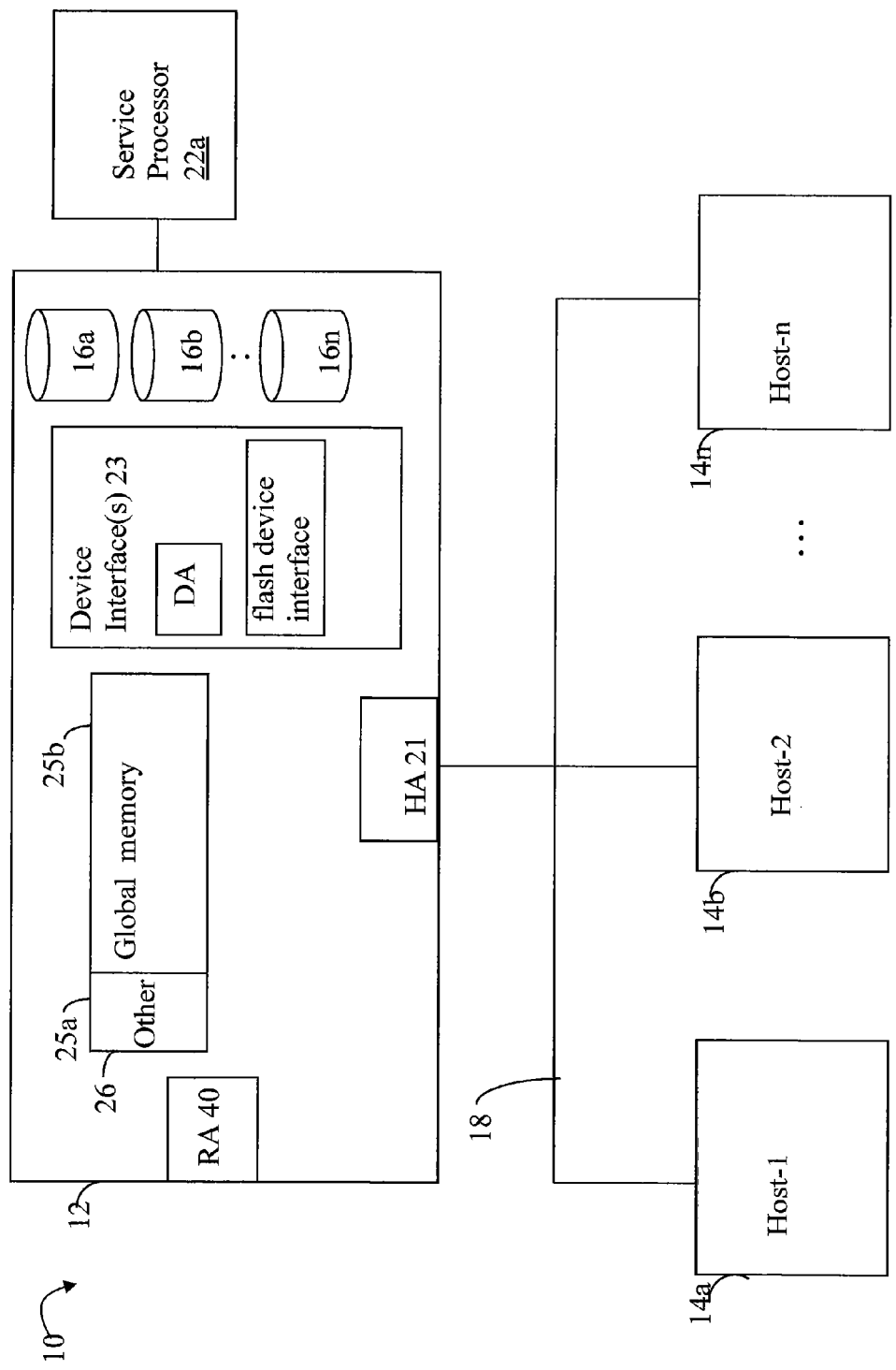
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices or logical volumes (LVs) which may also be referred to as logical units (e.g., LUNs). The LUNs may or may not correspond to the actual physical devices or drives 16a-16n. For example, one or more LUNs may reside on a single physical drive or multiple drives. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN(s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

The device interface, such as a DA, performs I/O operations on a drive 16a-16n. In the following description, data residing on an LUN may be accessed by the device interface following a data request in connection with I/O operations that other directors originate. Data may be accessed by LUN in which a single device interface manages data requests in connection with the different one or more LUNs that may reside on a drive 16a-16n.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area. Additional detail regarding the service processor 22a is described in following paragraphs.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

Figure 2:
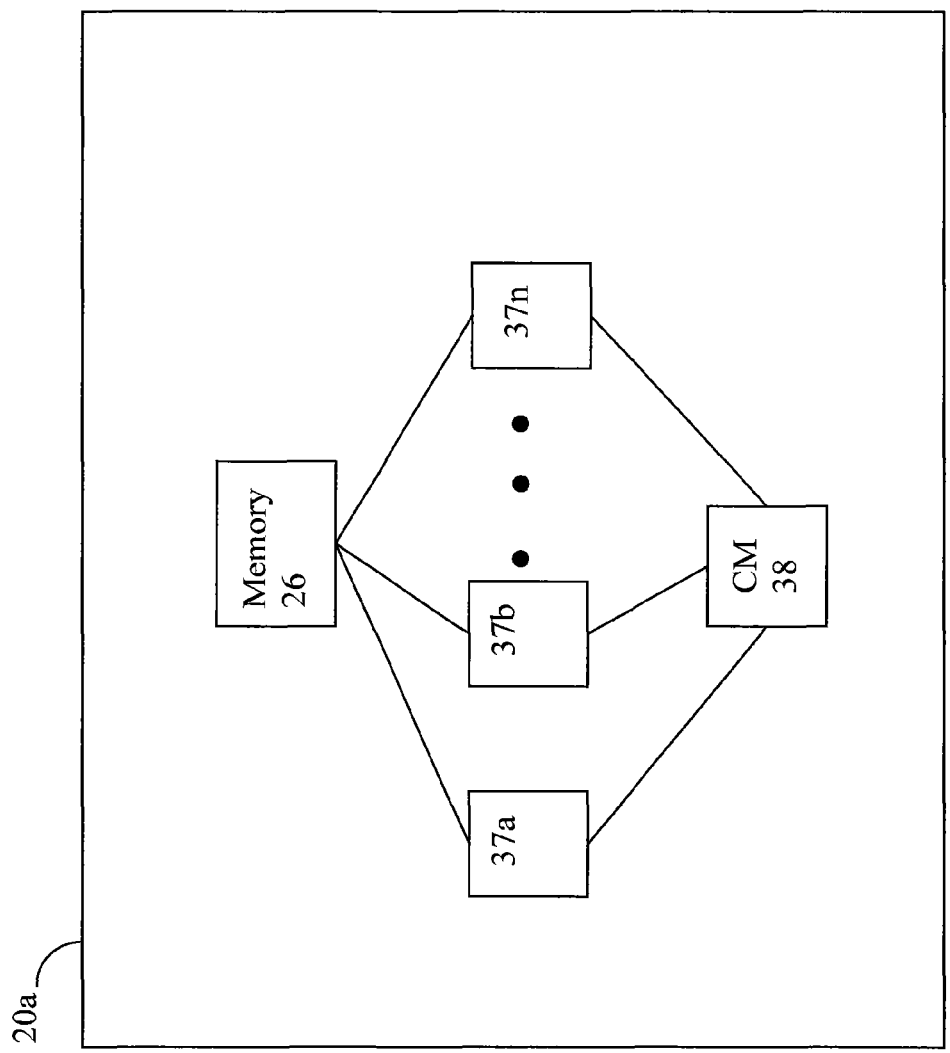
FIG. 2 is a representation of the logical internal communications between the directors and memory included in one embodiment of a data storage system of FIG. 1.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. For example, in connection with a write operation, an embodiment may first store the data in cache included in a portion of GM 25*b*, mark the cache slot including the write operation data as write pending (WP), and then later destage the WP data from cache to one of the devices 16*a*-16*n*. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

As described above, the data storage system 12 may be a data storage array including a plurality of data storage devices 16*a*-16*n* in which one or more of the devices 16*a*-16*n* are flash memory devices employing one or more different flash memory technologies. In one embodiment, the data storage system 12 may be a Symmetrix® DMX™ or VMAX® data storage array by EMC Corporation of Hopkinton, Mass. In the foregoing data storage array, the data storage devices 16*a*-16*n* may include a combination of disk devices and flash devices in which the flash devices may appear as standard Fibre Channel (FC) drives to the various software tools used in connection with the data storage array. The flash devices may be constructed using nonvolatile semiconductor NAND flash memory. The flash devices may include one or more SLC (single level cell) devices and/or MLC (multi level cell) devices.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed. Thus, a flash device may be expected to have a usage measured in calendar or wall clock elapsed time based on the amount of time it takes to perform the number of guaranteed write cycles. The techniques herein may also be used with other flash devices, more generally referred to as non-enterprise class flash devices, which, when performing writes at a same rate as for enterprise class drives, may have a lower expected lifetime based on a lower number of guaranteed write cycles.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like, as known in the art. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration.

An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes. The attributes may include any one or more of a storage type or storage technology, a type of data protection, device performance characteristic(s), storage capacity, and the like. The storage type or technology may specify whether a physical storage device is an SSD drive (such as a flash drive), a particular type of SSD drive (such using flash or a form of RAM), a type of magnetic disk or other non-SSD drive (such as rotating disk drives of various speeds or RPMs (revolutions per minute) (e.g., 10K RPM, 15K RPM) using one or more interfaces such as FC, NL-SAS, SAS, SATA, etc.), and the like. Data protection may specify a type or level of data storage protection such, for example, as a particular RAID level (e.g., RAID1, RAID-5 3+1, RAIDS 7+1, and the like). Performance characteristics may relate to different performance aspects of the physical storage devices of a particular type or technology. For example, there may be multiple types of FC disk drives based on the RPM characteristics of the FC disk drives (e.g., 10K RPM FC drives and 15K RPM FC drives) and FC disk drives having different RPM characteristics may be included in different storage tiers. Storage capacity may specify the amount of data, such as in bytes, that may be stored on the drives. An embodiment may allow a user to define one or more such storage tiers. For example, an embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives, a second tier of all FC 15K RPM drives, and a third tier of all SATA 7.2K RPM drives. The foregoing are some examples of tier definitions and other tier definitions may be specified in accordance with techniques herein.

Figure 3:
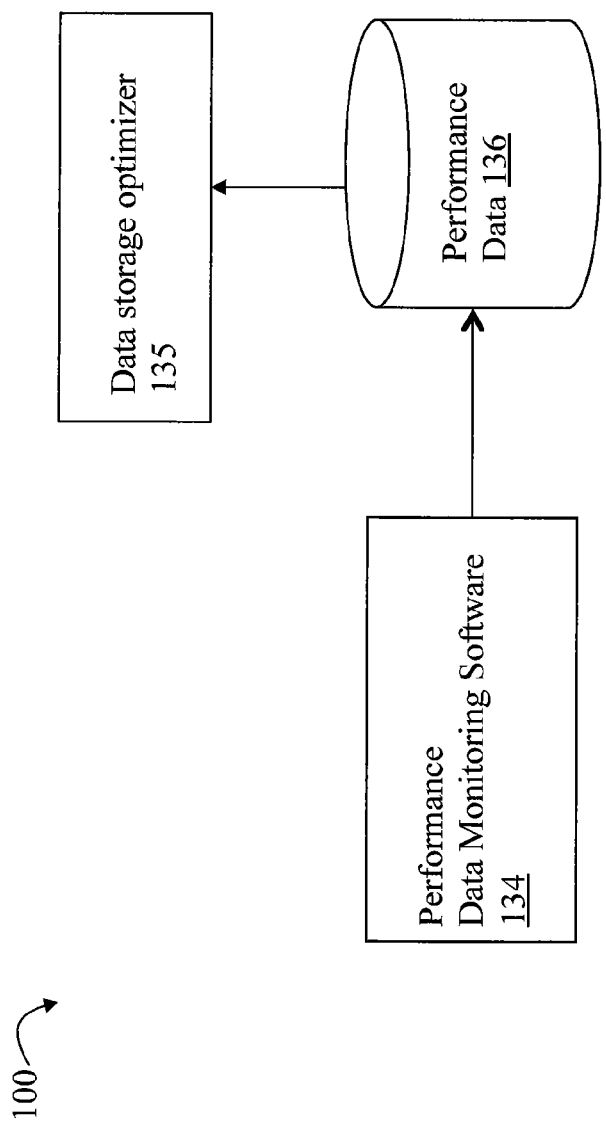
FIG. 3 is an example representing components that may be included in a service processor in an embodiment in accordance with techniques herein.

Referring to FIG. 3, shown is an example 100 of components that may be used in an embodiment in connection with techniques herein. The example 100 includes performance data monitoring software 134 which gathers performance data about the data storage system. The software 134 may gather and store performance data 136. This performance data 136 may also serve as an input to other software, such as used by the data storage optimizer 135 in connection with performing data storage system optimizations, which attempt to enhance the performance of I/O operations, such as those I/O operations associated with data storage devices 16*a*-16*n* of the system 12 (as in FIG. 1). For example, the performance data 136 may be used by a data storage optimizer 135 in an embodiment in accordance with techniques herein. The performance data 136 may be used in determining and/or optimizing one or more statistics or metrics such as may be related to, for example, a workload for one or more physical devices, a pool or group of physical devices, logical devices or volumes (e.g., LUNs), thin or virtually provisioned devices (described in more detail elsewhere herein), portions of thin devices, and the like. The workload may also be a measurement or level of "how busy" a device is, for example, in terms of I/O operations (e.g., I/O throughput such as number of I/Os/second, response time (RT), and the like). Examples of workload information and other information that may be obtained and used in an embodiment in accordance with techniques herein are described in more detail elsewhere herein.

In one embodiment in accordance with techniques herein, components of FIG. 3, such as the performance monitoring software 134, performance data 136 and/or data storage optimizer 135, may be located and execute on a system or processor that is external to the data storage system. For example, in one embodiment, any one or more of the foregoing components may be located and execute on service processor 22a. As an alternative or in addition to having one or more components execute on a processor external to the data storage system, one or more of the foregoing components may be located and execute on a processor of the data storage system itself.

The response time for a storage device or volume may be based on a response time associated with the storage device or volume for a period of time. The response time may be based on read and write operations directed to the storage device or volume. Response time represents the amount of time it takes the storage system to complete an I/O request (e.g., a read or write request). Response time may be characterized as including two components: service time and wait time. Service time is the actual amount of time spent servicing or completing an I/O request after receiving the request from a host via an HA 21, or after the storage system 12 generates the I/O request internally. The wait time is the amount of time the I/O request spends waiting in line or queue waiting for service (e.g., prior to executing the I/O operation).

It should be noted that the operations of read and write with respect to a LUN, thin device, and the like, may be viewed as read and write requests or commands from the DA 23, controller or other backend physical device interface. Thus, these are operations may also be characterized as a number of operations with respect to the physical storage device (e.g., number of physical device reads, writes, and the like, based on physical device accesses). This is in contrast to observing or counting a number of particular type of I/O requests (e.g., reads or writes) as issued from the host and received by a front end component such as an HA 21. To illustrate, a host read request may not result in a read request or command issued to the DA if there is a cache hit and the requested data is in cache. The host read request results in a read request or command issued to the DA 23 to retrieve data from the physical drive only if there is a read cache miss. Furthermore, when writing data of a received host I/O request to the physical device, the host write request may result in multiple reads and/or writes by the DA 23 in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes, may refer to the read and write requests or commands performed by the DA. Such read and write commands may correspond, respectively, to physical device accesses such as disk reads and writes that may result from a host I/O request received by an HA 21.

The optimizer 135 may perform processing of the techniques herein set forth in following paragraphs to determine how to allocate or partition physical storage in a multi-tiered environment for use by multiple applications. The optimizer 135 may also perform other processing such as, for example, to determine what particular portions of thin devices to store on physical devices of a particular tier, evaluate when to move data between physical drives of different tiers, and the like. It should be noted that the optimizer 135 may generally represent one or more components that perform processing as described herein as well as one or more other optimizations and other processing that may be performed in an embodiment.

Described in following paragraphs are techniques that may be performed to determine what data portions of devices such as thin devices to store on physical devices of a particular tier in a multi-tiered storage environment. Such data portions of a thin device may be automatically placed in a storage tier where the techniques herein have determined the storage tier is best to service that data in accordance with criteria described herein. The data portions may also be automatically relocated or moved to a different storage tier as the work load and observed performance characteristics for the data portions change over time. In accordance with techniques herein, analysis of performance data for data portions of thin devices may be performed in order to determine whether particular data portions should have their data contents stored on physical devices located in a particular storage tier. The techniques herein may take into account how "busy" the data portions are in combination with defined capacity limits and defined performance limits (e.g., such as I/O throughput or I/Os per unit of time, response time, utilization, and the like) associated with a storage tier in order to evaluate which data to store on drives of the storage tier.

Promotion may refer to movement of data from a first storage tier to a second storage tier where the second storage tier is characterized as having devices of higher performance than devices of the first storage tier. Demotion may refer generally to movement of data from a first storage tier to a second storage tier where the first storage tier is characterized as having devices of higher performance than devices of the second storage tier. As such, movement of data from a first tier of flash devices to a second tier of FC 15K RPM devices and/or SATA 7.2K RPM devices may be characterized as a demotion and movement of data from the foregoing second tier to the first tier a promotion. The promotion and demotion thresholds refer to thresholds used in connection with data movement.

As described in following paragraphs, one embodiment may use an allocation policy specifying an upper limit or maximum threshold of storage capacity for each of one or more tiers for use with an application. The partitioning of physical storage of the different storage tiers among the applications may be initially performed using techniques herein in accordance with the foregoing thresholds of the application's allocation policy and other criteria. In accordance with techniques herein, an embodiment may determine amounts of the different storage tiers used to store an application's data, and thus the application's storage group, subject to the allocation policy and other criteria. Such criteria may also include one or more performance metrics indicating a workload of the application. For example, an embodiment may determine one or more performance metrics using collected or observed performance data for a plurality of different logical devices, and/or portions thereof, used by the application. Thus, the partitioning of the different storage tiers among multiple applications may also take into account the workload or how "busy" an application is. Such criteria may also include capacity limits specifying how much of each particular storage tier may be used to store data for the application's logical devices.

As an example, the techniques herein may be described with reference to a storage environment having three storage tiers—a first tier of only flash drives in the data storage system, a second tier of only FC 15K RPM disk drives, and a third tier of only SATA 7.2K RPM disk drives. In terms of performance, the foregoing three tiers may be ranked from highest to lowest as follows: first, second, and then third. The lower the tier ranking, the lower the tier's performance characteristics (e.g., longer latency times, capable of less I/O throughput/second/GB (or other storage unit), and the like). Generally, different types of physical devices or physical drives have different types of characteristics. There are different reasons why one may want to use one storage tier and type of drive over another depending on criteria, goals and the current performance characteristics exhibited in connection with performing I/O operations. For example, flash drives of the first tier may be a best choice or candidate for storing data which may be characterized as I/O intensive or "busy" thereby experiencing a high rate of I/Os to frequently access the physical storage device containing the LUN's data. However, flash drives tend to be expensive in terms of storage capacity. SATA 7.2K RPM drives may be a best choice or candidate for storing data of devices requiring a large storage capacity and which are not I/O intensive with respect to access and retrieval from the physical storage device. The second tier of FC 15K RPM disk drives may be characterized as "in between" flash drives and SATA 7.2K RPM drives in terms of cost/GB and I/O performance. Thus, in terms of relative performance characteristics, flash drives may be characterized as having higher performance than both FC 15K RPM and SATA 7.2K RPM disks, and FC 15K RPM disks may be characterized as having a higher performance than SATA7.2K RPM.

Since flash drives of the first tier are the best suited for high throughput/sec/GB, processing may be performed to determine which of the devices, and portions thereof, are characterized as most I/O intensive and therefore may be good candidates to have their data stored on flash drives. Similarly, the second most I/O intensive devices, and portions thereof, may be good candidates to store on FC 15K RPM disk drives of the second tier and the least I/O intensive devices may be good candidates to store on SATA 7.2K RPM drives of the third tier. As such, workload for an application may be determined using some measure of I/O intensity, performance or activity (e.g., I/O throughput/second, percentage of read operation, percentage of write operations, response time, etc.) of each device used for the application's data. Some measure of workload may be used as a factor or criterion in combination with others described herein for determining what data portions are located on the physical storage devices of each of the different storage tiers.

Figure 4:
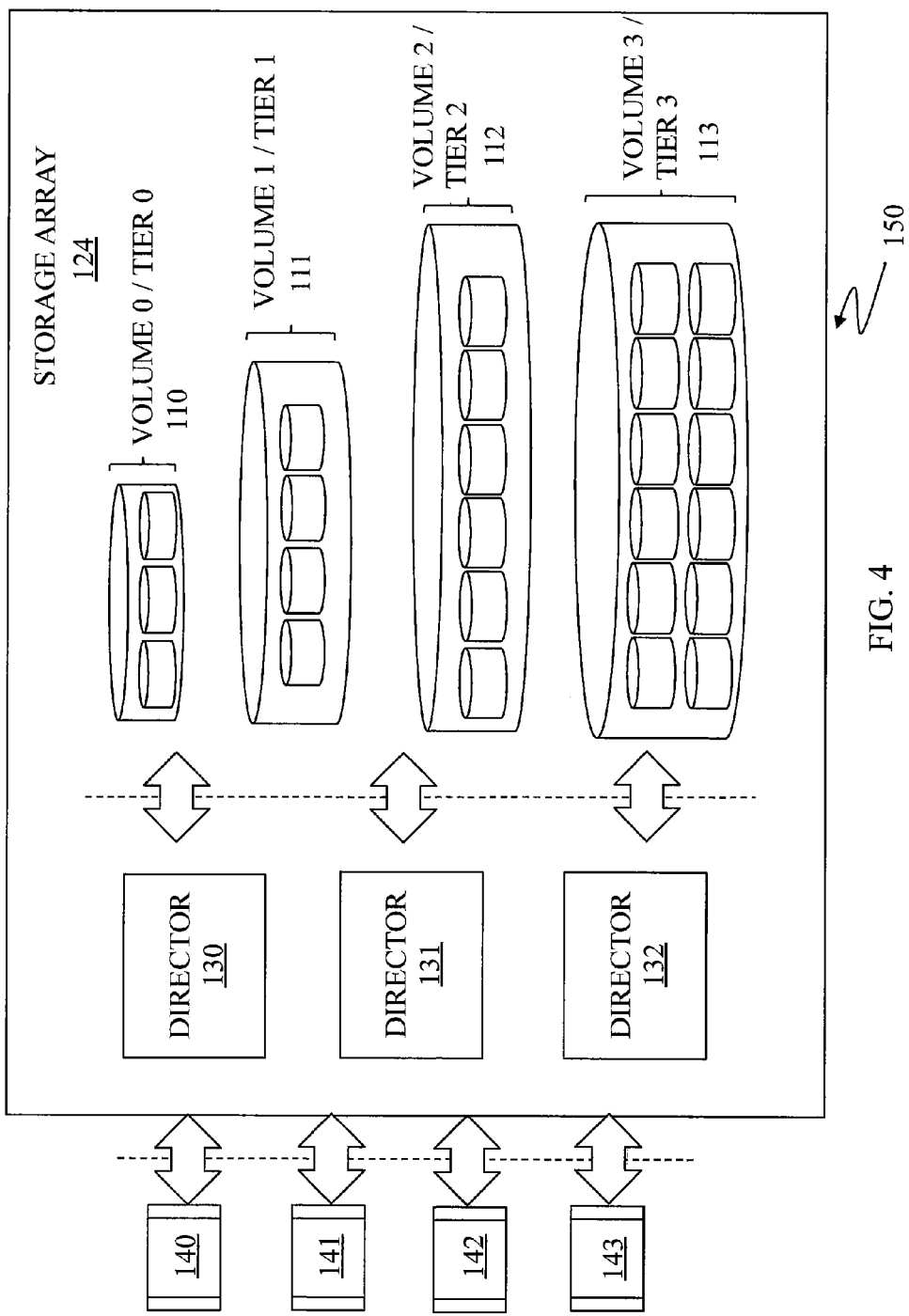
FIGS. 4, 5A and 5B are examples illustrating a data storage system, such as data storage array, including a plurality of storage tiers in an embodiment in accordance with techniques herein.

FIG. 4 is a schematic illustration showing a storage system 150 that may be used in connection with an embodiment of the system described herein. The storage system 150 may include a storage array 124 having multiple directors 130-132 and multiple storage volumes (LUNs, LVs, logical devices or VOLUMES 0-3) 110-113. Host applications 140-144 and/or other entities (e.g., other storage devices, SAN switches, etc.) request data writes and data reads to and from the storage array 124 that are facilitated using one or more of the directors 130-132. The storage array 124 may include similar features as that discussed above.

The volumes 110-113 may be provided in multiple storage tiers (TIERS 0-3) that may have different storage characteristics, such as speed, cost, reliability, availability, security and/or other characteristics. As described above, a tier may represent a set of storage resources, such as physical storage devices, residing in a storage platform. Examples of storage disks that may be used as storage resources within a storage array of a tier may include sets SATA 7.2K RPM disks, FC 15K RPM disks and/or EFDs, among other known types of storage devices. According to various embodiments, each of the volumes 110-113 may be located in different storage tiers. Tiered storage provides that data may be initially allocated to a particular fast volume/tier, but a portion of the data that has not been used over a period of time (for example, three weeks) may be automatically moved to a slower (and perhaps less expensive) tier. For example, data that is expected to be used frequently, for example database indices, may be initially written directly to fast storage whereas data that is not expected to be accessed frequently, for example backup or archived data, may be initially written to slower storage. In an embodiment, the system described herein may be used in connection with a Fully Automated Storage Tiering (FAST) product produced by EMC Corporation of Hopkinton, Mass., that provides for the optimization of the use of different storage tiers including the ability to easily create and apply tiering policies (e.g., allocation policies, data movement policies including promotion and demotion thresholds, and the like) to transparently automate the control, placement, and movement of data within a storage system based on business needs. The techniques herein may be used to determine amounts or allocations of each storage tier used by each application based on capacity limits in combination with performance limits. In one embodiment, the FAST product may be the data storage optimizer 135 which performs data movement optimizations such as using techniques described herein.

Figure 5A:
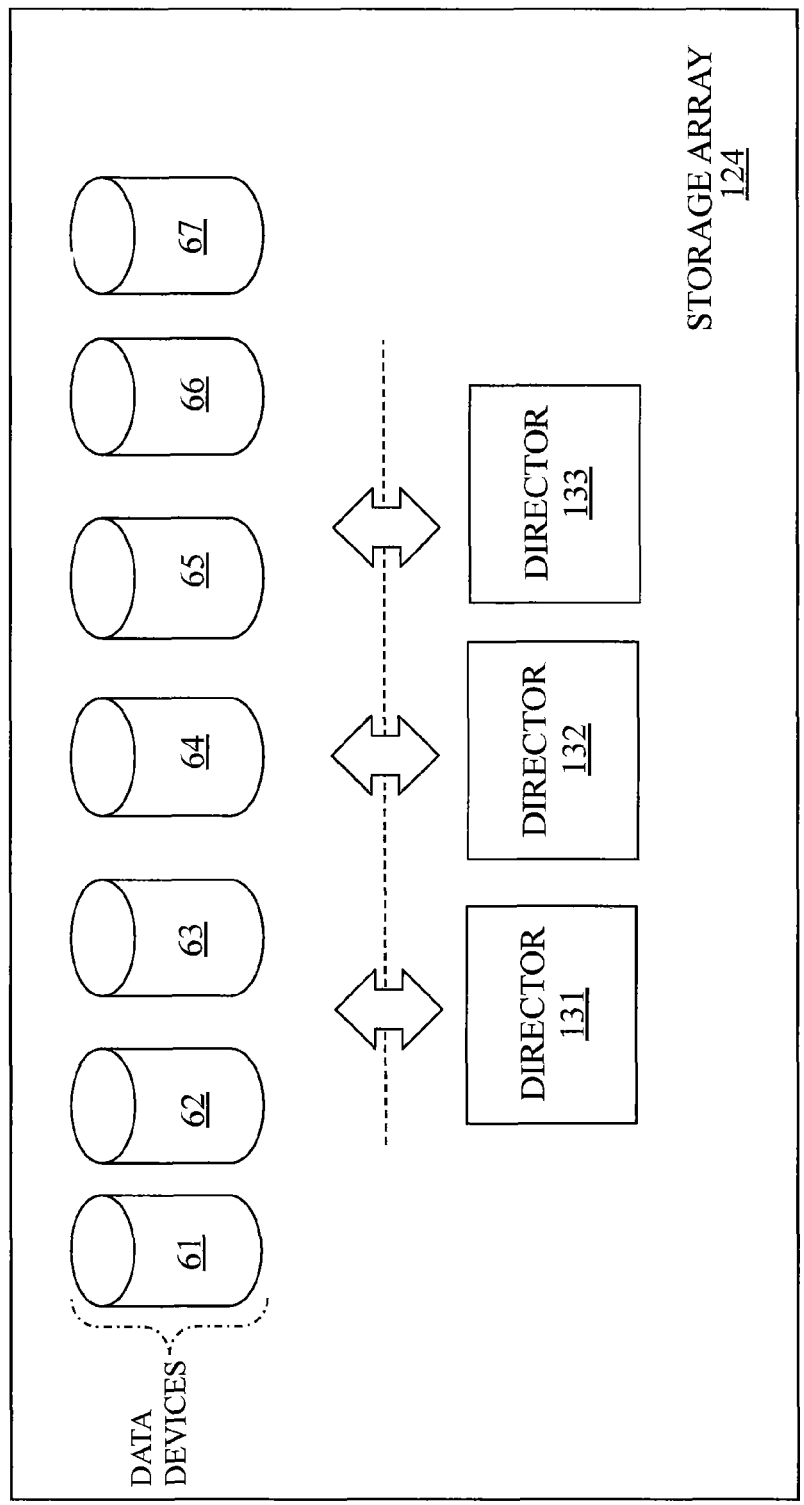

Referring to FIG. 5A, shown is a schematic diagram of the storage array 124 as including a plurality of data devices 61-67 communicating with directors 131-133. The data devices 61-67 may be implemented as logical devices like standard logical devices (also referred to as thick devices) provided in a Symmetrix® data storage device produced by EMC Corporation of Hopkinton, Mass., for example. In some embodiments, the data devices 61-67 may not be directly useable (visible) to hosts coupled to the storage array 124. Each of the data devices 61-67 may correspond to a portion (including a whole portion) of one or more of the disk drives 42-44 (or more generally physical devices). Thus, for example, the data device section 61 may correspond to the disk drive 42, may correspond to a portion of the disk drive 42, or may correspond to a portion of the disk drive 42 and a portion of the disk drive 43. The data devices 61-67 may be designated as corresponding to different classes, so that different ones of the data devices 61-67 correspond to different physical storage having different relative access speeds or RAID protection type (or some other relevant distinguishing characteristic or combination of characteristics), as further discussed elsewhere herein. Alternatively, in other embodiments that may be used in connection with the system described herein, instead of being separate devices, the data devices 61-67 may be sections of one data device.

Figure 5B:
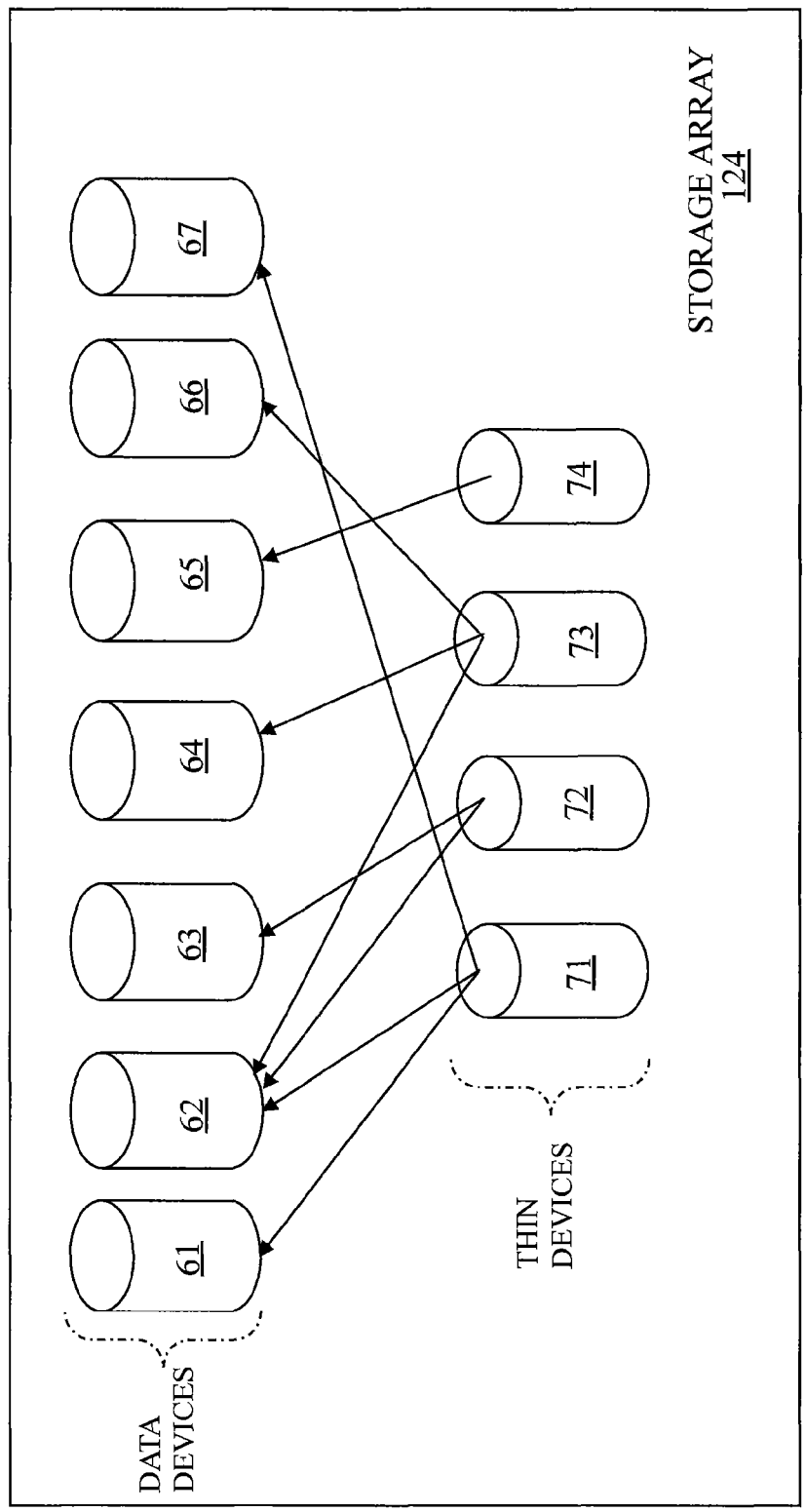

As shown in FIG. 5B, the storage array 124 may also include a plurality of thin devices 71-74 that may be adapted for use in connection with the system described herein when using thin provisioning. In a system using thin provisioning, the thin devices 71-74 may appear to a host coupled to the storage array 124 as one or more logical volumes (logical devices) containing contiguous blocks of data storage. Each of the thin devices 71-74 may contain pointers to some or all of the data devices 61-67 (or portions thereof). As described in more detail elsewhere herein, a thin device may be virtually provisioned in terms of its allocated physical storage in physical storage for a thin device presented to a host as having a particular capacity is allocated as needed rather than allocate physical storage for the entire thin device capacity upon creation of the thin device. As such, a thin device presented to the host as having a capacity with a corresponding LBA (logical block address) range may have portions of the LBA range for which storage is not allocated.

Figure 5C:
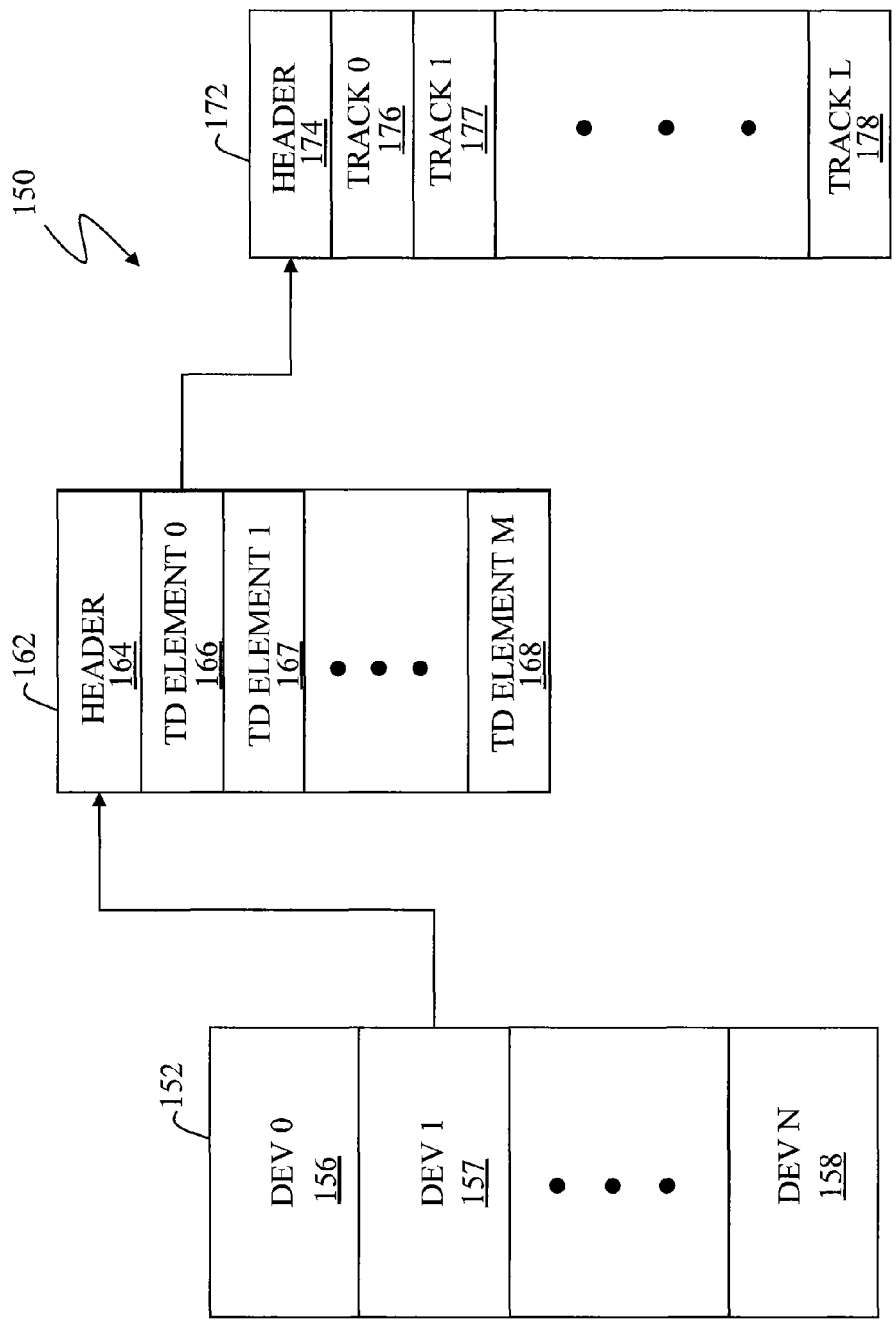
FIG. 5C is a schematic diagram illustrating tables that are used to keep track of device information in connection with an embodiment of the system described herein.

Referring to FIG. 5C, shown is a diagram 150 illustrating tables that are used to keep track of device information. A first table 152 corresponds to all of the devices used by a data storage system or by an element of a data storage system, such as an HA 21 and/or a DA 23. The table 152 includes a plurality of logical device (logical volume) entries 156-158 that correspond to all the logical devices used by the data storage system (or portion of the data storage system). The entries in the table 152 may include information for thin devices, for data devices (such as logical devices or volumes), for standard logical devices, for virtual devices, for BCV devices, and/or any or all other types of logical devices used in connection with the system described herein.

Each of the entries 156-158 of the table 152 correspond to another table that may contain information for one or more logical volumes, such as thin device logical volumes. For example, the entry 157 may correspond to a thin device table 162. The thin device table 162 may include a header 164 that contains overhead information, such as information identifying the corresponding thin device, information concerning the last used data device and/or other information including counter information, such as a counter that keeps track of used group entries (described below). The header information, or portions thereof, may be available globally to the data storage system.

The thin device table 162 may include one or more group elements 166-168, that contain information corresponding to a group of tracks on the data device. A group of tracks may include one or more tracks, the number of which may be configured as appropriate. In an embodiment herein, each group has sixteen tracks, although this number may be configurable.

One of the group elements 166-168 (for example, the group element 166) of the thin device table 162 may identify a particular one of the data devices 61-67 having a track table 172 that contains further information, such as a header 174 having overhead information and a plurality of entries 176-178 corresponding to each of the tracks of the particular one of the data devices 61-67. The information in each of the entries 176-178 may include a pointer (either direct or indirect) to the physical address on one of the physical disk drives of the data storage system that maps to the logical address(es) of the particular one of the data devices 61-67. Thus, the track table 162 may be used in connection with mapping logical addresses of the logical devices corresponding to the tables 152, 162, 172 to physical addresses on the disk drives or other physical devices of the data storage system.

The tables 152, 162, 172 may be stored in the global memory 25b of the data storage system. In addition, the tables corresponding to particular logical devices accessed by a particular host may be stored (cached) in local memory of the corresponding one of the HA's. In addition, an RA and/or the DA's may also use and locally store (cache) portions of the tables 152, 162, 172.

Figure 5D:
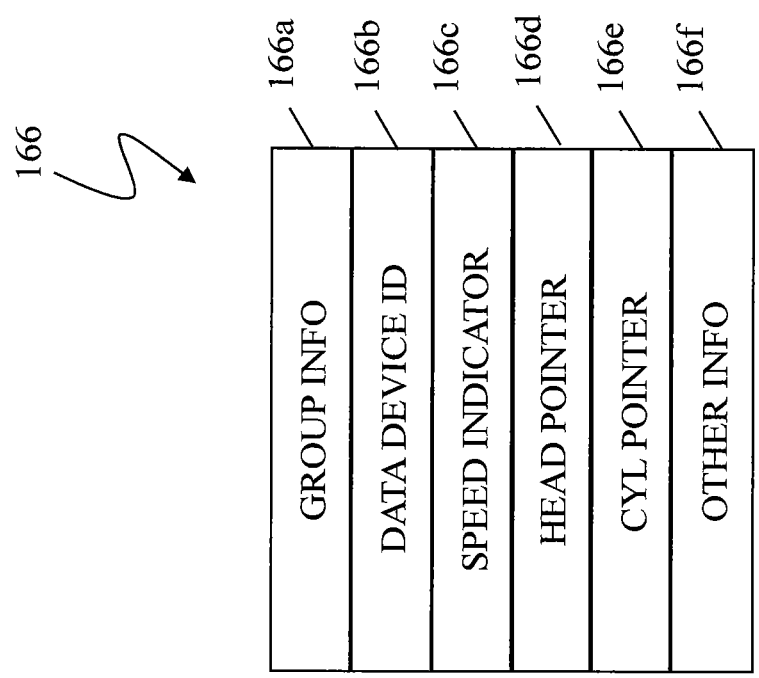
FIG. 5D is a schematic diagram showing a group element of a thin device table in connection with an embodiment of the system described herein.

Referring to FIG. 5D, shown is a schematic diagram illustrating a group element 166 of the thin device table 162 in connection with an embodiment of the system described herein. The group element 166 may include a plurality of entries 166a-166f. The entry 166a may provide group information, such as a group type that indicates whether there has been physical address space allocated for the group. The entry 166b may include information identifying one (or more) of the data devices 61-67 that correspond to the group (i.e., the one of the data devices 61-67 that contains pointers for physical data for the group). The entry 166c may include other identifying information for the one of the data devices 61-67, including a speed indicator that identifies, for example, if the data device is associated with a relatively fast access physical storage (disk drive) or a relatively slow access physical storage (disk drive). Other types of designations of data devices are possible (e.g., relatively expensive or inexpensive). The entry 166d may be a pointer to a head of the first allocated track for the one of the data devices 61-67 indicated by the data device ID entry 166b. Alternatively, the entry 166d may point to header information of the data device track table 172 immediately prior to the first allocated track. The entry 166e may identify a cylinder of a first allocated track for the one the data devices 61-67 indicated by the data device ID entry 166b. The entry 166f may contain other information corresponding to the group element 166 and/or the corresponding thin device. In other embodiments, entries of the group table 166 may identify a range of cylinders of the thin device and a corresponding mapping to map cylinder/track identifiers for the thin device to tracks/cylinders of a corresponding data device. In an embodiment, the size of table element 166 may be eight bytes.

Accordingly, a thin device presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to data devices, which are logical devices that map logical storage space of the data device to physical storage space on the disk drives or other physical storage devices. Thus, an access of the logical storage space of the thin device results in either a null pointer (or equivalent) indicating that no corresponding physical storage space has yet been allocated, or results in a reference to a data device which in turn references the underlying physical storage space.

Thin devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein.

As discussed elsewhere herein, the data devices 61-67 (and other logical devices) may be associated with physical storage areas (e.g., disk drives, tapes, solid state storage, etc.) having different characteristics. In various embodiments, the physical storage areas may include multiple tiers of storage in which each sub-tier of physical storage areas and/or disk drives may be ordered according to different characteristics and/or classes, such as speed, technology and/or cost. The devices 61-67 may appear to a host coupled to the storage device 24 as a logical volume (logical device) containing a contiguous block of data storage, as discussed herein. Accordingly, each of the devices 61-67 may map to storage areas across multiple physical storage drives. The granularity at which the storage system described herein operates may be smaller than at the file level, for example potentially as small as a single byte, but more practically at the granularity of a single logical block or collection of sequential data blocks. A data block may be of any size including file system or database logical block size, physical block, track or cylinder and/or other size. Multiple data blocks may be substantially the same size or different sizes, such as different size data blocks for different storage volumes or different sized data blocks within a single storage volume.

In accordance with techniques herein, an embodiment may allow for locating all of the data of a single logical portion or entity in a same tier or in multiple different tiers depending on the logical data portion or entity. In an embodiment including thin devices, the techniques herein may be used where different portions of data of a single thin device may be located in different storage tiers. As such, an embodiment in accordance with techniques herein may have added flexibility in that the first portion of data of the thin device may be located in a different higher performance storage tier than the second portion. For example, the first portion may be located in a tier comprising flash devices and the second portion may be located in a different tier of FC 15K RPM or SATA7.2K RPM drives.

Figure 6:
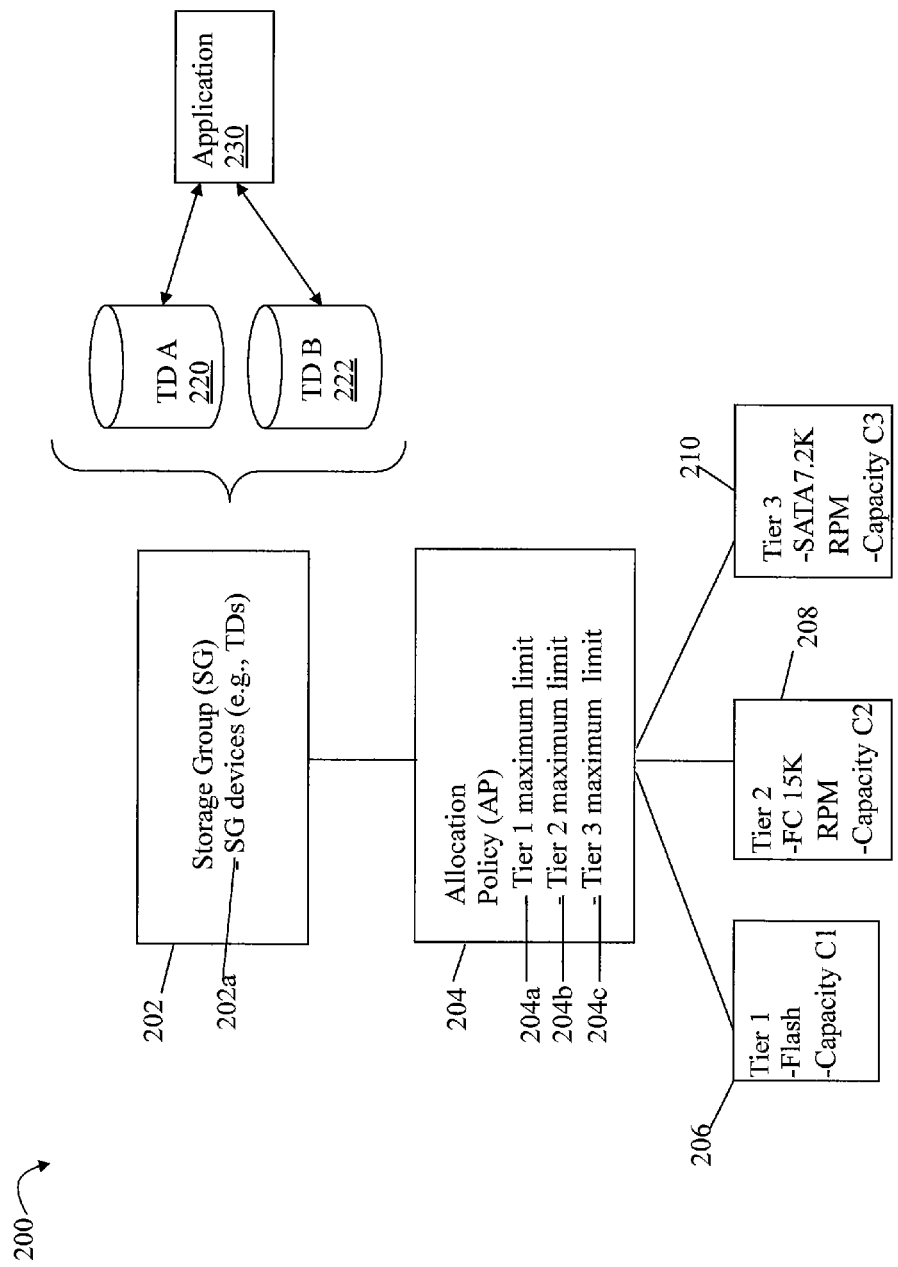
FIGS. 6 and 7 are examples illustrating a storage group, allocation policy and associated storage tiers in an embodiment in accordance with techniques herein.

Referring to FIG. 6, shown is an example illustrating information that may be defined and used in connection with techniques herein. The example 200 includes multiple storage tiers 206, 208, and 210, an allocation policy (AP) 204, and storage group (SG) 202. The SG 202 may include one or more thin devices (TDs), such as TD A 220 and TD B 222, used by an application 230. The application 230 may execute, for example, on one of the hosts of FIG. 1. The techniques herein may be used to determine how to partition physical storage of the multiple storage tiers 206, 208 and 210 for use in storing or locating the application's data, such as data of the TDs 220 and 222. It should be noted that the particular number of tiers, TDs, and the like, should not be construed as a limitation. An SG may represent a logical grouping of TDs or other logical volumes used by a single application although an SG may correspond to other logical groupings for different purposes. An SG may, for example, correspond to TDs used by multiple applications.

Each of 206, 208 and 210 may correspond to a tier definition as described elsewhere herein. Element 206 represents a first storage tier of flash drives having a tier capacity limit C1. Element 208 represents a first storage tier of FC 15K RPM drives having a tier capacity limit C2. Element 210 represents a first storage tier of SATA 7.2K RPM drives having a tier capacity limit C3. Each of C1, C2 and C3 may represent an available or maximum amount of storage capacity in the storage tier that may be physical available in the system. The AP 204 may be associated with one of more SGs such as SG 202. The AP 204 specifies, for an associated SG 202, a capacity upper limit or maximum threshold for one or more storage tiers. Each such limit may identify an upper bound regarding an amount of storage that may be allocated for use by the associated SG. The AP 204 may be associated with one or more of the storage tiers 206, 208 and 210 that may be defined in a multi-tier storage environment. The AP 204 in this example 200 includes limit 204a identifying a maximum or upper limit of storage for tier1, limit 204b identifying a maximum or upper limit of storage for tier2, and limit 204c identifying a maximum or upper limit of storage for tier3. The SG 202 may be based on an SG definition identifying 202a the logical devices, such as TDs included in the SG.

In connection with techniques herein, the maximum limits 204a, 204b and 204c each represent an upper bound of a storage capacity to which an associated SG is subjected to. The techniques herein may be used to partition less than the amount or capacity represented by such limits. An amount of physical storage of a tier allocated for use by an application is allowed to vary up to the tier limit as defined in the AP 204 in accordance with other criteria associated with the application such as, for example, varying application workload. The optimizer may vary the amount of storage in each tier used by an SG202, and thus an application, based on workload and possibly other criteria when performing a cost benefit analysis, where such amounts are subject to the limits of the SG's AP and also performance limits described in more detail elsewhere herein. At a second point in time, the workloads and possibly other criteria for the applications may change and the optimizer may reparation the storage capacity used by each application subject to the capacity limits of APs and performance limits.

Figure 7:
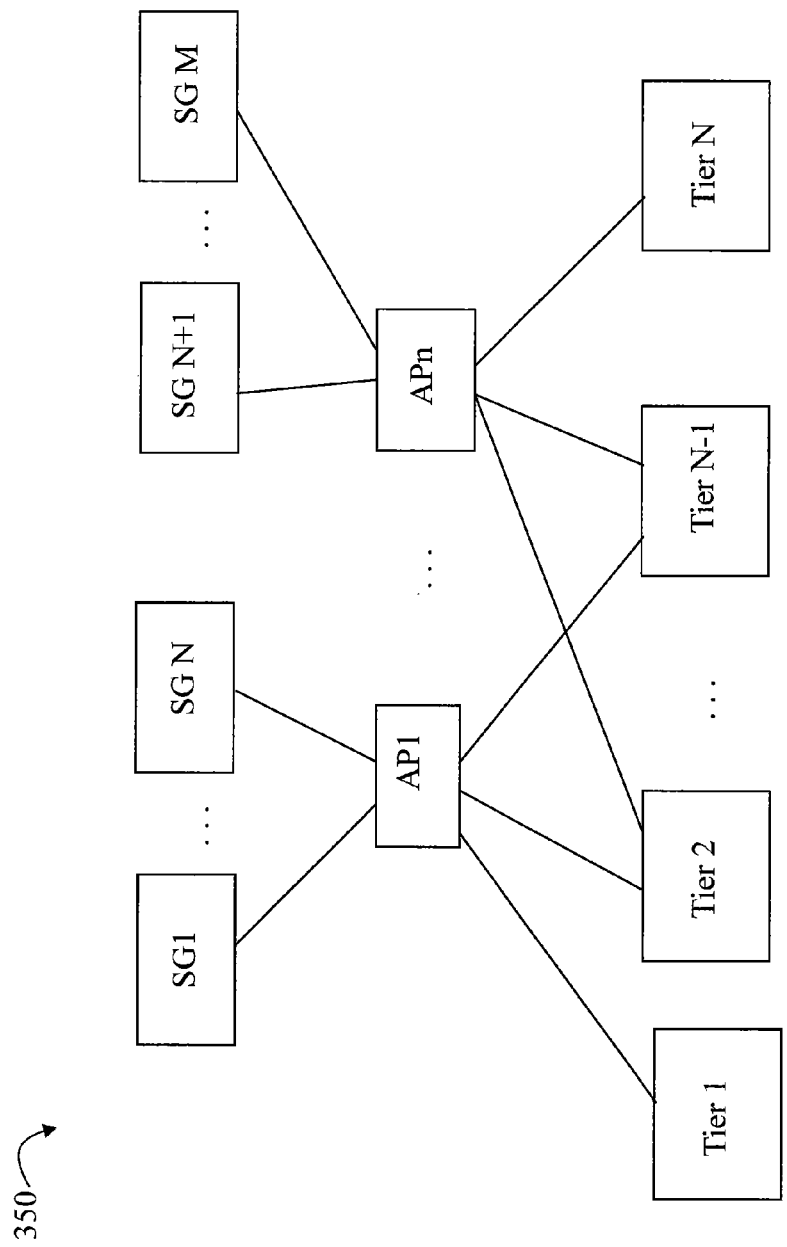

Referring to FIG. 7, shown is an example which more generally illustrates different associations between SGs, APs and tiers in an embodiment in accordance with techniques herein. The example 350 illustrates that an embodiment may have multiple storage tiers (e.g., tiers 1-N), multiple APs (e.g., AP1-N), and multiple SGs (e.g., SG 1-M). Each AP may be associated with one or more of the storage tiers. Each AP may also be associated with different tiers than other APs. For example, APn is associated with Tier N but AP1 is not. For each tier associated with an AP, the AP may define a maximum capacity limit as described in connection with FIG. 6. Each AP may be associated with one or more SGs. For example SGs1-N may be associated with a same AP1, and SGs N+1 through M may be associated with a same APn.

With reference back to FIG. 6, each of the maximum capacity limits may have any one of a variety of different forms. For example, such limits may be expressed as a percentage or portion of tier total storage capacity (e.g., such as a percentage of C1, C2, or C3), as an integer indicating an amount or quantity of storage 410c (e.g., indicating a number of bytes or other number of storage units), and the like.

Data used in connection with techniques herein, such as the performance data of FIG. 3 used in determining device and SG workloads, may be obtained through observation and monitoring actual performance. Data may also be determined in other suitable ways such as, for example, through simulation, estimation, and the like. Observed or collected data may be obtained as described in connection with FIG. 3 by monitoring and recording one or more aspects of I/O activity for each TD, and portions thereof. For example, for each TD, and/or portions thereof, an average number of reads occurring within a given time period may be determined, an average number of writes occurring within a given time period may be determined, an average number of read misses occurring within a given time period may be determined, and the like. It should be noted that the operations of read and write with respect to an TD may be viewed as read and write requests or commands from the DA, controller or other backend physical device interface. Thus, these are operations may also be characterized as a average number of operations with respect to the physical storage device (e.g., average number of physical device reads, writes, and the like, based on physical device accesses). This is in contrast to observing or counting a number of particular type of I/O requests (e.g., reads or writes) as issued from the host and received by a front end component such as an FA. To illustrate, a host read request may not result in a read request or command issued to the DA if there is a cache hit and the requested data is in cache. The host read request results in a read request or command issued to the DA to retrieve data from the physical drive only if there is a read miss. Furthermore, when writing data of a received host I/O request to the physical device, the host write request may result in multiple reads and/or writes by the DA in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes, may refer to the read and write requests or commands performed by the DA. Such read and write commands may correspond, respectively, to physical device accesses such as disk reads and writes that may result from a host I/O request received by an FA.

It should be noted that movement of data between tiers from a source tier to a target tier may include determining free or unused storage device locations within the target tier. In the event there is an insufficient amount of free of unused storage in the target tier, processing may also include displacing or relocating other data currently stored on a physical device of the target tier. An embodiment may perform movement of data to and/or from physical storage devices using any suitable technique.

One embodiment in accordance with techniques herein may include multiple storage tiers including a first tier of flash devices and one or more other tiers of non-flash devices having lower performance characteristics than flash devices. The one or more other tiers may include, for example, one or more types of disk devices. The tiers may also include other types of SSDs besides flash devices.

As described above, a thin device (also referred to as a virtual provision device) is a device that represents a certain capacity having an associated address range. Storage may be allocated for thin devices in chunks or data portions of a particular size as needed rather than allocate all storage necessary for the thin device's entire capacity. Therefore, it may be the case that at any point in time, only a small number of portions or chunks of the thin device actually are allocated and consume physical storage on the back end (on physical disks, flash or other physical storage devices). A thin device may be constructed of chunks having a size that may vary with embodiment. For example, in one embodiment, a chunk may correspond to a group of 12 tracks (e.g., 12 tracks*64 Kbytes/track=768 Kbytes/chunk). As also noted with a thin device, the different chunks may reside on different data devices in one or more storage tiers. In one embodiment, as will be described below, a storage tier may consist of one or more storage pools. Each storage pool may include multiple LUNs and their associated physical devices. With thin devices, a system in accordance with techniques herein has flexibility to relocate individual chunks as desired to different devices in the same as well as different pools or storage tiers. For example, a system may relocate a chunk from a flash storage pool to a SATA 7.2K RPM storage pool. In one embodiment using techniques herein, a thin device can be bound to a particular storage pool of a storage tier at a point in time so that any chunks requiring allocation of additional storage, such as may occur when writing data to the thin device, result in allocating storage from this storage pool. Such binding may change over time for a thin device.

A thin device may contain thousands and even hundreds of thousands of such chunks. As such, tracking and managing performance data such as one or more performance statistics for each chunk, across all such chunks, for a storage group of thin devices can be cumbersome and consume an excessive amount of resources. Described in following paragraphs are techniques that may be used in connection with collecting performance data about thin devices where such information may be used to determine which chunks of thin devices are most active relative to others. Such evaluation may be performed in connection with determining promotion/demotion thresholds use in evaluating where to locate and/or move data of the different chunks with respect to the different storage tiers in a multi-storage tier environment. In connection with examples in following paragraphs, details such as having a single storage pool in each storage tier, a single storage group, and the like, are provided for purposes of illustration. Those of ordinary skill in the art will readily appreciate the more general applicability of techniques herein in other embodiments such as, for example, having a storage group include a plurality of storage pools, and the like.

Referring to FIG. 8A, shown is an example 700 illustrating use of a thin device in an embodiment in accordance with techniques herein. The example 700 includes three storage pools 712, 714 and 716 with each such pool representing a storage pool of a different storage tier. For example, pool 712 may represent a storage pool of tier A of flash storage devices, pool 714 may represent a storage pool of tier B of FC 15K RPM storage devices, and pool 716 may represent a storage pool of tier C of SATA 7.2K RPM storage devices. Each storage pool may include a plurality of logical devices and associated physical devices (or portions thereof) to which the logical devices are mapped. Element 702 represents the thin device address space or range including chunks which are mapped to different storage pools. For example, element 702a denotes a chunk C1 which is mapped to storage pool 712 and element 702b denotes a chunk C2 which is mapped to storage pool 714. Element 702 may be a representation for a first thin device which is included in a storage group of one or more thin devices.

It should be noted that although the example 700 illustrates only a single storage pool per storage tier, an embodiment may also have multiple storage pools per tier.

Figure 8B:
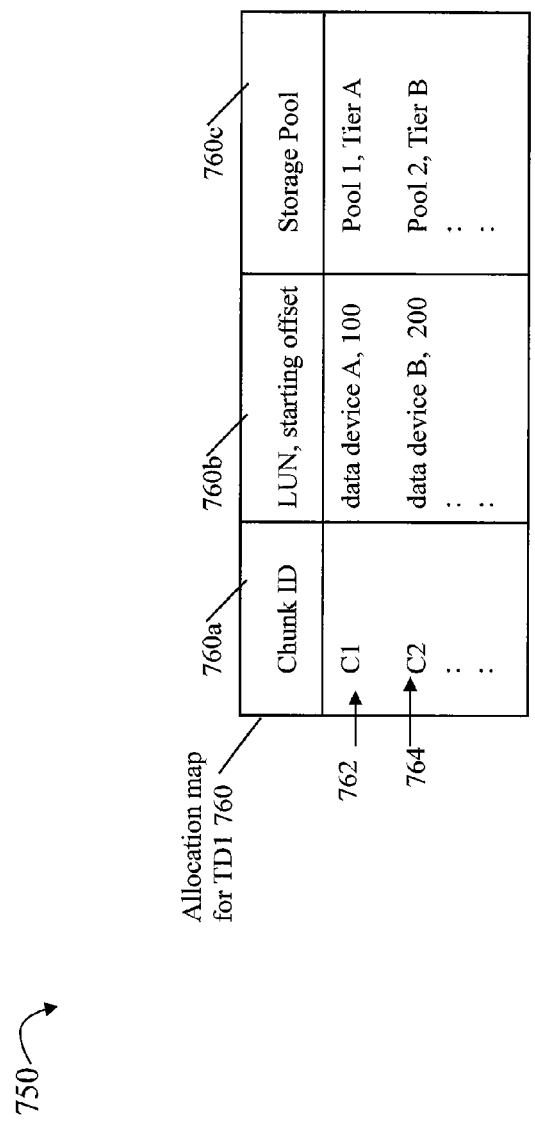

Referring to FIG. 8B, shown is an example representation of information that may be included in an allocation map in an embodiment in accordance with techniques herein. An allocation map may be used to identify the mapping for each thin device (TD) chunk (e.g. where each chunk is physically located). Element 760 represents an allocation map that may be maintained for each TD. In this example, element 760 represents information as may be maintained for a single TD although another allocation map may be similarly used and maintained for each other TD in a storage group. Element 760 may represent mapping information as illustrated in FIG. 8A such as in connection the mapping of 702 to different storage pool devices. The allocation map 760 may contain an entry for each chunk and identify which data device and associated physical storage is mapped to the chunk. For each entry or row of the map 760 corresponding to a chunk, a first column 760a, Chunk ID, denotes an identifier to uniquely identify the chunk of the TD, a second column 760b, indicates information about the data device and offset to which the chunk is mapped, and a third column storage pool 760c denotes the storage pool and tier including the data device of 760b. For example, entry 762 represents chunk C1 illustrated in FIG. 8A as 702a and entry 764 represents chunk C2 illustrated in FIG. 8A as 702b. It should be noted that although not illustrated, the allocation map may include or otherwise use other tables and structures which identify a further mapping for each data device such as which physical device locations map to which data devices. This further mapping for each data device is described and illustrated elsewhere herein such as, for example, with reference back to FIG. 5B. Such information as illustrated and described in connection with FIG. 8B may be maintained for each thin device in an embodiment in accordance with techniques herein.

In connection with collecting statistics characterizing performance, workload and/or activity for a thin device, one approach may be to collect the information per chunk or, more generally, for the smallest level of granularity associated with allocation and deallocation of storage for a thin device. Such statistics may include, for example, a number of reads/unit of time, #writes/unit of time, a number of prefetches/unit of time, and the like. However, collecting such information at the smallest granularity level does not scale upward as number of chunks grows large such as for a single thin device which can have up to, for example 300,000 chunks.

Therefore, an embodiment in accordance with techniques herein may collect statistics on a grouping of "N" chunks also referred to as an extent, where N represents an integer number of chunks, N>0. N may be, for example, 480 in one embodiment. Each extent may represent a consecutive range or portion of the thin device in terms of thin device locations (e.g., portion of the address space or range of the thin device). Note that the foregoing use of consecutive does not refer to physical storage locations on physical drives but rather refers to consecutive addresses with respect to a range of addresses of the thin device which are then mapped to physical device locations which may or may not be consecutive, may be on the same or different physical drives, and the like. For example, in one embodiment, an extent may be 480 chunks (N=480) having a size of 360 MBs (megabytes).

An extent may be further divided into subextents, where each subextent is a collection of M chunks. M may be, for example 10 in one embodiment. In one embodiment, the subextent size may correspond to the smallest granularity of data movement. In other words, the subextent size represents the atomic unit or minimum amount of data that can be operated upon when performing a data movement such as between storage tiers.

Figure 9:
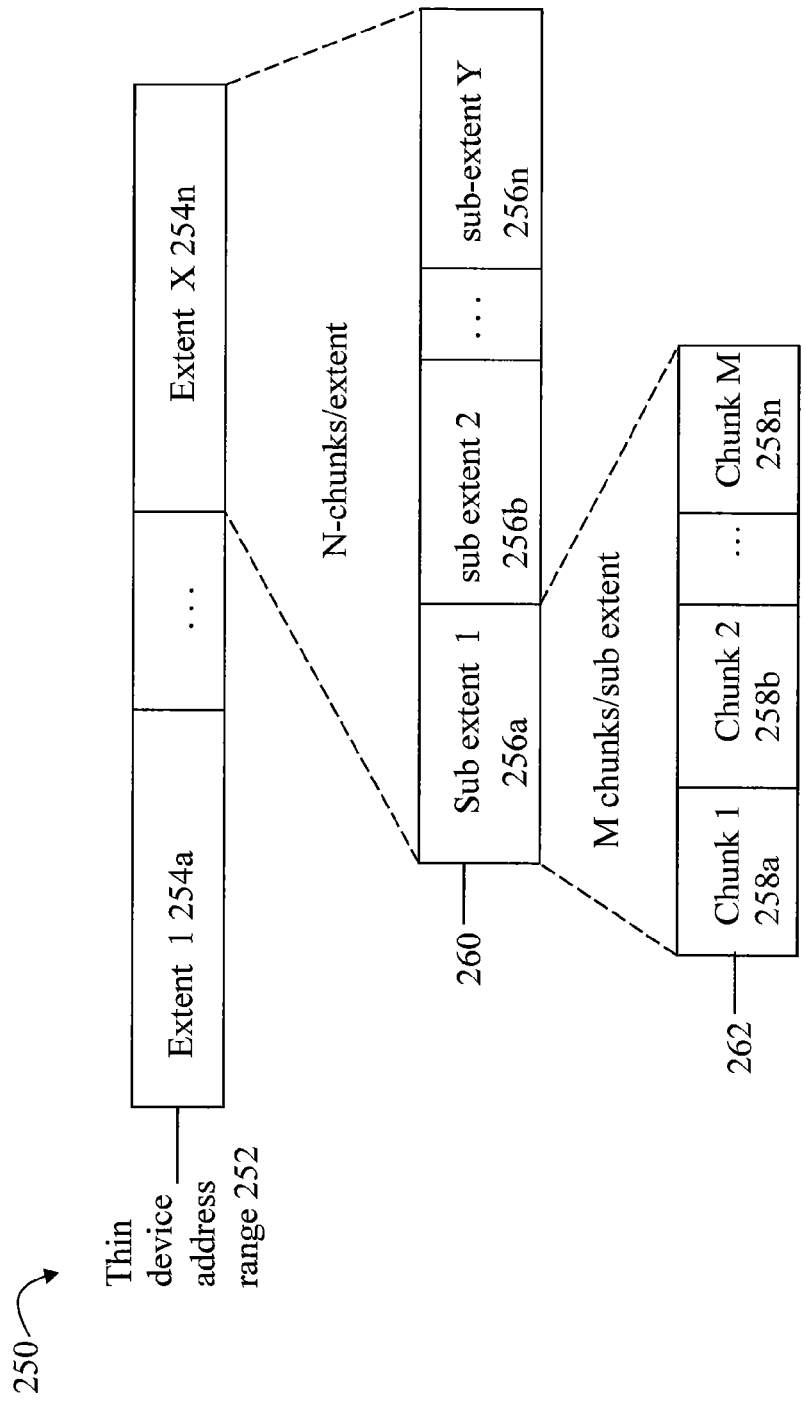
FIG. 9 is an example illustrating data portions comprising a thin device's logical address range.

Referring to FIG. 9, shown is an example illustrating partitioning of a thin device's address space or range in an embodiment in accordance with techniques herein. The example 250 includes a thin device address space or range 252 which, as described elsewhere herein, includes chunks mapped to physical storage locations. The thin device address space or range 252 may be partitioned into one or more extents 254a-254n. Each of the extents 254a-254n may be further partitioned into sub-extents. Element 260 illustrates that extent X 254n may include subextents 256a-256n. Although only detail is illustrated for extent 254n, each of the other extents of the thin device also include a same number of subextents as illustrated for 254n. Each of the subextents 256a-256n may represent a grouping of "M" chunks. Element 262 illustrates that subextent 1 256a may include chunks 258a-258n. Although only detail is illustrated for subextent 256a, each of the other subextents 256b-256n also include a same number of "M" chunks as illustrated for 256a. Thus, each of the extents 254a-254n may represent an grouping of "N" chunks, where $$N=\text{\# subextents/extent}*M \text{ chunks/subextent} \quad \text{EQUATION B1}$$

An embodiment in accordance with techniques herein may collect statistics for each extent, or more generally data portion, as described in more detail elsewhere herein.

It should be noted that although the techniques described herein are used with thin devices providing virtual storage provisioning, the techniques herein may also be used in connection with other types of devices such as those not providing virtual provisioning.

Described herein are different techniques that may be performed by an optimizer, for example, such as the optimizer 135 with reference back to FIG. 3. The optimizer may perform processing in accordance with the techniques herein to determine how to allocate or partition physical storage in a multi-tiered environment for use by multiple applications. The optimizer may perform processing such as, for example, to determine what particular portions of LUNs, thin devices, and the like, to store on physical devices of a particular tier, evaluate when to move data between physical drives of different tiers, and the like. In connection with description herein, embodiments are described whereby the optimizer may be included as a component of the data storage system, such as a data storage array. In such embodiments, the optimizer may perform optimizations, such as the data movement optimization, with respect to physical devices of a single data storage system such as a single data storage array. Such data movement optimizations may be performed with respect to different data storage units of granularity that may be vary with embodiment and/or type of logical devices. For example, an embodiment may provide for partitioning data of a logical device (as may be stored on one or more physical devices (PDs)) into multiple data portions of any suitable size. The data movement optimization processing may provide for evaluation and data movement of individual data portions (each of which can be much less than the size of entire LUN or other logical device such as a thin or virtually provisioned logical device) between storage tiers based on the workload or activity of I/Os directed to each such data portion. As the workload may change dynamically over time, the data storage optimizer may continuously evaluate and perform data movement optimizations between different storage tiers as needed responsive to such changing workloads.

It should be noted that the target data storage system may be connected to one or more other external data storage systems whereby one or more storage tiers managed by the data storage optimizer of the target data storage system include storage located on such external data storage systems. For example, the target system may include the three storage tiers as described above and also include a fourth storage tier of physical storage devices located on an external data storage system whereby the data storage optimizer of the target system performs automated data movement optimizations between storage tiers including those three tiers having physical devices located on the target system and additionally including physical devices of the tier located on the external data storage system. The external data storage system and its storage may be accessible to a host indirectly through the target data storage system. In this manner, the host or other client may send I/Os to the target system and physical storage for the I/Os may be located on physical device of the target system or another external data storage system connected to the target system.

The data storage optimizer may be located in a first or primary data storage system and may perform data storage optimizations, such as data movement and other optimizations, for PDs stored on the first data storage system. Additionally, the optimizer, or more generally, the one or more components performing the optimization processing, may perform data storage optimizations with respect to such externally located data storage systems and PDs. For example, the first data storage system may be connected, directly or through a network or other connection, to a one or more external data storage systems. The optimizer of the first data storage system may perform data storage optimizations such as data movement optimizations with respect to PDs of the first data storage system and also other PDs of the one or more other external data storage systems. In this manner, the data storage optimizer may perform data storage optimizations of its own local devices and/or other devices physically located in another component other than the data storage system. In other words, the techniques herein for performing data movement evaluation, performing the actual movement of data such as between physical devices of different storage tiers, and the like, may be performed by code executing on a component that is external with respect to the data storage system including the physical devices for which such data movement optimization is performed.

Figure 10:
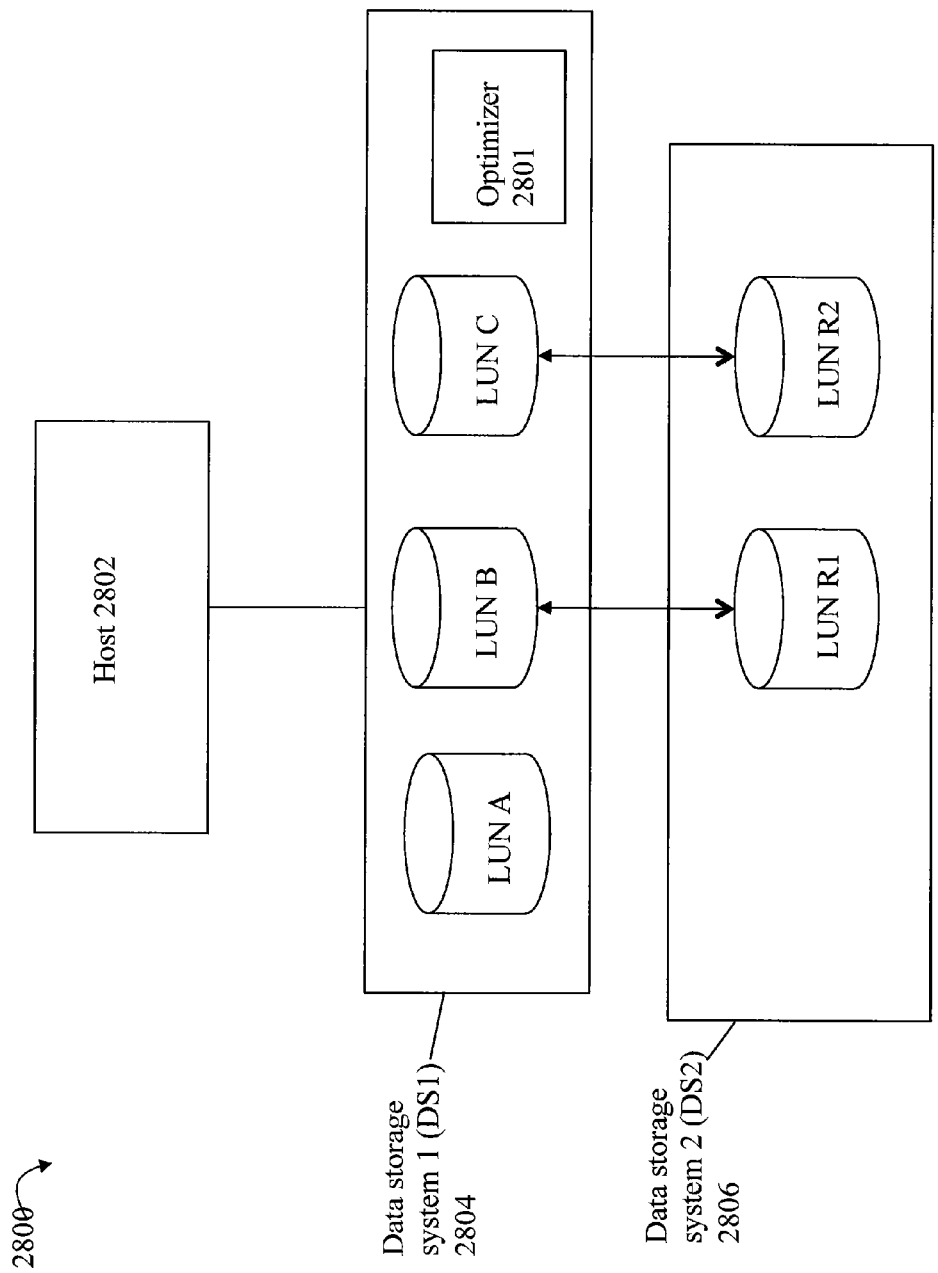
FIGS. 10 and 11 are exemplary embodiments in which the data storage optimizer manages storage across multiple data storage systems including external data storage systems in accordance with techniques herein.

For example, with reference now to FIG. 10, shown is an example 2800 of a system and network including a host 2802, data storage system 1 (DS1) 2804 and data storage system 2 (DS2) 2806. The data storage optimizer 2801 as may be included in DS 1 2804 may perform data storage optimizations across multiple storage tiers of PDs included in DS1 2804 and also PDs of DS2 2806. The optimizer 2801 may perform optimization processing such as in connection with data movement evaluation for moving data portions of LUNs between different underlying PDs providing the physical storage for the LUNs. DS1 2806 may provide for presenting to the host 2802 storage on both DS1 and DS2. LUNs A, B and C may be presented as devices of DS1 where LUN A may have underlying storage provisioned on PDs of DS1 and LUNs B and C may have underlying storage provisioned on PDs of DS2. For example, as illustrated, DS1 may map LUNs B and C (presented to the host as devices of DS1) to LUNs R1 and R2, respectively, of DS 2.

DS1 may utilize one or more components providing a "virtualized backend" to DS2 such as, for example, where a DA of DS1 communicates with an FA of DS2 to access LUNs R1 and R2 of DS2. In connection with SCSI terminology, a port of a DA of DS1 may be an initiator and a port of an FA of DS2 may be a target forming a path over which DS1 may access a LUN of DS2 (e.g., access one of the LUNs R1, R2). Thus, the example 1000 is an illustration whereby the host 1002 communicates directly with DS1 1004 issuing commands and operations to LUNs A-C. Host 2802 is provided access to storage and devices of DS2 only indirectly through DS1. As such, DS1 may want to know different types of information about DS 2 2806 (e.g., such as regarding the underlying PD storage from which LUNs R1 and R2 of DS2 are provisioned in connection with providing data services, and other information as described elsewhere herein) in connection with performing data storage optimizations. Information regarding DS2, such as related to the configuration of DS2, the performance or storage tier classification for PDs providing storage for LUNs R1 and R2 of DS2, and the like, may or may not be available to DS1. Since such information may not be provided to DS1, an embodiment may perform testing or collect observed data regarding I/Os DS2 to discover such information regarding DS2 and the PDs of DS 2 providing storage for the LUNs of DS2. The techniques herein may be performed by executing code on DS1 to determine such information including performance classifications or storage tiers of underlying PDs providing storage for LUNs R1 and R2. The foregoing information may be used as described elsewhere herein in connection with optimizations whereby an optimizer of DS1 does data movement and placement of LUN data of LUNs A-C. For example, DS1 may control movement and placement of data for LUNs B and C on selected ones of LUNs R1, R2 of DS2 based on particular storage tier classifications of PD groups for LUNs R1 and R2. For example, LUN R1 of DS2 may be classified as having its data stored on a first group of PDs which are EFDs, or have average RTs which approximate that as expected with EFD, and LUN R2 may be classified as having its data stored on a second group of PDs which are rotating FC or SAS 15K RPM disk drives (or have average RTs which approximate that as expected with FC or SAS 15K RPM rotating disk drives of a particular RPM). At a first point in time, DS1 may store data of LUN B which is frequently accessed by the host on LUN R1 and may store data of LUN C which is much less frequently accessed by the host on LUN R2 as illustrated in the example 2800. At a second point in time, the optimizer may determine that the data of LUN B is now much less frequently accessed than the data of LUN C and may relocate or move data of LUN B to LUN R2 and may move data of LUN C to LUN R1. Thus, DS1 may address each LUN of DS2 in a manner similar to one of its own PDs for placement and data movement optimizations.

It should be noted that the foregoing example describes performing data storage optimizations, such as data movement and placement, with reference to an entire LUN. However, as described elsewhere herein and also appreciated by those skilled in the art, such data movement and placement may be performed with respect to varying and different levels of storage granularity rather than per LUN. For example, the foregoing may be used in connection with data movement and placement for a portion of a LUN such as LUN B whereby a first very active portion of LUN B may have its data stored on LUN R1 and a second much less active portion of LUN B may have its data stored on LUN R2 and yet a third portion of LUN B may have its data stored on PDs of DS1. DS1 may then perform processing to appropriately and suitably move such data portions as workload and activity for each such portion may change over time.

Figure 11:
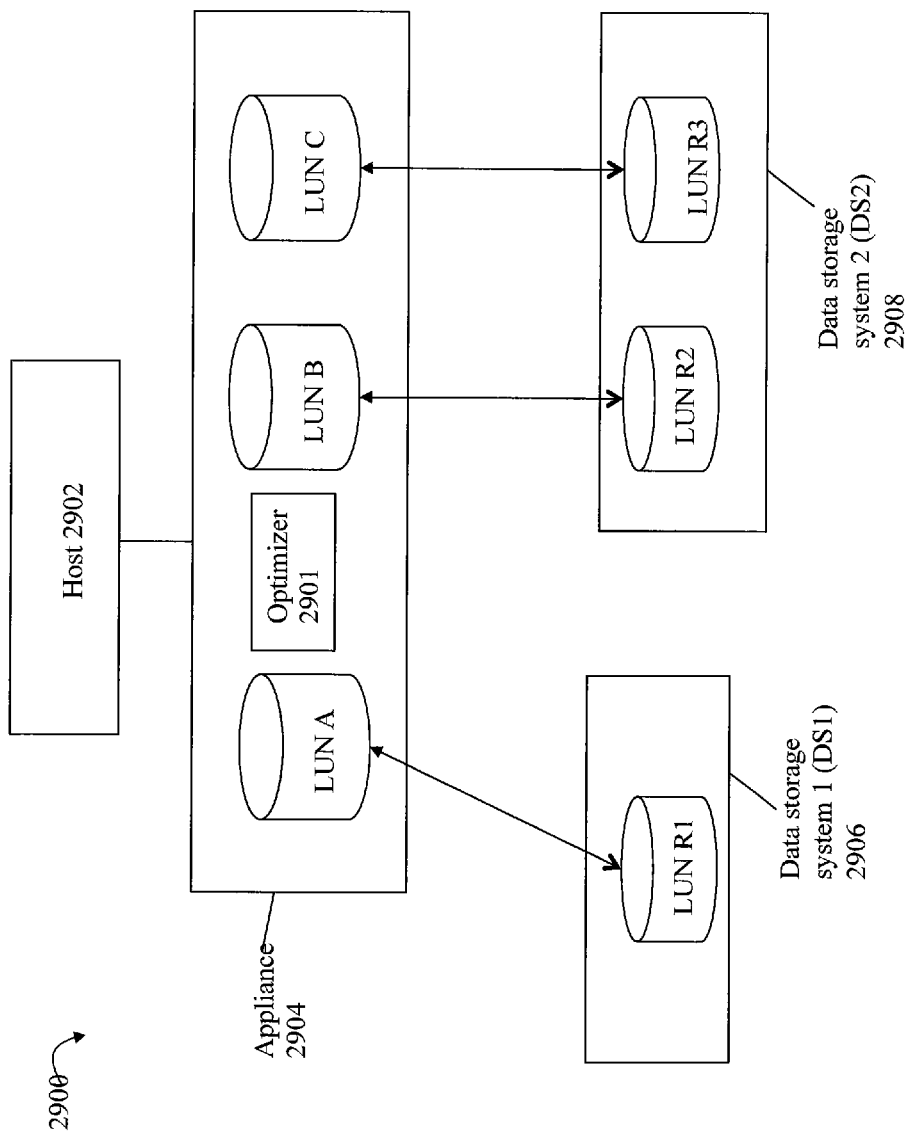

With reference now to FIG. 11, shown is another example of another embodiment that may utilize the techniques herein. The example 2900 includes a host 2902, appliance 2904 and DS1 2906 and DS2 2908. The appliance 2904 may be a data storage virtualization appliance such as an EMC® VPLEX™ appliance which accesses and aggregates storage from multiple data storage systems DS1 and DS2 whereby each such data storage system may be of the same or different types (e.g., same or different manufacturers as well as different array types that may be from a same manufacturer). In this manner, the appliance 2904 may present storage of DS1 and DS2 in an aggregated virtualized environment to the host 2902 and other clients. The host 2902 communicates with the appliance 2904 to access data on any one of the virtualized storage devices LUNs A-C exposed to the client and each such virtualized storage device of the appliance may be mapped to one or more other LUNs R1-R3 of one or more other data storage systems such as DS1 2906 and DS2 2908. To illustrate, the appliance 2904 may expose or present to the host LUNs A-C. As such, the appliance 2904 may want to know information about DS1 2906, DS2 2908 and the underlying PD storage from which LUNs R1, R2, and R3 are provisioned in connection with providing data services, performing optimizations such as data movement as described elsewhere herein, and the like. Such information regarding the configuration and performance classification of LUNs R1, R2 and R3 may or may not be available to the appliance 2904 (e.g. the appliance may not be provided with information regarding the storage tier classification of the underlying PDs from which storage is configured for storing data of LUNs R1, R2, and R3). Since such information may not be provided to the appliance, an embodiment may collect observed performance and workload data directed to DS1 20-6 and DS2 2908 to obtain information regarding the DSs 2906, 2908 and the PDs provisioned for LUNs R1-R3 of DS1 and DS2 that may be used in connection with the techniques herein. Techniques herein may be performed by executing code on the appliance 2904 to determine information such as performance classifications or characteristics of underlying PDs providing storage for LUNs R1, R2 and R3. The foregoing information may be used as described elsewhere herein in connection with optimizations whereby an optimizer of the appliance may perform data movement of LUN data of LUNs A-C. For example, the appliance may at a first point in time map LUN A, or a portion thereof, to LUN R1 of DS1 determined to have its data stored on PDs of the EFD storage tier. The PD technology of EFD may be provided regarding LUN R1 of DS1 2906. Alternatively, the PD technology regarding LUN R1 of DS1 2906 may not be provided and the applicant 2904 may determine an average RT for observed I/OS directed to LUN R1 which approximates that of EFDs. Such mapping to LUN R1 may be performed when the host is frequently accessing LUN A's data (e.g., when LUN A, or portion thereof, has a high workload and the optimizer determines to place such a highly active portion of data on the highest EFD storage tier). At a later point in time, assume the workload to LUN A, or the portion thereof, mapped to the LUN R1 of DS1 greatly decreases. The appliance may now determine that LUN A, or the portion thereof, has its data relocated or moved from the EFD storage tier of LUN R1 to LUN R2 of DS2 (whereby LUN R2 is determined to be of a lower performing tier than PDs of LUN R1 (e.g., LUN R2 may be classified as having underlying PDs which are FC or SAS 15K RPM rotational disk drives rather than EFD drives or otherwise approximating average RTs of such lower performing storage media).

What will now be described are techniques that may be used in connection with a storage environment. The storage tiering environment may be a multi-tiered storage environment. Physical devices (PDs) comprising the storage tiers may be included in logical groupings referred to as pools or storage pools (SPs). The storage tiers, and also the SPs, may be classified based on criteria including performance characteristics such as expected average response time (RT) for completing an I/O operation. In this manner, the PDs comprising each of the storage tiers (and thus the SPs comprising those tier) may be categorized without requiring knowledge of the underlying storage technology, such as SSD, a particular type of SSD such as MLC, SLC and the like) or a particular type of rotating disk drive (e.g., such as SATA 7.2K RPM, FC or SAS 10K RPM, etc. by a particular vendor). It should be noted that in some embodiments, the storage tiers and associated SPs may include such PD characteristics related to the underlying hardware technology in combination with other performance characteristics including expected average RT. In this manner, storage tiers and SPs may be classified using criteria including the expected average RT, alone or possibly in combination with, other criteria. For example, it may be the case that knowledge regarding the underlying hardware and storage technology of the PDs is unknown, unavailable, or otherwise incomplete so that classification of storage tiers based on such information is not possible. For example, the PDs may be stored on an external data storage system and a second data storage system may be managing such PDs such as in performing data movement optimizations. The second data storage system may not have knowledge regarding the underlying hardware and storage technology of the PDs it is managing. The second data storage system may, however, be able to obtain information regarding performance of such external PDs in terms of expected average RT. For example, the second data storage system may obtain such estimates based on observed measurements obtained in connection with actually sending I/Os to the external data storage system, estimates obtained through modeling, user input, and the like. Additionally, it may be the case that knowledge regarding the underlying hardware and storage technology of the PDs is known. However, even in such cases, actual expected performance may still vary, for example, depending on the particular vendor and possibly other factors. In such cases, classifying storage tiers based on expected average RT may prove more effective, efficient and for better optimization of resource usage.

Additionally, techniques herein provide for modeling, suggesting and/or performing data movements in accordance with criteria including performance goals or targets customized for particular applications and SPs. Performance criteria for an SP may vary. For example, SP performance goals may be based on whether a customer wants a system, or particular SP comprising PDs of one or more storage tiers, optimized to be faster (e.g., deliver lower response time) or cheaper (e.g., deliver more I/Os at a higher average response time). Performance criteria for an SP may also include an RT range defining a window of time or band within which the expected RT lies. The average RT may be with respect to all 100% of I/Os, or some percentage less than 100% of all I/Os, and the RT range may define an acceptable RT range. In this manner, the average RT may be used as an idealized performance target or goal and the RT range may provide some variation and flexibility, such as, in order to also maintain performance goals of other SPs and applications. Performance goals for an SP may also be expressed in other terms using the expected average RT. SP performance goals may specify that a certain percentage of all I/Os should complete within a certain amount of time. For example, SP performance goals may specify that 60% of all I/Os directed to this SP should have an average RT less than 4 milliseconds (ms) where the foregoing average RT may be specified as the RT objective included in the performance goals for the SP. In a similar manner, a percentage range may be specified. For example, SP performance goals may specify that 60% of all I/Os directed to this SP should have an average RT less than 4 ms with a target percentage range of 50-70%. It should be noted that the SP's average RT (or RT objective) may reflect the average expected RT of the SP based on expected performance capabilities. In this manner, the average RT (also referred to in following paragraphs as an RT objective) included in the performance criteria of an SP may denote performance criteria used to classify the SP and its underlying PDs into different storage tiers. For example, a storage tier may be defined to include those SPs, and underlying PDs, having an expected average RT (as included in the SP performance criteria), of N ms, a range of N-M ms, and the like. Multiple tiers may be so defined based on different expected average RTs, RT ranges, and the like.

Application of an optimization goal, such as "faster" or "cheaper", may be realized by changing the target % range that the system will target. For example, if SP performance goals include an RT objective (or target response time) of 4 ms with a target percentage range of 50-70% as noted above, a goal to be faster would demand a higher fraction of IO under the target response time of 4 ms, such as 90-95% for example. A goal to be cheaper may relax that criteria such as by decreasing the current target percentage range of 50-70% to, for example 30-40% so as to allow the PD to deliver more IO but at a higher overall average target response time. This is based on the understanding of the performance criteria of a PD where the relationship between IOPS and response time is that response time increases exponentially as a function of IOPS. In this manner, an embodiment may provide a user interface where current settings for an SP may be displayed such as SP performance goals including an RT objective (or target response time) of 4 ms with a target percentage range of 50-70%. A user may be allowed to specify whether to have the SP's performance goals modified in accordance with a selection of faster or cheaper. If the user selects faster, the SP performance goal target percentage range may be modified from 50-70% to 90-95%. If the user selects cheaper, the SP performance goal target percentage range may be modified from 50-70% to 30-40%.

Performance criteria for each application, or logical grouping of applications based on the underlying logical devices commonly used, may vary. As described herein, an SG may refer to logical devices used by a single application or such a single logical grouping. Performance criteria for each SG may be vary with each application and may be based on the particular customized performance expectations or requirements of each application. In this manner, performance criteria for each SG may affect selection of which SPs, and underlying PDs, are used to store data of the application (e.g., which SPs store data of logical devices used by the particular application). Application or SG performance criteria may include an expected average RT (also referred to herein as an RT objective). The SG performance criteria may include performance targets or goals similar in respects to those as described for the SPs. For example, an average RT may be specified as the RT objective indicating an average expected RT for I/Os directed to the particular SG. Additionally, the SG or application performance criteria may include an RT range or may include a percentage range such as that noted above. For example, performance criteria for an application (and thus its SG) may be obtained from a service level agreement or objective whereby a service provider who owns or manages the data storage system is providing services to a third party using the application and the service provider has agreed to deliver a particular level of performance to the third party for a price included in a service agreement.

In accordance with techniques herein in deciding what storage resources, such as SPs or PDs, are to be used by an application, the resources may be generally viewed as a supply and the applications, or more generally consumers of the resources, may be viewed as a demand for the supply. The supply side may be controlled to deliver a scalable number of IOPS (I/Os per second or I/O rate) and have a certain storage capacity (e.g., such as in terms of bytes, GBs, and the like), optimized for a particular RT. The customer may control the performance goals of the SPs such as by varying the RT range or percentage range and/or expected average RT. It should be noted, however, that the customer should select an expected average RT and other performance criteria for a storage tier that is realistic and within the capabilities of the actual underlying PDs. If a customer makes an unrealistic selection such as for the average RT, the system may not be able to satisfy SP performance goals. A system may detect such conditions, such as when all SPs are always looking to move data to a higher performing tier to obtain SP-specific performance goals or targets. An embodiment may also provide for having the system automatically configure and specify values for the SP performance criteria. In some embodiments, an SP may include PDs of all the same underlying physical storage technology or may alternatively include PDs of more than a single technology. It should also be noted that an embodiment may or may not form SPs. For example, consider an embodiment forming SPs where each SP may include PDs of a single tier. Such an embodiment may form multiple SPs each including PDs of the same single tier. Alternatively, in a simple implementation, an embodiment may include a single SP of all PDs of a single tier. In this case, description herein with respect to an SP may be applied to each tier or at the tier level.

The demand may be managed per SG providing a relative priority based scheme since a first SG having a performance goal with a lower RT than a second SG will have a higher priority than the first SG and associated application(s) storing data and directing I/Os to devices of the first SG. In this manner, SG performance goals specify a relative priority for the different SGs and applications in terms of obtaining the higher/highest-performing SPs and PDs being managed on the supply side using techniques herein. A system using techniques herein may stabilize based on the overall load while also keeping the tiers (e.g., SPs and PDs) in their ideal RT range and providing the SGs with the best possible relative performance that the hardware is capable of In one embodiment, the logical devices to which I/Os of an application are directed may be thin or virtually provisioned logical devices as described elsewhere herein. However, it will be appreciated by those skilled in the art that techniques herein may be used with other logical device types to which application I/O is directed.

In one embodiment, the PDs, and associated SPs, may be classified into a number of distinct tiers, such as 16 distinct tiers, based on the expected average RT specified as the RT objective. SPs may transition from states of being stable, accepting load or reducing load. As described elsewhere herein, the swap state may be characterized as a special state where there is an SP capacity violation. Such states of the SPs and storage tiers may be based on the expectations of the customer. The performance goals or targets for each SP may also be referred to as a Quality of Service (QOS) Target including the mean or average RT expected from the underlying PDs comprising the SP with respect to I/Os directed to such SP. For example, the average RT or RT objective included in performance goals or targets for an SP may be in the range of 1 ms to 20 ms. Additionally SP performance goals may include a percentage of I/Os expected to have an observed RT less than the RT objective, and a QOS Target Range specified in terms of a percentage as noted above whereby the percentage may represent the stable range of the underlying PDs in terms of the distribution of response times. For example, a QOS Target for one SP may be 90% at 2 ms, 85%@ 8 ms, and the like. The percentage range may represent a range of percentages within which the actual observed percentage of I/Os having an observed RT less than the RT objective may vary. For example, performance goals for an SP may be 75% of I/Os having an observed RT less than an RT objective=4 ms and the percentage range maybe 70-80%. Alternatively, an embodiment may specify performance goals with an expected average RT and an RT range (e.g., RT objective=4 ms with an RT range of 3.5 ms to 4.5 ms).

In one embodiment, the expected average RT for an SP may be configured and automatically determined by the system, such as through testing and obtaining an average observed RT for I/Os directed to the SP. The customer, however, may be provided with an option to affect the percentage of the SP performance goals. For example, a customer may be allowed to select a particular percentage (and optionally a percentage range) denoting a percentage of I/Os which are expected to have an observed RT that is less than the average RT of the SP's performance goals. The customer may be provided with different options, such as faster or cheaper, which are associated with or mapped to particular percentages and/or percentage ranges. For example, an embodiment may provide a customer with a first option for an SP of faster which is mapped to 95%, and a second option of cheaper which is mapped to 60% (each percentage representing the percentage of I/Os directed to the SP excepted to have an RT less than the average RT included in the SP's performance goals).

As described in more detail below, an embodiment in accordance with techniques herein may maintain a histogram of RTs for each SP. The histogram may be converted into a cumulative distribution function (CDF). The slope of the CDF may indicate how much variation there is in the population and correspond to a wider QOS Target Range %. During each sample period, such as at each 10 minute or other time interval, information may be collected for each SP for an RT histogram instance, along with other data, such as total number of reads, total number of writes, total amount of data written and/or read, based on accumulated data for the time period. The accumulated information for each SP over multiple sampling periods may be included in a QOS matrix described in more detail herein. The QOS matrix may be used, for example, to model expected average RT performance for a proposed data movement, to map or convert between RT ranges and corresponding workloads (e.g., IOPS or number of I/Os), and the like. In a similar manner as described for SPs, data may be collected and maintained for each SG and used in connection with modeling data movements and assessing impact of such proposed data movements to determine whether SG performance goals are met, or below specified SG performance levels, or above specified SG performance goals.

A state machine may be implemented assigning a state to each SP with a goal to reduce load, increase load, or remain stable. Processing may be performed to distribute data portions from the SGs under management to the various SPs based on the current state of each SP. As described herein, an embodiment may maintain three (3) queues of data portions per SP used by each SG (e.g., for each SP from which a storage allocation is made for the SG whereby data portions of the SG are stored on PDs of such an SP). When an SP is in a mode to accept load or reduce load, data portions may be selected from appropriate queues to satisfy the SG performance goals. In a similar manner, states may be assigned to SGs. The SG may be processed in manner similar to that as an SP. For example, processing may be performed to increase an SG's performance (e.g., reduce observed average RT for I/Os directed to the SG) when the observed average RT for the SG is below the RT average and/or RT range specified for the SG performance goals or targets. In this manner the SG may attempt to be as greedy as needed to acquire the highest performing storage in an increase load mode. An embodiment, however may quickly detect an imbalance if all SG are attempting to acquire higher performing storage thereby not meeting their SG-specific performance goals and while all SPs are otherwise in the stable range meeting their SP-specific performance goals. In other words, the performance expectation or demands of the SGs and applications may be beyond the reasonable capabilities of the current PD resources. It may be that, for example, the customer has set unrealistic expectations expressed in terms of RT objectives for the applications' performance goals based on the current PD resources of the system. In the event that the customer sets unrealistic expectations give the hardware configuration, the system may report the expected target range (e.g. such as an expected percentage range denoting the percentage of I/Os expected to have an RT less than a specified RT objective) that it can deliver. For example, the customer may choose to set an RT objective of 2 ms and a target range of 90-95% for an application or SG, but such performance goals may not be achievable without any high performance PD capable of delivering that response time. In this case the system may detect that such performance goals may not be achieved for the particular application given the current PDs on the data storage system and may alternatively provide the customer with an adjusted decreased percentage rage range that the customer may expect regarding SG performance. An example of this would be the system responding with an alternative suggested target percentage range of 30-50%, by using its knowledge of the hardware capabilities and the anticipated workload.

In one aspect, techniques herein match SG load with SP potential to provide the lowest possible I/O response times. Processing may examine the state of all SPs and, for example, from the lowest performing SP (where performance is determined based on the expected RT in the SP performance goals), attempting to move the SP into the stable state (e.g., meeting SP-specific performance goals). Each SP may be assigned a state and a budget of movements. When processing is completed to perform data movements in accordance with the budget, re-evaluation may be performed by observing the actual resulting data storage system performance, achieved as a result of the data movements along with any other changing data storage system workload. In this manner, a feedback loop may be introduced in an ongoing manner in the assessment and reassessment of data storage system, SG and SP performance. Thus, using techniques herein, an embodiment may allow a customer to detect if the data storage system is stable meeting performance goals of SPs and SGs. An embodiment may monitor the foregoing and may trigger alerts or increase the QOS Target range (e.g., percentages of the SP performance criteria) to adapt. An embodiment may set boundaries for how much the system will adapt dynamically and automatically (e.g., how much of an adjustment to the SP performance goals expressed in terms of percentages, percentage range, RTs, and RT range) before triggering user intervention. In this manner, an embodiment may utilize techniques herein which may be characterized as adaptive to provide the highest number of IOPS with lowest possible response times while also operating within customer-specified SG or application performance goals and SP-specific performance goals. In one embodiment, the performance goals or targets of an SP may be include a percentage range or RT range as described herein. Such a range may denote an acceptable variation or deviation with respect to the average RT of the SP performance goals.

Figure 12:
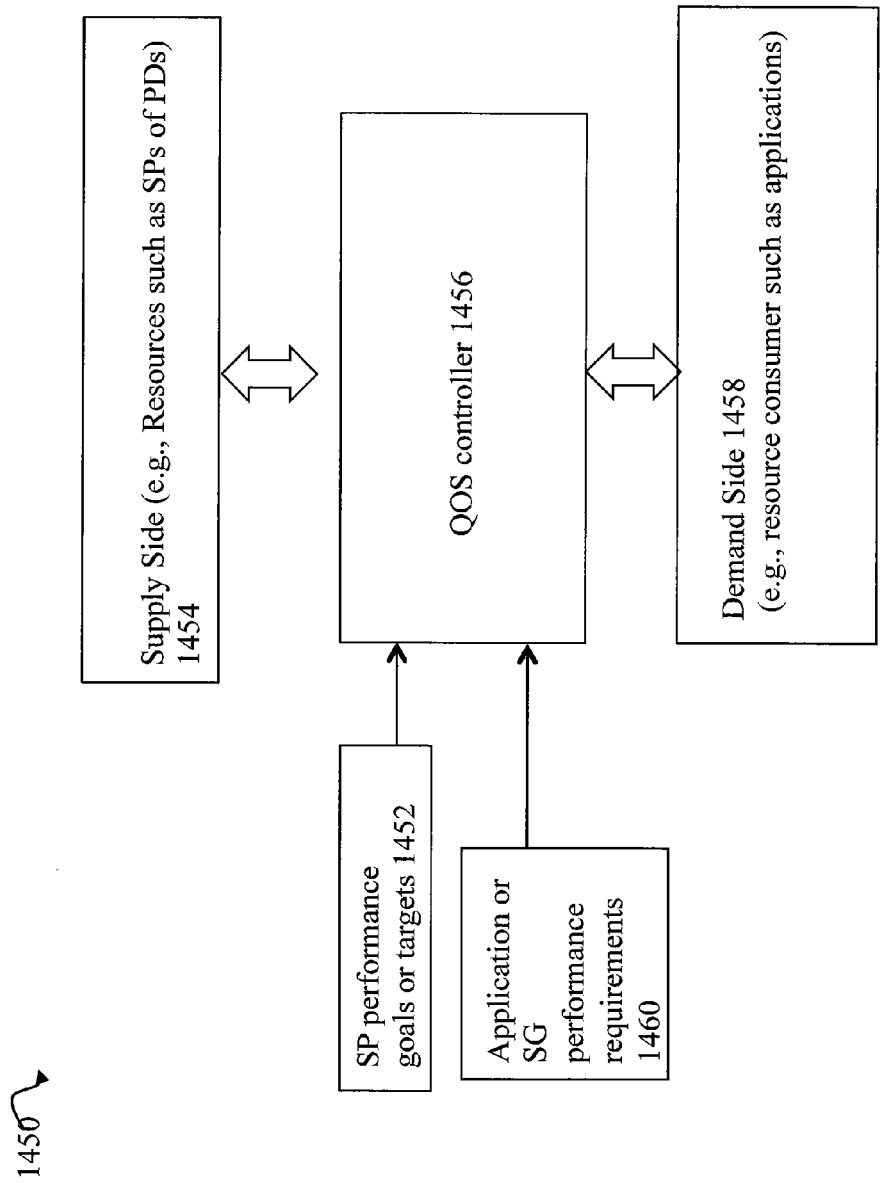
FIG. 12 is an example illustrating a QOS (quality of service) controller and other components that may be used in connection with techniques herein.

Referring to FIG. 12, shown is an example illustrating components and data that may be included and used in an embodiment in accordance with techniques herein. The example 1450 includes SP performance goals or targets 1452 which are specified for the storage resources of the supply side 1454. As noted above, the supply side 1454 may include the SPs or PDs in a data storage system under management using techniques herein. The SP performance goals or targets may be provided as an input to the QOS controller 1456. The demand side 1458 may include consumers of the supply side resources 1454. As noted above, the demand side 1458 may include applications storing their data on PDs of a data storage system where such PDs are included in the supply side 1454. Application or SG performance requirements 1460 may be specified for the applications included in the demand side 1458. The QOS controller 1456 which performs processing as described herein to attempt to best meet the demands of the demand side 1458 of the resources included in the supply side 1454 in accordance with the application or SG performance requirements 1460 and the SP performance goals or targets 1452.

It should be noted that the techniques herein are described with respect to a particular type of supply and demand such as, respectively, PDs and applications. However, techniques herein may be more generally applicable for use with other resources and other consumers of those resources that may be included in a data storage system or other system under management using techniques herein.

As noted above, an RT objective may be included in the performance goals or targets defined for each SP or pool and also each SG. The RT objective may represent the mean or average RT expected. Thus, the RT objective for an SP represents the average expected RT for I/Os directed to the SP, and the RT objective for an SG represents the average expected RT for I/Os directed to the SG. Further, the RT objective for the SP may be used to classify the SP and its underlying PDs in accordance with a tiering classification as described herein representing the expected average RT based on the underlying performance capabilities of the physical storage media. The RT objective for the SG or application may be imply a relative priority with respect to other RT objectives for other SGs or applications.

Figure 13:
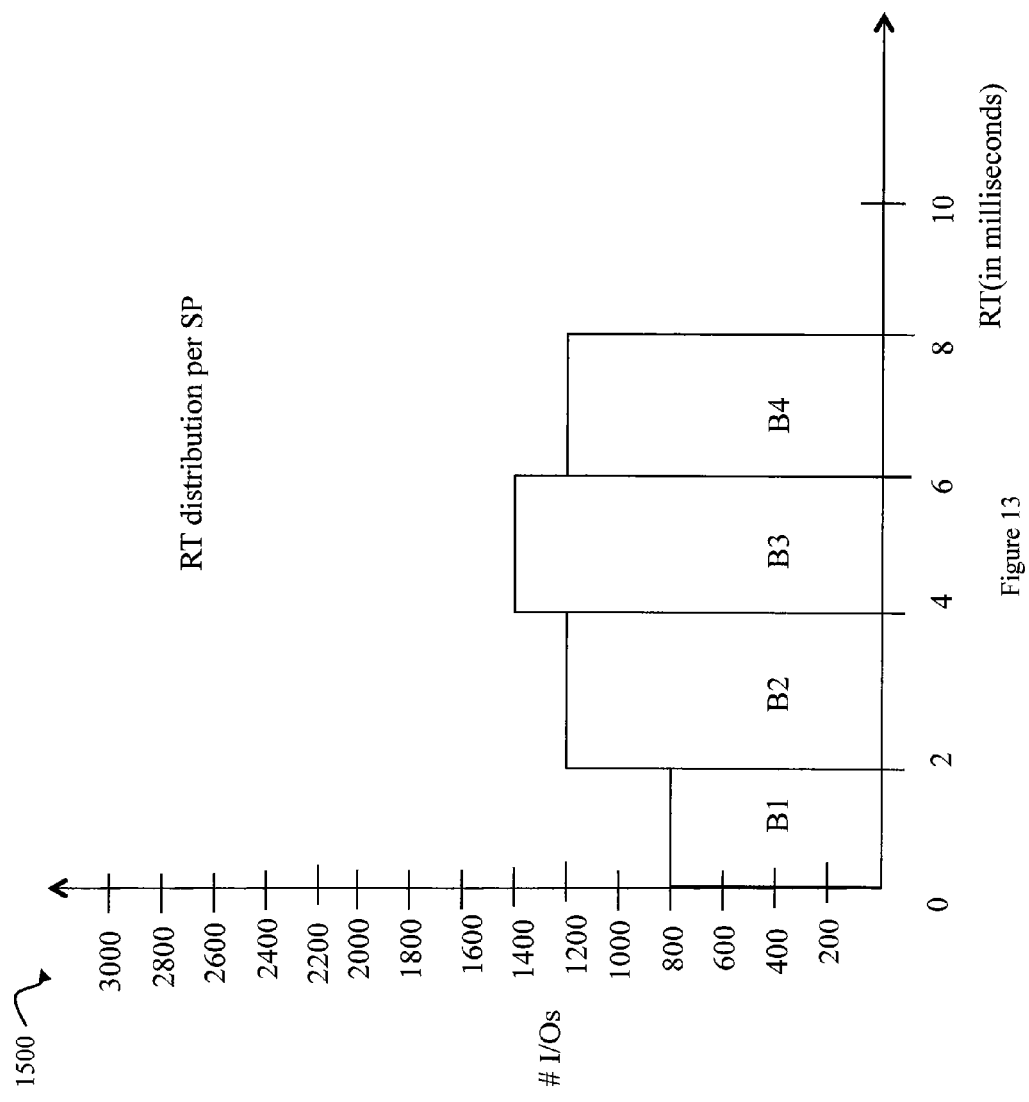
FIG. 13 is an example of a response time distribution or histogram that may be used in connection with techniques herein.

Referring to FIG. 13, shown is an example of an RT distribution that may be obtained for each SP or pool based on observed RTs for I/Os directed to the SP. The graph of the example 1500 indicates a number of I/Os observed during an observation time period on the Y axis and the RT expressed in ms on the X axis. The graph of 1500 is a histogram indicating a frequency or number of I/Os observed during an observation time period having an RT that falls within each of the indicated RT bins B1-B4. Each RT bin on the X axis denotes an RT range. For example bin B1 denotes an RT less than or equal to 2 ms, B2 denotes an RT>2 ms and less than or equal to 4 ms, B3 denotes an RT>4 ms and less than or equal to 6 ms, and B4 denotes an RT >6 ms and less than or equal to 8 ms. If an I/O has an observed RT of 1.5 ms, the I/O falls within B1 and that I/O is counted in the total I/Os of 8000 denoted by the frequency on the Y axis for RT bin B1. The example 1500 illustrates information that may be collected for each SP and also each SG during each time sampling interval and also accumulated in an ongoing manner and stored as an entry in the QOS matrices as described elsewhere herein.

For each SP using the SP's RT distribution as illustrated in FIG. 13, the number or percentage of total I/Os having an observed RT less than the RT objective for the SP may be determined. This percentage may be determined by adding the total number of I/Os in each RT bin where the RT bins added have an RT that is less than the RT objective for the SP. For example, if an SP has an RT distribution as in FIG. 13 and the SP has an RT objective of less than 4 ms, then the total number of I/Os having an observed RT that is less than 4 ms is 2000 I/Os, the sum of I/Os in bins B1 (e.g., 800 I/Os) and B2 (e.g., 1200 I/Os). In this manner, the RT distribution may be used to determine the number of I/Os which have an observed RT within the RT objective for the SP. If the total number of I/Os observed during the observation period is 4600 as denoted by the RT distribution of FIG. 13, then the percentage of I/Os meeting the RT objective for the SP may be 2000/4600 which is approximately 43%. It should be noted that the total number of I/Os representing the 100% level is the total number of I/Os in all the RT bins B1-B4 (e.g. B1 includes 800 I/Os. B2 and B4 each includes 100 I/Os and B3 includes 1400 I/Os).

Figure 14:
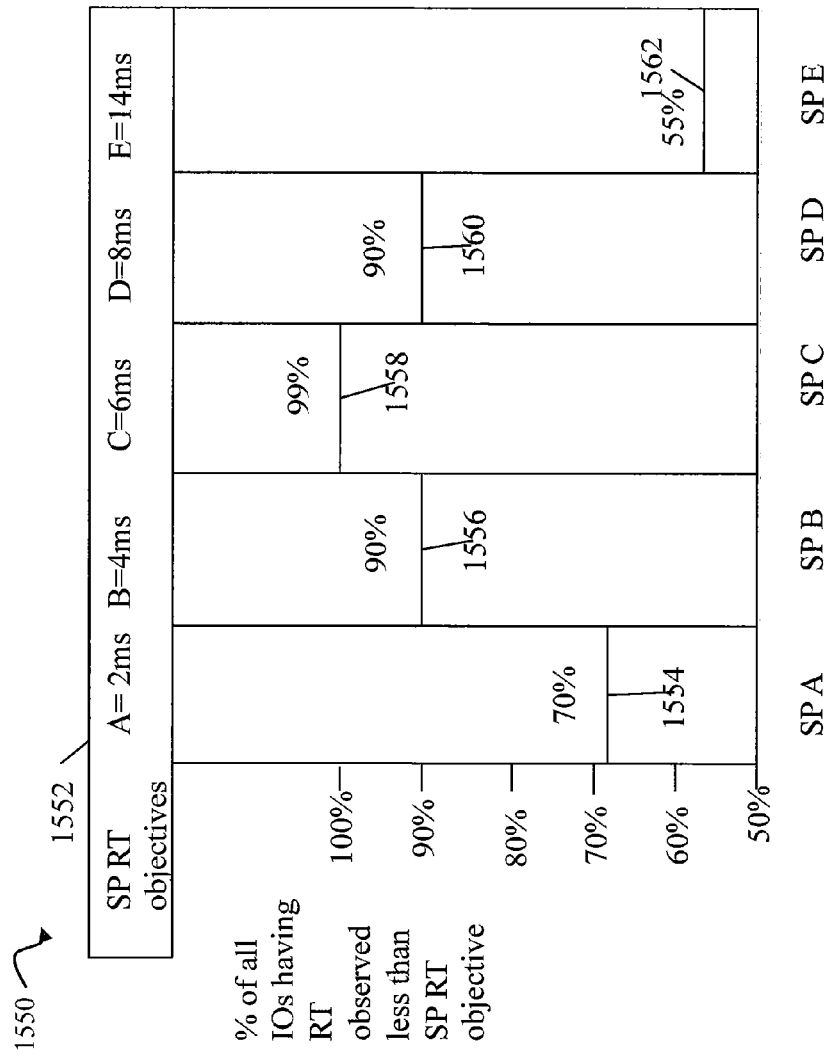
FIG. 14 is an example illustrating the number of observed I/Os having an observed RT meeting the RT objective for the different SPs in an embodiment in accordance with techniques herein.

Consider an example in which there are 5 SPs A, B, C, D and E. An RT distribution similar to that as described above in FIG. 13 may be determined for each of the 5 SPs for an observation time period. Each of the 5 SPs may have different RT objectives for which the percentage of observed I/Os having an observed RT within or meeting the RT objective may be determined. This is illustrated in FIG. 14. It should be noted that the RT objective may be defined in terms of a range with respect to a particular RT.

Referring to FIG. 14, shown is an example illustrating the number of observed I/Os having an observed RT meeting the RT objective for the different SPs in an embodiment in accordance with techniques herein. The example 1550 may also be referred to herein as the SP or pool CDF (cumulative distribution function) denoting the percentage of observed I/Os in each pool meeting SP-specific RT objectives. The example 1550 denotes the different SP RT objectives in 1552 where SPs A, B, C, D and E, respectively, have RT objectives of 2 ms, 4 ms, 6 ms, 8 ms, and 14 ms. Also illustrated, the SPs A, B, C, D, and E, respectively, have percentages of 70 90, 99, 90 and 55 where each of the percentages denote a percentage of all I/Os directed to that SP that have an observed RT less than the SP-specific RT objective denoted in 1552 (e.g., at or below the expected average RT denoted by the SP's RT objective).

Based on the RT distribution determined for each SP in a manner similar to that as described in connection with FIG. 13, the CDF (cumulative distribution function) for each SP may be determined. For a large number of I/Os and as the RT bin size is further decreased, the histogram represented by FIG. 13 may approximate that of a continuous smoothed curve corresponding to the PDF or probability density function. As known in the art, a CDF generally describes the probability that a variable X with a given probability distribution will be found at a value that is less than or equal to "x". In this case, the RT may be the variable X. The CDF for an SP may represent the cumulative response time distribution for the SP.

More formally, the probability density function (PDF) for a continuous random variable X having a value between any two numbers a and b may be expressed as:

$$P(a \leq X \leq b) = \int_a^b f(x)dx \qquad \text{EQUATION A1}$$

where the probability that X takes on a value in the interval [a; b] is the area above this interval and under the graph of the density function. The graph of f (x) is often referred to as the density curve. The PDF is a function that describes the relative likelihood for this random variable to take on a given value. The probability for the random variable to fall within a particular region is given by the integral of this variable's density over the region. The probability density function is nonnegative everywhere, and its integral over the entire space is equal to one. The CDF of a variable X, such as the RT, may be defined in terms of its PDF as:

$$F(\chi) = \int_{-\infty}^{\chi} f(t)dt \qquad \text{EQUATION A2}$$

EQUATION A2 denotes that the CDF representing the cumulative RT distribution for an SP may be determined as the sum of the area under the curve of the PDF for the SP.

Figure 15:
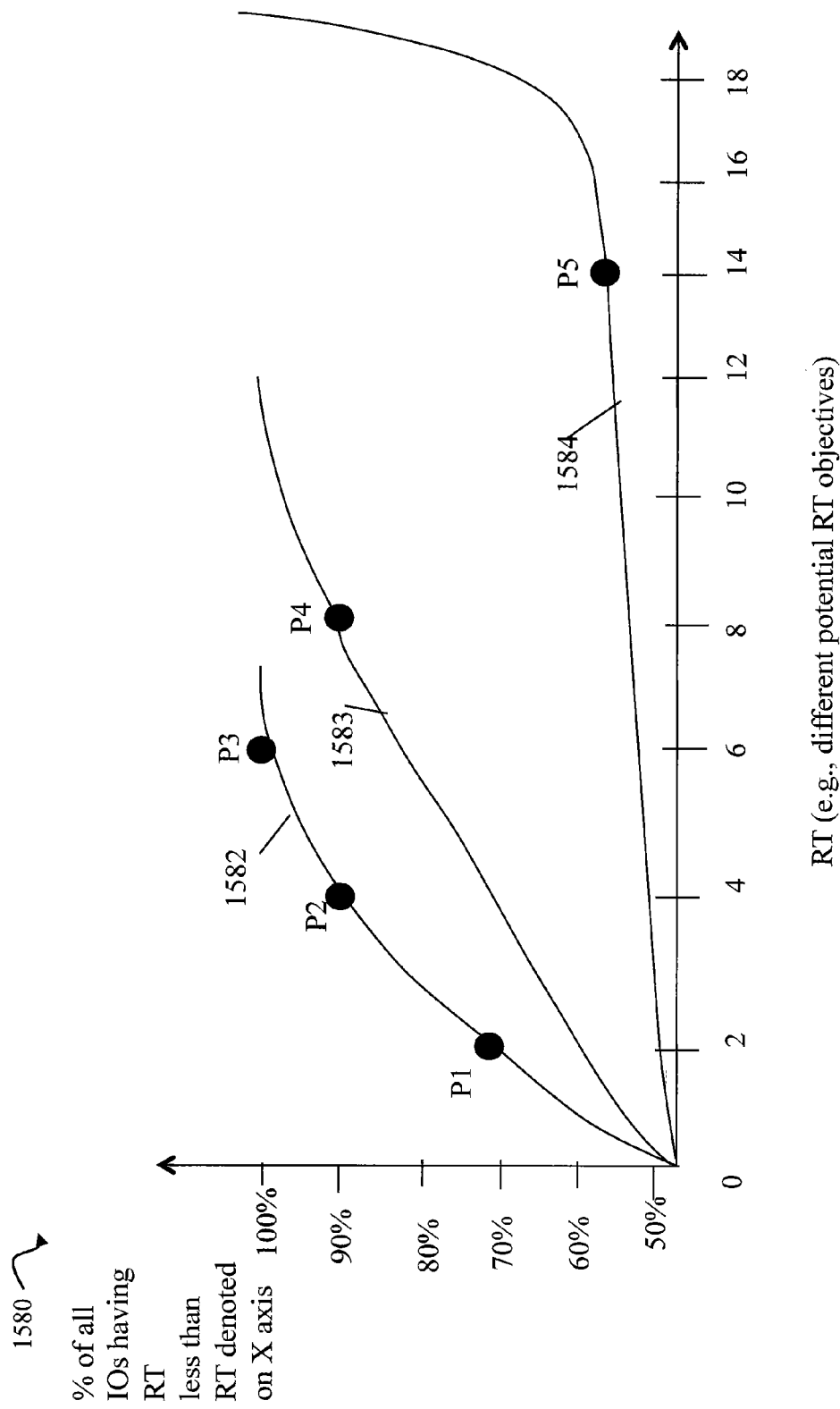
FIG. 15 is an example of cumulative distribution functions that may be used in an embodiment in accordance with techniques herein.

Referring to FIG. 15, shown is a graph illustrating exemplary CDFs for each of the different SPs denoting the percentage of I/Os having an observed RT less than that as denoted on the X axis. Curve 1582 may represent the RT CDF for SPs A, B and C. Curve 1583 may represent the RT CDF for SP D. Curve 1584 may represent the RT CDF for SP E. In this manner, the CDFs for each of the SPs may be used to determine the particular percentage of I/Os having an observed RT less than an RT objective. In particular, the RT objective may correspond to one of the RT values on the X axis and the corresponding Y coordinate percentage may be determined from the SP's CDF curve. This particular point on the CDF curve of each SP may be represented as in FIG. 14. Referring to FIG. 15, points P1, P2, P3, P4 and P5 represent points used in determining the I/O percentage, respectively, for SPs A, B, C, D and E, for each of the SP-specific RT objectives as illustrated in FIG. 14. For example, point P1 represents that for SP A 70% of observed I/Os have an RT less than the RT objective=2 ms; point P2 represents that for SP B 90% of observed I/Os have an RT less than the RT objective=4 ms; point P3 represents that for SP C 99% of observed I/Os have an RT less than the RT objective of 8 ms; point P4 represents that for SP D 90% of observed I/Os have an RT less than the RT objective of 10 ms; and point P5 represents that for SP E 55% of observed I/Os have an RT less than the RT objective of 14 ms.

In an embodiment in accordance with techniques herein, the RT distribution of FIG. 13 may be determined for each SP. From the RT distribution of FIG. 13 determined for each SP, a CDF or cumulative RT distribution for the SP may be determined as illustrated in FIG. 15 denoting, on the Y axis, a percentage of I/Os have an observed RT less than each particular RT denoted on the X axis. From the curve representing the cumulative RT distribution for each SP, one point on the curve may be selected having an X coordinate equal to that of the RT objective of the SP. The Y coordinate of the selected point may be used to determine or assess a state of the SP whereby the state represents how well the SP is meeting QOS performance targets for the SP where the QOS performance target may be expressed in terms of the RT objective and a percentage, or range of percentages, denoting a percentage of all observed I/Os have an observed RT less than the RT objective. If the observed percentage as determined from the Y coordinate of the curve point is within the percentage range specified in the QOS performance target, then the SP may be determined as meeting its QOS performance target. Otherwise, the SP may be determined as generally not meeting its QOS performance target.

As described herein, in one embodiment each SP may be assigned a state of stable, add load or reduce load in accordance with the SP's QOS performance target. If the SP is meeting its QOS performance target, than the SP is assigned the state of stable. If the SP is exceeding or performing better than its QOS performance target, the SP is assigned the state of add load meaning that the SP is able to accept or take on additional workload. If the SPs is below or not meeting its QOS performance target, the SP may be assigned a state of reduce load meaning that workload should be removed or moved from the SP. This is described in more detail below.

Each SP may have a QOS performance target (e.g., also referred to herein as performance goal or target), defined in terms of a RT objective, a target percentage range denoting a target percentage of I/Os having an RT less than the RT objective, and a percentage (falling within the foregoing target percentage range). For example, SP A may have QOS performance targets or goals specifying that 70% of I/Os directed to SP A are expected to have an average RT of less than 2 ms (e.g. RT objective=2 ms). The performance goals for SP A may further include a target percentage range of 60-80% denoting that 60-80% of all I/Os have an RT less than 2 ms. In this manner the QOS targets may identify a performance target expressed in terms of RT objective, a percentage of I/Os having an observed RT at or below the RT objective (e.g., expected average RT), and may also identify a range of such percentages. If an SP is within or currently meeting its QOS performance target, the SP may be assigned a state of stable. Let SP B have QOS performance targets of 4 ms RT for 60-70% of I/Os and let SP C have QOS performance targets of 6 ms for 60-70% of I/Os. Based on the foregoing QOS performance target ranges, SP A may be characterized as stable (within or meeting its performance goals) and for SP B and C, both SP B and SP C may increase load or take on additional workload since both SPs are performing better than expected based on SP-specified QOS performance targets. For example, with reference to FIG. 14, SP B has 90% of its I/Os meeting the RT objective of less than 4 ms (e.g., 90% is higher than the QOS performance I/O percentage range of 60-70%), and SP C has 99% of its I/Os meeting the RT objective of less than 6 ms (e.g., 99% is higher than the QOS performance I/O percentage range of 60-70%). Thus, SP B and C may be assigned a state of accept or add load. If, for example, SP B had a QOS performance target of 4 ms RT for 94-98% of its I/Os, then SP B would be assigned the state of reduce or remove workload since SP B would not be meeting its current QOS performance target (e.g., observed 90% of I/Os having an RT less than the RT objective of 4 ms is less than the RT performance target range of 94%-98%).

For purposes of illustration, assume the following QOS performance targets for each of the SPs A-E:

| SP | QOS performance target |
|---|---|
| A | 2 ms RT @ 60-80% |
| B | 4 ms RT @ 60-70% |
| C | 6 ms RT @ 60-70% |
| D | 8 ms RT @ 60-70% |
| E | 14 ms RT @ 60-70% |

It should be noted that different percentage ranges may be used for each of the SPs depending on the performance goals of each SP. Based on these QOS performance targets and the observed actual performance as in connection with FIG. 14, the SPs may be assigned the following states:

| SP | state |
|---|---|
| A | stable |
| B | +(add load) |
| C | +(add load) |
| D | +(add load) |
| E | −(decrease load) |

As noted above, there may be a need to reduce workload of SP E thereby increasing performance for SP E. Accordingly, some of SP E's workload (e.g., in terms of a number of I/Os, IOPS or I/Os per second) may be moved to one or more of the other SPs which are denoted as add load or being able to accept load and still meet the SP-specific QOS performance target.

It should be noted that performance analysis as just described may be based on the per-SP or per pool level QOS performance targets. Each SP may be characterized based on its QOS performance targets as a resource providing a number of I/Os at a particular RT. Collectively, the SPs of PDs may be viewed as resources of the data storage system providing a supply.

As described herein, a state machine may control and assign a state for each SP. As also described herein, a user may be able to set the performance criteria for the SP including the RT objective, percentage of I/Os expected to have an observed RT below the RT objective, and/or the associated percentage range. As also mentioned herein, SP performance goals may alternatively be specified in terms of RT objective and associated RT range where the RT objective represents the average RT objective of all I/Os directed to the SP (or some percentage thereof) and the RT range represents a range of RTs within which the RT objective falls. Such SP performance goals may be set by the user or automatically configured in an embodiment. For example, the RT objective and percentage of I/Os expected to have an RT less than the RT objective for the SP may be specified. The user may be able to configure an associated range either in terms of the RT range or percentage range. The SP performance goals, as input by the user or otherwise which may be determined automatically by the system, may be determined, for example, through automated testing and observing RTs over an observation period. Additionally, values such as the RT objective or percentage(s) specified for the SP's performance goals may be adjusted automatically over time as additional I/O results are observed over time.

Once the performance goals or targets for the SP are specified, the SP may be evaluated for its total available capacity and SP performance targets. The state of an SP may be set to one of the 3 values noted above. Additionally, the SP state machine itself may be characterized as being a particular model of operation that will now be described. A first mode of initialize denotes that the SP state machine is initializing. Part of this initialization process may include, for example, reading any available configuration information about the SP. The SP state machine may also be in a second mode of adapt. When in this mode, each SP's performance goals or targets are examined to determine if the SP needs to increase or decrease workload based on SP's performance goals. If so, the SP may be assigned a budget of IOPS or number of I/Os to move incrementally to or from the SP. This budget may be based on the SP performance goals and additionally other factors that may to limit the amount of change in a direction toward achieving the SP performance goals. The upper limit of the IOPS or I/Os that may be moved to or from the SP may be based on the SP performance goals and the performance prediction from the QOS Matrix for the SP. This is used to determine where the SP may operate in terms of load for given SP performance goals. Once the available workload capacity of the SP (e.g., such as expressed in a number of I/Os or IOPS) is determined, the allocation capacity is considered. Such allocation capacity may be defined in accordance with a policy. If within capacity compliance, a budget of GB or storage is also calculated. If the SP is out of compliance with respect to a size denoting the amount of physical storage that may be allocated for the SP, an indication is set to ignore the IOPS budget and force movement of workload out of the SP with the goal of achieving the capacity limit or maximum size limitation of the SP. The SP state machine may then transition to a move state with a goal specified for the SP in terms of IOPS or number of I/Os and GB. When the SP state machine is in the move state with respect to processing for a particular SP, the state machine is in a state where it may move data portions into or out of the SP. It will remain in the move state for the particular SP while waiting for an SG to consume from the SPs budget of movements. The SP state machine may timeout automatically, for example, after 30 minutes or some other suitable time period in order to ensure that the current budget and associated SP state do not become outdated due to real-time changes in the system. As noted above, the SP may be assigned one of three states—

SP State=Add load: SP has a budget of +N GB and +Y IOPS that may be added to it.

SP State=Reduce load: SP has a budget of −N GB and −Y IOPS to reduce. The IOPS budget may be ignored if the SP is out of capacity compliance for the SG. In this case, the primary criteria for determining which data portions to move with respect to the SP may be with respect to not violating the storage capacity limit. The −N implies that the SP is in violation of its storage capacity limit and needs to reduce its size by the amount of N in order to be within the SP's specified capacity storage limit.

SP state=stable: SP is within its specified performance goals and no movement of data portions is needed. In one embodiment, when in this state, the SP may still be in violation of an SP storage capacity limit even though the SP's performance goals are met. In this case, an embodiment may perform movement of data portions out of the SP to correct for any SP capacity limit violation. Assuming any capacity violations are the primary criteria for determining which data portions to move with respect to the SP, data movement candidates may be considered which first result in reducing the SP capacity or size without further causing the SP to move out of its performance goals. For example, movement of idle data portions of the SP having no workload may be first considered prior to moving data portions having any workload. Any data portions considered for data movement to correct a capacity limit violation may also preferably not violate the performance goals of the SP.

It should be noted that capacity storage limits that may be specified for an SP are described in more detail below.

What will now be described is the demand side or consumers of the resources provided by the supply side. The demand side may include applications having data stored on the data storage system. For example, application 1 (app1) may be an SQL server application storing its data on the data storage system. Application 2 (app 2) may be an email server application storing its data on the data storage system. Each of the applications may have its data stored on logical devices of a different SG. In this manner, an SG may represent the data stored on the data storage system for a single application although an SG may correspond to one or more other consumers or clients of the data storage system. Each application, and hence each SG, may have different QOS performance targets. The QOS target of an application or SG may also include an RT objective. The QOS performance target for an SG may also include a target range of percentages denoting a percentage range of I/Os having an observed RT less than the RT objective.

In a manner similar to that as described above for each SP, processing may be performed for each SG. A state machine may be used to control SG state and performance similar to that as described above for SPs with the difference that the states are SG-specific states denoting whether the SG is stable (e.g., meeting its performance goals), wants to increase performance thereby in a state which wants to acquire higher performing storage or SPs (e.g., wants to move one or more of its data portions currently stored in a first SP having a first RT objective to a second SP having a higher performance as denoted by the second SP having a second RT objective lower than the first RT objective), or wants to acquire lower performing storage or SPs (e.g., wants to move one or more of its data portions currently stored in a first SP having a first RT objective to a second SP having a lower performance as denoted by the second SP having a second RT objective higher than the first RT objective). Additionally, an RT distribution as in FIG. 13 may be determined for each SG. The RT distribution for each SG may be converted into a CDF for the RT (e.g., cumulative RT distribution) as in FIG. 15 for each SG. For each SG, the QOS performance targets may be specified in terms of meeting a particular RT range with respect to an RT objective (e.g. RT objective+/−some time interval or time window), or may be specified in equivalent terms with respect to a percentage and also percentage range (having range limits of an upper % and lower %) where each of the foregoing percentages represents a particular percentage of I/Os having an RT less than the RT objective as described above in connection with SPs. For example, assume that an SG has a CDF as illustrated by one of the curves such as 1582 in FIG. 15 generated from observed I/Os. The SG performance target may be specified in terms of a percentage range having endpoints of first percentage and second percentage (e.g. 60-70% as above) for a given RT objective. As noted above, the curve 1582 as observed for an SG may be used to locate the point on the curve having an X coordinate equal to the RT objective. The Y coordinate of the located point on the curve may be obtained and used as the observed % of I/Os having an RT less than the RT objective as denoted by the X coordinate. If the Y coordinate value is within the percentage range, then the SG's QOS performance target is determined as being met. Otherwise, the QOS performance target is determined as not being met whereby observed performance may be deemed higher or lower than the QOS performance target (depending on whether the actual observed percentage is higher or lower than the target percentage range of the QOS performance target as described elsewhere herein).

Rather than specify performance goals or targets for an SG or an SP using an RT objective, percentage, and percentage range, the QOS performance target may be specified using an RT objective (which represents the expected average RT as described elsewhere herein), and an RT target range (e.g., with respect to the RT objective such as RT objective+/−time window). The RT target range may specify a range of RT values where the observed average RT across all I/Os observed is expected to be within the RT target range. In this case, the average observed RT for an SG or SP may be used rather than the observed percentage of I/Os having an RT less than the RT objective. A determination of whether the SP or SG is meeting its QOS performance target may be performed by determining whether the observed average RT is within the RT target range. If the observed RT is higher than the maximum bound of the RT target range, then the current RT performance is worse than that as denoted by the RT target range. If the observed RT is higher than the lower bound of the RT target range, then the current RT performance is better than that as denoted by the RT target range.

In connection with the QOS performance target, a percentage range (denoting percentage bounds regarding percentage of I/Os having an RT less than the RT objective) may be mapped or translated to a corresponding RT range using information of the CDF as in FIG. 15. For a percentage range having an upper bound % and a lower bound %, an average RT at both the upper bound % and lower bound % may be determined. For example, if the percentage range is 70%-90%, a first average RT at 70% may be determined with respect to the 70% of all I/Os have an RT less than the RT objective. Similarly, a second average RT at 90% may be determined with respect to the 90% of all I/Os have an RT less than the RT objective. The first and second average RTs may be denote the corresponding RT range.

For purposes of illustration in following paragraphs, the SG and SP performance goals may be specified in terms of an RT range. If the performance goals are expressed in terms of percentages or percentage ranges (e.g. where each percentage denotes a percentage of I/Os expected to have an observed RT less than the RT objective), the percentage(s) may be converted to RT values as described.

Referring to FIG. 16, shown is an example of different SGs and associated RT objectives included in the QOS performance targets in an embodiment in accordance with techniques herein. The example 1600 illustrates information for 4 different applications and SGs. The table includes the following rows: 1610 identifying the different applications, 1612 identifying the RT objectives for the applications, 1614 identifying the observed average RT for I/Os directed to the applications, 1616 denoting whether the current observed RT is at, above or below the RT objective performance target (as in row 1612), and 1618 identifying an application or SG state determined in accordance with the QOS performance targets and observed RT for the applications. It should be noted that information in rows 1612 and 1614 is in ms. Each application has a column of its information in the table. Column 1604 indicates that app1/SG1 has an RT objective of 10 ms and an observed average RT of 10.5 ms. As noted above, an embodiment may define a QOS target in terms of an RT range with respect to the RT objective such as by using a time interval or a time window with respect to the RT objective so that if the observed RT is within the RT range of: RT objective+/−time interval, the RT performance target as included in the SG's QOS performance target may be characterized as being met. In this example, assume that the observed RT of 10.5 ms for app1/SG1 is within this RT performance target range thereby meeting the RT performance goals as denoted by 1616a.

A state may be assigned to each SG in accordance with whether the observed RT meets the SG's RT performance target (e.g., stable state), is below the SG's RT performance target (e.g., need to increase performance/decrease observed RT by acquiring higher performance media/moving workload to a higher performance media), or is above the SG's RT performance target (e.g., need to decrease performance/increase observed RT by acquiring lower performance media/moving workload to a lower performance media). In this example, SG1 is assigned the state of stable as denoted by 1618a.

Column 1606 indicates that app2/SG2 has an RT objective of 2 ms and an observed average RT of 1.5 ms. In this example, assume that the observed RT of 1.5 ms for app2 is outside of the SG's QOS performance target range specified with respect to the RT objective (e.g., RT objective+/−window or time interval) thereby indicating that the observed average RT is above the RT performance target as denoted by 1616b. Based on 1616b, SG2 may be assigned a state to acquire lower performance media and decrease performance/increase RT in order to bring the observed RT into line with the RT performance target (e.g., achieve the QOS performance target).

Column 1608 indicates that app3/SG3 has an RT objective of 5 ms and an observed average RT of 1.5 ms. In this example, assume that the observed RT of 1.5 ms for app3 is outside of the SG's QOS performance target range specified with respect to the RT objective (e.g., RT objective+/− window or time interval) thereby indicating that the observed average RT is above the RT performance target as denoted by 1616c. Based on 1616c, SG3 may be assigned a state to acquire lower performance media and decrease performance/increase observed RT in order to bring the observed RT into line with the RT performance target (e.g., achieve the QOS performance target).

Column 1610 indicates that app4/SG4 has an RT objective of 50 ms and an observed average RT of 60 ms. In this example, assume that the observed RT of 60 ms for app4 is outside of the SG's QOS performance target range specified with respect to the RT objective (e.g., RT objective+/− window or time interval) thereby indicating that the observed average RT is below the RT performance target as denoted by 1616d. Based on 1616d, SG4 may be assigned a state to acquire higher performance media and increase performance/decrease observed RT in order to bring the observed RT into line with the RT performance target (e.g., achieve the QOS performance target).

In connection with the SP or supply of resources as described herein, an SP may have a capacity limit or target identifying an upper bound or maximum size for the SP. However, an SG may not have such a capacity limit. Thus an SP may have performance goals or targets and also a storage capacity limitation representing the total capacity or size of the SP (e.g. in terms of consumed, allocated or used physical storage). The customer may specify a capacity limit for an SP, such as 500 GB, denoting a maximum or upper limit to the size of the SP. It should be noted that an embodiment may not enforce the capacity limit for the SP as a hard limit and may define a capacity range with respect to the capacity limit whereby the maximum capacity of the SP may be within the capacity range. For example assuming a 500 GB capacity limit, the capacity range may be determined as 500 GB+/−some threshold amount of storage such as in terms of GBs or other size units of storage. In this manner the capacity range may denote a range within which the size or capacity of the SG falls. It should be noted that the performance target for an SP and an SG as a target range specifies upper and lower bounds whereby adjustments may be made to move workload with the goal of maintaining the resulting performance within the performance target range. However, it is not required that the used capacity of an SP be within the capacity range. Rather, the total used storage capacity of the SP may lie within the capacity range and may also be less than the lower bound of this range. For purposes of simplicity, following examples and discussions refer to the capacity limit as a single value although an embodiment may use a capacity range as just described.

In connection with techniques herein, if the performance goals or targets for the SP are expressed in terms of a percentage range denoting a range of percentages of I/Os having an observed RT less than the RT objective, then the percentage range may be first converted or translated to an equivalent RT range so that processing from here may proceed with a QOS performance target in terms of an RT range as described elsewhere herein.

Figure 17:
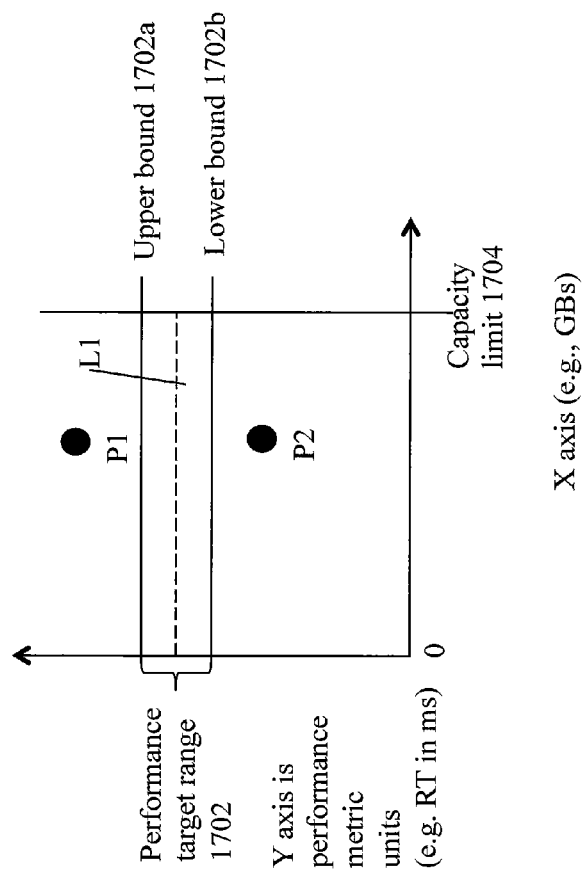
FIG. 17 is an example illustrating a proposed budget as a graphical movement in distance between points.

Referring to FIG. 17, shown is an example illustrating a point on a graph that may represent the current state of a single SP based on the SP's performance goals or targets and capacity limit. The graph has a Y axis with units in terms of the particular performance metric of the performance target. For example, if the performance target for the SP is in terms of RT, the Y axis may be in ms. The performance target range 1702 may represent the QOS performance target range as an RT range having an upper bound 1702a and a lower bound 1702b. The X axis may be in storage units such as GBs. The capacity limit 1704 may represent the maximum allowable size or capacity of the SP. A point on the graph of 1700 may represent the current state of the SP. For example, assume the performance target range denotes an RT range. In this case, the X coordinate represents the currently allocated capacity or size of the SP and the Y coordinate may represent the average observed RT for the SP. For example, point P1 may represent the current state of an SP that is less than the defined capacity range for the SP and having an average RT greater than the performance target range 1702. In this case P1 has an RT that is larger than that denoted by the RT range of 1702 thereby indicating that performance needs to increase/the current RT needs to decrease to be within the target range 1702.

Rather than have P1 represent the current state of the SP, let point P2 represent the current state of the SP that is less than the defined capacity range for the SP and having an average RT less than the performance target range 1702. In this case P2 has an RT that is less than that denoted by the RT range of 1702 thereby indicating that performance needs to decrease/the current RT needs to increase to be within the target range 1702.

Using this graphical illustration, adding workload to an SP or removing workload from an SP may be represented by a vector denoting a change in capacity (e.g., GBs) in the X direction (horizontal) and a change in performance (e.g., RT) in the Y direction (vertical) due to the shift or movement in workload (e.g. which may be expressed in terms of IOPS or number of I/Os). In a manner to that as described for SPs, a vector may be used with respect to each SG to represent any required shift in workload and/or capacity for the SG to be in compliance with its performance goals and any capacity restrictions imposed at the SG or application level.

Adding workload W such as associated with moving a data portion or extent of size S to the SP may result in increasing the SP's capacity size by S, increasing the SP workload by W and also decreasing SP performance (e.g. RT) by an amount proportional to the W increase. Similarly, when a data portion having an associated workload W and size S is moved out of an SP, the SP's workload decreases by W, its used capacity decreases by S, and its performance (e.g., RT) increases by an amount proportional to W. In this manner, a budget may be determined with respect to a current point representing the current state of an SP identifying an amount of movement in the X direction and Y direction to result in a point within the area bounded by the performance target range 1702 and the capacity target line 1704. Ideally, the RT midway in the range may be considered when determining the SP budget. Alternatively, an embodiment may consider some other RT of the RT range such as the maximum or upper bound of the RT performance target range 1702 when determining the budget. The budget for the SP may identify an amount of available capacity up to the capacity target and may identify an amount by which the RT may increase or decrease.

Dashed line L1 may represent the ideal RT used for determining the RT portion of the SP budget. For example, if point P1 represents the current state of the SP, the RT portion of the SP budget may be measured as the distance between the Y coordinate of point P1 and the value of the RT (Y coordinate) for line L1. The capacity portion of the SP budget may be measured as the distance between the X coordinate of point P1 and the value of the capacity (X coordinate) for the capacity target line 1704.

A change in RT may be achieved by shifting a corresponding workload in terms of IOs to or from the SP. To determine the amount of workload in terms of I/Os that need to be moved to achieve a resulting change or delta in RT, QOS matrices holding performance information for the SP may be constructed from the observed I/Os directed to the SP. The QOS matrix may represent observed performance data which may represent a performance curve used for modeling SP performance. The QOS matrix for an SP may be based on performance data obtained to date through observing I/Os directed to the SP. A histogram may be constructed as in FIG. 13 for the SP based on observed I/Os at each occurrence of a time period, such as once per hour. The histogram may represent one sampling of data which is incorporated into the QOS matrix at the occurrence of each time period.

The histogram can be used to determine the average RT and total I/Os across all observed I/Os. The integral or sum of all the bins of the histogram represents the total number of I/Os done. The RT average may be derived from the histogram. For example, for illustration assume a simple histogram having only two RT bins representing the total IOs observed during the current sample period. The first RT bin may have an average of 2 ms for 10 IOs and the second bins may have an average RT of 5 ms for 30 IOs. In this case the average RT may be determined as 170 ms/40 IOs=4.25 ms as the RT average.

The QOS matrix may thus become further refined as more data is collected for each SP at each time period occurrence. The QOS matrix may denote an average RT given a particular workload in terms of IOs stored on the amount of physical storage (GB) or capacity used for the SP. In this manner, the QOS matrix may represent information defining a performance curve for the SP based on collected performance data obtained from the histograms at each time period occurrence.

Figure 18:
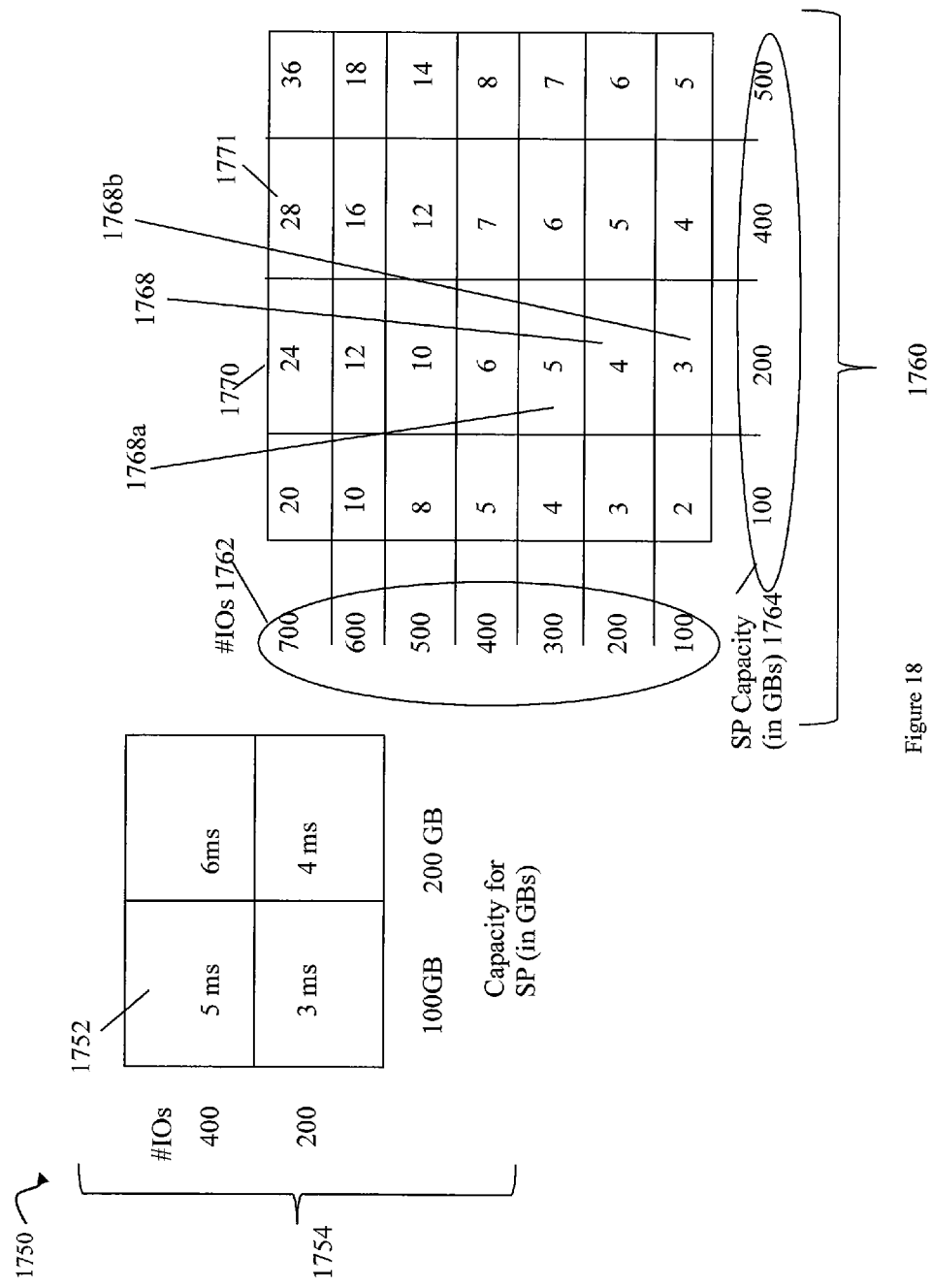
FIGS. 18 and 19 illustrate aspects of a QOS matrix in an embodiment in accordance with techniques herein.

For example, with reference to FIG. 18, element 1754 may represent the information stored in an SP's QOS matrix after 4 sampling time period occurrences. Each cell of the matrix may represent the average RT and total I/Os obtained for one sampling period (e.g., one histogram) and when a number of GBs is used for the SP. For example, 1752 may represent that an average RT of 5 ms is observed for a total number of 400 IOs directed to 100 GBs of stored data.

Element 1760 of FIG. 18 may represent a further refinement of the QOS matrix for the SP after 28 sampling time period occurrences where 1762 represents the different values for total IOs and 1764 denotes the different SP capacities. As with the matrix of 1754, the matrix of 1760 is further refined to include more data points used to form the performance curve for the SP.

An RT range may be mapped to a corresponding number of I/Os or workload range using the QOS matrix. For example with reference to 1760, assume a current SP state of an RT of 4 ms with an SP capacity of 200 GB as represented by 1768. Assume that the RT range is RT objective+/−1 ms denoting an RT range of 3 to 5 ms. The RT range for the 200 GB SP capacity corresponds to the RT range indicated by cells 1768a and 1768b. Using 1760, a corresponding workload range for the foregoing RT range may be determined using cells 1768a-b by looking up the #IOs corresponding to each of the 1768a and 1768b. In this case, 300 IOs corresponds to 1768a and 100 I/Os corresponds to cell 1768b and may be used to translate or map the RT range to a corresponding range expressed in terms of a number of I/Os. In this manner, the budget of an SP may be expressed in terms of IOs and capacity rather than RT and capacity.

Figure 19:
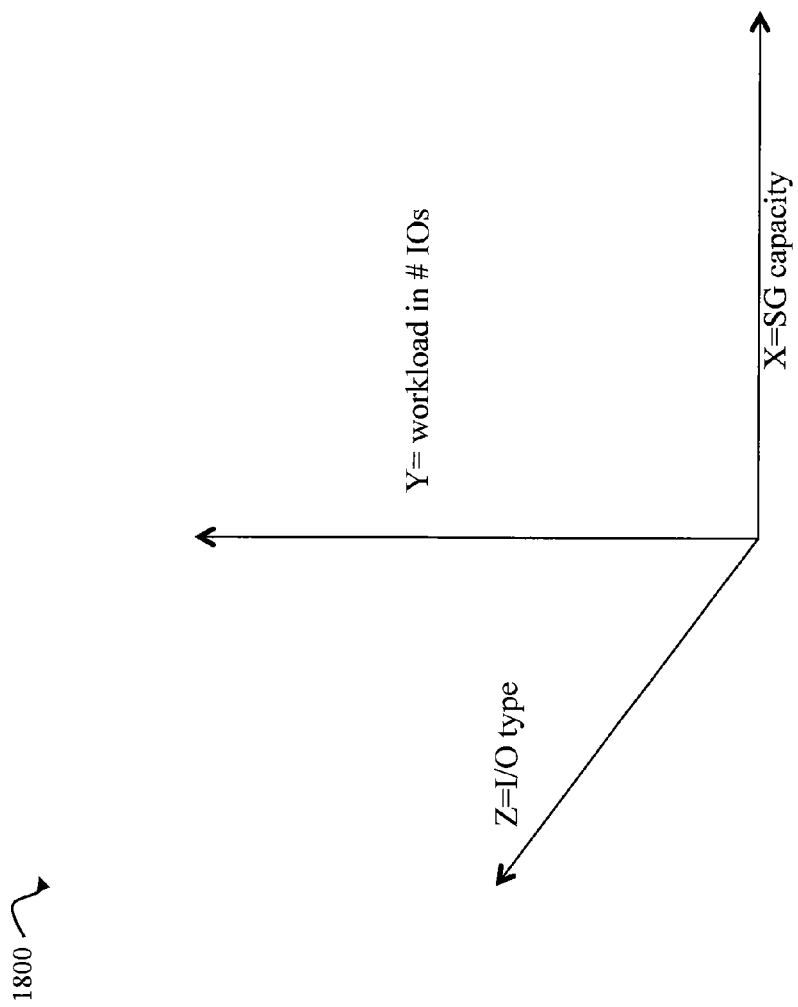

An embodiment in accordance with techniques herein may use a two-dimensional QOS matrix as just described. An embodiment in accordance with techniques herein may also choose to further define a QOS matrix using 3 dimensions as illustrated in FIG. 19. In the example 1800, the 3 dimensional QOS matrix maintained for each SP may have X and Y dimensions as described in FIG. 18. Additionally, the QOS matrix may have a $3^{rd}$ Z dimension denoting an I/O type so that an occurrence such as represented by elements 1754, 1760 of FIG. 18 may be maintained for each of the different I/O types.

In one embodiment, 8 different I/O types may be possible which characterizes the particular I/Os observed of the workload based on the following characteristics: whether the I/Os of the workload are primarily read or write, whether the I/O pattern is random or sequential and whether the I/O sizes are large block or small block.

Figure 20:
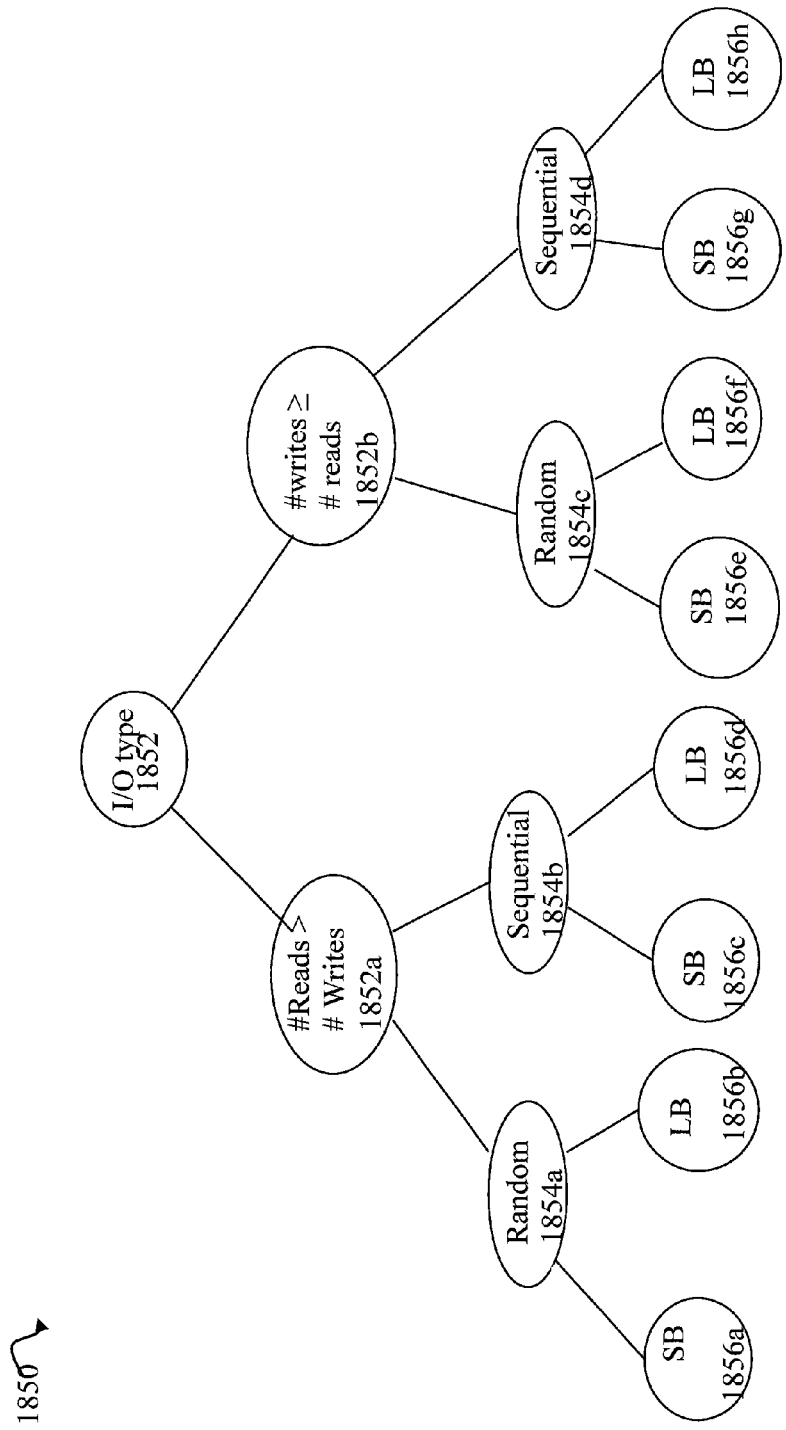
FIGS. 20 and 27 are examples illustrating the different allowable I/O types used to characterize a workload in an embodiment in accordance with techniques herein.

Referring to FIG. 20, shown is an example illustration of the different I/O types that may be determined in an embodiment in accordance with techniques herein. The example 1850 may represent a decision tree with a different characteristic further used to refine the I/O type at each level. For example the root 1852 may represent the starting point for a number of I/Os representing a workload. As a first step, a determination may be made as to whether the I/Os are primarily reads or writes. Node 1852a may represent a determination that the workload is primarily reads or read heavy and node 1862b may represent a determination that the workload is primarily writes or write heave. An embodiment may make this determination, for example, by determining whether the number of reads of the workload is larger than the number of writes of the workload. If so, the workload may be determined as read heavy (node 1852a) and otherwise, the workload may be determined as write heavy (node 1852b). Subsequent steps in the decision tree are made with respect to the particular node 1852a or 1852b selected as a result of the first step or decision.

As a second step, a determination may be made as to whether the workload has an I/O pattern that is primarily (e.g. more than 50%) random or sequential I/Os. As known in the art, different techniques may be used to determine whether I/O patterns are sequential thereby identifying sequential logical accesses to data in for sequences of I/Os of the workload. An embodiment may, for example, determine that the workload is primarily sequential of the number of I/Os included in a sequential I/O pattern are larger than the number of I/Os that are not included in a sequential I/O pattern. The decision tree includes nodes 1854a-b representing this second step in the decision process if the previous decision resulted in selecting node 1852a (e.g., the workload is read heavy). The decision tree includes nodes 1854c-d representing this second step in the decision process if the previous decision resulted in selecting node 1852b (e.g., the workload is write heavy).

As a third step, a determination may be made as to whether the workload is primarily large block or small block size I/Os. For example, an embodiment may define a threshold size of 32 kbytes whereby if the average I/O size of the workload is less than 32 kbytes, the workload may be characterized as small block, otherwise the workload may be characterized as large block I/O size. The decision tree includes nodes 1856a-b representing this third step in the decision process if the previous decision of the second step resulted in selecting node 1854a (e.g., the workload is random). The decision tree includes nodes 1856*c-d* representing this third step in the decision process if the previous decision resulted in selecting node 1854*b* (e.g., the workload is sequential). The decision tree includes nodes 1856*e-f* representing this third step in the decision process if the previous decision of the second step resulted in selecting node 1854*c* (e.g., the workload is random). The decision tree includes nodes 1856*g-h* representing this third step in the decision process if the previous decision resulted in selecting node 1854*d* (e.g., the workload is sequential).

In this manner, a path from the root node 1852 to one of the leaf nodes 1856*a-h* may denote a particular set of characteristics of one of the 8 I/O types. For example, leaf node 1856*a* may represent a workload that is primarily random read small block I/Os.

As will be appreciated by those skilled in the art, if the QOS matrix does not include a cell corresponding to a current SP state, interpolation and/or extrapolation may be used to determine a corresponding workload in terms of # IOs. It should also be noted that the particular ordering of steps and associated levels in the decision tree may be generally performed in any order rather than as ordered above.

An embodiment may use different techniques in connection with refining the number of row and/or columns in the matrix. Additionally, it should be noted that an embodiment may initially populate the QOS matrices for the SPs artificially such as by generating I/Os directed to the SPs rather than relying on actual received host I/Os. In this way, the QOS matrices may have information prior to first performing techniques herein for modeling data movements and movements of associated workloads to and/or from different SPs.

The QOS matrix as illustrated in FIG. 19 having three dimensions may store a RT distribution histogram of the number of I/Os having an RT that fall within particular RT bins where there may be one such histogram maintained for each (x, y, z) cell or set of x, y, z coordinates of the QOS matrix.

It should be noted that an embodiment may maintain sets of data (e.g., RT distribution histograms as in FIG. 13) for each I/O type or possible Z coordinate value. Additionally, an embodiment may maintain another set of data with a general or default I/O type associated with another Z coordinate value. For example, if there are 8 I/O types and thus 8 possible values for the Z coordinate, the default I/O type may be associated with cells of the QOS matrix having Z=9.

A set of performance data obtained for a given sampling period may be classified as one of the 8 I/O types based on the workload observed. The set of performance data may be incorporated into the appropriate cell of the QOS matrix having the matching Z dimension based on this I/O type classification and also incorporated into the appropriate cell having the Z dimension for the default I/O type. In this manner, the default I/O type may be an accumulation or aggregate of all observed data across all other cells of the QOS matrix. In other words, every set of observed workload data may be incorporated into a first cell of the QOS matrix having a Z coordinate based on the default I/O type and also a second cell of the QOS matrix having a Z coordinate based on the I/O type of the workload.

The QOS matrix may be used in a variety of different ways. For example, a workload may be directed to an SP. The workload may be classified into one of the I/O types and may have an associated # of I/Os. The SP may have a current used capacity. A cell of the QOS matrix may be accessed based on the I/O type, # of I/Os of the workload and the capacity of the SP. The information of the selected cell may be used to model the SP performance if the workload is added to the SP. Additionally, there may be instances where a cell is selected for one of the possible I/O types of FIG. 20 and that particular cell of the QOS matrix may have no data or an insufficient amount of data to be used for modeling RT or other purposes as described herein. In this case, the cell corresponding to the default I/O type as the Z dimension may be alternatively be used.

The QOS matrix for an SP may be used in connection with mapping or translating an RT range (e.g., that may be included in the QOS performance target information) to a corresponding workload range having a lower bound and an upper bound expressed in terms of number of I/Os as described elsewhere herein. In connection with this usage, the cells of the QOS matrix corresponding to the default I/O type as the Z axis value may be used.

A QOS matrix may also exist for each SG and may be used for modeling the RT of the SG. The QOS matrix of the SG is similar to that as described herein for the SPs. Workload directed to an SG may be incorporated into the appropriate cell of the QOS matrix for the SG in a manner similar to that as described herein for the SP QOS matrix. For a particular SG workload being modeled, an modeled RT may be determined. A cell of the QOS matrix may be selected having the capacity of the SG used as the X coordinate, and the number of I/Os and I/O of the workload used, respectively, to determine the Y and Z coordinates. The RT histogram of the cell may be used to model the SG RT as follows. The SG RT may be used to determine a first RT prior to modeling expected performance in terms of RT for the workload. The workload is then distributed to the cell and a corresponding expected or modeled RT may be calculated based on this workload distribution. As in connection with SG promotion as described elsewhere herein, if the modeled RT is within the SG's RT performance target or goal, then movement of additional data portions may be stopped.

For each cell of the QOS matrix, the information stored may also include an average observed read RT and average observed write RT.

Based on the foregoing, a budget may be specified for each SP based on the QOS performance target for the SP and the SP's capacity target. The budget for the SP may denote a number of IOs to be moved in or out of the SP and an amount of storage capacity that may be added to the tier (e.g., difference between current SP capacity and the amount indicated by the SP's target capacity). The number of I/Os of the budget may correspond to an amount within the range of I/Os corresponding to the RT range of the SPs QOS performance target as described above. In one embodiment, the number of I/Os may be the number of I/Os corresponding to the midrange RT value with respect to the RT range whereby the number of I/Os may be determined using the appropriate QOS matrix based on the current state of the SP.

A budget for an SP may be determined by first considering a movement in the X or capacity dimension in accordance with the SP's capacity target. For example, with reference back to FIG. 18, table 1760, assume that an EQUATION A2 SP A1 has a current capacity is 400 GB and the SP A1 has a capacity target of 200 GB thereby specifying a capacity movement of −200 GB for the budget. With reference to table 1760, the column 1771 of table 1760 for the 400 GB capacity may be used for modeling RTs for different I/O workloads for the current state. However, if a proposed movement by the budget is to decrease the SP A1's capacity by −200 GB, then the column 1770 of table 1760 for the 200

GB is now used for modeling RTs for the different workloads. As a second step, the RT range of the QOS performance target may be mapped to RTs in column 1770. For purposes of illustration, assume the RT range specifies 3 ms to 5 ms. For the RT of 3 ms, cell 1768*b* may be identified and for the RT of 5 ms, cell 1768*a* may be identified. In this case, the RT desired as an end point used for the second component of the budget may be 4 ms (midway in the RT range) corresponding to cell 1768. Assume we have a current average RT for the SP A1 of 3 ms meaning that the RT may increase from 3 ms (current average RT) to 4 ms (desired RT). In this case, the cell 1768*a* corresponding to the current RT=3 ms is located and cell 1768 is located corresponding to the desired RT=4 ms. The Y coordinate distance between these two cells (representing points in the modeled performance curve for the SP A1) is determined and represents a difference that is a number of I/Os, +100 I/Os. In other words, assuming the first proposed change of the budget is performed to reduce the SP A1's capacity. Given this, we can now increase the workload by 100 IOs. In this manner, the changes proposed for a budget need to be analyzed in sequence since the first change in capacity affects how the RTs subsequently considered in the second step are modeled.

As an example, consider the following budgets specified for each of four SPs where the first row represents the budget for SP A1 noted above:

TABLE 1

| SP | Budget |
|---|---|
| SP A1 | −200 GB, +100 IOs |
| SP A2 | +1 terabyte (TB), 0 IOs |
| SP A3 | +500 GB, +100 IOs |
| SP A4 | +200 GB, −100 IOs |

Table 1 indicates that SP A1 needs to reduce its capacity by 200 GB and may take up to 100 IOs, SP A2 may increase its capacity up to another TB and may not take on additional IOs, SP A3 may increase its capacity up to another 500 GB and may take up to an additional 100 IOs, and SP A4 may increase its capacity up to another 200 GB and needs to decrease its I/Os by 100. Each of these budgets may be determined for each of the SPs in a manner similar to that as described above for SP A1. In this manner, a vector expressed as an SP budget may be used to represent the movement in the capacity and workload (number of I/Os) dimension to obtain SP's QOS performance goals and to also not violate the SP's capacity target.

In a manner similar to that as described for SPs, a budget in terms of workload may be determined for each SG. In accordance with an SG's budget and assigned state as described elsewhere herein, workload may be appropriately moved into or out of different SPs (and hence different storage tiers having different performance classifications) to achieve the SG or application's performance goals. If the SG is attempting to increase its performance since it is currently not meeting its performance goals, the SG will attempt to acquire higher performing physical storage (e.g., move some data portions from PDs having first performance to other PDs having higher performance). If the SG is attempting to decrease its performance since it is currently exceeding or performing better than its performance goal, the SG will attempt to acquire lower performing physical storage (e.g., move some data portions from PDs having first performance to other PDs having lower performance). Processing may now be performed to examine the data portions of the SGs which may be moved into or moved out of particular SPs and therefore consume the SP budgets.

Consistent with description elsewhere herein, an embodiment in accordance with techniques herein may perform the following processing in connection with modeling or anticipating a future state of the system. Such as described in connection with FIG. 12, an abstract QOS controller may be used by all demand and supply entities in the system. The QOS controller may represent a functional grouping of one or more modules which, for example, collect the performance and workload of all the demand and supply entities such as SPs of PDs and SGs. The QOS controller may perform such processing based on the supply/demand goals and on the observed JO. The processing performed may iterate across all entities and assign various states as described herein for the SGs and SPs. Each demand and supply side entity may then use functionality of the QOS controller to implement the various schemes described herein to increase or decrease load as needed in accordance with the performance goals of the different entities.

An embodiment may track historical data or a transaction log of various system states such as regarding modeling or projected system state as well as actual observed information based on observed I/Os. For example, a record may be included in the transaction log for each observed set of SP data recorded as a histogram for a single sample period whereby this single instance is then accumulated into the appropriate QOS matrix entry for the SP. Various records may be included in the transaction log regarding modeling states and information used for modeling described in more detail below. The transaction log information may be stored in a table including a record or entry for each recorded transaction. In one embodiment, each record of the transaction log may include, for example:

1. Sample Index or timestamp denoting the time at which the transaction occurred.
2. transaction type of SP or SG, respectively, denoting whether this record pertains to an SG or an SP. Note that this may also identify the particular SP or SG instance.
3. Row Type: Type denoting the processing used to generate the data recorded in the transaction record. Row types may include:
   a. Calibration Sample: results from artificial JO denoting that the observed set of sample data is produced as a result of generating I/Os and observing performance such as to initialize the QOS matrix for a particular SP or SG.
   b. Sample: Analysis of the physical components denoting that the observed set of sample data is collected as a result of observing performance in connection with an actual workload of I/Os received from hosts or other clients
   c. Projection: Projected sample for the future. Used to describe transaction entries for modeling system performance described in more detail below.
   d. Projected Delta: Anticipated or modeled IOPS/GB change. Used to describe transaction entries for modeling system performance described in more detail below.
   e. Actual Delta: Derived from current and previous sample. A delta or difference in connection with observed workload and performance data between two collected data samples for an SP or SG.
2. IOPS: Number of IOs. If this record describes a set of sample data such as when the row type is any of calibration sample, sample, or projection, this may represent the total number of I/Os included in the sample. If this record describes a projected delta or actual delta, this field may represent the number of I/Os described by the delta or difference.
3. GB: utilized capacity. If this record describes a set of sample data such as when the row type is any of calibration sample, sample, or projection, this may represent the total amount of GBs consumed for the SP or SG. If this record describes a projected delta or actual delta, this field may represent the increase or decrease in GBs described by the delta or difference.
4. IO Type—This field may denote the I/O type used in identifying the appropriate index in the $z^{th}$ dimension of the QOS matrix.
5. State: increase/decrease IOPS/GB. This field identifies the state of the SG or SP entity described by the transaction record. Possible states are as described elsewhere herein. For example, for an SP, this may indicate whether the SP wants to increase load, reduce load or is stable.
6. Average RT. This field represents the overall average RT. If this record describes a set of sample data such as when the row type is any of calibration sample, sample, or projection, this may represent the average RT across the sample population. If this record describes a projected delta or actual delta, this field may represent the average RT resulting from the projected delta or actual delta.
7. Response Time CDF: This field may include data for a CDF. such as one including a percentage distribution for a number of predefined RT values. If this record describes a set of sample data such as when the row type is any of calibration sample, sample, or projection, this may represent the CDF for the sample. If this record describes a projected delta or actual delta, this field may represent the CDF resulting from the delta or difference.
8. Source and destination SPs. If the record type relates to a modeled data movement, the source and destination SPs may be identified. Otherwise, this field may not be used.

In one embodiment, the QOS controller may be implemented using methods or routines used for modeling to estimate the expected workload in the next N frames. Generally, as described herein, processing is performed regarding the supply side to examine the QOS target within the target range of all the supply side QOS matrices to determine a vector in IOPS and GB for each SP that, if performed, results in the SP meeting its performance goals (e.g., See, for example, FIG. 17 and discussion elsewhere herein that results in the SP being in its ideal performance goal zone). Processing may also include determining whether the net vector sum of all supply side vectors (e.g., for all SPs) is negative thereby indicating that all SPs need to reduce load. In such a case, the supply side may be determined as being in a deadlock state in that currently defined SP performance goals cannot be met. In this case, an adjustment to one or more SP performance goals may be made (manually and/or automatically). The QOS Target Range included in the performance goals for one or more SPs may be adjusted downward or otherwise broadened so as to allow a wider response time range. The system may then again re-evaluate the SPs using the new SP performance goals to determine any updated SP vectors. It should be noted that the foregoing SP vectors are also referred to elsewhere herein as budgets for the SPs to achieve corresponding performance goals and also remove any SP capacity violations. Once an SP vector has been determined for each SP, an entry may be created in the transaction log for each such SP and its associated vector. Consistent with discussion above regarding entries in the transaction log, the information recorded in the transaction log for each SP's vector (to bring the SP into compliance with its associate capacity and performance goals) may include the following information: a timestamp or identifier for the transaction, a type denoting SP, a row type of projected delta, IOPS denoting the increase or decrease in IOPS workload to achieve SP performance goals, GB denoting the increase or decrease in capacity to bring the SP's capacity into compliance with any capacity limits, a state denoting the current SP state (e.g. one of the SP states such as described elsewhere herein), average RT modeled or expected for the SP if the projected delta is performed, and modeled RT CDF of the SP if the projected delta is performed.

In a manner to that as described for SPs, a vector may also be determined for each SG regarding projected changes in workload (IOPS) and capacity that need to take place in order for the SG to be compliant with its performance goals and any capacity limits imposed on the SG level. A record may also similarly be made in the transaction log for each SG based on the SG's vector and associated state. In discussions below, the vectors recorded in the transaction log for the SPs and SGs may be referred to as vector projections.

At this point, the QOS controller then examines the supply side vector projections and the demand side vector projections to determine data movements to model to meet the foregoing vector projections. For each data movement, an entry may also be recorded in the transaction log. In one aspect, each data movement may be characterized as a step toward achieving a larger goal denoted by the supply side and demand side vector projections. There may be multiple such steps or data movements needed to obtain the total increase or decrease with respect to capacity and/or workload (IOPS) to achieve an SP or SG's performance goals. In determine such data movements, an embodiment may use a priority scheme. An embodiment of the QOS controller may use following priority to assign budgets of movements per SG:
1. Pool or SP Capacity: Look for SPs that are in violation of GB capacity limits. For an SP having a capacity violation, distribute the GB vector that will restore the SP to compliance across the SGs that have capacity in that SP. (e.g., multiple SGs may have storage allocated from a single SP having a capacity violation. Therefore, data portions from such multiple SGs may be moved from the single SP to another SP). SGs may be considered in an ordering in which those SGs also having an SG capacity violation may be considered prior to other SGs not having SG-specific capacity violations. (e.g., The idea is to possibly allow a data movement implemented to remove and SP capacity violation to also contribute to removing or reducing an SG capacity violation). Secondly, SGs may be considered which have a performance goal that would require movement off of the SP having the capacity violation. If there are no such SGs (which both contribute to the SP having the SP capacity violation and also have either an SG capacity violation or need to increase SG performance), then the capacity may be partitioned among the SGs so that each SG having storage allocated from the violating SP may have some amount of data relocated to another SP.
2. QOS Target: Look for SPs that have a goal to reduce IOPS load. Previously, processing determined that the vector sum of all SPs was positive, so there is no chance for IOPS to not have a potential destination. Starting with the SP having the highest IOPS violation, identify those one or more SGs contributing to that SP. SGs may be examined in a preference order as described above in connection with the SP capacity correction.

3. SG Capacity: Look for SGs that are in violation of SG capacity constraints that may be specified for each SP or storage tier. Find a target SP to distribute the required IOPS/GB vector that will restore the SG to compliance. Start with the highest performance pool that has a Stable or increase GB goal and produce a projected vector to consume the SP's available resources. Consider, for example, an embodiment having two SPs—SP1 and SP2—each including PDs of a different storage tier. For a particular SG, a first capacity limit may be specified denoting a maximum amount of SP1 or a first storage tier that may be allocated for use with storing data portions of the SG. Additionally, a second capacity limit may be specified denoting a maximum amount of SP2 or a second storage tier that may be allocated for use with storage data portions of the SG. An SG-level capacity violation may occur if any one or more of such limits are violated with respect to a particular SG.

4. SG Performance: Look for SGs that are missing their performance objections. SGs may be ranked with respect to performance violations, from highest to lowest, where the SG missing its performance goals by the most is ranked first or highest. For example, consider an SG1 with target RT=2 ms and target percentage of 80% and let SG1 have an observed percentage of 30% (indicating that 30% of observed I/Os directed to SG1 have an RT that is less than 2 ms). SG1 may be given priority over another SG2 with a target of 2 ms at 80% and having an observed percentage of 70% (denoting that 70% of. I/Os directed to SG2 have an observed RT of less than 2 ms). In this case, processing may be performed to produce a vector to move one or more data portions of SG1 to a higher performance SP that will result in SG1 increasing the observed percentage of I/Os having an RT less than 2 ms.

5. Compression: Look for idle data in the SG and match to an SP that qualifies for compression. Create a GB only vector for SP that support compression. An embodiment may optionally provide for selectively compressing data portions of an SP when such data portions are considered idle or having a minimal level of activity.

It should be noted that an embodiment may include or use any one or more of the foregoing prioritized criteria alone or in combination with any other suitable criteria.

For each data movement determined in accordance with the above-referenced criteria, a record may be recorded in the transaction log having the following: type of SG, a row type of projected delta for a particular SG, identify the change in IOPS and/or GBs by the proposed data movement among SPs of the SG, identify the source and target or destination SPs for the proposed data movement, identify the state of the SG after performing the proposed data movement, identify the average RT expected after performing the proposed data movement, and identify the CDF of the SG after performing the proposed data movement. In this manner, the transaction log may include information regarding the modeled or proposed data movement and expected performance resulting from modeling such data movement.

In one aspect, the projected vector for each data movement may be characterized as tied to a particular SG queue (e.g., promotion or demotion queue) in that the vector may be used to determine from which queue to select extents from. If the destination SP has a QOS target that is lower (higher performance media) than the source SP, the data portions may be selected form the source SP's promotion queue. If the destination SP has a lower QOS target than the source SP, then data portions may be selected for data movement from the source SP's demotion queue. If the destination SP and source SP have the same QOS target, then data portions may be selected form all 3 queues of the source SP such as in a round robin fashion. This is described in more detail elsewhere herein, for example, such as in connection with FIG. 31. Additionally, the different queues are also described in more detail elsewhere herein.

The end result of the foregoing analysis is a set of delta vector values representing multiple proposed data movements resulting in changes to IOPS and GB to SPs and SGs that are capable of changing during a next projected sample period. The relative changes to the performance can be estimated based on the queues and QOS matrix and the specified relocation rate. The analysis can be extended to apply to further samples in the future by taking the vectors of data movement and applying them as delta IOPS and GB to the projected state of the SG and SP.

As noted above, an embodiment may record an entry in the transaction log for each data movement and an associated delta value. Additionally, a modeled accumulated result may be determined by collectively summing or considering as a single set of data movements all those individual data movements recorded as determined in accordance with the above-mentioned criteria. The modeled accumulated result may be recorded in the transaction log as a set of projected data movements modeled for a projected sample period. In other words, each delta value may be summed for the projected sample interval and the project IOPS/GB used to insert a new entry into the transaction log for the SG whereby the state, average MS and Response time CDF may be derived from the QOS matrix for the SG. The system may continue to operate in this delta mode where a set of proposed data movements are determined and then the net effect of performing such proposed movements may be simulated such as using vector math. In this manner, an embodiment may perform determine multiple sets of proposed data movements and generate multiple projected sample frames based on performing such proposed movements. The state machines may iteratively generate multiple project sample frames whereby a first projected or modeled sample frame may be used as a starting point for determining the next second projected or modeled sample frame. The system may project or model performance into the future for as many samples as the SG can provide accurately modeled resulting IOPS/GB estimates. The impact of movement can be accounted for by inserting rows for read IOPS on the source and write IOPS on the target.

It should be noted that at a point in time, a set of proposed data movements may be implemented. The observed or actual performance results achieved as a result of implementing such data movements may be compared to modeled results in order to determine the accuracy of the model predictions. An embodiment may record such actual results in the transaction log, such as denoted by a record with the row type of actual delta described above. If the model predictions are similar to, or within some threshold amount, of the observed performance and capacity results (obtained when the modeled data movements are actually implemented), then the model may be deemed accurate and may be used to predict multiple projected sets of data movements over multiple frames into the future.

In connection with examining the data portions of the SGs which may be moved into or moved out of particular SPs and therefore consume the SP budgets, one feature relates to a first order of queueing that may be maintained per SG per pool or SP.

Figure 21:
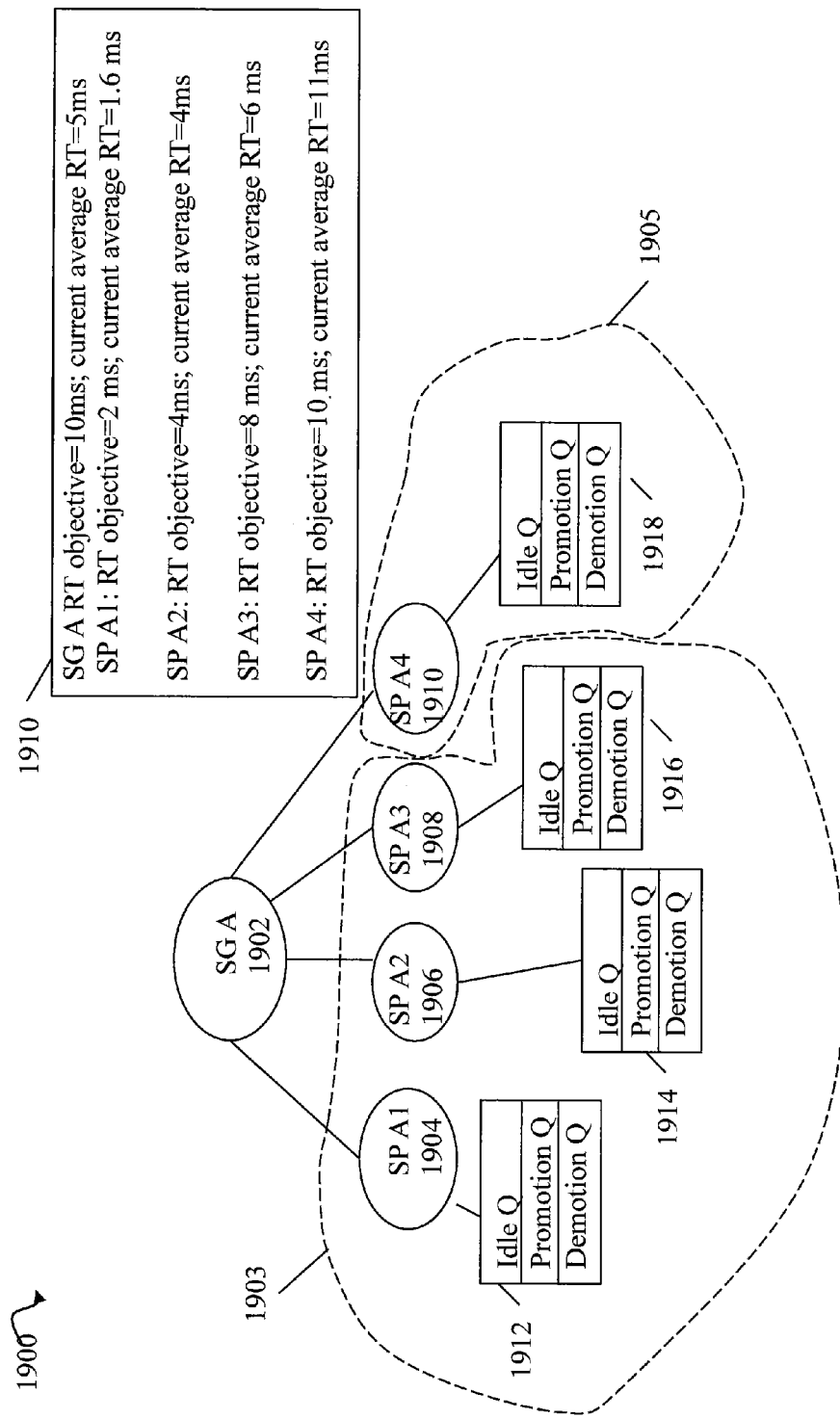
FIGS. 21 and 22 are examples illustrating processing that may be performed in connection with techniques herein.

Referring to FIG. 21, shown is an example of queues that may be maintained for each SP within each SG. In the example 1900, for each SP per SG, there are 3 queues of data portions maintained for those SPs from which storage is allocated for the SG—a first queue of idle data portions, a second queue of the most active data portions (also referred to as the promotion queue) and a third queue of the least active data portions (also referred to as the demotion queue). The level of activity or busy ness may be expressed in terms of a number of I/Os so that the second queue is ranked in terms of a total number of I/Os or I/O rate, from highest to lowest (e.g., with the highest I/O rate being at the top of the list), and the third queue is ranked in terms in number of I/Os or I/O rate, from lowest to highest. A number of data portions N may be included in both the second queue and third queue presenting, respectively, the N busiest data portions and the N least active data portions (other than idle or no activity). Idle data portions may be moved from an SP to increase capacity without modifying current workload. Each such data portion on a queue for a particular SP of an SG includes data portions of the SG which are stored on physical devices of the particular SP.

In the example 1900, 4 SPs 1904, 1906, 1908 and 1910 are illustrated each having a set of the above-mentioned 3 queues, respectively, 1912, 1914, 1916 and 1918. Element 1910 may represent current information about the SPs 1904, 1906, 1908 and 1910 and SG 1902 in used connection with following paragraphs.

In connection with evaluating and modeling data movements, an embodiment may consider criteria as described above in the following order: first consider SP capacity goals to achieve capacity targets, second consider SP performance goals to achieve SP performance targets, third consider SG capacity limits, fourth consider SG promotion (e.g., reduce SG RT and increase SG performance), fifth consider SG demotion (e.g., increase SG RT and reduce SG performance), and sixth consider data movements to an SP for which compression may be performed. Processing is described in more detail regarding the first, second, fourth and fifth such criteria below.

What will now be described is processing that may be performed in accordance with the first criteria of SP capacity limit. Using the SP budgets as in Table 1 above, it may be determined that SP A1 needs to have its capacity reduced. It may be preferred that SP A1's capacity be reduced without reducing overall performance such as by moving idle data portions from SP A1 to another SP such as moving idle data portions from SP A1 as included in SP A1's idle queue. It should be noted that if there are an insufficient number of idle data portions in SP A1 to move out of SP A1, then the data portions having the least activity may be considered in the order as in the third queue (e.g., demotion queue). A number of data portions may be identified to be removed from SP A1 and the data portions may be moved to another SP having available capacity. Such data portions may be moved to any of SP A2, SP A3 and/or SP A4. As each data portion is moved into another target SP, the resulting target SP's RT and capacity may be modeled using the QOS matrix for the target SP. Additionally, the donating SP, SP A1, may also have its performance and capacity modeled as a result of performing the proposed data movement. Such data movements to target SPs are subject to keeping within the target SP's QOS RT performance target and capacity target. It should be noted that SP A2 may be selected as a target SP for the data portion prior to SP A3 or SP A4 since SP A2 benefits most by adding data portions added capacity without added workload since SP A2's workload budget is 0. Identifying data portions to remove from a first SP exceeding its capacity target and moving such data portions to a target SP may be performed until the first SP no longer exceeds its capacity target.

In connection with moving idle data portions to a target SP, if there are multiple candidate target SPs having available capacity and able to accept load (and stay within capacity and performance goals or targets), an SP may be selected having the lowest performance or highest RT objective.

In connection with this criteria and other described herein, an embodiment may choose not to move the entire amount of the budget for SP A1 in connection with modeling since actual system conditions may change. For example, an embodiment may model and perform data movements based on ½ of SP A1's capacity budget or −100 GBs.

Acquisition of high performance resources (higher expected RT objectives) may be driven by the SG or application's performance targets and may drive promotion of data portions. In the embodiment described herein, an SP may include PDs characterized in terms of expected RTOs. The SP may drive demotion.

Generally, an embodiment may perform idle data optimization to move all idle data portions on the idle queues of all SPs to the lowest performing SP having available capacity and able to accept load (and stay within capacity and performance goals or targets). An embodiment may specify a performance threshold so that idle data portions may be moved to any target SP having an RT objective above this performance threshold.

Generally, in connection with removing an SP's capacity violation whereby the SP's current capacity exceeds a capacity limit, data portions may be removed from the SP which are included on the SP's idle queue. Additionally, data portions moved from the SP may be selected from the SP's promotion queue and/or demotion queue and moved to any higher performing SP (e.g., considering all SPs across all SGs or without consideration of SG). Data portions moved from the SP may be selected from the SP's promotion queue and/or demotion queue and moved to any lower performing SP (e.g., considering all SPs across all SGs or without consideration of SG).

What will now be described is processing that may be performed in accordance with the second criteria of SP performance goals. As the second criteria, the SP performance goals may be evaluated to determine which SP needs to have I/Os moved into (e.g., SP state of add load) or out (e.g., SP state of reduce load) of an SP based on the workload budgets. Although the budgets may be updated based on any moves performed based on the first criteria, for illustration assume the SP budgets are as in Table 1 above. In this case, it may be determined that SP A1, A3 and A4 have SP budgets. SP A1 cannot have data moved into it since such a movement would violate its capacity target (SP A1 has a capacity budget of −200 GB). In this case, SP A3 and SP A4 may be identified and one or more data portions having a workload of 100 I/Os may be m Generally, in connection with meeting an SP's performance goals where the SP state is to remove or reduce load, data portions moved from the SP may be selected from the SP's promotion queue and/or demotion queue and moved to either any higher performing SP or any lower performing SP. (e.g., considering all SPs across all SGs or without consideration of SG). Similarly, when the SP state is to add load, data portions may be moved into the SP from any other SP's promotion and/or demotion queue (e.g., considering all SPs as possible source SPs without consideration of SG).

What will now be described is processing that may be performed in accordance with the fourth criteria of SG or application promotion to attempt to increase an SG's current performance. At this point it may be determined which SG is not meeting its performance target whereby the SG observed average RT>SG RT objective indicating that performance needs to be increased (e.g., SG observed RT reduced).

Figure 22:
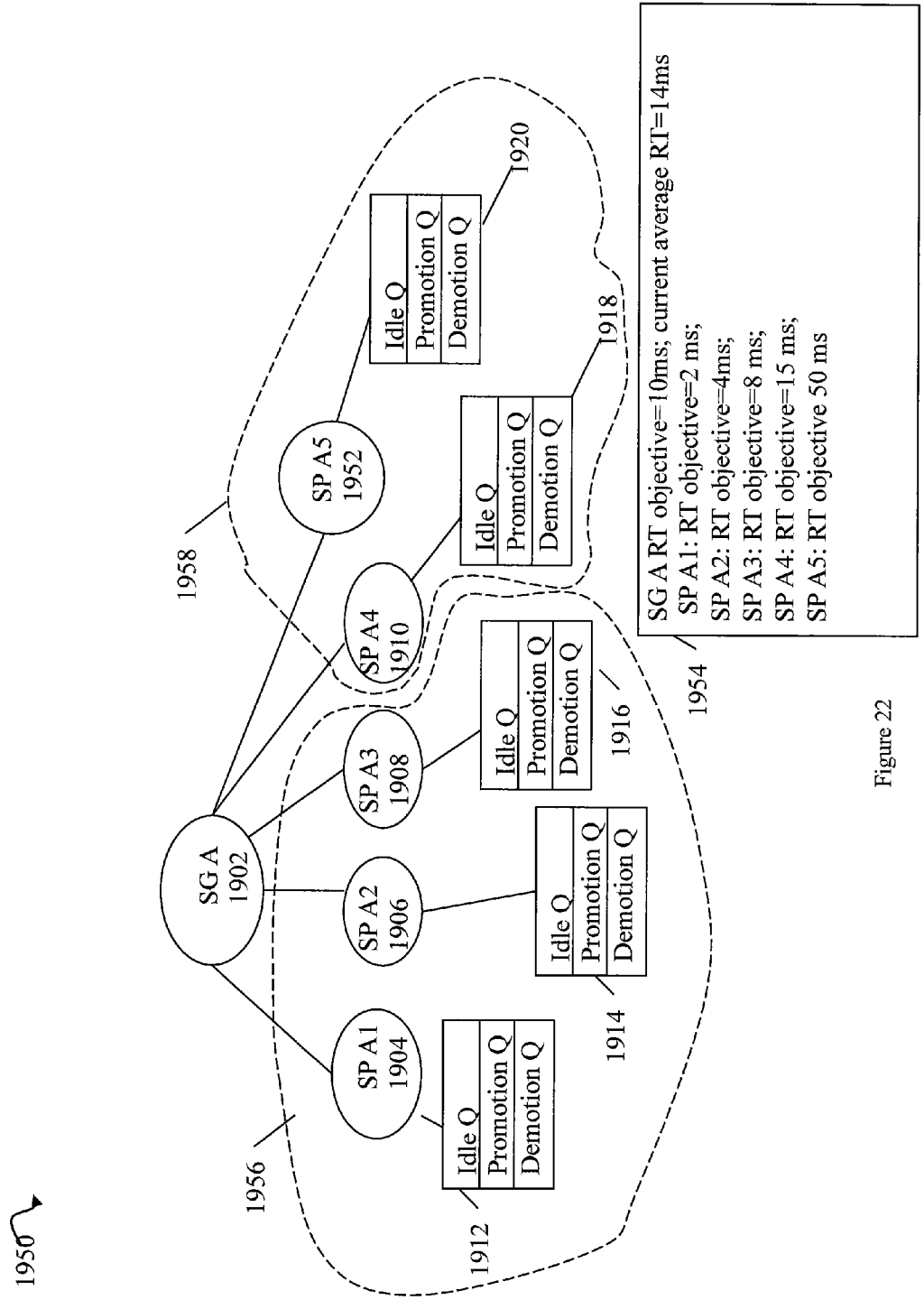

With reference to FIG. 22, consider a modified version of the example of FIG. 21. The elements of FIG. 22 are similarly numbered to that as in FIG. 21. Additionally, the example 1950 includes a fifth SP A5 denoted by node 1952 having a set of SP queues 1920 similar to the other sets of SP queues 1912, 1914, 1916 and 1918. For this example, let the SG and SPs have settings for RT objectives and average RT as in 1954. Assume an SG A has an RT objective=10 ms and the current average RT=14 ms. For the SG A, performance needs to increase since the current RT more than the RT objective.

A pivot point is determined based on the RT objective of the SG. The pivot point RT may be used to partition the SPs into a first portion identifying candidate SPs from which workload will removed (donate workload) and a second portion identifying candidate SPs to which the workload will be moved (receive workload). The SG RT objective of 10 is used to partition the SPs into the first portion including those SPs with an RT objective that is greater than the SG RT objective and a second portion of SGs having an RTO that is equal to or less than the SG RT objective. In this example, the second portion 1956 may include SP A1 1904, SP A2 1906 and SP A3 1908 and the first portion 1958 may include SP A4 1910 and SP A5 1952. A combined aggregated list is formed from the promotion queues for all the SPs in the first portion which can donate load (e.g., has SP state of reduce load) as may be indicated by any updated SP budgets.

The combined list may be sorted or ranked in terms of decreasing activity such as in terms of decreasing number of I/Os or IOPS (e.g. I/O rate) for each of the data portions. Data portions identified in the combined list may be considered for data movement to a target SP based on the sorted decreasing activity level.

A target SP which can accept workload (e.g., based on SP budgets, has SP state of add load) may be selected from the second portion. If there are multiple candidate target SPs in the second portion, the SP of the second portion having the lowest RT (e.g., highest performing SP of the second portion) may be selected.

When a data portion is moved from a source SP to a target SP, the average observed RTs of the SPs are used to model the proposed movement of the SG. The QOS matrix of the SG may be modified to redistribute the workload to the target SP and then the expected RT may be modeled and compared to the RT objective of the SG to determine whether the RT modeled is within the RT performance target. If not, additional data portions may be promoted. The promotion of data portions may generally continue until the SG meets its RT objective (as noted above), or there is no qualifying target SP, or the promotion candidate data portions are exhausted.

In one embodiment in connection with the fourth performance criteria to increase an SG's performance, overall processing may locate the highest performing SP that has an available budget for data movement. This may be the target SP. Once the target SP is determined, processing may then determine one or more data portions that can be promoted to that tier. An embodiment may build a source mask of SPs, or possible source SPs, that movements are allowed to come from and then compare the SG's promotion queues for those possible source SPs in order of decreasing performance. If the SG has allocations on a higher performing SP than the target SP, it will mask out those SPs in the source mask, preventing the allocations from moving to a lower performing tier. Once it has masked off the higher performing SPs, processing may determine the largest extent left in the remaining promotion queues and model movement of this data portion into the specified target SP. The capacity of the data portion just moved may be subtracted from the target SP's budget. The SG's projected RT may be modeled using the QOS matrix for the SG. It should be noted that such modeling may be performed, for example, if multiple data movements to improve the SG performance are being selected as suggestions for data movements provided to the data storage optimizer which would then actually implement such data movements. Assuming the SG's performance goals are not met and there are suitable data portions, suitable source and target SPs having available budget, the foregoing may be repeated. In this manner, the extents of the SG may be processed in sequential order ranked from the busiest or most active to idle.

As an alternative to ranking the data portions or extents in order of decreasing activity level, other criteria may be used to rank the combined list. For example, for each data portion in the combined list, a product may be determined that is the workload of the data portion in terms of number of I/Os or I/O rate (e.g. I/Os per second) multiplied by the SP's current average observed RT. If the workload is a number of I/Os, the corresponding I/O rate such as I/Os per second may be determined and multiplied by the SP's current observed RT. The combined list may then be sorted or ranked in terms of decreasing product values for each of the data portions. Data portions identified in the combined list are considered for data movement to a target SP based on the sorted decreasing product values.

What will now be described is processing that may be performed in accordance with the fifth criteria of SG or application demotion. Processing may be performed to determine which SG is not meeting its performance goal whereby the SG observed average RT<SG RT objective indicating that performance needs to be decreased (e.g., SG observed RT increased). With reference to FIG. 21, assume that the SGs and SPs have observed RTs and RT objectives as in 1910. Assume SG A has an RT objective=10 ms and the current average RT=5 ms. For the SG A, performance needs to decrease since the current RT is less than the RT objective.

A pivot point is determined based on the RT objective of the SG. The pivot point RT may be used to partition the SPs into a first portion identifying candidate SPs from which workload will be removed (donate workload) and a second portion identifying candidate SPs to which the workload will be added (receive workload). The SG RT objective of 10 is used to partition the SPs into a first portion including those SPs with an RT objective that is less than the SG RT objective and a second portion of SGs having an RTO that is equal to or greater than the SG RT objective. In this example, the first portion 1903 may include SP A1 1904, SP A2 1906 and SP A3 1908 and the second portion 1905 may include SP A4 1910. A combined aggregated list is formed from the demotion queues for all the SPs in the first portion which can donate load as may be indicated by any updated SP budgets and associated SP state (e.g., reduce or remove load). The combined list is sorted or ranked in increasing activity (e.g., increasing # I/Os). Data portions identified in the combined list are considered for data movement to a target SP based on the sorted increasing activity.

A target SP which can accept workload (e.g., based on SP budgets and SP state) may be selected from the second portion. If there are multiple candidate target SPs in the second portion, the SP of the second portion having the highest RT (e.g., lowest performing SP of the second portion) may be selected.

When a data portion is moved from a source SP to a target SP, the average observed RTs of the SPs are used to model the proposed movement of the SG. The QOS matrix of the SG may be modified to redistribute the workload to the target SP and then the expected RT may be modeled and compared to the RT objective of the SG to determine whether the RT modeled is within the RT performance target. If not, additional data movements may be performed.

What will now be described are flowcharts summarizing processing that may performed in an embodiment as described above.

Figure 23:
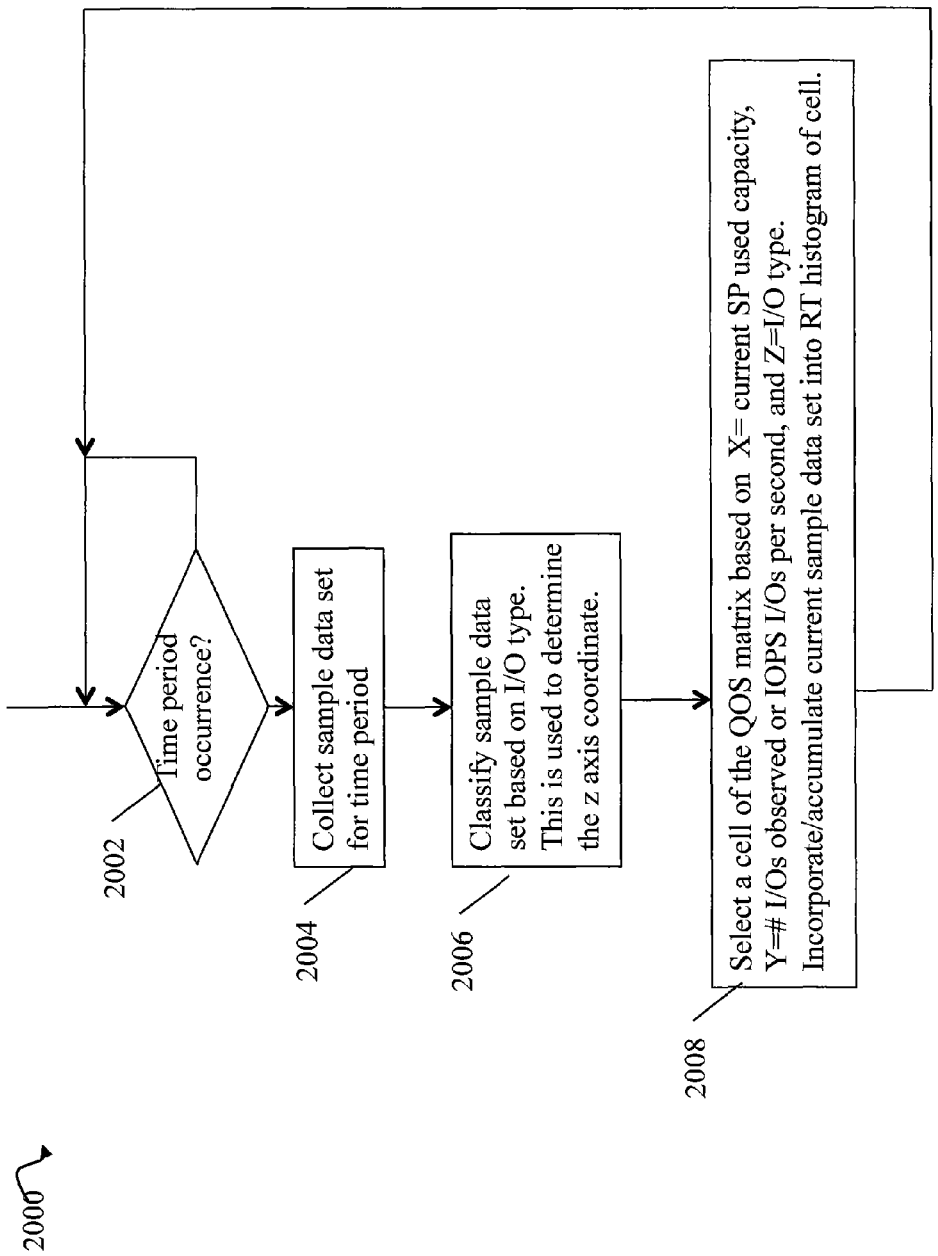
FIGS. 23-26 are flowcharts of processing steps that may be performed in an embodiment in accordance with techniques herein.

Referring to FIG. 23, shown is a flowchart 2000 of processing steps that may be performed to build and maintain a QOS matrix in an embodiment in accordance with techniques herein. As described herein, a QOS matrix may be maintained for each SP and also for each SG. At step 2002, a determination may be made as to whether a time period or interval has occurred. If not, control remains at step 2002 until the next such occurrence. At step 2004, a sample data set is collected for the time period. The sample data set may include gathering observed data collected during the time period into an RT histogram as in FIG. 13 along with other counters such as total number of reads, total number of writes and total amount of data transferred. At step 2006, the sample data set may be classified based on one of multiple predefined I/O types. The determined I/O type may correspond to a particular index value for the Z axis coordinate of the QOS matrix. In step 2008, a cell of the QOS matrix is selected based on X coordinate=current SP used capacity, Y coordinate=# I/Os observed or IOPS I/Os per second, and Z coordinate=I/O type. Step 2008 includes incorporating or accumulating the current sample data set into the RT histogram of the selected QOS matrix cell. Control proceeds to step 2002 to wait for the next time period occurrence.

Figure 24:
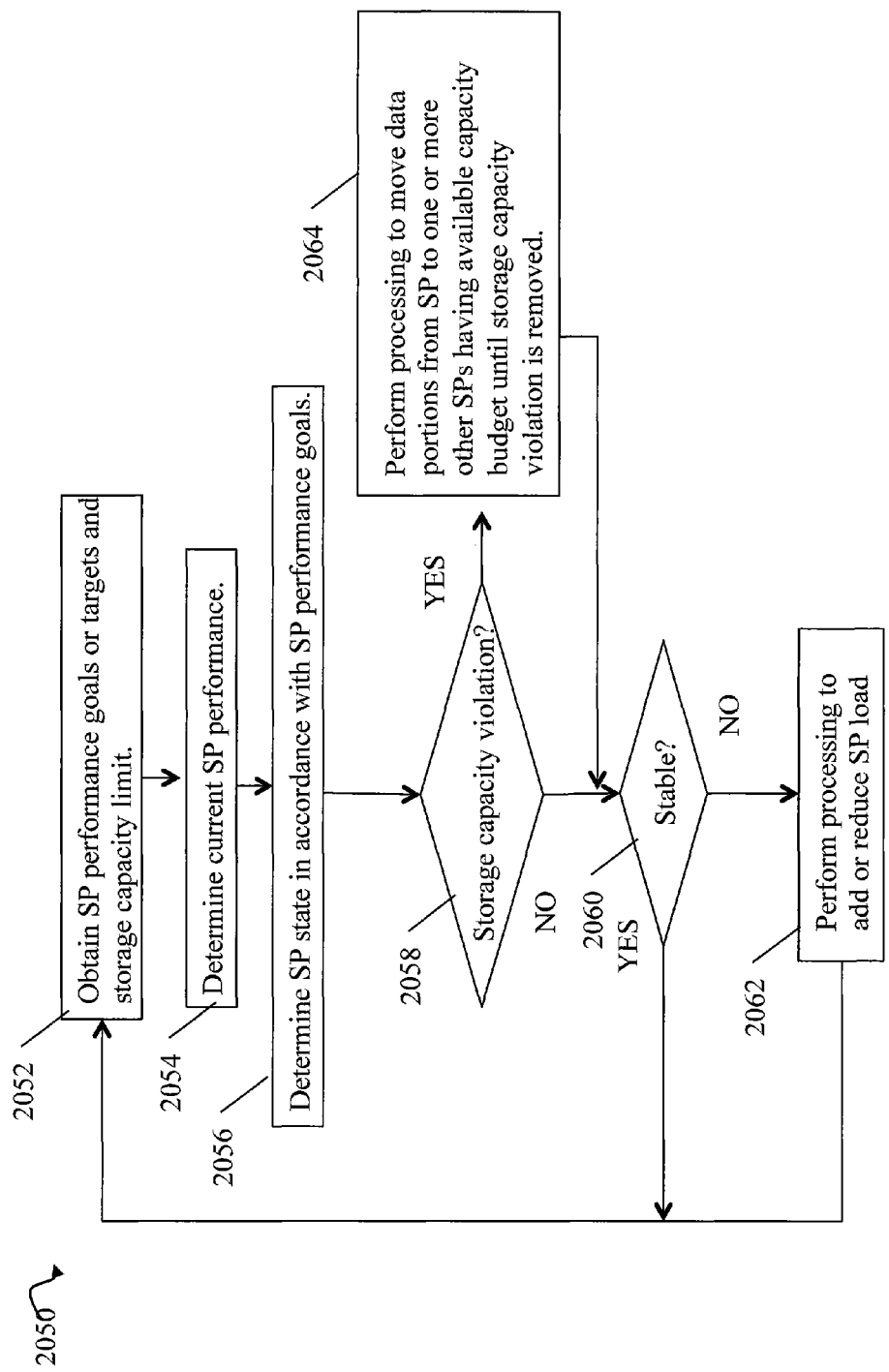

Referring to FIG. 24, shown is a flowchart of processing steps that may be performed in an embodiment in connection with achieving and maintaining SP performance goals in an embodiment in accordance with techniques herein. At step 2052, the SP performance goals or targets and storage capacity limit for the SP may be obtained. At step 2054, the current SP performance may be determined. Step 2054 may include, for example, obtaining and analyzing a next set of performance data such as used in forming a new instance of a histogram of FIG. 13. At step 2056, the SP state may be determined in accordance with its performance goals. At step 2058, a determination may be made as to whether the SP's storage capacity limit is violated. If so, control proceeds to step 2064 to perform processing to move data portions from the current SP to one or more other SPs having available storage capacity budget and available workload budget as may be needed depending on the workload, if any, of the data portions moved from the current source SP to one or more target SPs. In other words, such data movements from the source SP should be within the available capacity and workload budgets of the other target SPs and should not violate any capacity limits and performance goals of the target SPs. It should be noted that if the number of data movements that can be performed without violating the capacity limits and/or performance goals all other SPs is insufficient to remove the capacity violation of the current SP, an embodiment may choose to possibly perform data movements which do not violate capacity limits but may violate the performance goals of the other SPs (assuming the capacity limits have higher priority of enforcement than SP performance goals). If the number of data movements determined is still insufficient to remove the capacity violation of the current SP, an embodiment may perform some other suitable action (e.g., generate an alert or notification to the storage administrator or other user). Assuming that the capacity violation is removed through a sufficient number of data movements, processing may proceed from step 2064 to step 2060. If step 2058 evaluates to no, control proceeds directly to step 2060. In step 2060, a determination is made as to whether the current SP state is stable. If step 2060 evaluates to yes, control proceeds to step 2052. Otherwise, control proceeds to step 2062 to perform processing as described herein to add or reduce the current SP's load in accordance with the current SP's state of add load or reduce load. As described herein, step 2062 processing may include assessing suitable data portions to move to and/or from the current SP to one or more other SPs in accordance with performance goals and associated budgets of the current SP and the one or more other SPs.

By repeating processing of the flowchart 2050, a feedback loop for reassessing SP performance based on the processing performed in steps 2062 and/or 2064 may be performed prior to performing subsequent data movements. The processing of 2050 may be performed with respect to each SP. In one embodiment, the SP's may be processed in accordance with flowchart 2050 in any order.

Consistent with description elsewhere herein, steps 2062 and 2064 may include determining one or more proposed data movements, modeling the resulting performance and capacity of the affected SGs and SPs, and then actually implementing such data movements.

Figure 25:
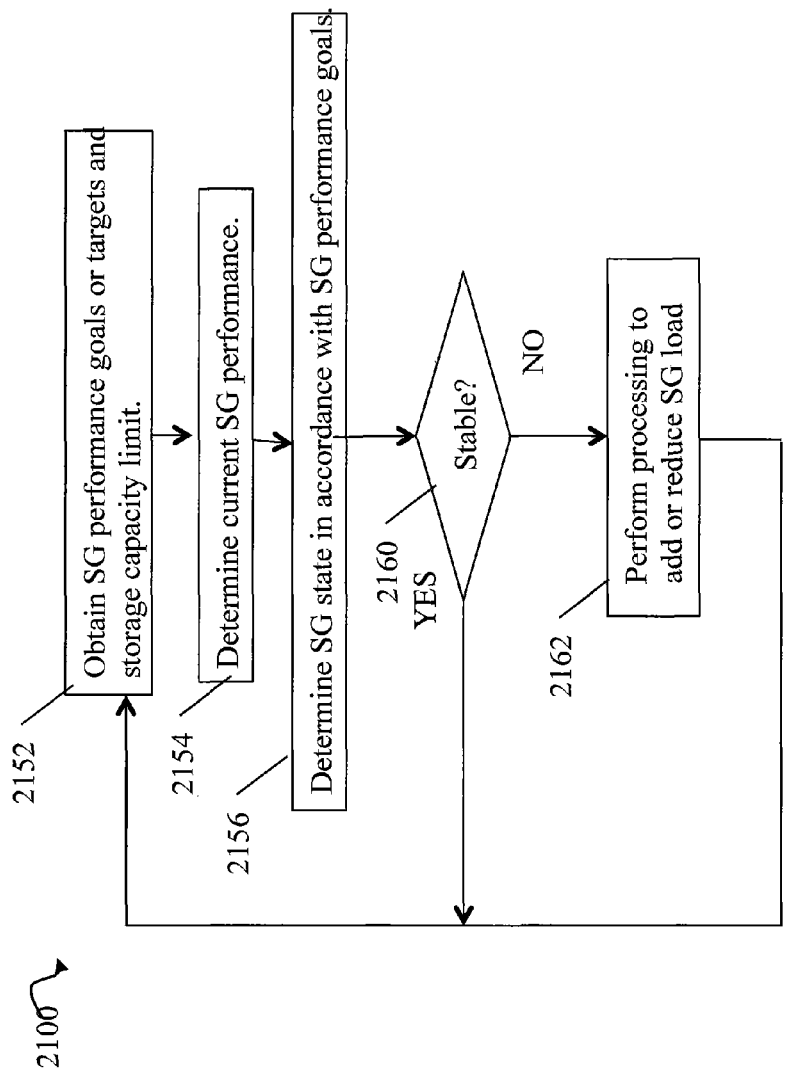

Referring to FIG. 25, shown is a flowchart of processing steps that may be performed in an embodiment in connection with achieving and maintaining SG performance goals in an embodiment in accordance with techniques herein. The steps 2152, 2154, 2156, 2160, and 2162 of FIG. 25 are respectively similar to steps 2052, 2054, 2056, 2060, and 2062 of FIG. 24 with the difference that those of FIG. 24 are with respect to an SP and those of FIG. 25 are with respect to an SG. By repeating processing of the flowchart 2150, a feedback loop for reassessing SG performance based on the processing performed in steps 2162 may be performed prior to performing subsequent data movements. The processing of 2150 may be performed with respect to each SG. In one embodiment, the SG's may be processed in accordance with flowchart 2150 in any order.

It should be noted that an embodiment may perform processing as described in connection with FIGS. 24 and 25 in accordance with prioritized criteria such as mentioned above in connection with determining a set of one proposed data movements.

It should be noted that if all SPs are in a state of needing to reduce load, processing may be performed to make a decision with regard to whether or not the QOS controller will continue to operate with current settings or otherwise make possible adjustments. For example, one option is to adjust the QOS performance goals such as the target performance range of included in one or more SP performance goals. For example, the QOS target for an SP as may include an RT objective and a single percentage or a percentage range, or an RT range. One option is to adjust the RT objective (perhaps this was incorrectly specified). Another option is to make an adjustment to the SP performance goals by lowering the range of one or more SP's performance goals. Adjusting the range (e.g., percentage range or RT range) is akin to forcing the media into a cheaper mode, where we are able to consider that the underlying mean response time of the media has some variation outside of our control. Therefore if it is determined that a workload that cannot change, then the performance expectations of the media may be adjusted downwards by accordingly adjusting the expected percentage of I/Os to have an observed RT less than the RT objective downwards (or similarly adjusting the expected average RT and associated observed RT range for I/Os to be adjusted downwards). Another adjustment that can be made is to the SG performance goals such as by similarly adjusting downwards the RT objective and/or RT range for one or more SG performance goals. An embodiment may determine whether the cumulative response time distribution for all SPs being managed is within a stable range (as may be expressed using the percentage range for an SP) while also satisfying the performance goals of the current applications or SGs. An SP may be determined as stable, for example, if the standard deviation for the SP with respect to the average RT for the SP is determined to be within an acceptable range. Furthermore, standard deviation may be determined for each individual RT bin for a given SP to determine whether particular observed RT ranges have acceptable standard deviation with respect to the average RT of the bin.

The standard deviation of an RT bin may be used in connection with determining performance goals such as the target performance range for an SP whose performance characterization and capabilities are unknown other than through observing performance results. In this case, if there is an external storage tier of PDs/SPs with unknown performance, an embodiment may perform processing to calibrate or estimate such performance. In connection with calibration, processing may be performed to issue I/Os having predetermined characteristics to populate particular cells of the SP's QOS matrix. For example, an embodiment may generate I/Os of desired I/O types, resulting in a particular total SP capacity, where such I/Os represent a desired workload as may be determined in accordance with the various IOPS, GB and IO type dimensions of the QOS matrix to determine the performance goals (e.g., RT objective and target percentage range) for the SP. Processing may include sending artificial calibration workload to populate cells of the QOS matrix. For example, processing may send N IOPS and then vary the SG affected in order to determine the performance as a function of capacity. Processing may then be similarly performed but along the IOPS axis whereby the number of IOPS is increased while holding the GB range constant. The level or rate at which the IOPS are issued may be scaled in a logarithmic or linear fashion and may stop scaling up when threshold conditions are met. For example, such conditions may indicate to stop scaling the IO rate when the difference in response time >100% between 2 samples at two consecutive I/O rates. The QOS target or performance goals for the SP may be set at the end of the calibration by calculating the average and standard deviation of all the response time buckets, from the historical data that was captured during the calibration phase. For example, the QOS target may be set based on the response time bucket or bin denoting a RT where at least 90% of all observed I/Os have an RT less than the average RT denoted by the bin and where all I/Os included in the bin have an observed RT that is within three standard deviations from the average RT of the entire observed population. This results in the RT objective being set at the level the media is consistently delivering IO response times. With reference back to FIG. 23, this calibration may be performed, for example, as a step between 2008 and the return to 2002 such as when a first set of observed sample data is obtained for an SP. Before the SP can be added for use with techniques herein, if the SP's performance is unknown, processing may be performed to determine the performance capabilities of the PDs underlying the SP.

Figure 26:
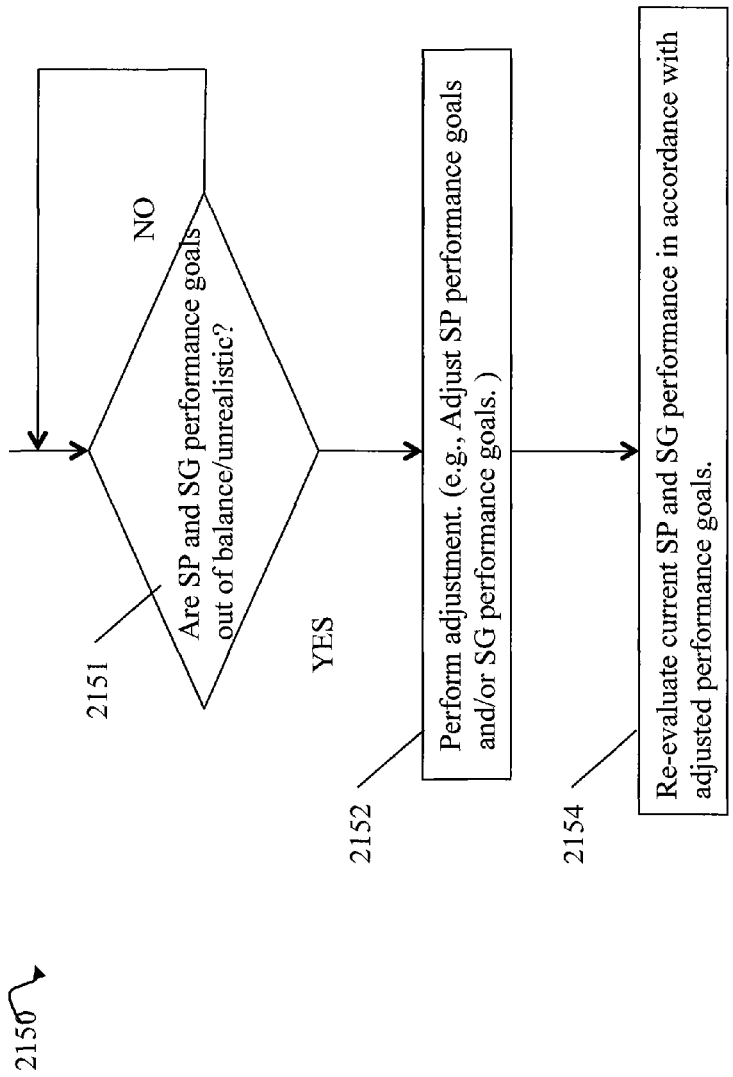

Referring to FIG. 26, shown is a flowchart of processing steps that may be performed in an embodiment in connection with techniques herein. The flowchart 2150 summarizes processing just described regarding whether the system can achieve a state of stability based on the currently specified performance goals of both the supply (e.g., SPs or tiers of PDs) and demand (e.g., applications or SGs that consume the physical storage). At step 2151, a determination is made as to whether the SP and SG performance goals are out of balance or unrealistic. Some ways in which this may be determined are noted above such as if all SPs are in a state of reduce load for some period of time or otherwise achieve this state at a level of frequency greater than some specified threshold (e.g., more than a threshold number of times within some time period). If step 2151 evaluates to no, control remains at step 2151. If step 2151 evaluates to yes, control proceeds to step 2152 to perform an adjustment as described above to the performance goals of one or more SPs and/or one or more SGs. At step 2154, re-evaluation of the current SP and SG performance is performed in accordance with the adjusted performance goals. Step 2154 may trigger processing described above, for example, such as in connection with FIGS. 31 and 32.

In connection with SPs managed using techniques herein where such PDs are stored on external data storage systems and the underlying PD or drive technology is unknown, or more generally, the performance classification in terms of expected performance such as average RT used as the RT objective is unknown, testing may be performed to select and tune such values for the SP's performance goals.

What will now be described may be characterized as support for diverse media support whereby additional criteria may be introduced to further fine tune the I/O or workload that is divided among the SPs and thus the different tiers. Not all storage media is created the same. There are different technologies of data storage media that can be manufactured with and there are tradeoffs that have to be made in terms of price and performance when performing data movements. Techniques herein may be used to leverage the strengths of a particular media type and marginalize its weaknesses. To accomplish this, a determination may be made regarding what are the strengths and weaknesses of a given media and how it may be exploited to achieve a particular goal such as performance goals of SPs and SGs. In this manner, processing may be performed to determine what data portions to move into a target SP in accordance with the I/O type of the data portion workload and one or more I/O types identified as preferred for data portions moved into the SP. Similarly, processing may be performed to determine what data portions to move out of a source SP in accordance with the I/O type of the data portion workload preferred for data portions that are moved out of the SP to another SP. For example, it may be preferred to select data portions for movement out of a source SP whereby such data portions are not preferred for the source SP because they do not have an I/O type or classification for which the PDs of the source SP provide the best performance (relative to other preferred I/O types or classifications).

Generally, such processing may determine which one or more possible I/O types that a given media type is "good" at providing the best performance. A match may then be made between the data portion I/O type and an SP good or preferred for handling I/Os of the data portion's I/O type. When data portions need to move into the SP, processing may be performed to prefer movement into the SP of those data portions which have an I/O type that best matches one of the preferred I/O types of the SP (tier) at a given ratio. As applications attempt to add or move data portions into an SP, preference for data movement may be given to the data portions having one of the preferred I/O types specified for the particular target SP over other data portions not having one of the preferred I/O types specified for the particular target SP. For example, assume there are 10 data portions and 3 of the data portions have an I/O type or classification of read heavy, small block and 7 of the data portions are write heavy, large block. On flash or SSD tier, the 3 read heavy data portions may be ranked higher or preferred over the 7 write heavy large block data portions for data movement into the SSD tier such as due to write amplification and the fact that flash-based storage wears out more quickly when performing writes as opposed to reads. As will be described below, when projecting performance of the SP, the SP may bias selection of data portions which are moved into and/or out of the SP based on whether the I/O type characterizing the workload of the data portion matches a preferred I/O type(s) specified for the SP as described above. The above-mentioned criteria of I/O type assigned to each data portion based on the data portion's workload may be used as additional criteria to further partition or classify data portions on each of the promotion queues and the demotion queues.

In connection with moving a group of candidate data portions to the target SP having a set of one or more preferred I/O types, data portions moved to the target SP from the promotion queue and/or demotion queue may be preferred based on whether each of the data portions has an I/O type matching one of the preferred I/O types of the first set for the target SP. For example, the target SP may specify as a preferred I/O type one or more I/O types for which PDs of the SP are expected to provide the highest or best performance for the given workload of the data portion. For example, as a first option, an embodiment may examine the QOS matrix to determine which I/O type (s) will result in the best modeled RTs for an added workload of a particular I/O type. This first option may be used for example, where the underlying PD technology of the different SPs is unknown. As another alternative, if the underlying PD technology is known, an embodiment may provide an inherent ranking or selection of preferred I/O types for an SP based on the underlying PD technology (e.g., SSD, non-SSD, particular type of rotating PD interface (e.g., SAS, FC, SATA), one or more other PD performance characteristics (e.g., rotation speed of PDs such as 10K RPM or 15 K RPM), and the like) expected to provide a best RT for the particular I/O type. Additionally, the criteria used to rank or select preferred I/O types for an SP may depend on other PD characteristics such as whether particular I/O types adversely impact other aspects besides performance. For example, as known in the art, flash-based PDs have a life expectancy determined in accordance with the number of writes. In this manner, depending on the age of the flash-based media in terms of prior usage, a bias may be further introduced to limit the number of data portions selected for movement into an SP having flash-based PDs if the data portions have an I/O type which is write heavy.

In a similar manner, preferred I/O types or ranking of I/O types specified for an SP may also identify those one or more I/O types that are least preferred for inclusion in a particular SP. The one or more I/O types identified as least preferred for an SP may be used to identify data portions which are preferred candidates for movement out of the SP to another SP. For example, write heavy workload data portions may not be preferred for flash-based SPs and data portions currently stored on an SP having PDs which are flash-based or SSDs may be selected for movement out of the SP prior to other data portions having read heavy workload.

Figure 27:
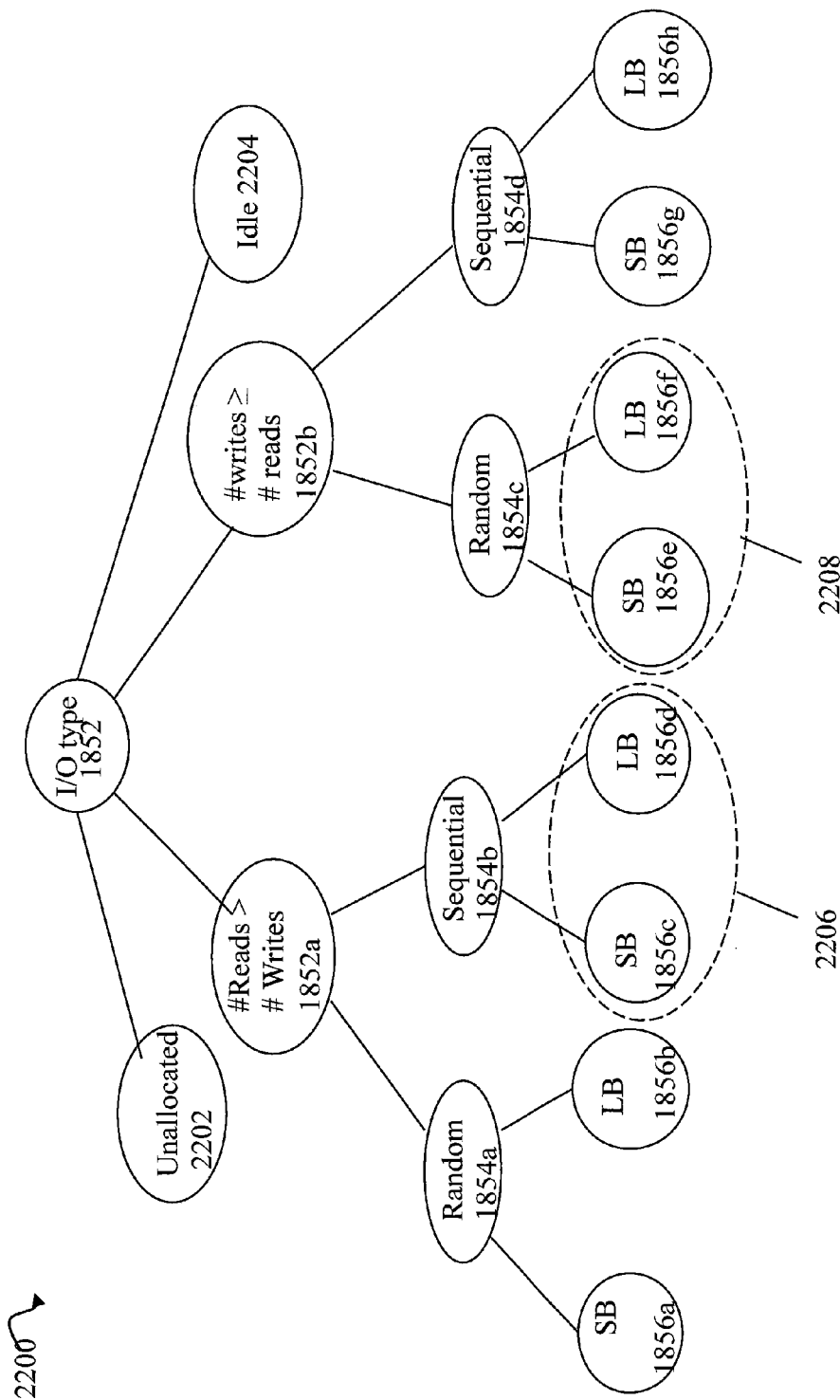

Referring to FIG. 27, shown is an example of different I/O types that may be used in connection with techniques herein when assigning an I/O type to a data portion based on its workload for use with second order queuing. The example 2200 includes the I/O types previously described in connection with the example 1850. Additionally, a data portion may be assigned an I/O type of idle as denoted by 2204 or unallocated 2202. A data portion corresponding to a logical device of an SG may represent a range of the logical device's logical address space. For virtually provisioned or thin devices, the data portion may be unallocated thereby corresponding to a range of the logical device's logical address space that is currently unallocated or not associated with any allocated physical storage. A data portion that is idle has no workload or zero I/Os observed within a defined time period. In one embodiment, the I/O types of 1856c-d may be combined into a single instance (as represented by 2206) so that a single Z coordinate value may represent cells of the QOS matrix for such I/O types in combination. Similarly, the I/O types of 1856g-h may be combined into a single instance (as represented by 2208) so that a single Z coordinate value may represent cells of the QOS matrix for such I/O types in combination.

As described elsewhere herein, in accordance with description for the example 1850, a data portion may fall into only one of the I/O types at a point in time based on the data portion's workload (e.g., all I/O types are mutually exclusive in that a single data portion at a point in time may not be classified as falling into more than one I/O type).

An embodiment may use a QOS matrix having 3 dimensions where the Z axis may have a value that is in the inclusive range of 1 . . . 6, corresponding respectively, to the I/O types 1856a 1856b, 2206, 2208, 1856g and 1856h, as described above with the exclusion of Idle and unallocated since there is no workload for such data portions and thus no performance data stored. Additionally, the Z axis may have another value of 7 corresponding to the default I/O type as described herein.

In this manner, consider determining which one or more I/O types are preferred for a particular SP. For an SP having a current capacity C1 in GBs (X dimension) and a current workload W1 in number of I/Os or I/Os per second (Y dimension), the resulting RT performance of increasing the workload by an amount of a data portion's workload W2 and size S1 may be modeled for all the I/O types using the 6 cells of the SP's QOS matrix having X=C1+S1 and Y=W2+W2 and comparing the resulting RT determined using each of the 6 cells. Each of the 6 cells of the SP's QOS matrix used has an associated I/O type and modeled resulting RT. The possible 6 resulting modeled RTs may be ranked in terms of increasing performance or decreasing RT and the I/O type associated with the highest ranked RT in terms of performance may be selected as preferred for data portions moved into or stored in the SP. More generally, the resulting RT ranking from best performance to lowest performance indicates a ranking of the associated I/O types in terms of preference for data movement into the SP. The I/O type associated with the lowest ranked RT in terms of performance may be selected as the least preferred for data movement into the SP or the most preferred for data movement out of the SP. In other words, when looking at which particular data portions of an SP may be candidates for movement OUT of the SP, data portions having the I/O type associated with the lowest ranked performance (e.g., highest resulting modeled RT) may be selected. Similarly, when looking at which particular data portions of an SP may be candidates for movement INTO the SP, data portions having the I/O type associated with the highest ranked performance (e.g., lowest resulting modeled RT) may be selected.

Alternatively, an embodiment may perform processing to qualify the underlying PDs for the SPs and determine offline a ranking of I/O types from highest performance to lowest performance expected. The ranking may be based on some observations during a qualification period. For example, an embodiment may determine a first set of one or more I/O types for each SP that are preferred for storing on PDs of the SP, and a second set of one or more I/O types for each SP that are least preferred of all possible I/O types for storing on PDs of the SP. The first set may identify I/O types preferred for data portions that are candidates for movement into the SP. The second set may identify I/O types that are preferred for data portions that are candidates for movement OUT of the SP. The ranking of I/O types of the first and second sets may be static or predetermined, or may further adapt over time based on observed performance such as automatically using the QOS matrix as refined over time.

It should be noted that an embodiment may also consider other criteria besides performance when determining the ranking of I/O types or when determining which one or more I/O types are preferred for data portions that are candidates for movement OUT of the SP and which one or more I/O types are preferred for data portions that are candidates for movement INTO the SP. For example, an embodiment may consider whether the I/O type is read heavy or write heavy if relevant to a particular SP's I/O type ranking if the underlying PD technology as SSD or not is known.

In this alternative embodiment, a table such as illustrated in FIG. 28 may be provided as an initial ranking of I/O types. The example 2200 includes a table with I/O types 2221 and some underlying PD media or technology type that may be used in an embodiment. Each entry in the table of 2200 indicates, for the particular I/O type, a ranking or grade for each possible media type where the grade is one of those indicated in 2212. Specifically, each entry in the table 2200 is assigned one of the following: X denoting that the media type is bad or not preferred for storing or movement of a data portion having the associated I/O type into the SP, G denoting that the media type is good or preferred for storing or movement of a data portion having the associated I/O type into the SP, and D denoting don't care. In connection with the above, those cells associated with I/O types of X may represent the I/O type preferred for data portion candidates for movement out of the SP. Those cells associated with I/O types of G may represent the I/O type preferred for data portion candidates for movement into the SP. It should be noted that the example 2200 may be based on expected RT performance and also other criteria for the MLC SSD-based storage since such physical storage wears out based on write usage. In this way, the I/O rankings for MLS may prefer to include data portions with read heavy workload and may prefer least to include data portions with write heavy workload.

An embodiment may also interpret the information of table 2200 in a different way to identify one or more I/O types as preferred for data movement into and/or out of the SP. For a given I/O type identified by one of the columns of 2221, an embodiment may identify a ranked list of one or more preferred media types or PD technology types as those one or more media types 2210 which do not include an X in the entry. The media types which do not include an X entry may be further ranked with all media types having a G ranked higher than entries have a D. The foregoing ranking may denote a preference ranking of data portions to be included or moved to the SP. Any entries for a given I/O type having an X entry may be preferred for data movement out of the SP. For example, the following are ranked preferences, from highest to lowest, for each I/O type regarding which media type is preferred for storing a data portion of the I/O type (e.g., identify a ranking of preference for data movement into the an SP having the particular media type):

| I/O type | List of preferred media type(s) for storing data portions of this I/O type |
|---|---|
| Read Random Large (RRL): | SLC (G), MLC (G), FC 15K RPM (D) |
| Write random small (WRS): | SLC (G), FC 15K RPM (D) |
| Write random large (WRL): | SLC (G), FC 15K RPM (G) |
| Read sequential large (RSL) and small (RSS): | SATA 7.2K RPM (G), SLC (D), MLC (D), FC 15K RPM (D) |
| Write sequential large (WSL) and small (WSS): | SATA 7.2K RPM (D), SLC (D), FC 15K RPM (D) |
| Idle: | SATA 7.2K RPM (D), SLC (D), MLC (D), FC 15K RPM (D) |

In connection with the above lists for each I/O type, I/O types may be ranked first based on the G and D rating, G being ranked higher than D. Further, if multiple media types have a same ranking of D or G, the multiple media types having may further be ranked based on secondary criteria in terms of expected RT performance, from highest to lowest. Such expected RT performance may be based on the RT objective associated with an SP as well as general knowledge of expected performance of: MLC and SLC (same performance expected), FC 15K RPM and SATA 7.2K RPM further ranked based on secondary criteria.

In this example 2200, the underlying PD technology or media type may be known. However, it should be noted that more generally the information of 2200 may be comprised based on each SP or storage tier rather than media type in 2210 (such as where the media type is unknown) and a determination of whether an SP or storage tier is preferred for one or more I/O types may be based on an assessment of information the QOS matrix identifying which I/O types generally provide the best relative RT for each of the different allowable I/O types 2221.

Figure 29:
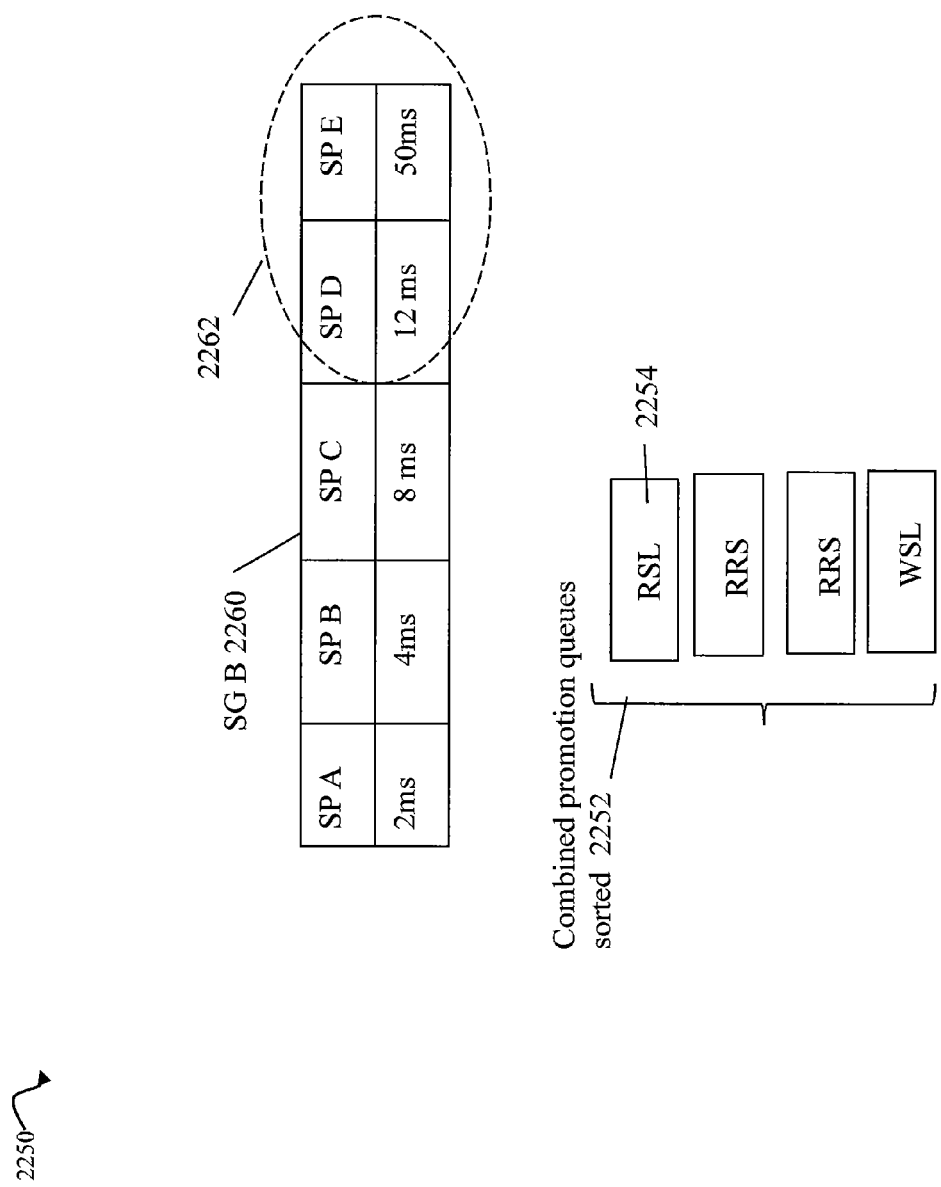
FIGS. 29 and 30 are examples illustrating use of I/O type in performing data movements in an embodiment in accordance with techniques herein.

Referring to FIG. 29, shown is an example illustrating use of I/O type in connection with using the promotion queues of an SG when the SG wants to acquire higher performance media to increase its performance such as described above in connection with FIG. 22. The example 2250 includes a set of SPs in 2260 having storage allocated therefrom for storing data portions of SG B. In 2260, there are 5 SPs denoted SP A-E and associated RT objectives as follows: SP A has a 2 ms RT objective, SP B has a 4 ms RT objective, SP C has an 8 ms RT objective, SP D has a 12 ms RT objective and SP E has a 50 ms RT objective.

The SG B may have an RT objective of 10 ms and a current observed average RT of 50 ms therefore the SG B wants to increase its performance. With 10 ms as the pivot point (the current SG RT objective), SPs D and E are selected as SPs having RT objectives higher than the pivot point. Thus, data portions from such SPs D and E may be considered as candidates for data movement from their current SP of D or E to another target SP that is any of SP A, B or C. Element 2252 may represent the combined or aggregate promotion queues of data portions for SPs D and E which are sorted in 2252 based on decreasing order of each data portions IOPS or number of I/Os multiplied by the SP average observed RT. Thus, element 2254 represents the entry in the sorted list have the maximum such product of all entries on the list 2252. When selecting a target SP to move data portion 2254, the data portion's I/O type of RSL is considered. A comparison is made between the data portion's I/O type and the one or more preferred I/O types indicated for each SP that has available budget (in terms of I/Os or IOPS and also capacity). If such an SP has a preferred I/O type matching the I/O type of the data portion, that SP may be selected as the target SP over another SP that does not have a preferred I/O type that matches the data portion's I/O type. If there is no such SP having a preferred I/O type matching the I/O type of the data portion, then processing may proceed to the next entry in the list 2252. In this manner, the matching criteria may require that there be a match between the data portion's I/O type and the I/O type of the SP preferred for receiving a data portion.

An embodiment may further bias or weight selection of data portions for data movement to a higher performing media using different matching criteria. For example, an embodiment may specify a weighting of X:Y where X data portions may be selected from the sorted list 2252 using first criteria as described above requiring that there be a match between the data portion's I/O type and the I/O type of the SP preferred for receiving a data portion (e.g., target SP having a G rating for the I/O type matched such as indicated in FIG. 28), and the next Y data portions may be selected from the sorted list 2252 using second criteria requiring that the data portions have the highest product value of all data portions on the list 2252. The foregoing product value may be as described above which is the data portion's workload (e.g., OPS or number of I/Os) multiplied by the SP average observed RT (where the RT used is of the source SP currently including the data portion being assessed). For example, an embodiment may select as a bias or weighting 2:1 or 10:1.

As noted above, to optimize for workload, an embodiment needs to determine what a given media type is good at. In one embodiment, the Z axis of the QOS Matrix may be sorted according to the lowest read response time and the each media type may be rated according to the read performance at the 8 different IO types. This ranking can be static based on some observations during drive qualification or can adapt over time based on the observed performance, or a combination of both. Similar processing may be performed regarding write response time. Either using the foregoing or some other technique for determined what one or more I/O types a given media type is good at, workload having matching I/O type may be biased towards the media type. To accomplish this, the data portions for a given application may be divided based on the media they are located on and the IO Type they represent. Data portions may be moved between media types in order to realize the performance goals for that media.

During a given sample interval the data portions are sorted according to the load they are driving to each media type. A pool of media will be given a performance goal based on expected read response time and will allow data to move in when below that expectation and force data out when above that expected response time. When data is being selected for movement into a media type, there is a sorted list of data portions that are possible movement candidates. The data portions selected for data movement will be biased based on the IO type using a ratio that is setup. The ratio may be based on the configuration and adapted over time based on the observed load.

The amount of bias may be based on the number of media types in the system. The more media type, the more each can be biased towards the ideal IO Types, since there will be other candidates to handle the less than ideal load. Generally, there may be one or more preferred I/O types for a particular SP or storage tier. The level of bias may be a function of the current load on the system as well as some margin for absorbing future load.

Figure 30:
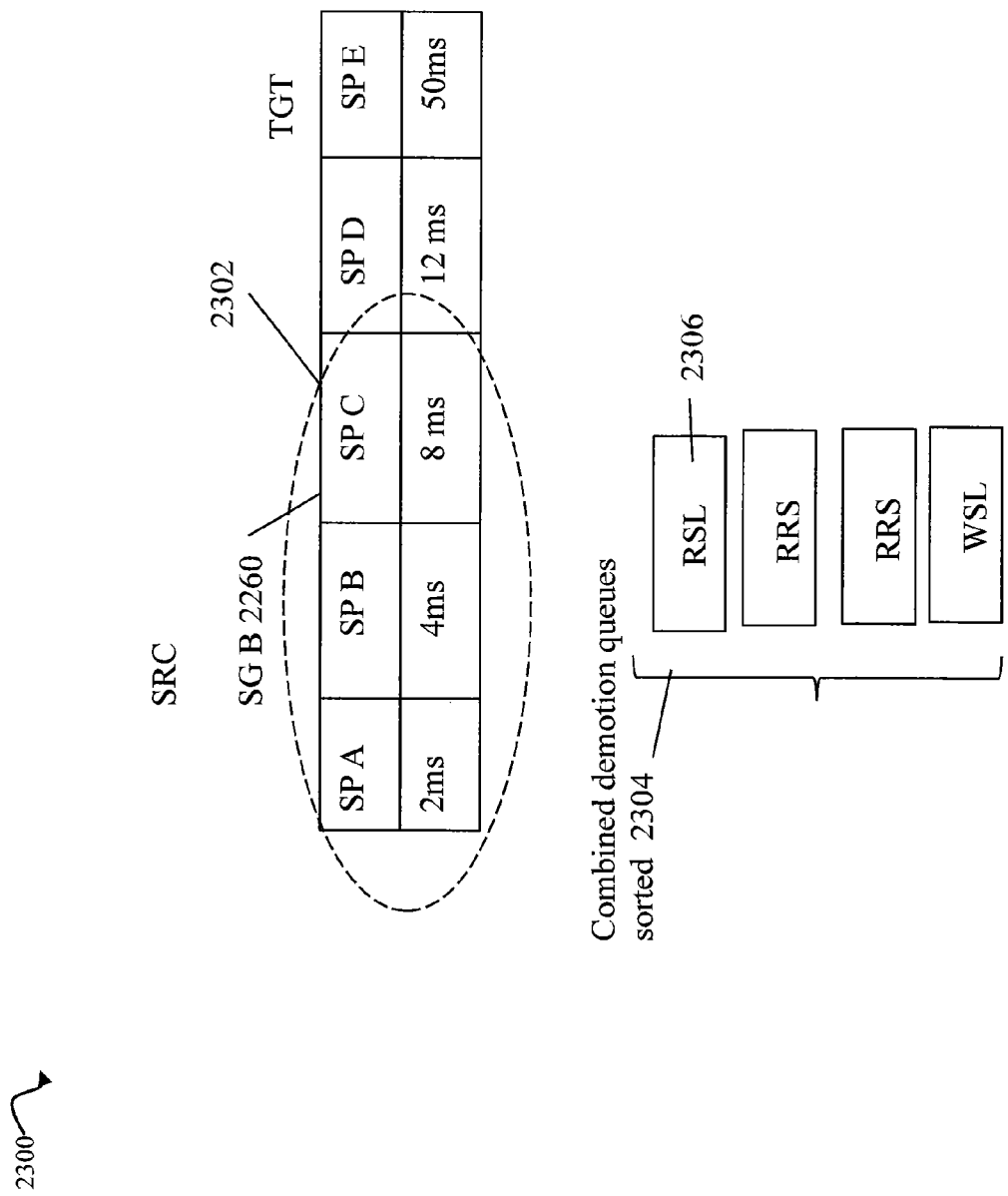

Referring to FIG. 30, shown is an example illustrating use of I/O type in connection with using the promotion queues of an SG when the SG wants to acquire lower performance media to decrease its performance such as described above. The example 2300 may include the same SPs and associated RT objectives in 2260 as in the example 2250. In this case, let SG B have an RT objective of 10 ms and an actual observed average RT of 4 ms. Consistent with description above, the pivot RT of 10 ms is used and the source SPs from which workload may be removed are SPs A-C 2302 to any target SP which can be SP D or SP E. Element 2304 may represent the combined demotion queues of SPs A-C sorted based on increasing order of workload or activity of the data portions. The data portion(s) of 2304 selected for data movement from current SP to another SP (either SP D or E in this case) is based on whether the data portion has an I/O type which is indicated as preferred for data movement out of the current SP (e.g. a data portion stored in an SP where there is a match between the data portion's I/O type and the I/O type for the SP indicated as preferred for data movement (e.g., the SP has an X rating for the data portion's I/O type as in FIG. 28).

The target SP to which the selected data portion may be moved must have available budget and also the target SP's preferred I/O type should match the I/O type of the data portion (e.g., target SP having a G rating for the I/O type of the data portion to be moved as illustrated in FIG. 28).

Rather than consider data portions as ordered in the list 2304 and select for data movement a data portion of a current SP having an I/O type which matches the least preferred I/O type for the current SP (e.g., data portion's I/O type has an X rating for the current SP), an embodiment may rather just select the first entry or highest ranked data portion from 2304 and proceed to determine which of the possible target SPs D and E, if any has a G rating (preferred rating) matching the I/O type of the data portion.

When performing processing as described herein to reduce an SP's capacity due to an SP capacity violation or adjust (increase or decrease) an SP's workload to meet SP performance goals, I/O types of the data portions and SPs may be similarly considered and biasing using a ratio of different criteria may also be used. Generally, suitable data portions may be selected from a source SP for movement into a target SP based on the I/O type of the data portion, I/O type preferred for data portions moved out of the source SP, and I/O type preferred for data portions moved into the target SP. Biasing using a ratio or weighting (of different criteria to perform X number of movements using the I/O type matching between data portions and SP I/O type preferences and Y movements without using the I/O type matching criteria between data portions and SP I/O type preferences) may be used in connection with reducing an SP's capacity due to an SP capacity violation or adjusting (increase or decrease) an SP's workload to meet its performance goals.

Figure 31:
FIG. 31 is a table summarizing possible source and target SPs for data movements in an embodiment in accordance with techniques herein.

Referring to FIG. 31, shown is a table summarizing what SPs may be considered as sources (S) and targets (T) in connection with data movements in an embodiment in accordance with techniques herein. The table of 2350 is based on an example as described in connection with the SPs A-E 2352 having corresponding RT objectives as denoted in 2354 consistent with description of FIG. 30. Additionally, assume SP C has a capacity limit violation and also that SP C's performance goals are not being met. As indicated by 2356, to correct the capacity limit violation, data portions may be moved from SP C to any of the other SPs as denoted by the T entries where such target (T) SPs have available capacity and workload budget. As indicated by 2358, to bring SP C's current performance into compliance with its performance goals, data portions may be moved from SP C to any of the other SPs as denoted by the T entries where such target (T) SPs have available capacity and workload budget.

Referring back to FIG. 29, FIG. 29 illustrated SG promotion where the SG wants to increase its performance and acquire higher performing media. Consistent with that as described in connection with FIG. 29 to illustrate which SPs may be sources (S) from which data portions are moved to SP targets (T), element 2360 of FIG. 31 represents that SP D and SP E may be source SPs from which data portions may be moved out of to one of 3 possible target SPs—SP A, B or C.

Referring back to FIG. 30, illustrated is SG demotion where the SG wants to decrease its performance and acquire lower performing media. Consistent with that as described in connection with FIG. 30 to illustrate which SPs may be sources (S) from which data portions are moved to SP targets (T), element 2362 of FIG. 31 represents that SPs A, B and C may be source SPs from which data portions may be moved out of to one of 2 possible target SPs—SP D or E.

With reference back to FIG. 12, description elsewhere herein refers to expected RT with respect to the supply side 1454 or resources, such as SPs of PDs. In connection with following description, such an expected RT with respect to SPs of PDs, or more generally supply side resources 1454, may also be referred to herein as a service level expectation (SLE).

Similarly, with reference back to FIG. 12, description elsewhere herein refers to expected level of service, such as a response time objective (RTO) with respect to the demand side 1458 or resource consumers, such as SGs of the applications. In connection with following description such an expected RTO with respect to SGs, or more generally consumers of resources on the demand size 1458, may also be referred to herein as a service level objective (SLO).

In an embodiment in accordance with techniques herein, different media types or technologies (e.g., flash or EFD, SAS or other 15K RPM rotating disk drive, SAS or other 10K RPM rotating disk drive) that are known may have an associated SLE denoting an expected level of performance for I/Os directed to PDs of a particular media type or technology. For example, as described herein, the SLE for an SLE class and its one or more media types may be an expected RT for I/Os directed to PDs of this particular SLE class. In this manner, one characteristic associated with a storage tier may be an SLE of the underlying physical storage devices. If two media types or technologies have the same SLE, they may both be included in the same SLE classification. Additionally, for PDs of the external data storage system whose media type and expected level of performance are unknown, performance information may be collected for the PDs using techniques herein where such information is used to establish an SLE for the PDs of the external data storage system.

In an embodiment in accordance with techniques herein, an SLO may be specified for one or more logical devices of a customer or tenant having data stored on the data storage system. In one embodiment in accordance with techniques herein, the data storage system may provide a multi-tenant (MT) environment whereby multiple tenants, or customers, store their data on the data storage system. In such an exemplary MT environment, a different service level objective or SLO may be specified for each tenant that defines a guaranteed performance level or performance goal for the tenant. For example, an SLO may be related to a guaranteed level of performance with respect to I/O operations serviced at the data storage system for the tenant. In this case, the SLO specified for the tenant may be expressed in terms of one or more metrics, such as based on response time (RT). For example, the SLO specified for the tenant may include an average response time (RT) with respect to I/Os issued by the tenant. To further illustrate, an SLO may specify an average RT of 3 ms. for the tenant whereby the tenant is guaranteed to have an average RT of 3 ms. for each LUN storing the tenant's data. The tenant may also be referred to as a customer or consumer of the data storage system having its data stored on the data storage system. A single tenant or customer may be, for example, one or more applications executing on a host. A single host may have one or more tenants or customers where each of the tenants or customers includes one or more applications. For simplicity of illustration, following examples may refer to a single application on a host as a tenant or customer for which an SLO is specified where the SLO may be applied to each LUN used by the application. However, it will be appreciated by those skilled in the art that an SLO, such as RT, specified for a single tenant or customer may be applied in the aggregate with respect to multiple applications and associated LUNs of the single tenant or customer.

The SLO may include an RT denoting a guaranteed level of performance as measured on the data storage system where the RT denotes an average RT per LUN. For example, the SLO may specify an RT for an application's LUNs. The application may be a database application and the SLO may specify a RT to be guaranteed for each of the LUNs used the application. The SLO may be met or maintained if the observed average RT over some time period is less than (or equal to or less than) the RTO of the SLO for each individual logical device (e.g., LUN that is a thin device, thick device or regular LUN, etc.) of the customer. The observed average RT may be determined with respect to front end or host I/O operations directed to the logical device.

The SLO may be associated with a general level of service purchased by the customer. For example, in one embodiment, a data storage customer or tenant may purchase one of five defined performance level plans: diamond, platinum, gold, silver and bronze. The foregoing listing may denote an order from highest to lowest service plan level. In such an embodiment the highest ranked service plan level of diamond may have the most stringent or highest performance objective of all service plans. In contrast, the lowest ranked service plan level of bronze may have the lowest performance objective of all service plans. For example, the diamond service plan may have an SLO that is an average RT=2 ms with respect to all I/Os of all LUNs of the customer, and the bronze service plan may have an SLO that at is an average RT=15 ms with respect to all I/Os of all LUNs or other logical devices of the customer. It should be noted that generally an embodiment may include any number of service levels and plans.

In one embodiment in accordance with techniques herein as described in more detail below, the SLO associated with a thin or virtually provisioned logical device may be used to select the physical storage location for the first or initial storage allocation. As described herein, a chunk of physical storage for a thin device portion, such as a chunk, may be allocated upon the first or initial write to a logical address associated with that chunk of the thin device's logical address space. Thus, a specified SLO for a thin device may be used to select a storage tier for initial physical storage allocation to store write data for the thin device. As described herein, each storage tier may have physical storage devices of a particular media type. Additionally, in an embodiment in accordance with techniques herein, each storage tier may include such physical storage devices of a media type or technology (e.g., EFD, FC 10K RPM, FC 15K RPM, SATA 7.2K RPM) configured in a RAID group having an associated RAID protection type or level and configuration. Thus, physical storage location (of a storage tier) such as may be allocated in a multi-tiered storage environment may be characterized as having a first dimension denoting the media type or technology of the PDs in the storage tier and a second dimension denoting the RAID type or level (e.g., RAID-1, RAID-5, RAID-6) and configuration (e.g., of the RAID group such as RAID-5 with 3×1 (3 data drives and 1 parity drive) or 7×1 (7 data drives and 1 parity drive).

As an example of an embodiment illustrating techniques herein, consider an embodiment which supports RAID-1, RAID-5 (3×1), and RAID-6 groups and where the PDs in a configured RAID group may include PDs of any of the following media types or technologies: EFD, FC 15K RPM rotating disk drives FC 10K RPM rotating disk drives, and SATA 7.2 K RPM rotating disk drives. In such an embodiment, each of the possible 4 media types may have an associated expected level of performance such as expected average RT (e.g., that may be determined based on modeling, performance testing, specifications provided by manufacturer or provider of PDs of different RPMs, and the like). The foregoing 4 media types or technologies may have an associated performance ranking, from highest performance ranking to lowest performance ranking, of EFD, FC 15K RPM, FC 10K RPM, SATA 7.2K RPM. Additionally the following may be expected average RTs for each of the media types: EFD=2 ms RT, FC 15K RPM=8-12 ms RT, FC 10K RPM=12-15 ms RT, and SATA 7.2K RPM 20+ms RT. Additionally, each of the possible RAID group types and configurations may an associated ranking, from lowest write penalty cost to highest write penalty cost, of RAID-1, RAID-5 3×1, and RAID-6.

In connection with techniques herein, when initially allocating physical storage for a thin device chunk responsive to a first write to a logical address in that thin device chunk, physical storage may be allocated from a storage tier having an associated media type or technology with an expected level of performance that most closely matches an SLO specified for the thin device. For example, consider a data storage system for which a customer may purchase one of the following service plan levels: diamond, platinum, gold, silver and bronze, as described elsewhere herein. A first customer may purchase the diamond service plan level with an SLO that is an RTO of 2 ms and the first customer may have an application storing its data on a thin device. When allocating storage responsive to a first write to a logical address of the thin device, physical storage may be allocated from a storage tier having physical storage devices of a media type with an expected RT that is closest to the RTO=2 ms of the SLO for the first customer. Thus storage may be allocated from a storage tier including EFDs (EFD expected RT=2 ms and customer's SLO=2 ms). In an embodiment in which there are multiple RAID group types and configurations of EFDs, selection may be made based on a further ranking of all such EFD configured RAID groups. The ranking of the EFD RAID groups may be based on write penalty, from lowest to highest write penalty. For example, assume there are 3 RAID groups of EFDs ranked from lowest to highest write penalty as follows: a RAID-1 group of EFDs, a RAID-5 group of EFDs and a RAID-6 group of EFDs. Selection of a RAID group for storage allocation for a first write to a logical address of a thin device may be made for the first customer having the diamond service plan from a RAID group of EFDs having available physical storage with the least write penalty. For example, storage may be allocated from the RAID-1 EFD group if it has available capacity. If there is no available capacity in the RAID-1 EFD group (or if there is no RAID-1 EFD group), storage may be allocated from the RAID-5 EFD group if it has available capacity. If there is no available capacity in the RAID-5 EFD group (or if there is no RAID-5 EFD group), storage may be allocated from the RAID-6 EFD group if it has available capacity. If there is no available capacity in the RAID-6 EFD group (or if there is no RAID-6 EFD group), storage may be allocated using another default technique such as described below. In this manner, an embodiment in accordance with techniques herein may allocate new storage in response to a first write to a thin device logical address where the new storage allocation is made from a PD selected in accordance with the SLO associated with the thin device. In such an embodiment, the PD may be of a particular media type or technology having an expected performance, such as RT, that is a closest match of all available media types in the system to the SLO of the thin device. In a similar manner, storage may be allocated for a thin device having an SLO as may be specified based on any one of the different service plan levels in an embodiment in accordance with techniques herein.

Figure 32:
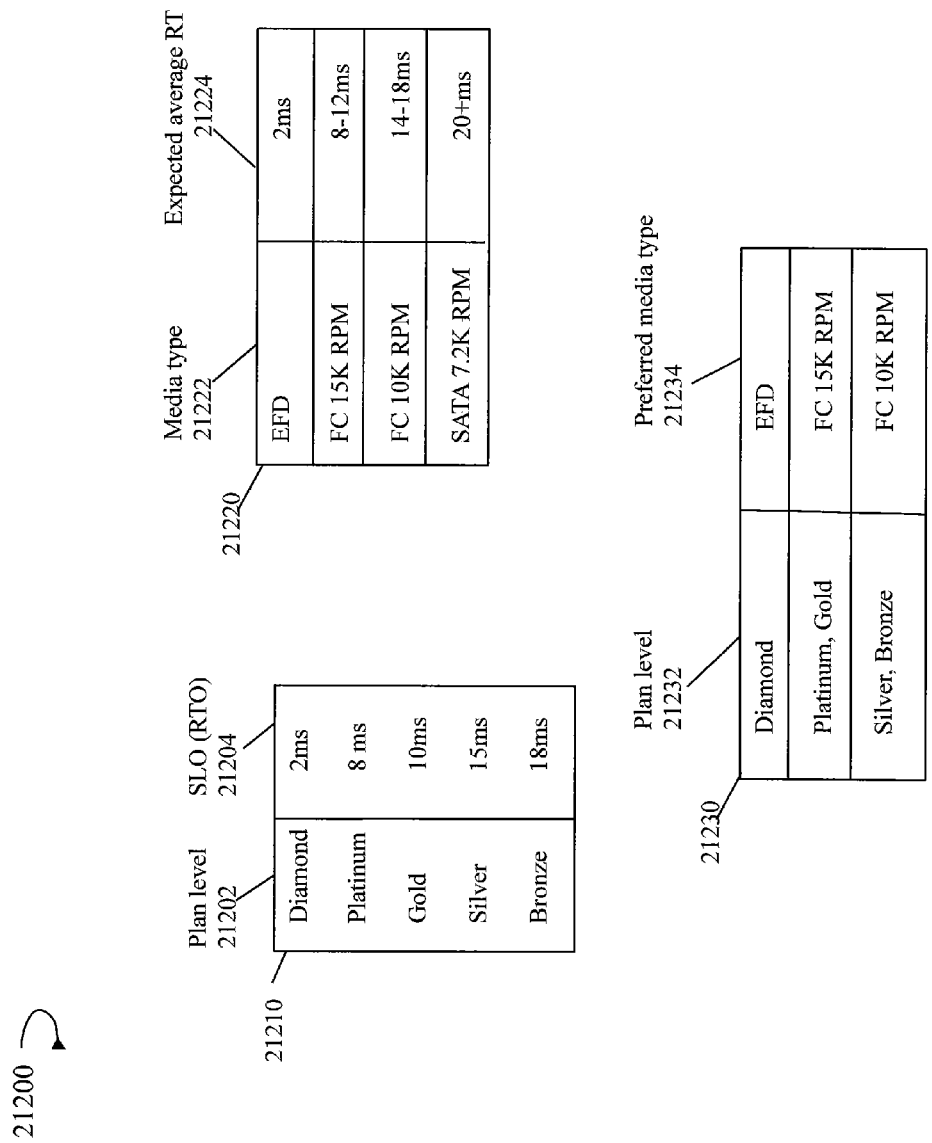
FIG. 32 is an example illustrating service level objectives and media types that may be used in an embodiment in accordance with techniques herein.

Referring to FIG. 32, shown is an example of tables including service plan levels, SLOs and preferred media types that may be used in an embodiment in accordance with techniques herein. In the example 21200, table 21210 may specify service plan levels 21202 and associated SLOs 21204 that may be used in an embodiment in accordance with techniques herein. The table 21210 summarizes the 5 different service plan levels described above from which a customer may select in connection with specifying a service level agreement, for example, with a provider providing data storage in a data storage system. In the table 21210, the diamond service plan has an associated SLO as an RTO of 2 ms. for each LUN of the customer, the platinum service plan has an associated SLO as an RTO of 8 ms. for each LUN of the customer, the gold service plan has an associated SLO as an RTO of 10 ms. for each LUN of the customer, the silver service plan has an associated SLO as an RTO of 15 ms. for each LUN of the customer, and the bronze service plan has an associated SLO as an RTO of 18 ms. for each LUN of the customer. It should be noted that the SLO RTO specified in table 1210 may refer to an average RT for a host I/O.

Table 21220 summarizes expected performance in terms of average RT 21222 for an I/O directed to a PD for the particular media types 21224. Thus, table 21220 generally lists average RTs with respect to backend physical device I/O operations. For example, table 21220 indicates an average RT of 2 ms. for I/Os directed to an EFD, an average RT in the range of 8-12 ms for FC 15K RPM rotating disk drive, an average RT in the range of 14-18 ms for FC 10K RPM rotating disk drive and an average RT of 20 ms or more for a SATA 7.2K RPM rotating disk drive.

Table 21230 lists the plan levels 21232 and the preferred media types 21234 based on the tables 21210 and 21220. The diamond plan has an RTO of 2 ms as in table 21210 which maps to EFD indicated in table 21220 which has a matching RT of 2 ms. The platinum plan has an RTO of 8 ms as in table 21210 which maps to FC 15K RPM drive indicated in table 21220 which has a matching RT in the range of 8-12 ms. The gold plan has an RTO of 10 ms as in table 21210 which maps to FC 15K RPM drive indicated in table 21220 which has a matching RT in the range of 8-12 ms. The silver plan has an RTO of 15 ms as in table 21210 which maps to FC 10K RPM drive indicated in table 21220 which has a matching RT in the range of 14-18 ms. The bronze plan has an RTO of 18 ms as in table 21210 which maps to FC 10K RPM drive indicated in table 1220 which has a matching RT in the range of 14-18 ms.

The foregoing table 21230 may indicate a preferred media type selected for the initial allocation of storage of a thin device chunk in response to a first write to a logical address of the thin device chunk. In an embodiment in which there are multiple RAID group types or protection levels (and associated configurations) for the single preferred media type, one of the multiple RAID group types and associated configuration is selected based on a ranking of such RAID group types from lowest or minimum write penalty (per host I/O) to maximum write penalty (per host I/O), as described above. For example, if there are 3 RAID types or levels as described above for a single media type, the storage may be allocated from one of a RAID-1 group, a RAID-5 group or a RAID-6 group. The foregoing ordering also lists the RAID group type ranking, from minimum to maximum, in terms of write penalty of a single host I/O associated with each type. Thus, the physical storage may be allocated from the RAID group having the RAID type or level and associated configuration which has available storage and the least write penalty.

Criteria for determining a best match between a thin device SLO and one of the media types may vary. For example, one embodiment may select the media type having an expected level of performance, such as expected average RT for I/Os, that is closest to the SLO RT but not less than the SLO RT.

In the event that there is no available storage for allocation based on the preferred media type determined based on SLO, a default technique may be used to select a storage tier from which to allocate the storage for the newly allocated thin device chunk. In one embodiment in accordance with techniques herein, selection may be made from a storage tier based on a predefined ranking determined in accordance with media type or technology and RAID type or protection level such as illustrated in FIG. 33.

Referring to FIG. 33, shown is a table 21300 representing the default allocation ranking preference or ordering from most to least preferred when allocating storage for a first write to a thin device. The ranking may be based on factors including RAID type and configuration and media type or technology. Media type or technology may consider the underlying physical storage media characteristics and expected performance capabilities of such a PD based on, for example, whether the PD is a rotating disk drive or solid state storage, if the PD is a rotating drive, what is the RPM, and the like. Additionally, the foregoing ranking takes into consideration the RAID type and configuration ranking described above based on host I/O write penalties of the different RAID types and configurations. The ranking in table 21300 may take into account factors including physical device performance capability that may vary with media type, RAID type and configuration write penalty, cost per unit of storage (e.g. cost per GB), amount or storage capacity of different media types in the system, and any media wear out. For example, flash-based media experiences wear out based on the number of writes performed. Within a lifetime or usage period, the amount of writes that each type of flash, such as MLC or SLC, may be expected to successfully sustain varies. For example, with SLC, stored one bit of information or data per cell and may be the simplest of all flash types. Due to having only one bit per cell, it may therefore have the longest lasting of the flash types in an embodiment in accordance with techniques herein. In contrast, for example, with MLC, multiple bits of information are stored per cell and wear rate during write operations is greater than with SLC. Thus, during a usage or lifetime period, an SLC device is expected to be able to have a larger number of allowable writes than an MLC device. In this manner, the SLC device may be characterized as a type of flash having a higher write endurance than the MLC device. Furthermore, the SLC device may be generally included in first write endurance classification associated with a first level of write endurance and the MLC device may be generally included in a second write endurance classification associated with a second different level of write endurance. Thus, EFD is a media type that experiences wear out based on the amount of writes to that particular EFD. In this manner, an embodiment in accordance with techniques may consider write endurance or wear out as a factor when determining the ranking of table 21300.

In one embodiment in accordance with techniques herein, the media types may include flash/EFD, FC 15K RPM rotating disk drives, FC 10K RPM rotating disk drives and SATA 7.2 K RPM rotating disk drives. Additionally, the embodiment may include RAID type and configurations of RAID-1, RAID-5, and RAID-6. In table 21300 for such an embodiment, column 21302 lists the different media types and columns 21304, 21306 and 21308 list the 3 different RAID types and configurations. Thus table 21300 has 12 cells or entries each denoting a different combination of media type and RAID type and configuration. The ranking for the 12 entries denoting the different possible combinations of media type and RAID type and configuration may be from 1 to 12 with 1 being the highest ranked or most preferred storage tier from which to initially allocate storage for the thin device chunk, and 12 being the lowest ranked or least preferred storage tier from which to initially allocate storage for the thin device chunk.

Due to factors such as wear out and cost/GB of EFD (e.g., media type), it may be desirable to establish a default ranking as in table 21300 in which EFD is ranked below other media types such as one or more fast rotating disk drives media type of FC 15K and FC 10K RPM disk drives. Additionally, it may be desirable to have the default ranking consider as primary criterion/ia the media type characteristics (e.g., performance, wear out, cost/GB) and as secondary criterion the write performance penalty associated with different RAID types and configurations. Thus, the ranking may use the write performance penalty to rank different RAID types and configurations of the same media type. The default ranking may also place one or more of the slowest performance capability media types, such as SATA 7.2K RPM, in the last or lowest positions in the ranking Based on the foregoing, table 21300 lists an example of a default ranking for allocation based on a combination of media type and RAID type and configuration as follows, from highest rank to lowest rank: $1^{st}$ is FC 15K RPM RAID-1, $2^{nd}$ is FC 10K RPM, RAID-1, $3^{rd}$ is EFD RAID-1, $4^{th}$ is FC 15K RPM RAID-5, $5^{th}$ is FC 10K RPM, RAID-1, 6th is EFD RAID-5, $7^{th}$ is FC 15K RPM RAID-6, $8^{th}$ is FC 10K RPM RAID-6, 9th is EFD RAID-6, $10^{th}$ is SATA 7.2K RPM RAID-1, $11^{th}$ is SATA 7.2K RPM RAID-5 and $12^{th}$ is SATA 7.2K RPM RAID-6.

The ranking table in 21300 may be used by default when there is no SLO associated with a thin LUN when initially allocating storage for a thin LUN chunk responsive to a first write to a logical address of the chunk, or when there is no physical storage available in a storage tier including PDs of the preferred media type having an expected performance that most closely matches the SLO for the thin LUN.

Thus, responsive to first write to a thin LUN chunk, physical storage is allocated for the chunk. In an embodiment in accordance with techniques herein, techniques as described in connection with FIG. 32 may first be performed to allocate storage from a tier including PDs of the preferred media type for the thin LUN if the thin LUN has an associated SLO such as an RTO. If the thin LUN does not have an associated SLO or otherwise if there is no available storage capacity on a PD of the preferred media type for the thin LUN, a default technique may be used, such as allocation from a storage tier based on the default ranking of table 21300.

When allocating storage for first storing data of a first write to a thin LUN chunk using the default ranking of table 21300, storage may be allocated from the tier which matches the highest ranking and which has available storage capacity for allocation. An embodiment may establish allocation limits based on various allocation policies and any allocation may be in accordance with any existing allocation limits. For example, an embodiment may want to keep a minimum threshold percentage or amount of unused storage capacity of one or more media types so that no further storage may be allocated from a media type once that threshold is reached. In this case, when selecting a storage tier for allocation based on either the preferred media type determined using a thin LUN SLO or otherwise using the default table 21300, if a first storage tier of a first media type is at an associated allocation limit, storage may be allocated from a different tier having a different media type. Using the table 21300, storage may be allocated from the tier having available storage capacity and which has the highest ranking in table 21300 based on the combination of media type and RAID type and configuration.

Once storage has been allocated for a chunk of a thin LUN, processing may be performed to gather performance data about the chunk such as related to I/O workload directed to the chunk. In one embodiment as described herein, statistics such as related to I/O workload may be collected per extent based on all the I/O workload of all chunks in that extent. Alternatively, an embodiment may store I/O workload information at smaller or finer levels of granularity such as per subextent, per chunk, or some other level of suitable granularity.

For purposes of illustration, following paragraphs may refer to one embodiment in accordance with techniques herein where I/O workload information is collected per extent, storage for thin LUNs is allocated per chunk and data movement optimizations may move data portions the size of a single subextent or per chunk between storage tiers.

Thus, although workload information is tracked at the extent level for each TD extent, more specifically, an embodiment in accordance with techniques herein may track workload information at the extent level for the particular chunks of each TD extent having storage allocated in that extent.

Consider the following to illustrate. For example, consider a first thin device TD1 with a first logical address space where storage is allocated for a first chunk C1 in a first extent E1 of TD1 where E1 has a corresponding first logical address subrange of TD1's first logical address space. C1 may also correspond to a second subrange of logical address(es) within the first logical address subrange. Data for C1 may be stored on a first physical storage portion of a PD where the first physical storage portion is mapped to the second subrange of logical address(es) for C1 of TD1 (e.g., such as via an allocation map as described above and illustrated in FIG. 8B). Assume, currently, that C1 is the only chunk of E1 for which physical storage has been allocated (e.g., storage has not been allocated for any other chunk in E1 of TD1's logical address space so that no other chunk in E1 is mapped to physical storage per TD1's allocation map). In this case, the workload information tracked for E1 of TD1 includes only information for C1. At a later point in time, assume a second chunk C2 within E1 of TD1 has physical storage allocated so that both C1 and C2 of E1 of TD1 now have physical storage allocated. Subsequent to this later point in time, the workload information for E1 of TD1 may reflect I/Os directed collectively to both C1 and C2.

Thus, an embodiment may track the I/O workload at an extent-level/per extent where each such extent corresponds to a subrange of logical address space of a single TD(thin device) based on I/Os that are directed to any logical address in the logical address subrange for that extent.

For a thin LUN chunk, subsequent to the initial allocation of storage and placement of write data in the initially allocated physical storage, processing may be performed in an ongoing manner to periodically assess whether there is a need to relocate or move data portions among storage tiers having different PDs of different media types and associated RAID types and configurations. In one embodiment in accordance with techniques herein, the assessment or determination as to whether a data portion currently stored on a PD of a storage tier should be relocated may be made based on one or more movement criteria including a RAID type and configuration of the storage tier where the data portion is currently stored, a media type of the PDs of the storage tier where the data portion is currently stored, and current I/O workload characteristics of the data portion. The I/O workload characteristics may include a write probability and a current I/O workload density such as based on I/O volume or quantity (e.g., number of I/Os directed to a data portion) per unit of storage (e.g., per GB), or based on I/O throughput or I/O rate such as I/Os per second (IOPS) per unit of storage (e.g., per GB).

As described herein, in one embodiment, the statistics of write probability and I/O workload density characterizing the I/O workload may be collected per extent. In a single extent of a thin LUN, not all chunks in the extent may be currently allocated. In such an embodiment, the I/O workload density for the extent may be a ratio of the IOPS directed to any logical address in the extent to the size or storage capacity of the allocated chunks. More formally, I/O workload density, also referred to herein as I/O density, for an extent based on IOPS may be represented as:

I/O density=IOPS/total capacity of allocated chunks    EQUATION 1 wherein

I/O density is the calculated I/O workload density for the extent;

IOPS represents the I/O rate, such as I/Os per second, directed to any logical address of thin device range associated with the extent; and total capacity of allocated chunks represents the size or total amount of allocated storage for allocated chunks in the extent. For example, if the extent includes N chunks and only 2 are allocated, the total capacity of allocated chunks may be expressed as the mathematical product of 2*size of one chunk.

Since the size of read and write I/Os may vary, the write probability may account for both the number or rate of reads and writes as well as the average size of read I/Os and average size of write I/Os. The write probability for a data portion, such as an extent, is the probability of doing a write based on the following for host or front end I/Os:

$$\text{Write probability} = \frac{\text{Total data written}}{(\text{Total data read} + \text{Total data written})} \quad \text{EQUATION 2}$$

where

Total data written is the total quantity or amount of data written; and

Total data read is the total quantity or amount of data written.

The write probability determined using EQUATION 2 is a value between 0 and 100%, inclusively.

The Total data written may be calculated as in EQUATION 3 below:

Total data written=write rate(e.g., write I/Os per second)*average size of write The Total data read may be calculated as in EQUATION 4 below:

Total data read=read rate(e.g., read I/Os per second)*average size of read

In one embodiment, for an extent having one or more chunks of storage thereof allocated, processing may be performed to select a preferred media type for the extent based on the extent's I/O density such as may be determined using EQUATION 1. For the extent, a selection of a preferred RAID type and configuration may be made from those currently configured in an embodiment based on the extent's write density as may be determined using EQUATION 2. A preferred storage tier may be determined as one having PDs of the preferred media type and one having a preferred RAID type and configuration. Further processing may then be performed to move one or more chunks of the extent to the preferred storage tier (if such one or more chunks are not already in PDs of the preferred storage tier. This is described in more detail below.

Generally, the higher performance media types may be preferred for storing data having the highest I/O workload such as may be expressed as having the highest I/O density in an embodiment in accordance with techniques herein. As an alternative, an embodiment may use I/O rate for a data portion, such as an extent, to denote the workload directed to the data portion. As yet another alternative, an embodiment may use another suitable metric to denote the I/O workload of a data portion, such as an extent. Thus, for example, consider an embodiment as described above with 4 media types as in FIG. 33 having an associated performance ranking from highest to lowest of EFD, FC 15 RPM K, FC 10K RPM and SATA 7.2K RPM. Data portions may be preferred for different media types depending on the I/O workload of each of the different data portions, such as each extent. The data portions having the highest I/O workload ("hottest") of all existing data portions may be stored in the highest performance media type such as EFD. Data portions having lower I/O workloads may accordingly be preferred for lower ranked performance storage. In an embodiment using the I/O density as in EQUATION 1, those data portions having the highest I/O density may be preferred for the highest performance ranked media type.

Furthermore, different RAID type and configurations may be preferred for different read/write mixtures or, more generally, depending on whether the data portion has a read heavy I/O workload (e.g., more reads than writes) or write heavy I/O workload (e.g., more writes than reads). RAID-1 groups may be preferred for write heavy workload and RAID-6 groups may be preferred for read heavy workloads based on the relative write performance penalties as described elsewhere herein for different RAID types and configurations. In one embodiment in accordance with techniques herein, whether workload of a data portion, such as an extent, is write heavy may be expressed using the write probability as may be determined using EQUATION 2 above. In other words, the higher the write probability of an extent as may be determined using EQUATION 2, the greater the write workload or higher the mixture of writes vs. reads for the extent. Thus, in an embodiment in accordance with techniques herein, a preferred RAID type and configuration for a data portion, such as an extent, may be determined based on the write probability of the data portion. Data portions having the highest write probability may be stored in storage tiers having a RAID-1 type and configuration. In contrast, data portions having the lowest write probability (thereby indicating the data portions as the most read heavy) may be stored in storage tiers having a RAID-6 type and configuration.

Figure 34:
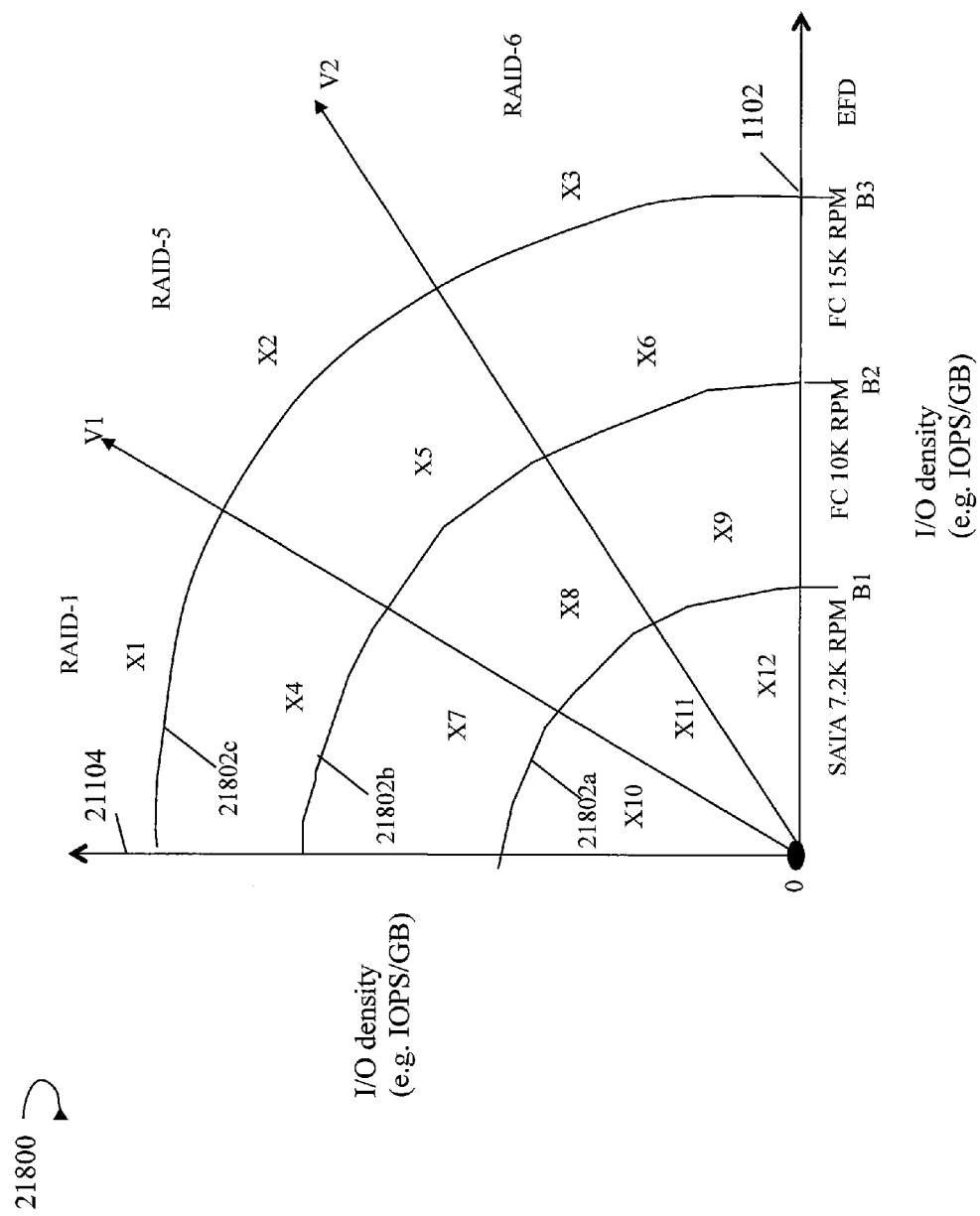
FIGS. 34 and 35 are examples illustrating selecting a particular RAID level and media type based on I/O density and write probability that may be used in an embodiment in accordance with techniques herein.

Referring to FIG. 34, shown is an example illustrating I/O workload characteristics of varying values of I/O density and write probability which may be preferred for different storage tiers having PDs of a particular media type configured into RAID group(s) having a particular RAID-type and configuration. An I/O workload may have a write probability that ranges from all writes or write probability of 100% to all reads or read probability of 100%. The quarter pie graph of 21800 is generally divided into 3 "pie slice" partitions based on radial lines V1 and V2 drawn from the center point 0. In this example, there are 3 RAID group types and configurations so the graph 21800 may be divided into 3 partitions for the number of RAID group types and configurations. In one embodiment, these 3 partitions may be approximately equal each denoting approximately a same amount or portion size of the write probability range 0-100%. In one embodiment, the partition associated with RAID-1 is denoted by portions X1, X4, X7 and X10, the partition associated with RAID-5 is denoted by portions X2, X5, X8 and X11 and the partition associated with RAID-6 is denoted by X3, X6, X9 and X12. Generally, the graph may be divided into N partitions where N denotes the number of different RAID types and configurations in an embodiment.

Additionally, the quarter pie graph is generally divided into 4 arc partitions or circumferential bands partitioned by arcs B1 21802aa, B2 21802b and B3 21802c. In this example, there are 4 media types so the graph 21800 may be divided into 4 arc partitions based on arcs B1, B2, and B3. Generally, the graph may be divided into M arc partitions where M denotes the number of different media types in an embodiment. In one embodiment, the arc partition associated with SATA 7.2K RPM is denoted by portions X10, X11 and X12, the arc partition associated with FC 10K RPM is denoted by portions X7, X8 and X9, the arc partition associated with FC 15K RPM is denoted by portions X4, X5 and X6, and the arc partition associated with EFD is denoted by X1, X2 and X3.

Each of the arcs or curves 21802a-c may generally represent read write mixtures or read/write ratios of I/O workloads ranging from a first mixture or ratio denoted by 21102 to a second mixture or ratio denoting by 21104. In an embodiment described herein using the write probability metric of EQUATION 2, each of the arcs or curves 21802a-c may represent write probabilities of I/O workloads ranging from a 0% write probability (e.g., all read workload) denoted by 21102 to a 100% write probability (e.g., all writes workload) denoted by 21104. As illustrated, each point at which the X axis 21102 intersects one of the curves 21802a-c may denote a point on the intersecting curve for 0% write probability. Each point at which the Y axis 21104 intersects one of the curves 21802a-c may denote a point on the intersecting curve for 100% write probability. Points on the curves 21802a-c between 21102 and 21104 may represent a write probability of a workload between 0 and 100%. In one embodiment, line V2 may denote approximately 33% write probability and line V1 may denote approximately 67% write probability. It should be noted that the particular boundaries or partitioning of the full range of write probabilities among the three pie slice partitions associated with the tree RAID types of RAID-1, RAID-5 and RAID-6 may vary with embodiment. For example, some embodiments may overlap the write probability boundaries associated with two or more adjacently ranked RAID groups. As illustrated, the highest the write probability space (X1, X4, X7 and X10) is mapped to the RAID-1 type and the lowest write probability space (X3, X6, X9 and X12) is mapped to the RAID-6 type. Additionally, although the example 1800 shows the range of write probabilities as being partitioned in approximately equal parts or pie slices between the different RAID types and configurations, an embodiment may map any suitable portion of the range of write probabilities to each RAID type and configuration.

Generally, movement along a radial line drawn from point 0 may denote an I/O density. As the I/O density increases, the distance from the point 0 increases. In one embodiment, the radial distance of a line drawn from the center point 0 may be associated with a range of I/O densities. Each such radial line drawn from the center point 0, such as V1, V2, 21102 and 21104, may be divided into subranges where each subrange of I/O densities may be mapped or associated with a particular preferred media type. For example, I/O densities in the subrange from 0-B1 may be preferred for SATA 7.2K RPM, I/O densities in the subrange B1-B2 may be preferred for FC 10K RPM, I/O densities in the subrange B2-B3 may be preferred for FC 15K RPM, and I/O densities greater than B3 may be preferred for EFD. Values selected for B1, N2 and B3 may generally be any suitable boundary values. In one embodiment in accordance with techniques herein, the I/O density range may be divided into 4 non-overlapping contiguous subranges which may or may not be the same size. The size of each subrange may vary, for example, with the storage capacity of each media type.

In some embodiments in accordance with techniques herein, the representation of 21800 may logically represent a preferred matching of I/O workload characteristics based on write probability and I/O density (e.g., based on the amount, volume or rate of I/Os) to storage tier characteristics of media type and RAID type and configuration. Such a representation 21800 is consistent with description elsewhere herein based on order of priority, preference, or bias for storing data having an I/O workload that is predominantly reads (e.g., low write probability) in RAID-6 groups and predominantly writes (e.g., high write probability) in RAID-1 groups. Similarly, the representation 1800 indicates the priority, preference or bias of storing data with a large or heavy I/O workload (e.g., high I/O density) in higher performance media types and a low I/O workload (e.g., low I/O density) in lower performance media types. In such an embodiment, those data portions having the highest write probability may be stored in those storage tiers preferred or most suitable for writes such as those having RAID-1 configuration, and those data portions having the lowest write probability may be stored in those storage tiers preferred or most suitable for reads such as those having RAID-6 configuration. In such an embodiment, those data portions having the highest or heaviest I/O workload may be stored in those storage tiers preferred or most suitable for a heavy workload such as those having EFD media type, and those data portions having the lowest I/O workload may be stored in those storage tiers preferred or most suitable for a low workload such as those having the SATA 7.2K RPM media type.

The example 21800 represents a partitioning of the vector space denoted by the combination of I/O density values and write probability values into 12 partitions. Each of the 12 partitions represents one of the twelve possible combinations of media type and RAID type and configuration in an embodiment. Each of the 12 partitions may be associated with a particular subrange of possible I/O density values and a particular subrange of write probability values used to identify I/O workload characteristics of data portions preferred for the particular combination of media type and RAID type of that partition.

Figure 35:
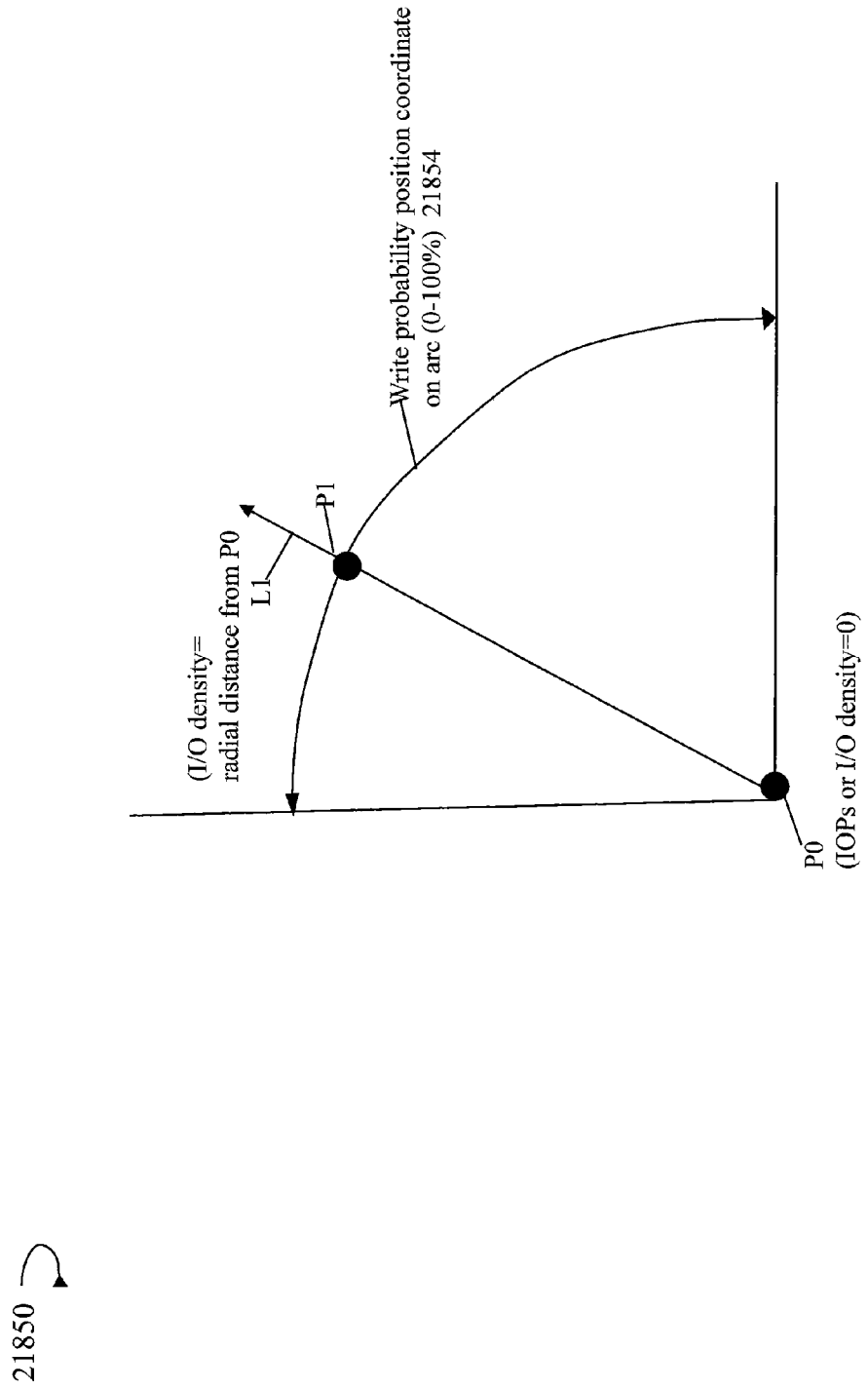

Based on the representation of FIG. 34, a preferred media type and preferred RAID type and configuration may be determined for a data portion having an I/O density and a write probability. For example, if a data portion, such as an extent, has a write probability of 100% and a write density greater than that as denoted by B3, a first storage tier configured using RAID-1 and EFD may be determined as preferred for that data portion. If the data portion is an extent, processing may then include moving one or more chunks of the extent to the first storage tier having EFD PDs configured into RAID-1 groups. In contrast, if a data portion, such as an extent, has a write probability of 10% and a write density greater than that as denoted by B3, a second storage tier configured using RAID-6 and EFD may be determined as preferred for that data portion. If the data portion is an extent, processing may then include moving one or more chunks of the extent to the second storage tier having EFD PDs configured into RAID-6 groups. Referring to FIG. 35 shown is an example 21850 illustrating how each data portion having an associated write probability and I/O density may be represented by a point in the quarter pie graph. The example 21850 may denote the same quarter pie graph as in FIG. 34 with the particular boundaries omitted for simplicity. For a data portion, the write probability may denote a first position or coordinate on an arc such as 21854, and the I/O density may denote a radial distance from the point P0, such as on Line L1, used as a second position or coordinate. For example, P1 may denote a point for such a data portion whereby P1 may have associated coordinate values that fall into subranges (e.g., mapped to) of one of the 12 portions denoted as X1 to X12 identifying preferred media type and RAID type and configuration for the data portion.

What will now be described are flowcharts summarizing processing steps described above that may be performed in an embodiment in accordance with techniques herein.

Figure 36:
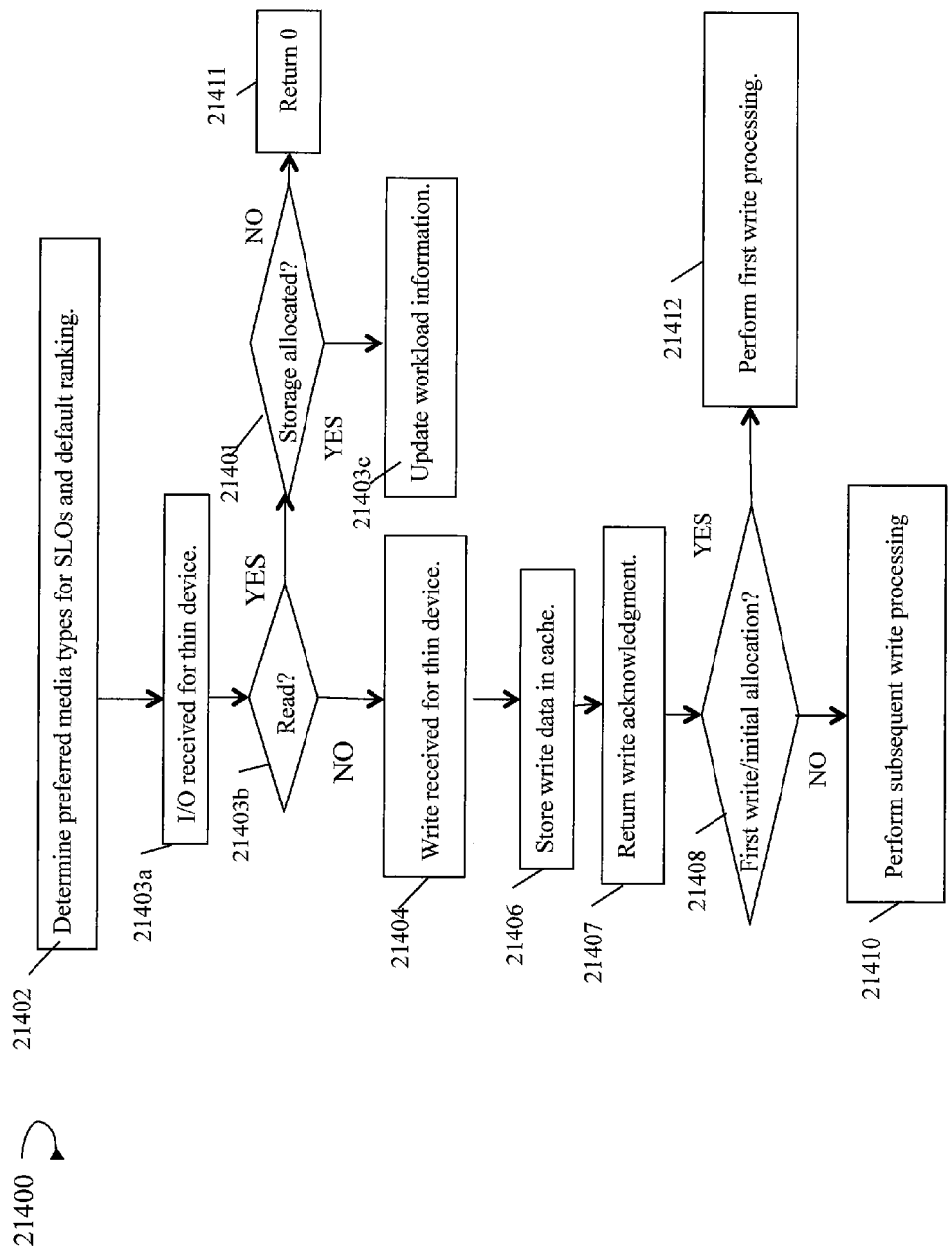
FIGS. 36, 37, 38 and 39 are flowcharts of processing steps that may be performed in an embodiment in accordance with techniques herein.

Referring to FIG. 36, shown is a first flowchart of processing steps that may be performed in an embodiment in accordance with techniques herein. The flowchart 21400 includes step 21402 where preferred media types for the different SLOs are determined such as described in connection with FIG. 33. Additionally, for each such preferred media type as may be used in connection with initial storage allocation for thin device chunk, a relative ranking of RAID types and configurations may be established ranking the RAID types from least write penalty to highest write penalty. For example, one ranking may be RAID-1 (least write penalty), RAID-5 and RAID-6 (highest write penalty). Additionally, step 21402 may include determining a default allocation ranking for possible combinations of media type and RAID type and configuration such as, for example, the ranking described in connection with FIG. 33. At step 21403*a*, an I/O operation directed to a chunk of a thin device may be received. At step 21403*b*, a determination is made as to whether the I/O is a read operation. If step 1403*b* determines the I/O operation is a read, control proceeds to step 21401 where a determination is made as to whether storage is currently allocated or mapped to the chunk to which the read is directed. If step 21401 evaluates to no, control proceeds to step 21411. In step 21411, one embodiment in accordance with techniques herein may return a zero (0) denoting that no storage is currently allocated. As described herein, storage may be allocated for a chunk the first time there is a write to a logical address associated with the chunk. In this case where step 21411 is performed, there has been a read to a logical address prior to storage being allocated for the logical address. Thus, step 21411 returns a zero to denote this condition. If step 1401 evaluates to yes, control proceeds to step 21403*c* where workload information for the extent including the chunk is updated. Otherwise, if step 21403*b* evaluates to no, control proceeds to step 21404 where it is determined that the I/O is a write received for a thin device. At step 21406, the write data is stored in cache and an acknowledgement regarding the successful completion of the write may be returned in step 21407. In step 21408, a determination is made as to whether this write operation is the first write to the chunk whereby no physical storage is currently mapped to the logical addresses of the thin device's address space corresponding to the chunk. If step 21408 evaluates to yes indicating this is the first write to the chunk, first write processing is performed in step 21412. If step 21408 evaluates to no, subsequent write processing is performed in step 21410.

Figure 37:
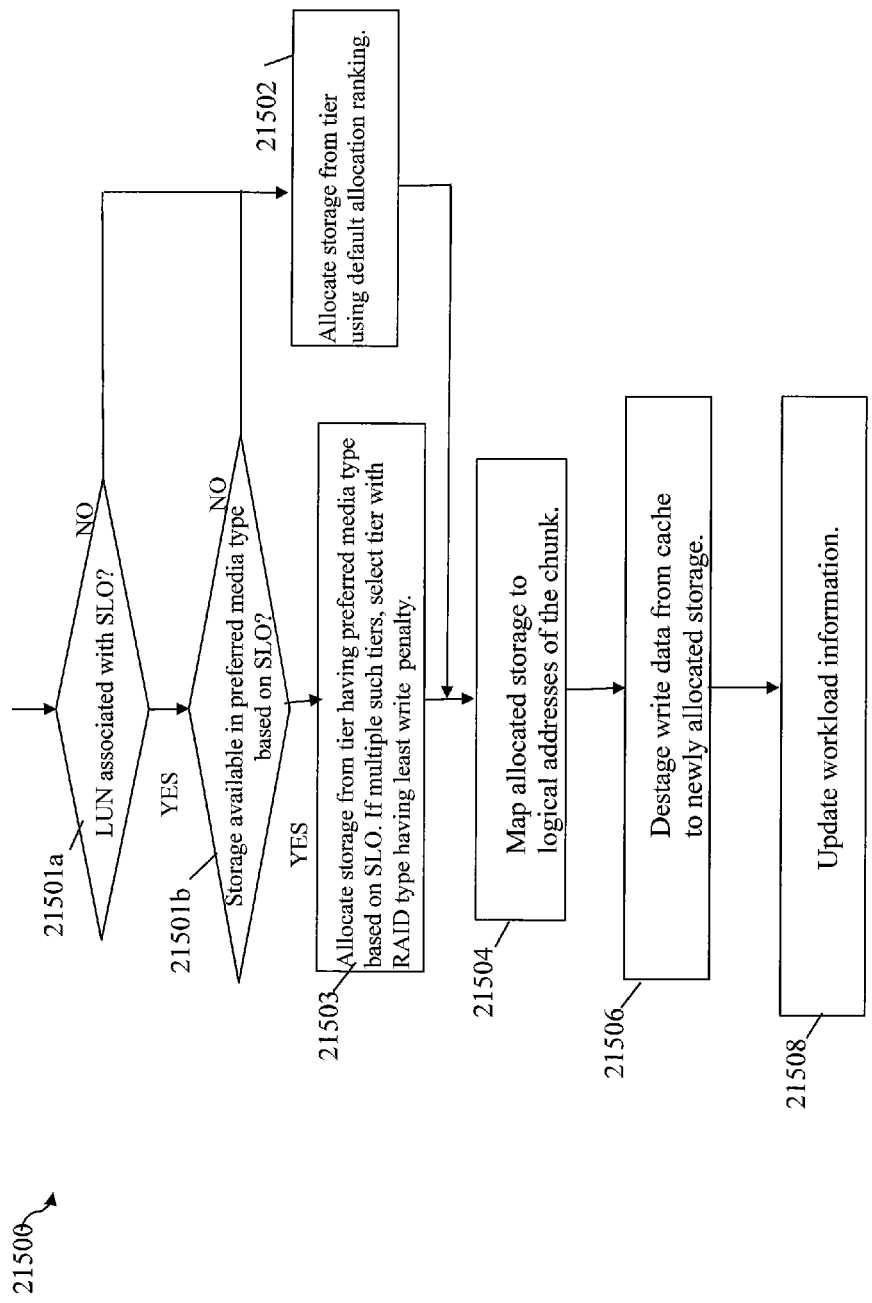

Referring to FIG. 37, shown is a second flowchart of processing steps that may be performed in an embodiment in accordance with techniques herein. The flowchart 21500 provides additional details regarding step 21412. At step 21501*a*, a determination is made as to whether the thin device LUN to which the write is directed is associated with an SLO, such as an RTO. If step 21501*a* evaluates to no, control proceeds to step 21502 where storage for the chunk may be allocated from a storage tier having characteristics based on the default allocation ranking such as, for example, based on the ranking of FIG. 33. From step 21502, control proceeds to step 21504.

If step 21501*a* evaluates to yes, control proceeds to step 21501*b* where a determination is made as to whether there is storage available in a tier having the preferred media type for the LUN based on the SLO. If step 21501*b* evaluates to no, control proceeds to step 21502. If step 21501*b* evaluates to yes, control proceeds to step 21503 to allocate storage from a tier having the preferred media type determined based on the SLO for the LUN. If there are multiple tiers having PDs of the preferred media type, one of the multiple tiers is selected with the RAID type and configuration having the least write penalty of all such multiple tiers.

At step 21504, the allocated storage is mapped to the logical addresses of the chunk. At step 21506, the write data is destaged from cache to the newly allocated storage (as allocated in step 21504). At step 21508, workload information for the extent including the chunk is updated to reflect the write operation just received.

Figure 38:
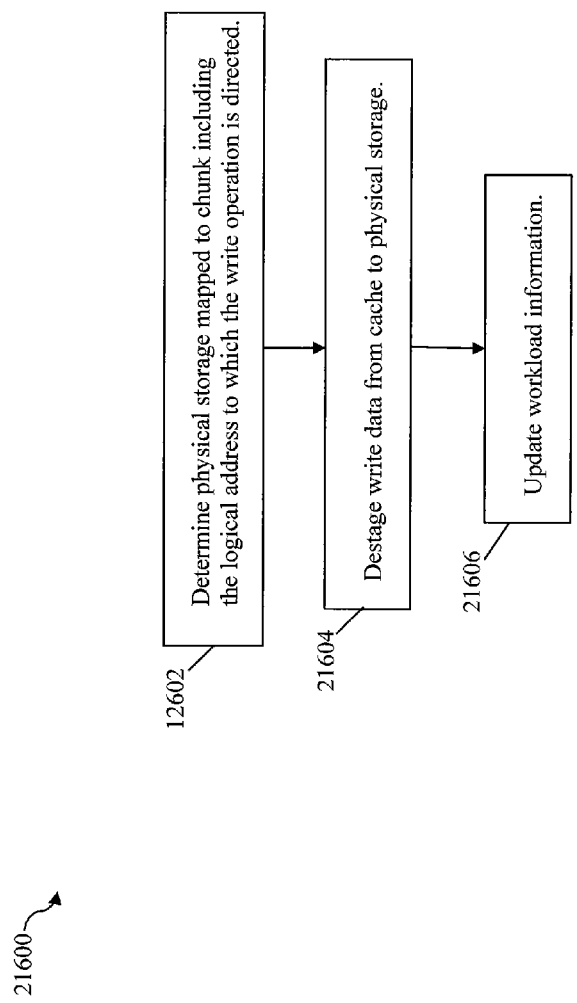

Referring to FIG. 38, shown is a third flowchart of processing steps that may be performed in an embodiment in accordance with techniques herein. The flowchart 21600 provides additional details regarding step 21410. At step 21602, the physical storage location is determined that is mapped to the chunk including the logical address to which the write operation is directed. In step 21602, the write data is destaged from cache to the physical storage location determined in step 21602. At step 21606, I/O workload information for the extent including the logical address to which the write operation is directed (e.g. including the chunk to which write is directed) is updated to reflect the write operation.

Figure 39:
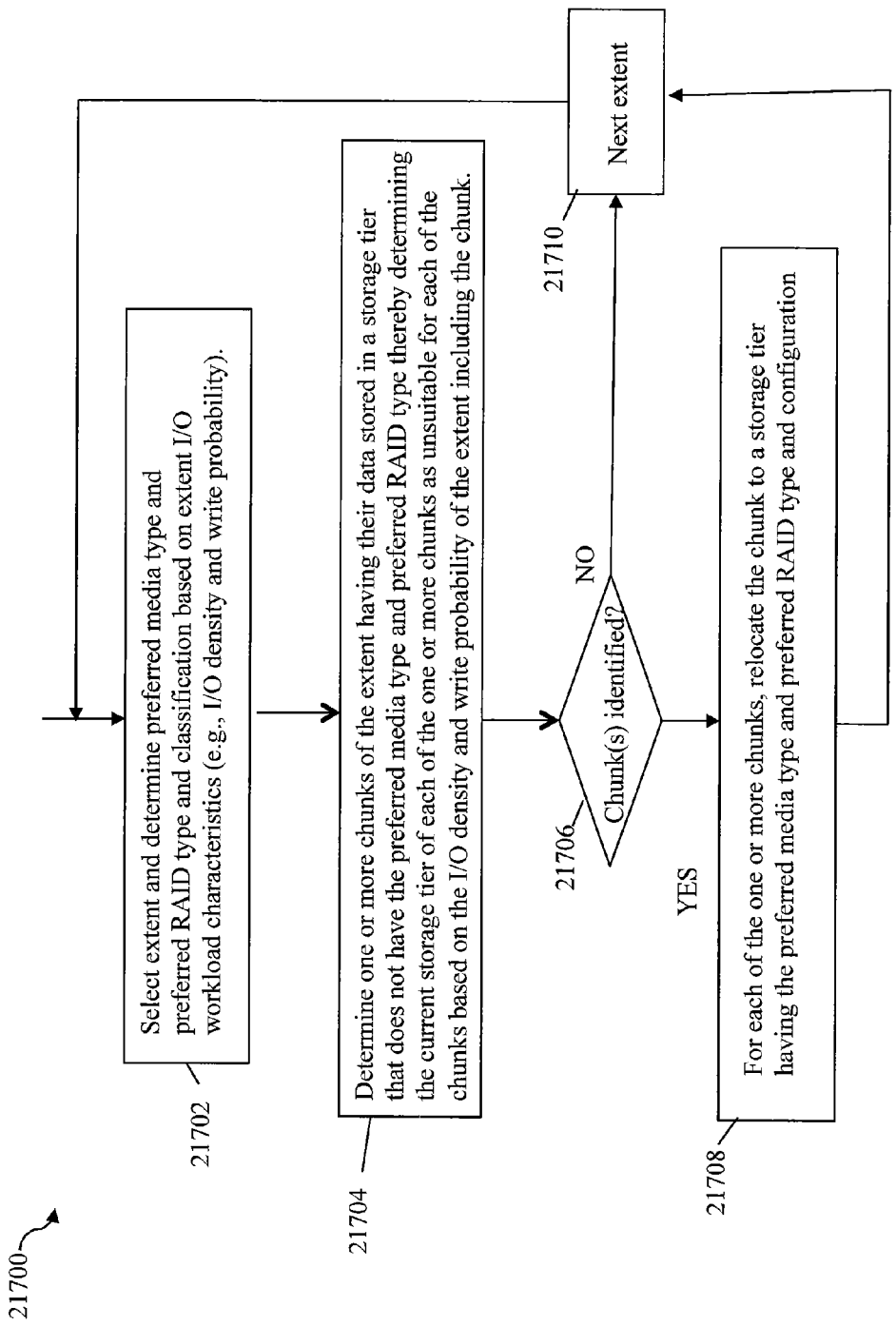

Referring to FIG. 39, shown is a fourth flowchart of processing steps that may be performed in an embodiment in accordance with techniques herein. The flowchart 21700 may be performed in an ongoing manner such as periodically at predetermined time interval occurrences to evaluate. For example, the flowchart 21700 may be performed to periodically assess data portions, such as extents, and determine if any data movement optimization is needed to relocate data from its current storage tier to another target tier determined as more suitable or preferred based on the write probability and I/O density of the data portion. FIG. 39 processing may also be performed at other time such as, for example, responsive to consuming more than a threshold amount of a particular media type, responsive to a particular SLO for a thin LUN not being met, and the like.

At step 21702, an extent is selected for which processing is to be performed and the preferred media type and preferred RAID type and configuration for the extent may be determined. As described herein, the preferred media type and preferred RAID type and configuration for the extent may be determined based on the I/O density and write probability for the extent such as described in connection with FIG. 34. At step 21704, one or more chunks of the extent having their data stored in a storage tier that does not have the preferred media type and preferred RAID type are determined. Each of the one or more chunks are thereby determined in step 21704 as being stored in a current storage tier that may be characterized as unsuitable or not preferred for the chunk based on the I/O density and write probability of the extent including the chunk. At step 21706, a determination is made as to whether step 21704 identified any chunk(s) currently stored in a storage tier having a media type and RAID type and configuration that does not match those preferred as determined in step 21702. If step 21706 evaluates to no whereby no chunk is identified in step 21704, control proceeds to step 21710 to process and select a next extent in step 21702. If step 21706 evaluates to yes, for each of the one or more chunks identified, processing may be performed to relocate the chunk to a storage tier having the preferred media type and preferred RAID type and configuration. Relocating a chunk from a current to a target storage tier may include allocating storage for the chunk in the target storage tier and mapping the newly allocated storage to the chunk corresponding logical address subrange of the thin LUN including the chunk. From step 21708, control proceeds to step 21710.

It should be noted that the number of chunks moved or relocated as a unit in step 21708 may vary with the level of data movement granularity used in an embodiment. For example, one embodiment in accordance with techniques herein may move a group of chunks as a unit such as in an embodiment having a subextent as the data movement granularity. In another embodiment in accordance with techniques herein, individual or single chunks may be moved or relocated having a chunk as the data movement granularity.

It should also be noted that processing may be performed responsive to consuming more than a threshold amount of capacity of one or more storage tiers having one or more particular characteristics such as a particular RAID-type and/or media type. Such processing may be performed to evict or relocate data portions currently stored therein to make additional storage capacity available in storage tiers of a particular media type and/or particular RAID-type and configuration. Such relocation may consider both RAID type and media type as described above, such as in connection with FIG. 39 processing. As another option, such processing may consider just one of the foregoing when determining what data portions to evict or relocate. For example, one embodiment in accordance with techniques herein may determine that there is an insufficient amount of available storage in storage tiers having RAID-1 configuration. In such an embodiment, selection of data portions for eviction or movement from a RAID-1 tier may be those data portions having a low write probability. Similarly, if it is determined that there is an insufficient amount of available storage in storage tiers having RAID-6 configuration. In such an embodiment, selection of data portions for eviction or movement from a RAID-6 tier may be those data portions having a high write probability (e.g., more suited for RAID-1). The target storage tier to which such evicted data portions may be moved may have a media type that is the same or higher in the performance ranking of media types.

Many I/O workloads exhibit time-dependent workflow patterns in terms of random I/O reads, random I/O writes, and prefetch or sequential I/O reads. Such I/O workloads typically alternate between periods of high activities and low activities as workload characteristics may change, for example, from daytime to nighttime activities or from weekday to weekend activities. In a multi-tiered storage system as described herein, such workloads may inevitably causes disastrous SLO violations, performance degradation and even service unavailability. To address this, described herein is are techniques based on mathematical models of autocorrelation in a time series analysis, called auto-regressive integrated moving average (ARIMA) models, which are capable of capturing periodic patterns and trends of workload I/O access to predict the future load demand, and thus, attempt to migrate the data across different storage tiers and also guarantee multiple SLO requirements for applications under dynamic workloads. Thus, techniques herein using such ARIMA models may be used to achieve improvements in I/O workload patterns prediction and enhances overall performance, such as maintaining SLOs and SLEs as described herein.

As described in more detail elsewhere herein, the I/O statistics collected at a sub-LUN level in an embodiment in accordance with techniques herein may be analyzed to facilitate determining an I/O workload pattern and which may be used to predict future I/O workload directed to each sub-LUN based on its previous I/O workload or activity. It may be desirable to use a forecasting technique such as described herein based on the ARIMA models to provide for accurate I/O workload predictions for use in modeling data storage system workload performance used, for example, in determining data movements. For example, for a current time period for a first extent having a current I/O workload, modeling techniques described herein based on the ARIMA models may be used to accurately predict a future I/O workload for the first extent in the next time period. Such future I/O workload prediction for an extent may be used to determine whether, for the next time period, the I/O workload is expected to increase and thus a data movement may be made prior to the next time period to promote data portions of the extent to a higher performance storage tier in anticipation of its expected increased I/O workload. In a similar manner, such future I/O workload prediction for an extent may be used to determine whether, for the next time period, the I/O workload is expected to decrease and thus a data movement may be made prior to the next time period to demote data portions of the extent to a lower performance storage tier in anticipation of its expected decreased I/O workload.

Figure 40:
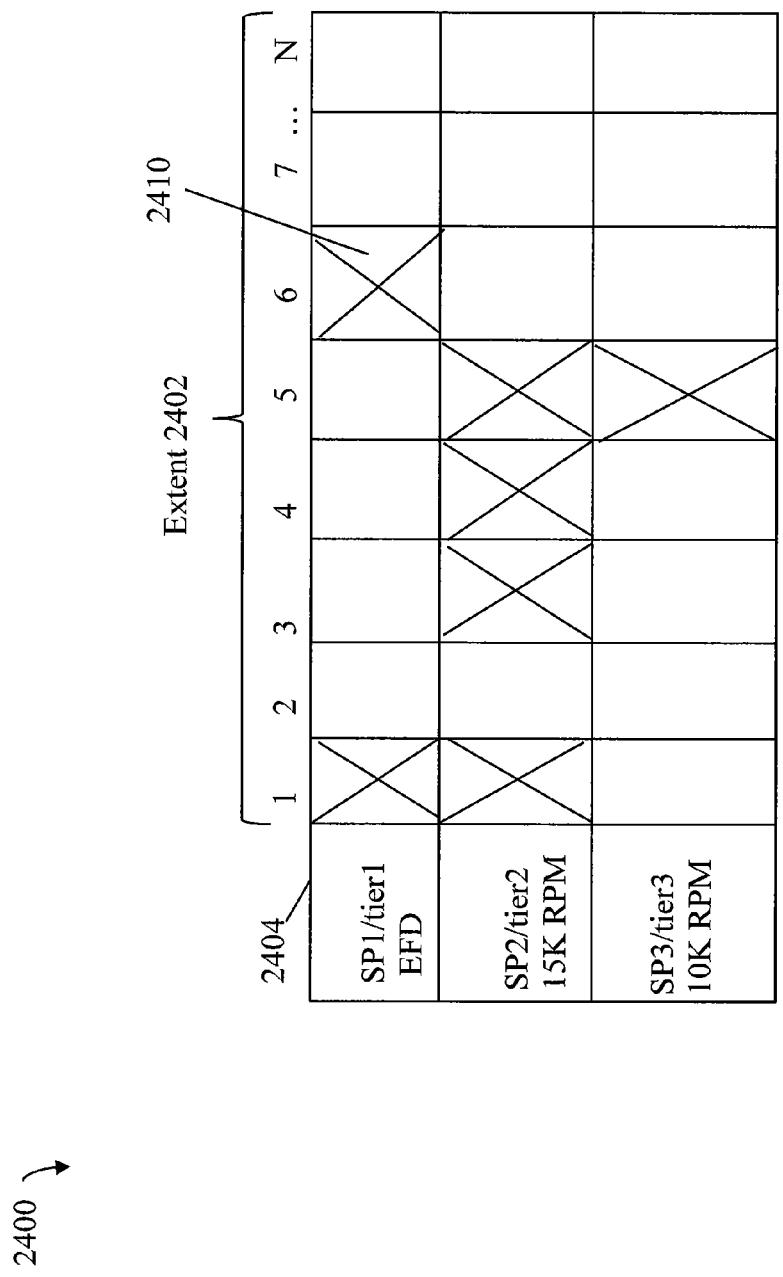
FIGS. 40 and 41 illustrate I/O statistics that may be collected and tracked for extents in an embodiment in accordance with techniques herein.

Referring to FIG. 40, shown is an example illustrating I/O statistics that may be tracked and maintained for a single logical device, such as a LUN that is a thin or virtually provisioned logical device, in an embodiment in accordance with techniques herein. The example 2400 is a table of entries or cells with columns denoting particular extents 1 through and rows 2404 denoted the different SPs configured from PDs of different storage tiers. In this example, SP1 is a pool of flash drives or EFDs, SP2 is a pool of 15K RPM rotating disk drives, and SP3 is a pool of 10K RPM rotating disk drives. A set of I/O statistics may be tracked and maintained for each cell or entry of the table whereby up to 3 sets of I/O statistics may be tracked and maintained for each extent. In this example, a set of I/O statistics may be tracked for a particular entry denoted by a particular extent number and a particular SP or tier if there has been any physical storage allocated for that particular extent on the particular SP or tier. For example, as described herein, the unit of allocation and data movement may be at the chunk subextent level. Thus a single extent may have storage allocated in multiple SPs or storage tiers. For example, each entry of the table 2400 including an "X" may denote a particular extent having physical storage allocated on a particular SP or storage tier. For example, extent 1 has storage allocated in SP 1/tier 1 and SP 2/tier 2, extent 3 has storage allocated in SP2/tier2, extent 5 has storage allocation in SP 2/tier 2 and SP 3/tier 3. Each entry, such as 2410, of the table may include a set of I/O statistics as described in more detail below.

Figure 41:
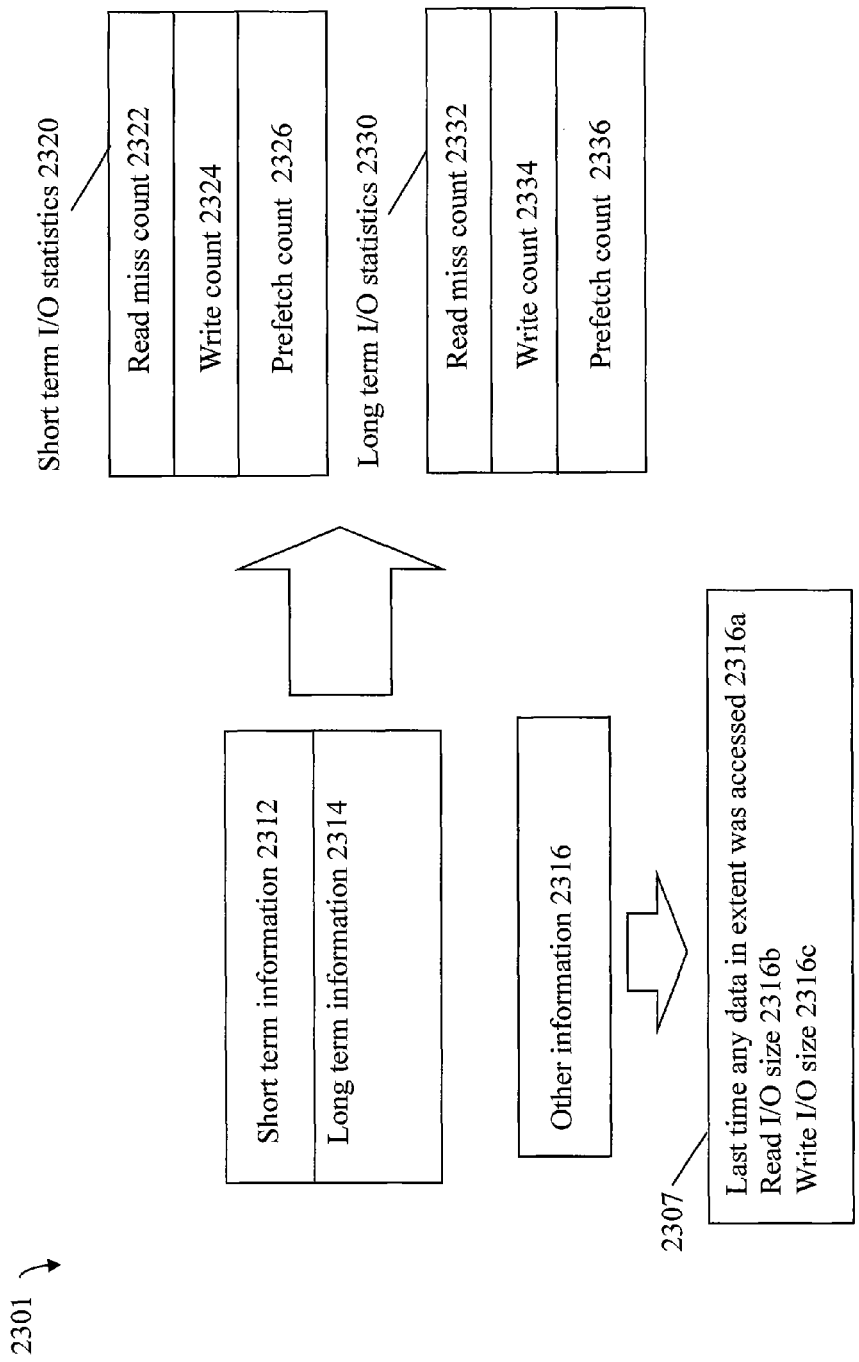

Referring to FIG. 41, shown is an example of information that may be collected and used in connection with each extent in an embodiment in accordance with techniques herein. The example 2301 illustrates a set of I/O statistics that may be tracked and maintained for each entry 2410 of the example 2301 where the entry denotes a particular extent having storage allocated on a particular SP including PDs of one of the possibly multiple storage tiers. The example 2301 illustrates that short term information 2312, long term information 2314 and other information 2316 may be collected for each extent. The short term information 2312 and long term information 2314 may be used in connection with determining short term I/O statistics 2320 and long term I/O statistics 2330 for each extent. The statistics included in 2312, 2314, 2320 and 2330 may reflect activity with respect to a single extent's data portions stored on one of the SPs or a single one of the tiers. For example, an embodiment in accordance with techniques herein may include 3 storage tiers such as described in connection with FIG. 40 where data portions of a single extent may be stored in 3 different SPs and each of the 3 SPs may include physical drives of a different one of the storage tiers. In this case, 3 instances of the information of 2301 may be tracked and maintained for each extent of a logical device, such as a LUN that is a thin or virtually provisioned logical device.

The other information 2316 that may be collected is illustrated in further detail by element 2307 and may include, for example, the last time any data in the extent was accessed 2316a, read I/O size 2316b, and write I/O size 2316c. The read I/O size 2316b may denote one or more sizes of read I/Os observed as well as a count or number of reads of the particular sizes. as may be desired, an embodiment may track read I/O sizes for sequential or prefetch reads separately from read I/O sizes for random reads. Alternatively, an embodiment may track read I/O size as an average across all reads. In a similar manner, an embodiment may track write I/O size 2316c with respect to write I/Os observed. The last time any data in the extent was accessed 2316a, also referred to as access time 2316a, may be used to denote between extents which extent was most recently accessed or had I/O activity. The access time 2316a may be used in an embodiment as described in following paragraphs as criterion for selecting data portions for data movement. In an embodiment in which the data movement level of granularity is at the sub-extent level or a single chunk level, the access time 2316a may be used in conjunction with extent level I/O statistics to identify particular chunks which are most active, and/or as idle or least active as particular chunks of the extent which may be selected as candidates for data movement.

As will be described in following paragraphs, the short term I/O statistics 2320, long term I/O statistics 2330 and other information 2316 may be used in connection with a variety of different evaluations such as by the optimizer. Generally, the activity level information or data for an extent such as illustrated in FIG. 41 may be referred to as extent activity level information or I/O statistics denoting I/O workload directed to the extent where such information includes one or more metrics indicating an activity level for the extent. The extent activity level information may comprise short term activity information (e.g., such as 2312 and/or 320) and long term activity information (e.g., such as 2314 and 2330).

In one embodiment, the short term I/O statistics 2320 for an extent may include a read miss count 2322, a write count 2324 and a prefetch count 2326 for the extent. The long term I/O statistics 2330 for an extent may include a read miss count 2332 (e.g., number of read misses, where a read miss refers to a cache miss for a read), a write count 2334 (e.g., number of writes and a prefetch or sequential read count 336 (e.g., number of prefetches) for the extent. As known in the art, data may be prefetched from a physical device and placed in cache prior to reference or use with an I/O operation. For example, an embodiment may perform sequential stream I/O recognition processing to determine when consecutive portions of a thin device are being referenced. In this case, data of the sequential stream may be prefetched from the physical device and placed in cache prior to usage in connection with a subsequent I/O operation. In connection with a portion of data at a first point in a sequential stream associated with a current I/O operation, data subsequent to the first point may be prefetched such as when obtaining the portion from a physical device in anticipation of future usage with subsequent I/Os. Each of the foregoing counts of 2320 and 2330 may be denote a count or amount of the I/O of the particular type associated with each I/O statistic. It should be noted that description herein may refer to I/O statistics maintained which are expressed in terms of a count. Alternatively, an embodiment may use other values to reflect the I/O statistics. For example, an embodiment may use rates which denote a count with respect to any unit of time, such as per second, per hour, and the like. In connection with describing elements 2312 and 2314 in more detail, what will be described is how an embodiment in accordance with techniques herein may collect I/O statistics in a current time period and use such I/O statistics from the current time period and one or more other prior time periods to determine predicted values for the next time period for the short term I/O statistics 2320 and long term I/O statistics 2330 using an ARIMA modeling equation.

It should be noted that as a variation from that described above in connection with 2320, an embodiment may use a single short term read count that is an aggregated value of 2322 and 2326 rather than separate counts 2322 and 2326. In a similar manner in connection with 2330, an embodiment may using a single long term read count that is an aggregated value of 2332 and 2336 rather than separate counts 2332 and 2336.

As described in more detail below, data may be collected for a time period. For example, an embodiment may periodically collect a set of statistics such as at every occurrence of a fixed time interval. The collected information may include counts of the number of observed I/O operations occurring during that particular time period or data collection period for each particular I/O statistic as in FIG. 41. Using such collected I/O statistics based on observed values during the collection time period as well as possibly other observed values for I/O statistics from prior time periods and also associated error values of prior predictions, an ARIMA model described herein may be used to predict values for the I/O statistics for the next time period. It should also be noted that the read I/Os, for which statistics are collected in a time period and for which predictions are performed using the ARIMA equation described elsewhere herein, are read cache misses since read I/Os resulting in a cache hit are serviced using data already in cache generally having a very small or negligible contribution to overall response time.

For a data collection period "t−1", the ARIMA equation and modeling techniques as described in more detail elsewhere herein may be used to predict or forecast values for the I/O statistics 2320, 2330 in the next data collection period "t". In one embodiment in accordance with techniques herein, I/O statistics may be collected, for example, every 10 minutes to forecast future I/O workload for each extent and therefore plan ahead to determine in what storage tier to place data portions of the extent. The statistical forecasting method used in an embodiment in accordance with techniques herein is the ARIMA time series with the regression model. Using such ARIMA modeling, techniques herein may be used to detect and accurately model patterns such as, for example, a level or long term average where data fluctuates about a constant mean, a trend where data exhibits an increasing or decreasing pattern, seasonality where data over time exhibits a pattern that regularly repeats itself and is a constant length, and a cycle of patterns created by fluctuations. Thus, ARIMA time series are useful models for predicting future I/O workloads and may be used, for example, by the data storage optimizer as described herein for modeling and predicting I/O workload and determining data movements.

An ARIMA model may be generally classified based on its parameters p, d and q, thereby denoted as an "ARIMA (p,d,q)" model, where:

p is the number of auto-regressive terms (e.g., order of AR), d is the number of nonseasonal differences needed for stationarity (e.g., order of differencing), and q is the number of lagged forecast errors in the prediction equation (e.g., order of MA).

The parameters p, d and q are non-negative integers that refer to the order of the auto-regressive, integrated, and moving average parts of the model respectively. When two out of the three parameters are zeros, the model may be referred to as the non-zero parameter. For example, dropping "AR", "I" or "MA" from the acronym describing the model. For example, ARIMA(0,1,0) is (1), and ARIMA(0,0,1) is MA(1).

In accordance with techniques herein using an ARIMA time series forecasting model, the model uses the last "t" periods in order to predict I/O workload and performance in period "t+1". Such prediction in the future depends on the most recent and also older observed I/O workload statistics. Such ARIMA models may be used with I/O workload data that, over time, exhibits a repeated pattern.

The acronym ARIMA stands for Auto-Regressive Integrated Moving Average. Lags of the stationarized series in the forecasting equation are called "auto-regressive" terms, lags of the forecast errors are called "moving average" terms, and a time series which needs to be differenced to be made stationary is said to be an "integrated" version of a stationary series. Random-walk and random-trend models, auto-regressive models, and exponential smoothing models are all special cases of ARIMA models.

A time series, such as $X_t, X_{t+h}, X_{t+2h}, \ldots$, is a collection of data or recorded observations) over a period of time (e.g., weekly, monthly, quarterly, or yearly) where "h" may denote the above of time between observations or the "sampling frequency". An analysis of a history that is a time series may be used to make current decisions and plans based forecasting assuming past patterns will continue into the future. Generally, there are four components to a time series: the trend, the cyclical variation, the seasonal variation, and the irregular variation.

Stationarity may be characterized as a property denoting when the probabilistic distribution of each observation is the same as the probabilistic distribution of every other data point. Stationarity does not denote that the time series never changes, but rather that its probabilistic distribution does not (e.g., statistical properties such as mean, variance, autocorrelation, etc. are all constant over time). In connection with analyzing observed values in a history or time series, processing may determine whether there is evidence of a trend or seasonality. Depending on the type of trend or seasonality, the nonstationarity may be removed in different ways such as, for example, by using simple difference to subtract out or remove a trend or seasonal component from the original series.

Autocorrelation refers to the correlation of a time series with its own past and future values. Autocorrelation is also sometimes called "lagged correlation" (e.g., the likelihood of tomorrow being rainy is greater if today is rainy than if today is dry). An important guide to the persistence in a time series is given by the series of quantities called the sample autocorrelation coefficients, which measure the correlation between observations at different times. The set of autocorrelation coefficients arranged as a function of separation in time is the sample autocorrelation function (e.g., also referred to as correlogram or ACF). The correlation may be computed between one time series and the same series "lagged" by one or more time units. For the first-order autocorrelation, the lag is one time unit. The first-order autocorrelation coefficient is the simple correlation coefficient of the first N−1 observations $X_t$, t=1, 2, . . . , N−1, and the next N−1 observations $X_t$, t=2, 3, . . . , N.

Differencing may be characterized as the transformation of a series to a new time series where the values are the differences between consecutive values. The procedure may be applied consecutively more than once giving rise to first differences, second differences, and the like. For example, first order differences may be computed as $d^1_t = X_t - X_{t-1}$. Second order difference may be computed as $d^2_t = d^1_t - d^1_{t-1}$.

ARIMA models are, in theory, the most general class of models for forecasting a time series which can be made to be "stationary" by differencing (if necessary), and that its autocorrelations (correlations with its own prior deviations from the mean) remain constant over time. A random variable of this form may be characterized as a combination of signal and noise, and the signal may be a pattern of fast or slow mean reversion, or sinusoidal oscillation, or rapid alternation in sign, and it may also have a seasonal component. In one aspect, an ARIMA model can be viewed as a "filter" that tries to separate the signal from the noise, where the signal may then be extrapolated into the future to obtain forecasts.

The ARIMA forecasting equation for a stationary time series is a linear (i.e., regression-type) equation in which the predictors consist of lags of the dependent variable and/or lags of the forecast errors. In the ARIMA forecasting equation, a predicted value for Y, may be expressed using a constant and/or a weighted sum of one or more recent observed values of Y and/or a weighted sum of one or more recent values of the errors (based on differences between previous observed and previous predicted values). A series which needs to be differenced to be made stationary is an "integrated" (I) series. A lagged value or lag is a value associated a previous time period. Lags of the stationarized series are called "auto-regressive" (AR) terms. Lags of the forecast errors are called "moving average" (MA) terms.

Figure 41B:
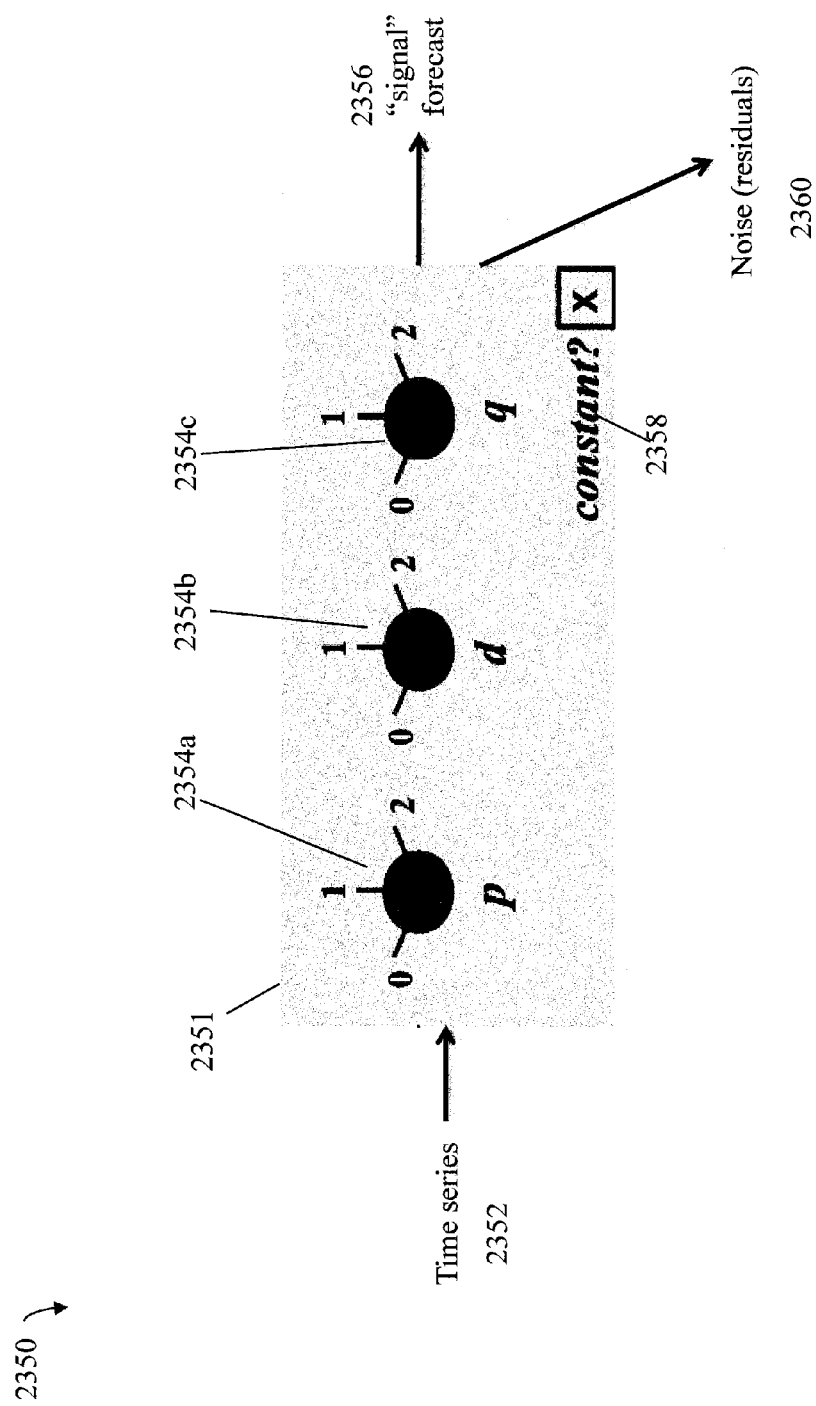
FIG. 41B is an example representation of an ARIMA model that may be used in an embodiment in accordance with techniques herein.

Referring to FIG. 41B, shown is an example representation of an ARIMA model (as may be expressed using the ARIMA forecasting equation described elsewhere herein) as a filtering box 2351 whereby the time series is provided as an input 2352 that generates an output signal 2356 representing a forecasted value generated by the model. An additional output may be noise or residuals 2360. Analysis may be performed of the time series whereby the knobs 2354a-c denoting values of the parameters p, d and q are adjusted until the residuals 2360 are uncorrelated "white noise". Element 2358 may denote a constant value of the ARIMA equation described in more detail elsewhere herein.

Thus, observed values for a particular I/O statistic or set of I/O statistics may be collected as a result of an application issuing I/O operations. The collected data of the I/O statistics may form a training set which is analyzed to determine an ARIMA model that accurately models or captures the I/O workload behavior (e.g., patterns, trends, etc.) exhibited by the training set of collected I/O statistics. In this manner, the particular ARIMA model may be used to model or predict I/O statistics characterizing the application's I/O workload over time. Furthermore, the I/O operations issued by the application may have associated characteristics or properties denoting an I/O workload of the application.

An original time series, Y, of observed time series data may be collected and analyzed to identify an appropriate ARIMA model that accurately captures the original series Y. Let y denote the differenced (stationarized) series. To identify the appropriate ARIMA model for Y, the data of Y may be examined to determine the order of differencing (e.g., d parameter value) needing to stationarize the series. For example:

If d=0, then $y_t$ (as used in the ARIMA equation 2501 of FIG. 42)=$Y_t$.

If d=1, then $y_t$ (as used in the ARIMA equation 2501 of FIG. 42)=$Y_t - Y_{t-1}$ (e.g., difference between observed values for I/O statistic in time period t and t−1).

Figure 42:
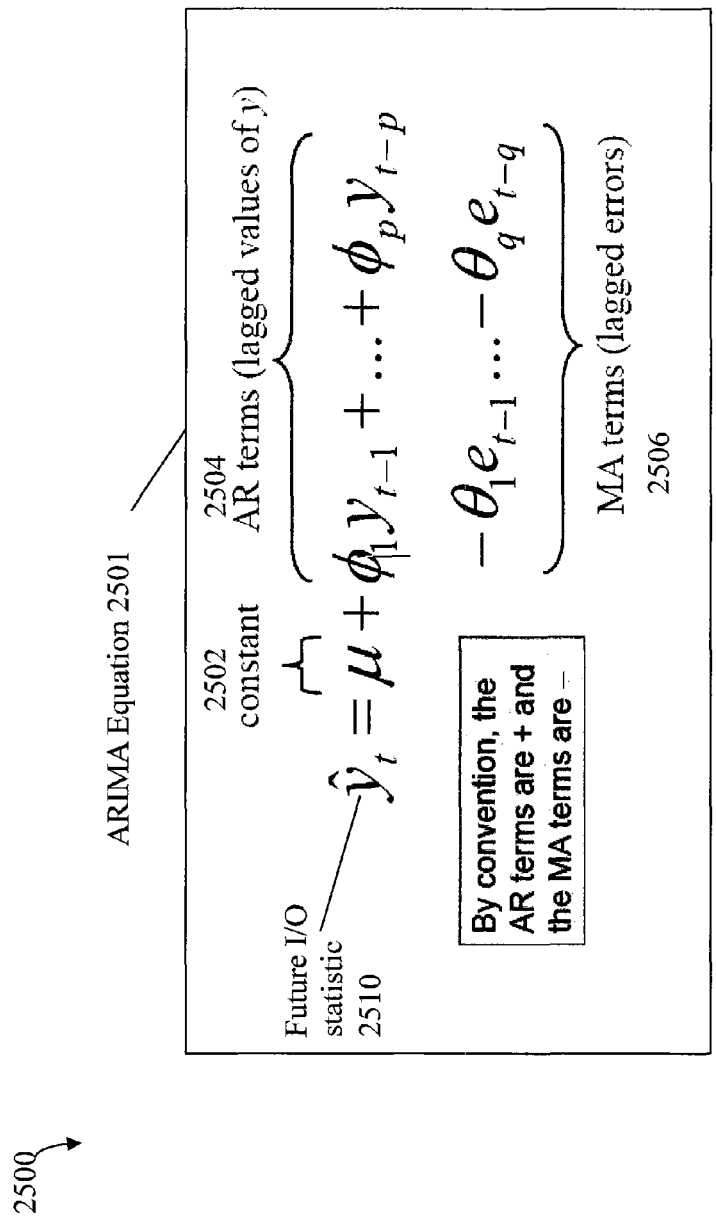
FIG. 42 is an example illustrating an equation or function that may be used in an ARIMA model in an embodiment in accordance with techniques herein.

If d=2, then $y_t$ (as used in the ARIMA equation 2501 of FIG. 42)

$$=(Y_t - Y_{t-1}) - (Y_{t-1} - Y_{t-2}) = Y_t - 2Y_{t-1} + Y_{t-2}.$$

Note that a difference value of d=1 means that there is no trend in the observed I/O statistic over time and it may be characterized as stationary. Note that the second difference case where d=2 is not the difference from 2 prior periods. Rather, it is the first-difference-of-the-first-difference (e.g., difference of two differences which is the discrete analog of the second derivative or the local acceleration of the series rather than its local trend). In the foregoing note that each upper case "$Y_i$" denotes an observed value for the I/O metric for time period "i" used to calculate lower case "$y_t$" values denoting any differencing used in the ARIMA equation such as in FIG. 42 described below.

Referring to FIG. 42, shown is an example of the ARIMA forecasting equation 2501 that may be used in an embodiment in accordance with techniques herein. In the ARIMA equation 2501, $\hat{y}_t$ 2510 denotes the future I/O statistic being predicted for the next time period t;

μ 2502 denotes a constant (e.g., 2358 of FIG. 41B) which may be the mean of the training data set used to determine the ARIMA model;

AR terms 2504 denotes lagged values of Y for the observed I/O statistics of the time series expressed using the difference terms y (e.g., $d^{th}$ difference of each Y, d being the ARIMA parameter), in the last previous "p" time periods or sampling periods (e.g., window or how many previous observed I/O statistics considered);

MA terms 2506 denotes the lagged error terms for time periods t−1 through t−q where each such error term denotes an error between the observed and the predicted I/O statistic for a time period. For example, an embodiment may determine an error term for a time period as the square of the difference between an observed and predicted value for that time period. For example, $e_{t-1}$ denotes the error for time period t−1 which may be calculated as the square of the difference between $\hat{y}_{t-1}$, the predicted value of I/O statistic for time period t−1, and $Y_{t-1}$, the observed value of the I/O statistic for time period t−1 (e.g., the difference$^2$ or raised to the power of 2);

$\theta_1$ through $\theta_q$ are coefficients or weights associated with the error values or MA terms; and $\Phi_1$, through $\Phi_p$ are coefficients or weights associated with the AR terms.

In the foregoing, each of the AR terms 2504 includes a $y_i$, where i is a value in the inclusive range t−1 through t-p, where each $y_i$, denotes a difference of level "d" ($d^{th}$ difference) for Yi, the observed value of the I/O statistic in time period i.

It should be noted that in connection with determining the ARIMA model, various values for the foregoing weights may be tried in a manner similar to determining other model parameters in order to select suitable values for the weights used in the final determined ARIMA model based on the training data to obtain small or minimum error values. Generally, the values for the parameters Φ and θ express how much a forecasted value will react, respectively, to observed differences and previous predictions. If stable predictions with smoothed random variation are desired, then small values of $\Phi_1$ through $\Phi_p$ and $\theta_1$ through $\theta_q$ may be used. In contrast, if a rapid response to a real change in the pattern of observations is desired, large values for $\Phi_1$ through $\Phi_p$ and $\theta_1$ through $\theta_q$ may be used.

Regarding the AR coefficients $\Phi_1$ through $\Phi_p$, the AR(1) coefficient $\Phi_1$, determines how fast the series tends to return to its mean. If the coefficient is near zero, the series returns to its mean quickly. If the coefficient is near 1, the series returns to its mean slowly. In a model with 2 or more AR coefficients, the sum of the coefficients determines the speed of mean reversion and the series may show an oscillatory pattern.

Generally, short term I/O statistics as used in an embodiment in accordance with techniques herein may be contrasted with long term I/O statistics in connection with parameter values selected for p and q for use with an ARIMA equation. Short term I/O statistics being modeled may use a smaller window of time and hence less time periods than that used with long term statistics. Thus, values for parameters p and q used when modeling a short term I/O statistic with an ARIMA equation are smaller than other values for parameters p and q used when modeling a long term I/O statistic. For example, in one embodiment, a short term I/O statistic may look at observed I/O statistics for time periods forming a 24 hour window (e.g., look back in time series at observed values within the previous 24 hours), and a long term I/O statistic may look at observed I/O statistics for time periods forming a 5 day window (e.g., look back in time series at observed values within the previous 5 days). Thus, values for p and q may be selected so that the time window spanned by the lagged values or terms of the AR terms 2504 and MA terms 2506 meets the time windows, for example, of 24 hours for short time statistics and 5 days for long term statistics. The values for p and q may be determined based on the sampling frequency between time periods of data collection and the desired time window of observed values considered for each of the short term and long term I/O statistics.

Additionally, values selected for the particular coefficients or weights, such as for the AR terms and the MA terms (e.g., $\Phi_1$ through $\Phi_p$ and $\theta_1$ through $\theta_q$), may vary with whether the I/O statistic is a short term or long term statistic. Generally, long term I/O statistics may use values for the foregoing coefficients which are close to 0 and short term I/O statistics may use values for the foregoing coefficients which are close to 1.

It should be noted that with a short term I/O statistic, values of the coefficients or weights $\Phi_1$ through $\Phi_p$ and $\theta_1$ through $\theta_q$ may be selected to give greater weight to the more recently observed I/O statistics than for a long term I/O statistic.

As a variation to the foregoing, depending on the particular pattern of the I/O statistic being modeled, an embodiment may use the same values for p, d and q for the ARIMA equation for both the short term and long term variation of the I/O statistic and may accurately model any further variations between the short term and long term variation of the I/O statistic by using different suitable values for the coefficients of the AR terms (e.g., $\Phi_1$ through $\Phi_p$) and coefficients of the MA terms (e.g., $\theta_1$ through $\theta_q$).

Thus, with reference back to FIG. 41, generally, an embodiment in accordance with techniques herein may determine and use different sets of values for p, q, d and the coefficients of the AR terms (e.g., $\Phi_1$ through $\Phi_p$) and coefficients of the MA terms (e.g., $\theta_1$ through $\theta_q$) to model the different short term I/O statistics 2320 and long term I/O statistics 2330. For example, a first set of the foregoing values defining a first ARIMA model may be used for modelling the short term read miss count 2322, a second set of the foregoing values defining a second ARIMA model may be used for modelling short term write count 2324, and the like, for each of the I/O statistics in 2320 and 2330.

Figure 43:
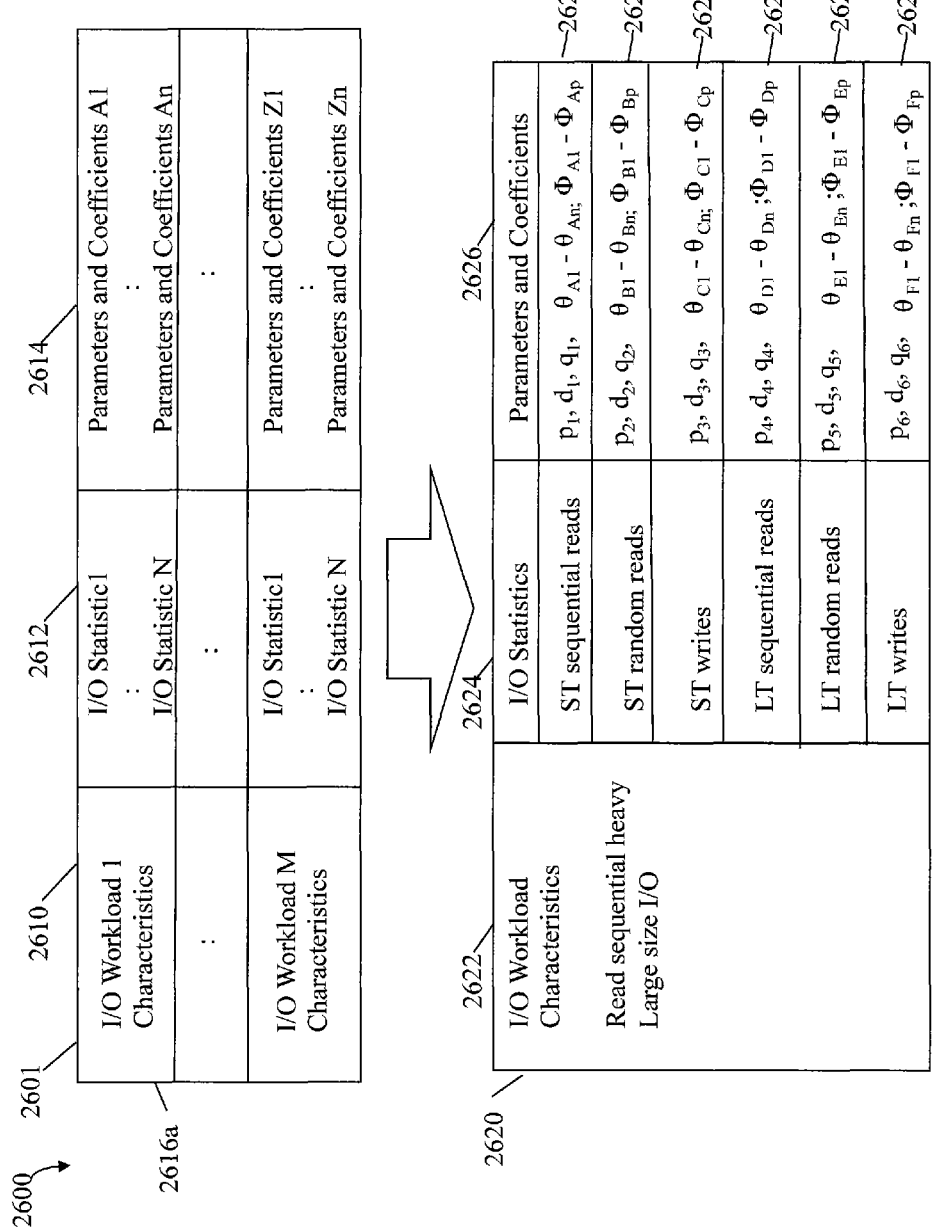

Referring to FIG. 43, shown is an example 2600 illustrating selection of values for use with the ARIMA equation to model I/O statistics in an embodiment in accordance with techniques herein. The example 2600 includes a table 2601 of sets of values for the parameters and coefficients as may be used in an embodiment in accordance with techniques herein. The table 2601 includes a first column 2610 of I/O workload characteristics, a second column 2612 of I/O statistics, and a third column 2614 of sets of values of parameters and coefficients for the ARIMA equation. The information in table 2601 may be determined from analyzing different patterns and trends of the different I/O statistics for different types of I/O workload characteristics that may be exhibited by an application. An embodiment in accordance with techniques herein may select a row of the table for use in determining the particular values of parameters and coefficients to use for modeling particular I/O statistics for a given set of I/O workload characteristics. For example, row 2616a specifies that, for an application exhibiting I/O workload 1 characteristics, parameters and coefficients A1 denotes the particular values to use with the ARIMA equation to model I/O statistic 1, and parameters and coefficients An denotes the particular values to use with the ARIMA equation to model I/O statistic N.

Element 2620 provides more detail of what may be specified in the table 2601 for each set of I/O workload characteristics. In this example, 2622 indicates that the application exhibits I/O workload characteristics of read heavy, sequential, and large size I/O. The application may be directing its I/O stream to a set of one or more LUNs for which techniques herein are performed. In one embodiment, the I/O workload observed may be characterized as follows: read heavy (e.g., more reads than writes) or write heavy (e.g. more writes than reads), whether I/Os are primarily (e.g., more than 50%) sequential or random, and whether the average I/O size is large or small (e.g., more than a threshold may denote large size, less than the threshold may denote small size). Alternatively, an embodiment may use different I/O size ranges to classify the I/O workload size attribute. For example, different sets of values for parameters and coefficients may be specified for different average I/O sizes such as 4K block size, 8K block size, 16K block size, and 32K block size.

In the example 2620, column 2622 indicates the I/O workload characteristics of read heavy, where observed I/Os are primarily sequential. Additionally, the average I/O size is large I/Os (e.g., the average I/O size may be larger than a threshold value). For the I/O workload 2622, when modeling or predicting a particular I/O statistic as denoted in a particular row of column 2624, a corresponding set of values for parameters and coefficients 2626 may be selected from the same row. For example, when modeling short term (ST) sequential reads, ST random reads, ST writes, long term (LT) sequential read, LT random reads, and LT writes, values of 2628a-f, respectively, may be used.

Although 2620 provides detail for one particular set of I/O workload characteristics, information of 2620 may be similarly specified for other sets of I/O workload characteristics.

Thus, as generally illustrated by the example 2600, the values of the parameters and coefficients used for the ARIMA model may vary in accordance with the observed I/O workload characteristics for an application.

In one embodiment, the table may 2601 may specify the same values, such as p=X and q=Y, for each short term I/O statistic for all I/O workload characteristics. The table 2601 may specify the same values, such as p=X2, q=Y2, for each short term I/O statistic for all I/O workload characteristics. The table 2601 may vary the values used for the d parameter, the coefficients of the AR terms (e.g., $\Phi_1$ through $\Phi_p$) and coefficients of the MA terms (e.g., $\theta_1$ through $\theta_q$) based on the I/O workload characteristics. In such an embodiment, for a particular I/O workload, the same first set of values for parameters and coefficients may be used with the ARIMA equation to model all long term I/O statistics, and the same second set of values for parameters and coefficients may be used with the ARIMA equation to model all short term I/O statistics.

To further illustrate, consider a first application that is an OLTP (online transaction processing) application that has an I/O workload that is primarily small I/O size, primarily random I/Os and primarily read I/Os. Also consider a second application that is an OLAP (Online Analytical Processing) or DSS (Decision Support System) application that has a large average I/O size, primarily sequential I/O, and primarily read I/Os.

With reference to FIG. 44, shown is an example of I/O workload characteristics and parameter and coefficient values that may be used an embodiment in accordance with techniques herein. The example 2700 includes element 2710 specifying observed I/O workload characteristics for a DSS application (as mentioned above) and element 2720 specifying observed I/O workload characteristics for an OLTP application (as mentioned above). Table 2730 is a table that specifies values of parameters and coefficients that may be used for each of the foregoing two I/O workload characteristics. Row 2732 indicates values for parameters and coefficients that may be used with the ARIMA equation to model all I/O statistics for the OLTP application having the I/O workload characteristics as denoted in 2720. Row 2734 indicates values for parameters and coefficients that may be used with the ARIMA equation to model all I/O statistics for the DSS application having the I/O workload characteristics as denoted in 2710.

As a variation to the foregoing, rather than specify a single set of values for the parameters and coefficients to use for predicting all I/O statistics for an I/O workload as with table 2730, an embodiment may use table 2740 to specify different values for the AR and MA coefficients to use for short term (ST) and long term (LT) I/O statistics for each I/O workload type. For example, row 2742 specifies that, for the OLTP I/O workload (e.g., such as indicated in 2720), values for the coefficients 2742a may be used for all ST I/O statistics and values for the coefficients 2742b may be used for all LT I/O statistics. Row 2744 specifies that, for the DSS I/O workload (e.g., such as indicated in 2710), values for the coefficients 2744a may be used for all ST I/O statistics and values for the coefficients 2744b may be used for all LT I/O statistics.

Thus, whether the same values for the "d" parameter and/or the same values for the coefficients may be used with predicting different I/O statistics modeled with the ARIMA equation varies with the particular pattern, trend, and the like, exhibited by the I/O statistics for each particular I/O workload considered in an embodiment.

Figure 45:
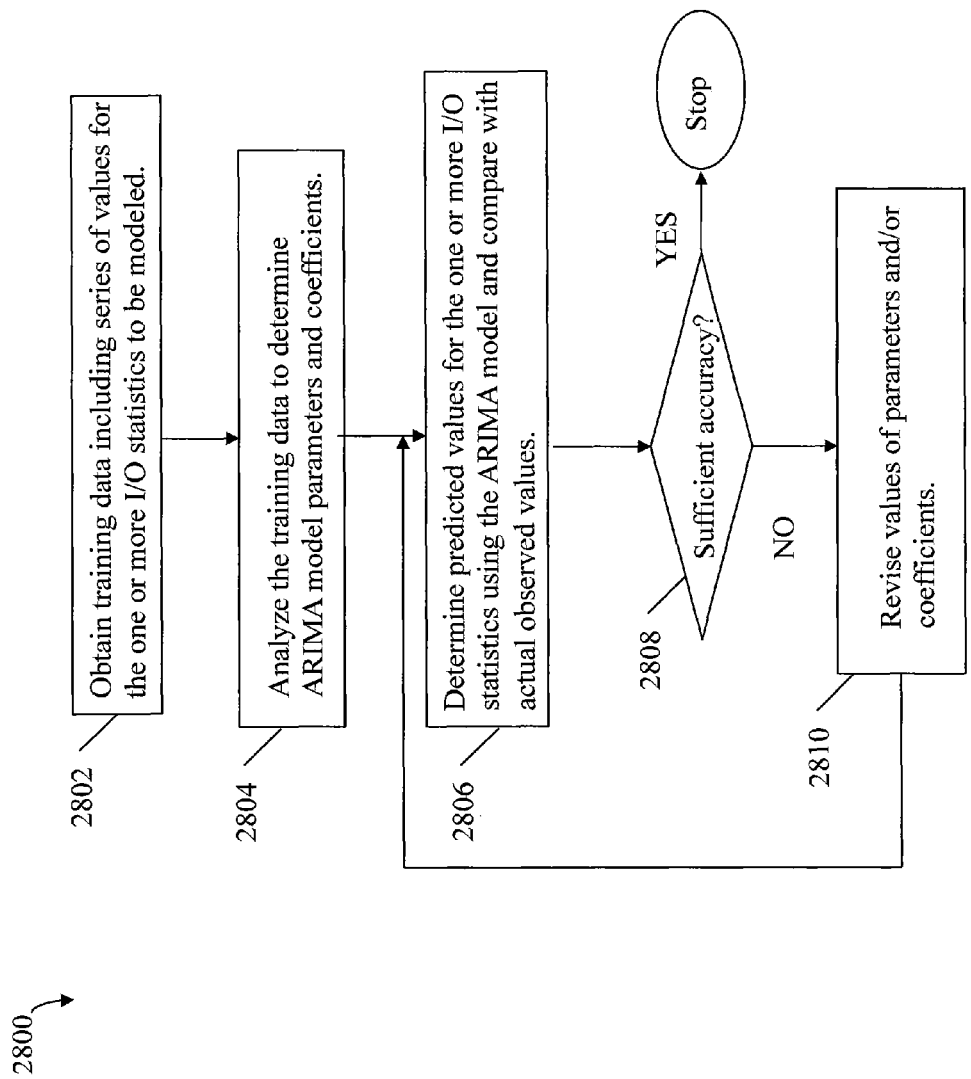
FIGS. 45, 45B, 46 and 48 are flowcharts of processing steps that may be performed in an embodiment in accordance with techniques herein.

Referring to FIG. 45, shown is an example of a flowchart 2800 of processing that may be performed in an embodiment to build an ARIMA model in accordance with techniques herein. At step 2802, training data may be obtained that includes values for the one or more I/O statistics to be modeled. At step 2804, processing is performed to analyze the training data and determine an initial set of values for the parameters p, d, and q, and the coefficients to use for the ARIMA model. Processing for step 2804 is generally known in the art. For example, step 2804 may include determining whether the series of observed values for the one or more I/O statistics being modeled is stationary. If the series is not stationary, the series may be converted to a stationary series by differencing where the original series is replaced by a series of differences and the model is then specified for the differenced series. Thus, a degree of differencing, as denoted by the "d" parameter value, may be determined in step 2804. At step 2806, predicted values may be determined for the one or more I/O statistics using the ARIMA model with the parameters and coefficients determined from step 2804. In step 2806, the predicted values may be compared with actual observed values for the one or more I/O statistics models. In step 2808, a determination is made as to whether the ARIMA model is sufficiently accurate. If so, processing stops and the current values for the parameters and coefficients may be used with the ARIMA equation as the ARIMA model to model the one or more I/O statistics. If step 2808 evaluates no, control proceeds to step 2810 to revise current values of any of the parameters and coefficients and then proceed to step 2806 with a revised ARIMA model.

It should be noted that the particular set of values used for parameters and coefficients in an ARIMA model generated using flowchart 2800 processing may be re-evaluated periodically, for example, using additional data sets including observed values for the I/O statistics. Such re-evaluation may be performed to reassess the accuracy of the ARIMA model and determine if further refinements are needed. For example, re-evaluation and modification of the current ARIMA model in use may be needed, for example, if the magnitudes of the most recent errors tend to be consistently larger than previous errors, or the recent forecast errors tend to be consistently positive or negative.

Once the ARIMA model is generated, it may be used to predict the one or more I/O workload statistics such as may be used by the data storage optimizer in an embodiment in accordance with techniques herein.

Figure 45B:
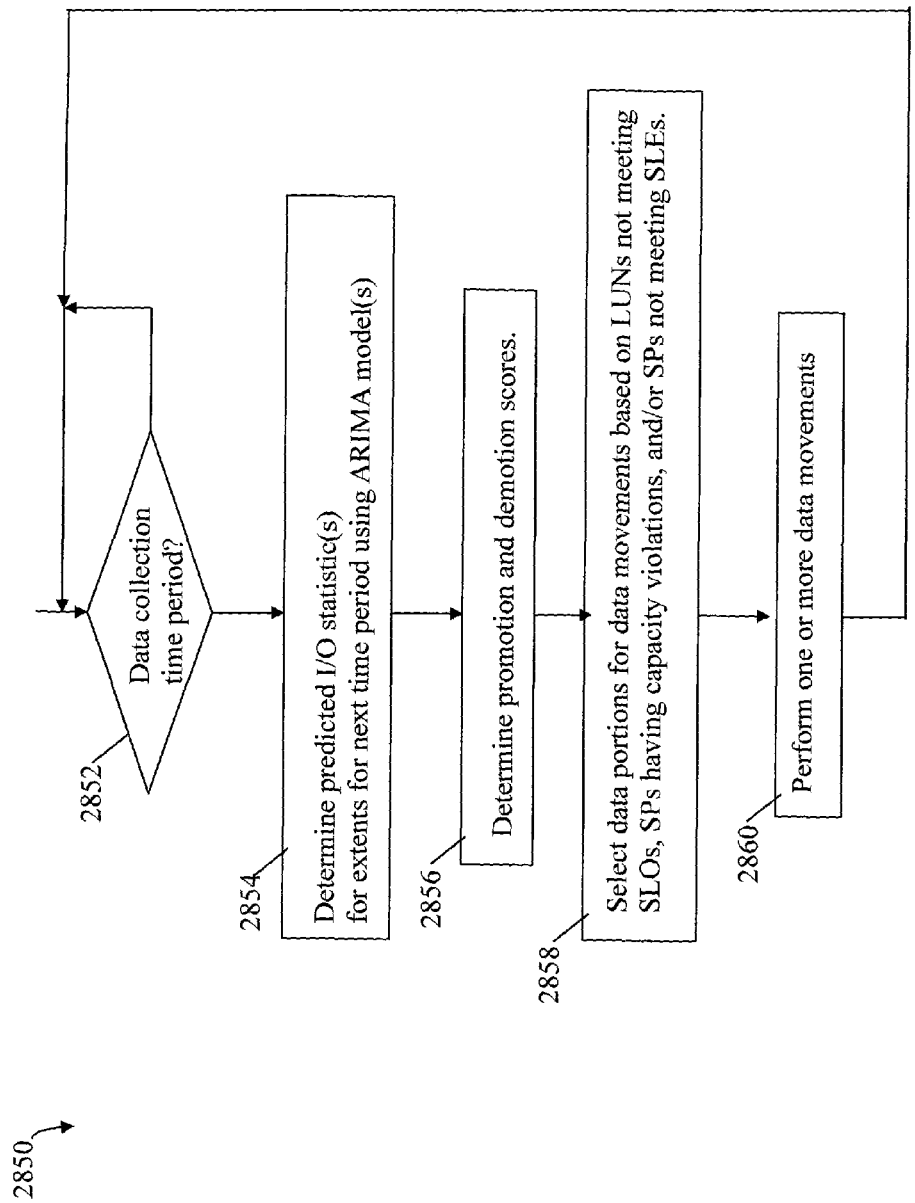

Referring to FIG. 45B, shown is an example of a flowchart 2850 of processing that may be performed in an embodiment using an ARIMA model in accordance with techniques herein. At step 2852, a determination is made as to whether it is time to perform another data collection.

As described herein, an embodiment may periodically, such as at each occurrence of a fixed time interval, perform data collection and subsequent processing of flowchart 2850. Control remains at step 2852 until step 2852 evaluates to yes. Once step 2852 evaluates to yes, control proceeds to step 2854. At step 2854, processing is performed to determine one of more predicted I/O statistics for each of one or more extents for the next time period using the one or more ARIMA models. As described herein, an ARIMA model may be used to predict one or more I/O statistics for each of one or more extents for the next time period. In step 2856, processing is performed to determine promotion and/or demotion scores, or more generally, to determine any metric based on the predicted I/O statistics from step 2854 reflecting the modeled I/O workload or activity for the extents in the next time period. Such predicted I/O statistics may be used, for example, in the calculation of the promotion and/or demotion scores or other suitable metrics that may be used to rank extents based on modeled I/O workload for the next time period. At step 2858, data portions are selected for data movement. As described elsewhere herein, such data portions may be selected based on LUNs not meeting SLOs, SPs having capacity violations, and/or SPs not meeting SLEs. Thus, step 2858 generally outlines different event occurrences that may trigger a data movement in an embodiment in accordance with techniques herein. Step 2858 processing is described in more detail elsewhere herein, such as FIGS. 46, 47 and 48, which may use any of the predicted I/O statistics from step 2854 and promotion and demotion scores from step 2856. At step 2860, one or more data movements may be performed to move data portions selected in step 2858 from current SPs and storage tiers to target SPs and storage tiers. From step 2860, control proceeds to step 2852 to wait for the next data collection period.

Figure 46:
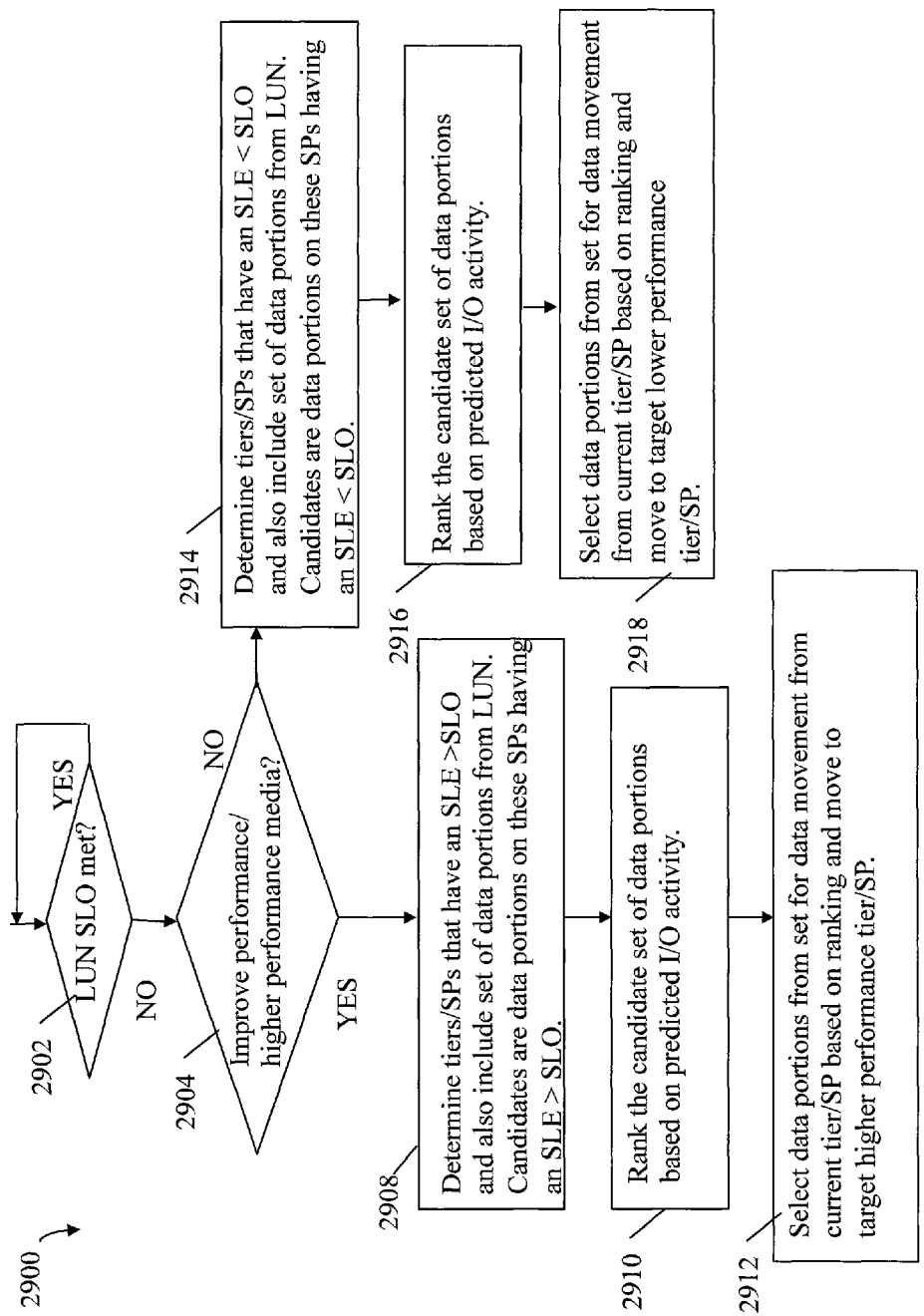

Referring to FIG. 46, shown is a flowchart 2900 of processing steps that may be performed in an embodiment in accordance with techniques herein with respect to a logical device, such as a LUN that may be a thin device, having a specified SLO. Although illustrated for a single LUN, the flowchart 2900 may be repeated for each desired LUN. At step 2902, a determination is made as to whether the SLO for the LUN is met. Processing remains at step 2902 until step 2902 evaluates to no. As described elsewhere herein, an embodiment may consider an SLO not being met if the current observed RT, for example, is above the specified RTO of the SLO whereby increased RT performance is needed to meet the specified SLO. Additionally, an embodiment may consider an SLO not being met if current observed RT performance is "too high" (e.g., the current observed RT is lower than the specified RTO of the SLO, for example, by a specified threshold amount). In this case, it may be desired to lower RT performance.

If step 2902 evaluates to no, control proceeds to step 2904 where a determination is made as to whether to improve performance by acquiring higher performance media for data portions of the LUN. Thus, step 2904 evaluating to yes means that the current observed RT is higher than the RTO of the SLO. Step 2904 evaluating to no means that the current observed RT is lower than the RTO of the SLO whereby current performance for the LUN is too high. If step 2904 evaluates to no, control proceeds to step 2914 to determine the tiers or SPs that have an SLE that is less than the SLO for the LUN and that also include one or more data portions from the LUN. Consistent with description elsewhere herein, the candidates for data movement are those data portions of extents of the LUN stored in the SPs that have an SLE less than the SLO for the LUN. In step 2916, the candidate set of data portions determined in step 2914 may be ranked based on predicted I/O activity. In step 2918, processing may be performed to select one or more data portions for data movement from the their current tier/SP for movement to a lower performance target tier/SP. It should be noted that the target SP/tier selection may be based on other criteria as described herein (e.g., preferred media type, RAID configuration, which SPs have available capacity and are accepting I/O workload, and the like).

If step 2904 evaluates to yes, control proceeds to step 2908 to determine the tiers or SPs that have an SLE that is more than the SLO for the LUN and that also include one or more data portions from the LUN. Consistent with description elsewhere herein, the candidates for data movement are those extents of the LUN having data portions stored in the SPs that have an SLE more than the SLO for the LUN. At step 2910, the candidate set of data portions may be ranked based on predicted I/O activity. In step 2912, processing may be performed to select one or more data portions for data movement from the their current tier/SP for movement to a higher performance target tier/SP. It should be noted that the target SP/tier selection may be based on other criteria as described herein (e.g., preferred media type, RAID configuration, which SPs have available capacity and are accepting I/O workload, and the like).

In one embodiment, step 2910 may rank the candidate set of data portions based on promotion scores determined for the extents. Additionally, the candidate set of data portions may also be ranked based on the time since data of each extent was last accessed. In one embodiment, the extent level promotion scores may be used as primary criteria for ranking the data portions. Then, for those extents having the same promotion score, such extents may be further ranked based on access time with the most recently accessed data portions ranked highest. In one embodiment, the following promotion score may be determined for each extent to predict the I/O activity for the extent in the next time period "t" using an ARIMA model as described herein:

Promotion Score=(4*((3*RSH)+WSH))+((3*RLG)+ WLG)   EQUATION P1 where

RSH is the predicted value of the short term read I/O statistic based on an ARIMA model. It should be noted that this value may be based on the aggregated read counts 2322 and 2326 of FIG. 41 for both random and sequential read cache misses as described elsewhere herein.

WSH is the predicted value of the short term write I/O statistic based on an ARIMA model (e.g., 2324 of FIG. 41).

RLG is the predicted value of the long term read I/O statistic based on an ARIMA model. It should be noted that this value may be based on the aggregated read counts 2332 and 2336 of FIG. 41 for both random and sequential read cache misses as described elsewhere herein.

WLG is the predicted value of the long term write I/O statistic based on an ARIMA model (e.g., 2334 of FIG. 41).

The extents may be ranked, based on the promotion scores for the extents of the LUN, from highest promotion score to lowest promotion score. The extent having the highest promotion score is ranked as the busiest/most active extent of the LUN and the extent having the lowest promotion score is ranked as the least active extent of the LUN. The data portions of the ranked extents may be selected for data movement based on the ranked promotion scores, from highest to lowest, whereby data portions of extents having higher/highest ranked promotion scores may be considered for data movements before another data portion of an extent having a lower promotion score. Additionally, access time may also be considered. For example, an embodiment may use the access time as secondary criteria in the ranking. A first and second extent may have the same promotion score but the first extent may have a more recent access time that the second extent so the first extent may be ranked higher than the second extent. As a variation, an embodiment may consider access time, for example, by selecting a data portion of an extent for data movement only if the extent's last access time was within a specified window of time. In this manner, only data portions of the most recently accessed extents with high promotion scores may be considered for data movement to a higher performance tier.

As a variation to the foregoing ranking based on promotion scores for extents, an embodiment may determine the activity ranking for the extents based on the RSH value. For example, the extents of the LUN having data stored on SPs/tiers each having an SLE less than the LUN's SLO may be ranked, from highest to lowest, based on RSH. Those extents having the highest predicted RSH may have their data portions selected for data movement to a higher performance tier prior to other extents having a lower predicted RSH.

In one embodiment, step 2916 may rank the candidate set of data portions based on demotion scores determined for the extents. Additionally, the candidate set of data portions may also be ranked based on the time since data of each extent was last accessed. In one embodiment, the extent level demotion scores may be used as primary criteria for ranking the data portions. Then, for those extents having the same demotion score, such extents may be further ranked based on access time with the data portions having the oldest access times ranked highest. In one embodiment, the following demotion score may be determined for each extent to predict the I/O activity for the extent in the next time period "t" using an ARIMA model as described herein:

Demotion Score=(RSH+(3*WSH))+4*(RLG+ (3*WLG))   EQUATION D1

The extents may be ranked, based on the demotion scores for the extents of the LUN, from lowest demotion score (e.g., least active/idle) to highest demotion score. The lower the demotion score, the more inactive/idle the extent's activity. The data portions of the ranked extents may be selected for data movement based on the ranked demotion scores, from lowest to highest, whereby data portions of extents having lower/lowest ranked promotion scores may be considered for demotion data movements before another data portion of an extent having a higher demotion score. Additionally, access time may also be considered. For example, an embodiment may use the access time as secondary criteria in the ranking. A first and second extent may have the same demotion score but the first extent may have a more recent access time that the second extent so the first extent may be ranked lower than the second extent. As a variation, an embodiment may consider access time, for example, by selecting a data portion of an extent for data movement only if the extent's last access time indicates that data of the extent was not recently accessed (e.g., not accessed within a recent window of time). In this manner, only data portions of the least recently accessed extents with low demotion scores may be considered for data movement to a lower performance tier.

As a variation to the foregoing ranking based on demotion scores for extents, an embodiment may determine the activity ranking for the extents based on the RSH value. For example, the extents of the LUN having data stored on SPs/tiers each having an SLE less than the LUN's SLO may be ranked, from lowest to highest, based on RSH. Those extents having the lowest predicted RSH may have their data portions selected for data movement to a lower performance tier prior to other extents having a higher predicted RSH.

The foregoing describes some examples of criteria that may be used to rank and select data portions from movement between storage tiers. Generally, an embodiment may use any suitable criteria.

In connection with performing data movements moving data portions of a LUN to either higher or lower performance media because the LUN is not in compliance with its SLO, such data movements may be performed until the predicted performance of the SLO, based on the data movements and associated modeled I/O workload, is in compliance with its SLO (e.g., or within some specified threshold thereof).

Figure 47:
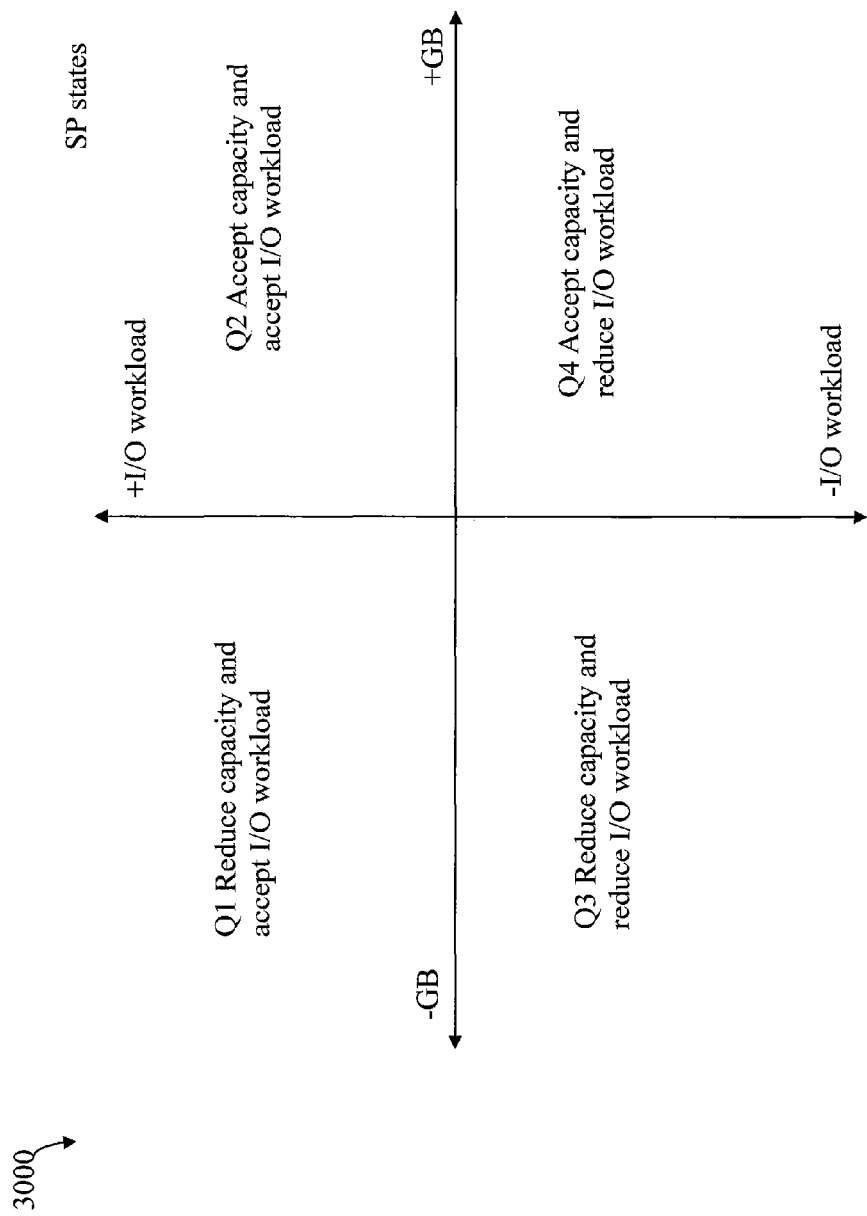
FIG. 47 is an example illustrating different states of a storage pool (SP) in an embodiment in accordance with techniques herein.

Referring to FIG. 47, shown is an example 3000 illustrating different states of SPs in an embodiment in accordance with techniques herein. Consistent with description elsewhere herein, for an SP configured using PDs of a storage tier, the SP may have an associated SLE and an associated capacity limit. If the current allocation of the SP exceeds the capacity limit, the SP has a capacity violation. If the SP has a current observed average RT the exceeds an RT specified in its SLE, the SP has a performance problem and needs to reduce its I/O workload. Thus, an SP may be characterized as being in one of 4 states each associated with one of the 4 quadrants Q1-Q4 of FIG. 47. In the example 3000, the X axis denotes allocated or consumed capacity in GBs of the SP where a positive X coordinate denotes a number of GBs of available capacity (e.g. below the SP's maximum capacity limit), and a negative X coordinate denotes a number of GBs of a capacity violation (e.g. above the SP's maximum capacity limit). The Y axis denotes current I/O workload of the SP where a positive X coordinate denotes that the SP can accept I/O workload (e.g. SP is currently below its SLE), and a negative X coordinate denotes that the SP needs to reduce its I/O workload (e.g. SP is currently above its SLE).

Q1 denotes the SP state where the SP needs to reduce its currently allocated capacity and can accept additional I/O workload. Q2 denotes a stable SP state where the SP is within specified SLE and capacity maximum limits or upper bounds. Q3 denotes a state where the SP needs to reduce its currently allocated capacity and also reduce its I/O workload (e.g., exceeds its SLE). Q4 denotes a state where the SP needs to reduce its I/O workload and has available capacity.

Thus, based on the illustration in FIG. 47, an SP in the state of Q2 is stable and does not require movement of data portions out of the SP to meet its specified SLE and capacity limit maximum. For an SP in any of the other 3 states associated with Q1, Q3 or Q4, processing may be performed to move one or more data portions out of the SP to another target SP and tier in order for the SP to meet its specified SLO and capacity limit maximum.

It should be noted that more detail regarding the SP states is described in more detail elsewhere herein.

Figure 48:
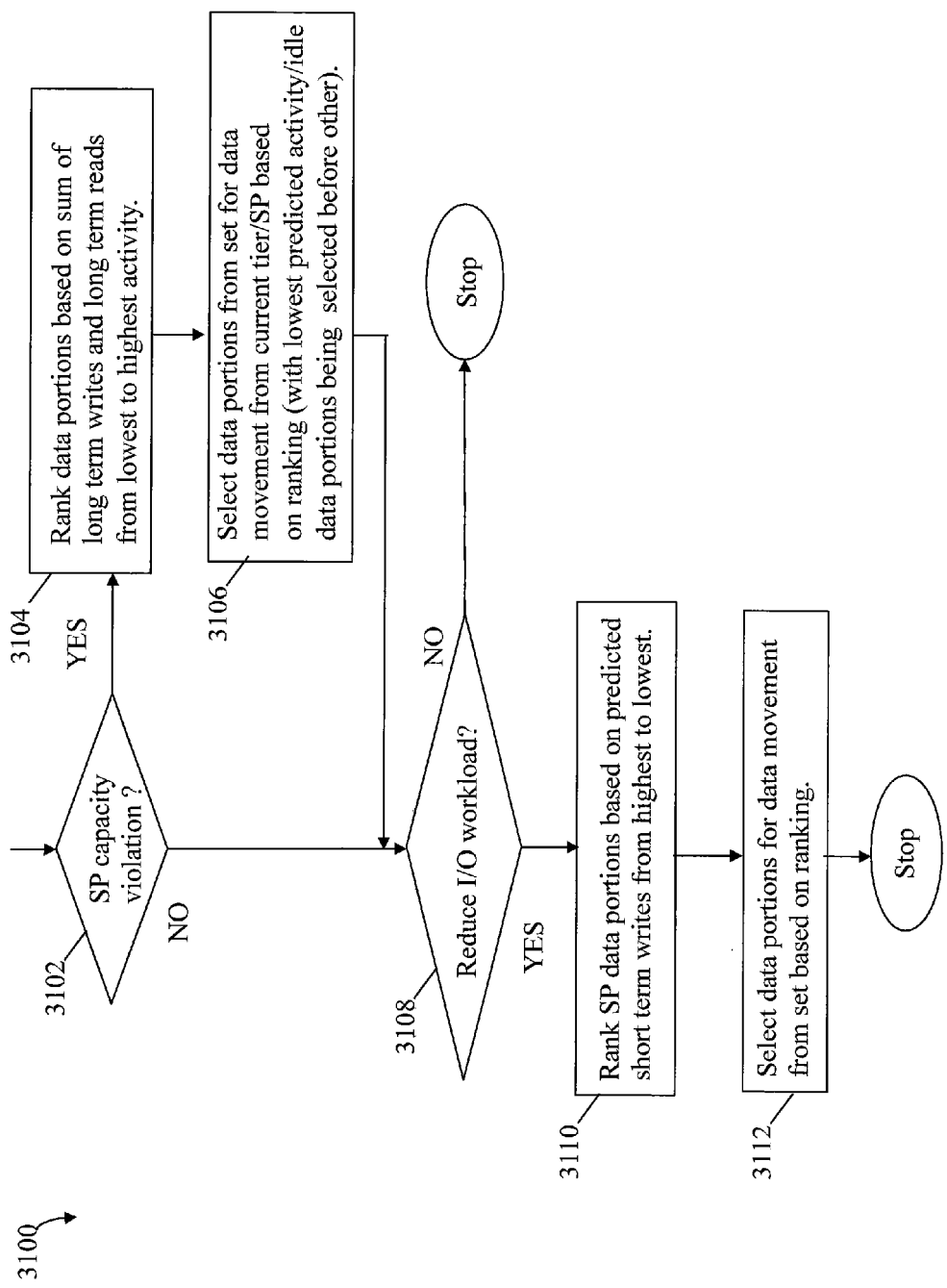

Referring to FIG. 48, shown is a flowchart of processing steps that may be performed in an embodiment in accordance with techniques herein for an SP having PDs of a storage tier. Although illustrated for a single SP, the flowchart 3100 may be repeated for each desired SP. At step 3102, a determination is made as to whether there is a capacity violation for the SP. As described elsewhere herein, a maximum capacity limit denoting a maximum amount of the SP that may be used for allocation and provisioning may be specified. If a current allocation amount of the SP exceeds the foregoing maximum capacity limit, then there is a capacity violation for the SP whereby step 3102 evaluates to yes. If step 3102 evaluates to yes, control proceeds to step 3104. In step 3104, data portions stored in the SP may be ranked from lowest to highest predicted I/O activity or workload based on extent level statistics. In one embodiment, step 3104 may rank extents having data portions stored in the SP based on the sum of the predicted long term writes and the long term reads for each extent. With reference back to FIG. 41, the foregoing sum may be the sum of 2332, 2334 and 2336. At step 3106, one or more data portions stored in the SP are selected for data movement based on the order of the ranked extents from step 3104. In one embodiment, those data portions of extents which are idle or have the lowest activity may be selected for data movement from the current tier/SP before other data portions of other extents having a higher activity. From step 3106, control proceeds to step 3108. If step 3102 evaluates to no, control proceeds directly to step 3108.

At step 3108, a determination is made as to whether there is a need to reduce the I/O workload for the SP. Step 3108 may compare an average observed RT for I/Os directed to the SP to the SLE for the SP. If the average observed RT is not less than the SLE, step 3108 may evaluate to yes whereby it is determined that there is a need to reduce the I/O workload for the SP. If step 3108 evaluates to no, processing stops for the SP. Alternatively, if step 3108 evaluates to yes, control proceeds to step 3110. In step 3110, processing is performed to rank the data portions of the SP based on extent level statistics. In one embodiment, step 3110 may determine the extents including data portions stored on the SP and rank the extents based on the predicted short term writes, from highest to lowest. With reference back to FIG. 41, the foregoing predicted short term writes may be element 2324. At step 3112, one or more data portions stored in the SP are selected for data movement based on the order of the ranked extents from step 3110. In one embodiment, those data portions of extents which have the highest ranked activity may be selected for data movement from the current tier/SP before other data portions of other extents having a lower activity. In step 3112, processing may be performed to select one or more data portions for data movement from their current tier/SP for movement to a higher performance target tier/SP. It should be noted that the target SP/tier selection may be based on other criteria as described herein (e.g., preferred media type, RAID configuration, which SPs have available capacity and are accepting I/O workload, and the like). From step 3112, processing stops for the SP.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing data storage optimization comprising:
collecting a current set of one or more I/O statistics for a current time period T;
determining, using the current set of one or more I/O statistics and one or more models, a predicted set of one or more I/O statistics for a next time period T+1, wherein each of the one or more models is used to model at least a first of the one or more I/O statistics of the predicted set, wherein each of the one or more models is an auto-regressive integrate moving average model characterized by model parameters including P denoting a number of auto-regressive terms, D denoting a number of nonseasonal difference needed for stationarity, and Q denoting a number of lagged forecast errors of prediction; and
determining, by a data storage optimizer using the predicted set of one or more I/O statistics, one or more data portions for movement from a current storage tier to a target storage tier, wherein each of the one or more I/O statistics of the predicted set is a predicted I/O statistic for the next time period T+1 determined using a constant and any of: a weighted sum of one or more observed values for said each I/O statistic in one or more time periods prior to time period T+1, and a weighted sum of one or more error values each denoting an amount of error between a predicted value and an observed value for said each I/O statistic in a particular time period, wherein at least a first of the one or more data portions selected for movement is included in a logical device having an average observed response time that is not in accordance with a specified response time objective denoting a performance goal for the logical device, and wherein the logical device has the average observed response time that is greater than the specified response time objective and the method includes:
moving the first data portion from the current storage tier to the target storage tier, wherein the current storage tier has an associated expected response time that is more than the specified response time objective for the logical device and wherein said target storage tier is a higher performance storage tier than the current storage tier.

2. The method of claim 1, further comprising:
determining, by the data storage optimizer using the predicted set of one or more I/O statistics, a second data portion for movement, wherein the second data portion is included in a first storage pool of storage devices of a first storage tier and the first storage pool has an associated average observed response time that is more than a second specified response time objective denoting an expected service level objective for physical storage devices of the first storage tier.

3. The method of claim 2, further comprising:
moving the second data portion from the first storage tier to another storage tier that is a higher performance storage tier than the first storage tier.

4. The method of claim 1, further comprising:
determining, by the data storage optimizer using the predicted set of one or more I/O statistics, a second data portion for movement, wherein the second data portion is included in a first storage pool of storage devices of a first storage tier and the first storage pool has a maximum capacity limit denoting an upper allocation bound wherein a current allocation amount of the first storage pool exceeds the maximum capacity limit.

5. The method of claim 4, wherein the second data portion is included in a first extent determined to be idle or has a predicted I/O workload that is lower than any other extent including any of the one or more data portions.

6. The method of claim 1, wherein the current set of one or more I/O statistics for the current time period T includes any of a random read miss I/O statistic, a write I/O statistic, and a read miss sequential I/O statistic.

7. The method of claim 1, wherein the predicted set of one or more I/O statistics for a next time period T+1 includes one or more predicted short term I/O statistics and one or more predicted long term I/O statistics.

8. The method of claim 7, wherein the one or more predicted short term I/O statistics includes a predicted short term read I/O statistic and a predicted short term write I/O statistic.

9. The method of claim 7, wherein the one or more predicted long term I/O statistics includes a predicted long term read I/O statistic and a predicted long term write I/O statistic.

10. The method of claim 1, wherein the logical device is a virtually provisioned logical device.

11. A method of performing data storage optimization comprising:
collecting a current set of one or more I/O statistics for a current time period T;
determining, using the current set of one or more I/O statistics and one or more models, a predicted set of one or more I/O statistics for a next time period T+1, wherein each of the one or more models is used to model at least a first of the one or more I/O statistics of the predicted set, wherein each of the one or more models is an auto-regressive integrate moving average model characterized by model parameters including P denoting a number of auto-regressive terms, D denoting a number of nonseasonal difference needed for stationarity, and Q denoting a number of lagged forecast errors of prediction; and
determining, by a data storage optimizer using the predicted set of one or more I/O statistics, one or more data portions for movement from a current storage tier to a target storage tier, wherein each of the one or more models uses an equation or function including a constant, a first set of one or more terms that are the auto-regressive terms and a second set of one or more terms that are lagged forecast errors of prediction, wherein at least a first of the one or more models uses a first set of one or more coefficients and a second set of one or more coefficients, said first set of coefficients being used with the first set of one or more terms and said second set of coefficients being used with the second set of one or more terms, wherein at least a first of the one or more data portions selected for movement is included in a logical device having an average observed response time that is not in accordance with a specified response time objective denoting a performance goal for the logical device, and wherein the logical device has the average observed response time that is greater than the specified response time objective and the method includes:
moving the first data portion from the current storage tier to the target storage tier, wherein the current storage tier has an associated expected response time that is more than the specified response time objective for the logical device and wherein said target storage tier is a higher performance storage tier than the current storage tier.

12. The method of claim 11, wherein any of the first set of one or more coefficients, the second set of one or more coefficients and a value for parameter D is determined in accordance with I/O workload characteristics of an application issuing I/O operations directed to a set of one or more logical devices including the one or more data portions selected for data movement, wherein said collecting collects information regarding I/O operations of the application observed during the current time period T.

13. The method of claim 12, wherein the I/O workload characteristics denote any of: whether I/O workload for the application includes more reads than writes, whether I/O workload for the application includes more sequential I/Os than random I/Os, whether I/O workload for the application includes I/Os larger than a specified size, and whether I/O workload for the application includes I/Os of a specified size.

14. A system comprising:
a processor; and
a memory comprising code stored thereon, that, when executed, performs a method of data storage optimization comprising:
collecting a current set of one or more I/O statistics for a current time period T;
determining, using the current set of one or more I/O statistics and one or more models, a predicted set of one or more I/O statistics for a next time period T+1, wherein each of the one or more models is used to model at least a first of the one or more I/O statistics of the predicted set, wherein each of the one or more models is an auto-regressive integrate moving average model characterized by model parameters including P denoting a number of auto-regressive terms, D denoting a number of nonseasonal difference needed for stationarity, and Q denoting a number of lagged forecast errors of prediction; and
determining, by a data storage optimizer using the predicted set of one or more I/O statistics, one or more data portions for movement from a current storage tier to a target storage tier, wherein each of the one or more models uses an equation or function including a constant, a first set of one or more terms that are the auto-regressive terms and a second set of one or more terms that are lagged forecast errors of prediction, wherein at least a first of the one or more models uses a first set of one or more coefficients and a second set of one or more coefficients, said first set of coefficients being used with the first set of one or more terms and said second set of coefficients being used with the second set of one or more terms, wherein at least a first of the one or more data portions selected for movement is included in a logical device having an average observed response time that is not in accordance with a specified response time objective denoting a performance goal for the logical device, and wherein the logical device has the average observed response time that is greater than the specified response time objective and the method includes:
moving the first data portion from the current storage tier to the target storage tier, wherein the current storage tier has an associated expected response time that is more than the specified response time objective for the logical device and wherein said target storage tier is a higher performance storage tier than the current storage tier.

15. A non-transitory computer readable medium comprising code stored thereon, that, when executed, performs a method of data storage optimization comprising:
collecting a current set of one or more I/O statistics for a current time period T;
determining, using the current set of one or more I/O statistics and one or more models, a predicted set of one or more I/O statistics for a next time period T+1, wherein each of the one or more models is used to model at least a first of the one or more I/O statistics of the predicted set,
wherein each of the one or more models is an auto-regressive integrate moving average model characterized by model parameters including P denoting a number of auto-regressive terms, D denoting a number of nonseasonal difference needed for stationarity, and Q denoting a number of lagged forecast errors of prediction; and
determining, by a data storage optimizer using the predicted set of one or more I/O statistics, one or more data portions for movement from a current storage tier to a target storage tier, wherein each of the one or more models uses an equation or function including a constant, a first set of one or more terms that are the auto-regressive terms and a second set of one or more terms that are lagged forecast errors of prediction, wherein at least a first of the one or more models uses a first set of one or more coefficients and a second set of one or more coefficients, said first set of coefficients being used with the first set of one or more terms and said second set of coefficients being used with the second set of one or more terms, wherein at least a first of the one or more data portions selected for movement is included in a logical device having an average observed response time that is not in accordance with a specified response time objective denoting a performance goal for the logical device, and wherein the logical device has the average observed response time that is greater than the specified response time objective and the method includes:
moving the first data portion from the current storage tier to the target storage tier, wherein the current storage tier has an associated expected response time that is more than the specified response time objective for the logical device and wherein said target storage tier is a higher performance storage tier than the current storage tier.

16. The non-transitory computer readable medium of claim 15, wherein any of a promotion score and a demotion score are determined for each of the one or more data portions using the predicted set of one or more I/O statistics.

* * * * *